US010633403B2

(12) United States Patent
Kang et al.

(10) Patent No.: US 10,633,403 B2
(45) Date of Patent: Apr. 28, 2020

(54) N-HETEROCYCLIC PHOSPHINES

(71) Applicant: The Board of Regents of the Nevada System of Higher Education on Behalf of the University of Nevada, Las Vegas, Las Vegas, NV (US)

(72) Inventors: Jun Yong Kang, Henderson, NV (US); Karimulla Mulla, Atlanta, GA (US); Kyle Aleshire, North Las Vegas, NV (US); Paul M. Forster, Las Vegas, NV (US)

(73) Assignee: THE BOARD OF REGENTS OF THE NEVADA SYSTEM OF HIGHER EDUCATION ON BEHALF OF THE UNIVERSITY OF NEVADA, Las Vegas, NV (US)

( * ) Notice: Subject to any disclaimer, the term of this patent is extended or adjusted under 35 U.S.C. 154(b) by 235 days.

(21) Appl. No.: 15/505,052

(22) PCT Filed: Sep. 9, 2015

(86) PCT No.: PCT/US2015/049181
§ 371 (c)(1),
(2) Date: Feb. 17, 2017

(87) PCT Pub. No.: WO2016/040479
PCT Pub. Date: Mar. 17, 2016

(65) Prior Publication Data

US 2018/0118770 A1 May 3, 2018

Related U.S. Application Data

(60) Provisional application No. 62/048,072, filed on Sep. 9, 2014, provisional application No. 62/175,028, filed on Jun. 12, 2015.

(51) Int. Cl.

*C07F 9/6584* (2006.01)
*C07F 9/6571* (2006.01)
*C07F 9/6574* (2006.01)
*C07F 9/6578* (2006.01)

(52) U.S. Cl.
CPC ........ *C07F 9/65848* (2013.01); *C07F 9/6578* (2013.01); *C07F 9/65719* (2013.01); *C07F 9/65742* (2013.01); *C07F 9/65744* (2013.01); *C07F 9/65785* (2013.01); *C07F 9/657181* (2013.01)

(58) Field of Classification Search
CPC ............................ C07F 9/6584; C07F 9/6571
See application file for complete search history.

(56) References Cited

FOREIGN PATENT DOCUMENTS

WO WO-99/07672 A1 2/1999
WO WO-2016/040479 A1 3/2016

OTHER PUBLICATIONS

Breen et al., 2008, caplus an 2008:1485986.*
Derivative, 2018, https://en.wikipedia.org/wiki/Derivative (chemistry).*
U.S. Appl. No. 62/048,072, filed Sep. 9, 2014, Jun Yong Kang et al.
PCT/US2015/049181 (WO 2016/040479), Sep. 9, 2015 (Mar. 17, 2016), Jun Yong Kang et al.
Ackermann, L. et al. (2010) Tetra-ortho-Substituted Biaryls Through Palladium-Catalyzed Suzuki-Miyaura Couplings with a Diaminochlorophosphine Ligand. Org Lett. 12(5):1004-7.
Al Quntar, A.A.A. et al. (2007) Potent Anti-Inflammatory Activity of 3-Aminovinylphosphonates as Inhibitors of Reactive Oxygen Intermediates, Nitric Oxides Generation, and Tumor Necrosis Factor-Alpha Release. EurJ Pharmacol. 556(1-3):9-13.
Allen, D.W. et al., (2010) Phosphines and Related P—C-bonded Compounds. Organophosphorus Chem. 39:1-48.
Ambartsumova et al. (1997) 1,3-Thiazepines. 4.* Reactions of 2-Iminothiazepines with Methyl Acylate, Crystal and Molecular Structure of 2-Phenylimino-3-(3-Methoxycarbonylethyl)- and 2-Benzyliminohexahydro-1,3-Thiadiazepines. Chem Heterocycl Compd. 33:475-80.
Ansell, J. and M. Wills (2002) Enantioselective Catalysis Using Phosphorus-Donor Ligands Containing Two or Three P—N or P—O Bonds. Chem Soc Rev. 31(5):259-68.
Arbuzov, B.A. (1964) Michaelis-Arbusow-Und Perkow-Reaktionen. Pure Appl Chem. 9(2):307-35.
Bang, J. et al. (2015) Asymmetric Aldol Reaction of Allenoates: Regulation for the Selective Formation of Isomeric Allenyl or Alkynyl Aldol Adduct. Org Lett. 17(6):1573-6.
Berge, S.M. et al. Pharmaceutical Salts. J Pharma Sci. 66(1):1-19 (1977).
Bernacki, A.L. et al. (2010) A Selective and Convenient Method for the Synthesis of 2-Phenylaminothiazolines. Org Lett. 12(23):5526-9.
Bhattacharya, A.K. and G. Thyagarajan (1981) Michaelis-Arbuzov Rearrangement. Chem Rev. 81(4):415-30.
Blazis, V.J. et al. (1995) Reactions of Chiral Phosphorous Acid Diamides: The Asymmetric Snthesis of Chiral α-Hydroxy Phosphonamides, Phosphonates, and Phosphonic Acids. J Org Chem. 60(4):931-40.
Blom, K.F. et al. (2004) Preparative LC-MS Purification: Improved Compound-Specific Method Optimization. J Comb Chem. 6(6):874-83.
Borowitz, I.J. et al. (1972) Organophosphorus Chemistry. XVII. Kinetics and Mechanism of the Perkow Reaction. J Am Chem Soc. 94(5):1623-8.
Breeden, S. et al. (2000) Rhodium-Mediated Asymmetric Hydroformylation with a Novel Bis(diazaphospholidine) Ligand. Angew Chem Int Ed. 39(22):4106-8.
Breen, D. et al. (2009) A Divergent Synthesis of Minor Groove Binders With Tail Group Variation. Org Biomol Chem. 7(1):178-86.
Brunel, J.M. et al. (1997) Enantioselective Palladium Catalyzed Allylic Substitution with New Chiral Pyridine-Phosphine Ligands. Tetrahedron Lett. 38(34):5971-4.

(Continued)

*Primary Examiner* — Sun Jae Yoo
(74) *Attorney, Agent, or Firm* — Ballard Spahr LLP

(57) ABSTRACT

Provided herein are N-heterocyclic phosphines (NHPs) useful in metal-free phosphorus-carbon bond forming reactions. Methods for preparing vinylphosphonates using NHPs also are provided. This abstract is intended as a scanning tool for purposes of searching in the particular art and is not intended to be limiting of the present invention.

20 Claims, 2 Drawing Sheets

(56) References Cited

OTHER PUBLICATIONS

Buck, F.C. and J.T. Yoke, III (1962) On the Mechanism of the Arbuzov Rearrangement. J Org Chem. 27(10):3675-7.
Caputo, C.A. et al. (2008) N-Heterocyclic Phosphenium Cations: Syntheses and Cycloaddition Reactions. Dalton Trans. (26):3461-9.
Catana, D.A. et al. (2011) Synthesis of Phostone-Constrained Nucleic Acid (P-CNA) Dinucleotides Through Intramolecular Arbuzov's Reaction. Eur J Org Chem. 2011(34):6857-63.
Chelucci, G. et al. (2003) Chiral P,N-Ligands with Pyridine-Nitrogen and Phosphorus Donor Atoms. Syntheses and Applications in Asymmetric Catalysis. Tetrahedron. 59(48):9471-515.
Chen, B. et al. (2008) An Efficient Double 1,2-Addition Reaction of 2,3-Allenoates with Allyl Magnesium Chloride. J Org Chem. 73(23):9486-9.
Clavier, H. et al. (2011) Highly Selective Cobalt-Mediated [6+2] Cycloaddition of Cycloheptatriene and Allenes. Org Lett. 13(2):308-11.
Constantieux, T. and G. Buono (2002) Synthesis of Penta-1,2-Dien-4-One (Acetylallene). Orgn Syn. 78:135.
Cowen, B. et al. (2009) Pyridylalanine (Pal)-Peptide Catalyzed Enantioselective Allenoate Additions to N-Acyl (mines. J Am Chem Soc. 131(17):6105-7.
De La Cruz, A. et al. (1998) The Synthesis, Structure and Properties of Diazaphospholes: Reagents and Ligands for Asymmetric Synthesis. Tetrahedron. 54(35):10513-24.
Denmark, S.E. and J.H. Kim (1995) Asymmetric Michael Addition Reaction of Phosphorus-Stabilized Allyl Anions with Cyclic. J Org Chem. 60(23):7535-47.
Denton, R.M. et al. (2011) Catalytic Phosphorus(V)-Mediated Nucleophilic Substitution Reactions: Development of a Catalytic Appel Reaction. J Org Chem. 76(16):6749-67.
Dolomanov, O.V. et al. (2009) OLEX2: a Complete Structure Solution, Refinement and Analysis Program. J Appl Cryst. 42(2):339-41.
Dupau, P. et al. (2002) Osmium-Catalyzed Dihydroxylation of Olefins in Acidic Media: Old Process, New Tricks. Adv Synth Catal. 344(3-4):421-33.
Enders, D. et al. (2006) the Phospha-Michael Addition in Organic Synthesis. Eur J Org Chem. 2006(1):29-49.
Fernandez-Valle, M.E. et al. (2015) 2D Ultrafast HMBC $^{1}$H, $^{31}$P: Obtaining Mechanistic Details on the Michaelis-Arbuzov Reaction. J Org Chem. 80(2):799-805.
Geng, Z.C. et al. (2014) Construction of Highly Substituted Pyrazole Derivatives with P—C Bond: Access to Racemic and Enantioselective Forms by Conjugate Addition of Diarylphosphane Oxides to α,β-Unsaturated Pyrazolones. Tetrahedron. 70(2):417-26.
Goodyer, C.L.M. et al. (2003) Synthesis of N-benzyl- and N-phenyl-2-amino-4,5-dihydrothiazoles and Thioureas and Evaluation as Modulators of the Isoforms of Nitric Oxide Synthase. Bioorg Med Chem. 11(19):4189-206.
Guadat, D. (2010) Phosphorus Heterocycles II. Bansal, R.K., Ed.Springer Berlin Heidelberg: 2010; vol. 21, pp. 63-102.
Guang, J. and J.C.G. Zhao (2013) Organocatalyzed Asymmetric Michael Reaction of β-aryl-a-ketophosphonates and Nitroalkenes. Tetrahedron Lett. 54(42):5703.
Guzaev, A.P. and M. Manoharan (2001) 2-Benzamidoethyl Group—A Novel Type of Phosphate Protecting Group for Oligonucleotide Synthesis. J Am Chem Soc. 123(5):783-93.
Hanessian, S. et al. (2000) Asymmetric Conjugate Additions of Chiral Phosphonamide Anions to α,β-Unsaturated Carbonyl Compounds. A Versatile Method for Vicinally Substituted Chirons. J Org Chem. 65(18):5623-31.
Heinelt, U. et al. (2004) A Convenient Method for the Synthesis of 2-amino Substituted AZA-Heterocycles from N,N'-disubstituted Thioureas Using TsCl/NaOH. Tetrahedron. 60(44):9883-8.
Hoashi, Y. et al. (2004) Bifunctional Thiourea-Catalyzed Enantioselective Double Michael Reaction of y,6-unsaturated [3-ketoester to Nitroalkene: Asymmetric Synthesis of (—)-epibatidine. Tetrahedron Lett. 45(50):9185-8.
Hoashi, Y. et al. (2005) Enantioselective Michael Addition to α,β-Unsaturated Imides Catalyzed by a Bifunctional Organocatalyst. Angew Chem Int Ed. 44(26):4032-5.
Holstein, S.A. et al. (1998) Phosphate and Bisphosphonate Analogues of Farnesyl Pyrophosphate as Potential Inhibitors of Farnesyl Protein Tranferase. Bioorg Med Chem. 6(6):687-94.
Hua, D.H. et al. (1987) Remarkable Enantioselective 1,4-Addition Reactions of Chiral Allylphosphonyl Anions (Ambident Nucleophiles) with Cyclic Enones (Ambident Electrophiles). J Am Chem Soc. 109(16):5026-9.
Jackson, J.A. et al. (1989) Synthesis of α-phosphono Lactones and Esters Through a Vinyl Phosphate-Phosphonate Rearrangement. J Org Chem. 54(20):4750-4.
Kedrowski, S.M. and D.A. Dougherty (2010) Room-Temperature Alternative to the Arbuzov Reaction: The Reductive Deoxygenation of Acyl Phosphonates. Org Lett. 12(18):3990-3.
Keglevich, G. et al. (2008) Phospha-Michael Reactions Involving P-Heterocyclic Nucleophiles. Heteroat Chem. 19(3):288-92.
Kim, T.H. et al. (1999) One-Pot Synthesis of 2-phenylaminothiazolines from N-2-hydroxyethyl)-N'-phenylthioureas. Tetrahedron Lett. 40(47):8201-4.
Law, K.R. and C.S.P. McErlean (2013) Extending the Stetter Reaction with 1,6-Acceptors. Chem Eur J. 19(47):15852-5.
Lee, J.H. et al. (2010) Characterization and Structure of Dhpl, a Phosphonate O-Methyltransferase Involved in Dehydrophos Biosynthesis. Proc Natl Acad Sci U.S.A. 107(41):17557-62.
Lee, P.H. et al. (2011) Preparation of Ethyl 2-Aryl 2,3-Alkadienoates via Palladium-Catalyzed Selective Cross-Coupling Reactions. J Org Chem. 76(1):312-5.
Liao, J.Y. et al. (2015) Catalytic Divergent Synthesis of 3H of 1H Pyrroles by [3+2] Cyclization of Allenoates with Activated Isocyanides. J Am Chem Soc. 137(2):628-31.
Lown, J.W. and S.M.S. Chauhan (1983) Synthesis of Novel-N-Nitrosothioureas and Examination of Their Mechanisms of Formation by High-Field Nitrogen-15 and Carbon-13 Nuclear Magnetic Resonance Spectra of Specifically Labeled Compounds. J Org Chem. 48(4):507-12.
Michaelis, A. and R. Kaehne (1898) Ueber das Verhalten der Jodalkyle genen die sogen. Phosphorisäureester oder O-Phosphine. Ber Dtsch Chem Ges. 31(1):1048-55.
Moriwake, T. et al. (1986) A Selective 1,2-Reduction of γ-Amino-α,β-Unsaturated Esters by Means of $BF_3$-$OEt_2$-DIBAL-H System. Highly Versatile Chiral Building Blocks from α-Amino Acids. Chem Lett. 15(5):815-8.
Na, R. et al. (2011) Phosphine-Catalyzed Annulations of Azomethine (mines: Allene-Dependent [3+2], [3+3], [4+3], and [3+2+3] Pathways. J Am Chem Soc. 133(34):13337.
Nametz, R.C. (1967) Self-Extinguishing polyester Resins. Ind Eng Chem. 59(5):99-116.
Okino, T. et al. (2005) Enantio- and Diastereoselective Michael Reaction of 1,3-Dicarbonyl Compounds to Nitroolefins Catalyzed by a Bifunctional Thiourea. J Am Chem Soc. 127(1):119-25.
Pétursson, S. et al. (1997) Protecting Groups in Carbohydrate Chemistry. J Chem Educ. 74(11):1297.
Pubchem-15142984. Create date: Feb. 9, 2007.
Rajeshwaran, G.G. et al. (2011) Lewis Acid-Mediated Michaelis—Arbuzov Reaction at Room Temperature: a Facile Preparation of Arylmethul/Heteroarylmethyl Phosphonates. Org Lett. 13(6):1270-3.
Reiter, J. et al. (1980) Synthesis of New "Benzyl"-Thiourea Derivatives and Their Cyclic Analogues with Diuretic and Saluretic Activity. EurJ Med Chem. 15(1):41-3.
Remington's Pharmaceutical Sciences, 17th ed., Mack Publishing Company, Easton, PA, 1985, p. 1418.
Renard, P.Y. et al. (2003) Lewis Acid Catalyzed Room-Temperature Michaelis-Arbuzov Rearrangement. Angew Chem Int Ed. 42(21):2389-92.
Robbie, A.J. et al. (2011) Complexes of Sterically-Hindered Diaminophosphinothiolate Ligands with Rh(I), Ni(II) and Pd(II). Polyhedron. 30(11):1849-56.
Rout, L. and A.M. Harned (2009) Allene Carboxylates as Dipolarophiles in Rh-Catalyzed Carbonyl Ylide Cycloadditions. Chem Eur J. 15(47):12926-8.

(56) References Cited

OTHER PUBLICATIONS

Scherer, O.J. and M. Schmidt. (1964) Synthese neuer Organoarsen- und Organophosphor-amine. Angew Chem. 76(18):787.
Shie, J.J. et al. (2008) a Concise and Flexible Synthesis of the Potent Anti-Influenza Agents Tamiflu and Tamiphosphor. Angew Chem Int Ed. 47(31):5788-91.
Trost, B.M. et al. (2001) Ruthenium-Catalyzed Two-Component Addition to Form 1,3-Dienes: Optimization, Scope, Applications, and Mechanism. J Am Chem Soc. 123(50):12466-76.
Tsuboi, S. et al. (1993) A New Aldol Condensation of $\alpha$-allenic Esters with Aldehydes, Including a One-Pot Synthesis of Enyne Compounds. J Org Chem. 58(22):5952-7.
Wurz, R.P. and G.C. Fu (2005) Catalytic Asymmetric Synthesis of Piperidine Derivatives through the [4+2] Annulation of Imines with Allenes. J Am Chem Soc. 127(35):12234-5.
Xiao, Y. et al. (2014) Chiral Phosphines in Nucleophilic Organocatalysis. Beilstein J Org Chem. 10:2089-121.
Zhu, X.F. et al. (2003) An Expedient Phosphine-Catalyzed [4+2] Annulation: Synthesis of Highly Functionalized Tetrahydropyridines. J Am Chem Soc. 125(16):4716-7.
Zijp, E.J et al. (2005) Chiral Bidentate Aminophosphine Ligands: Synthesis, Coordination Chemistry and Asymmetric Catalysis. Dalton Trans. 3: 512-7.
International Search Report and Written Opinion dated Feb. 16, 2016 by the International Searching Authority for International Patent Application No. PCT/US2015/049181, which was filed on Sep. 9, 2015 and published as WO 2016/040479 on Mar. 17, 2016 (Inventor—Kang et al.; Applicant—University of Nevada; (9 pages).
International Preliminary Report on Patentability dated Mar. 14, 2017 by the International Searching Authority for International Patent Application No. PCT/US2015/049181, which was filed on Sep. 9, 2015 and published as WO 2016/040479 on Mar. 17, 2016 (Inventor—Kang et al.; Applicant—University of Nevada; (6 pages).

* cited by examiner

N-HETEROCYCLIC PHOSPHINES

CROSS-REFERENCE TO RELATED APPLICATIONS

This application is a national stage filing under 35 U.S.C. § 371 of International Application No. PCT/US2015/049181, filed on Sep. 9, 2015, which claims the benefit of U.S. Provisional Application No. 62/048,072, filed on Sep. 9, 2014, and U.S. Provisional Application No. 62/175,028, filed on Jun. 12, 2015, the contents of which are incorporated herein by reference in their entirety.

BACKGROUND

The N-heterocyclic phosphine (NHP), a five-membered nitrogen containing heterocycle with a unit of —N—P(X)—N— (two P—N bonds and one P—X bond) (Ansell and Wills (2002) *Chem. Soc. Rev.* 31: 259; Zijp et al. (2005) *Dalton Trans.* 512; Chelucci et al. (2003) *Tetrahedron* 59: 9471), has emerged as a powerful synthetic tool in chemical synthesis since its first observation in 1964 (Scherer and Schmidt (1964) *Angew. Chem.* 76, 787). Traditional NHP-mediated reactions have contributed to both C—C and C—P bond-forming techniques because the focus on NHP chemistry has so far been predominantly directed to phosphorus-donor nucleophiles (Ansell and Wills (2002) *Chem. Soc. Rev.* 31: 259) that assist NHP in coordinating to metal complexes or in forming covalent bonds to electrophiles as ligands or auxiliaries. For example, chiral and achiral NHP ligands have been utilized to create C—C bonds in various transition metal-catalyzed transformations such as hydroformylation (Breeden et al. (2000) *Angew. Chem. Int. Ed.* 39: 4106), Heck reactions (Wucher et al. (2011) *PNAS* 108: 8955), cross-coupling reactions (Ackermann et al. (2010) *Org. Lett.* 12: 1004), and allylic substitutions (Brunel et al. (1997) *Tetrahedron Lett.* 38: 5971).

In addition, chiral NHP-oxides of phosphorus-stabilized anions have been successfully employed as auxiliaries for stereoselective Pudovik-type reaction (De la Cruz et al. (1998) *Tetrahedron* 54: 10513; Blazis et al. (1995) *J. Org. Chem.* 60: 931) and Michael-type reaction (Hanessian et al. (2000) *J. Org. Chem.* 65: 5623; Hua et al. (1987) *J. Am. Chem. Soc.* 109: 5026; Denmark and Kim (1995) *J. Org. Chem.* 60: 7535) to form a C—P bond providing a stereogenic center to the NHP motifs. The widely known C—P bond forming Michaelis-Arbuzov reaction (Bhattacharya and Thyagarajan (1981) *Chem. Rev.* 81: 415; Arbuzov (1964) *Pure Appl. Chem.* 9: 307) utilizes a trialkyl phosphite P(III) and alkyl halide to access dialkyl alkylphosphonates P(V) via an elegant $S_N2$ reaction sequence (Fernandez-Valle et al. (2015) *J. Org. Chem.* 80: 799; Buck and Yoke (1962) *J. Org. Chem.* 27: 3675). Since its discovery in 1898 (Michaelis and Kaehne (1898) *Ber. Dtsch. Chem. Ges.* 31: 1048), the Michaelis-Arbuzov reaction has served as a standard protocol for forming C—P bonds in versatile phosphonate derivatives such as phosphinate and phosphine oxide. Synthesis of such compounds, however, requires the use of aliphatic halides possessing good leaving groups and high temperature. Thus, for the search of more general and mild reaction conditions, attempts to expand the scope of the substrates within $sp^2$ carbon-containing electrophiles were demonstrated by Perkow (Borowitz et al. (1972) *J. Am. Chem. Soc.* 94: 1623) and Dougherty (Kedrowski and Dougherty (2010) *Org. Lett.* 12:3990). Alternatively, efforts of seeking mild reaction conditions resulted in the finding of Lewis acid-mediated reactions (Rajeshwaran et al. (2011) *Org. Lett.* 13: 1270; Renard et al. (2003) *Angew. Chem. Int. Ed.* 42: 2389).

Despite the widespread utility of NHPs, there remains limitations in terms of the substrate scope, only $sp^3$- or $sp^2$-carbon-containing electrophiles are tolerated, and reaction temperature, which increases the chance of side reaction (Fernandez et al. (2015) *J. Org. Chem.* 80: 799). These needs and others are met by the present invention.

SUMMARY

In accordance with the purpose(s) of the invention, as embodied and broadly described herein, the invention, in one aspect, relates to N-heterocyclic phosphines and methods of using these complexes for the preparation of, for example, vinylphosphonates.

Disclosed are compounds having a structure represented by a formula:

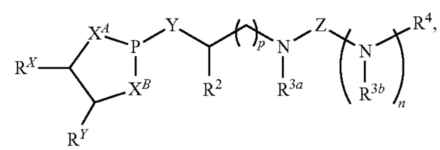

wherein n is selected from 0 and 1; wherein p is selected from 0, 1, 2, 3, 4, and 5; wherein each of $X^A$ and $X^B$ is independently selected from $NR^1$, O, and S; wherein each occurrence of $R^1$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each occurrence of $R^1$, when present, is independently substituted with 0, 1, 2, 3, or 4 independently selected $R^5$ groups; wherein Y is selected from O, S, and $NR^{26}$; wherein $R^{26}$, when present, is selected from hydrogen and C1-C8 alkyl; wherein Z is selected from C═O, C═S, S═O, and $SO_2$; wherein each of $R^X$ and $R^Y$ is independently selected from hydrogen, C1-C8 alkyl, C6-C10 aryl, and 4-10 membered heteroaryl, or wherein each of $R^X$ and $R^Y$ are optionally covalently bonded together and, together with the intermediate carbon atoms, comprise a 5- to 7-membered cycloalkyl or 5- to 6-membered aryl; wherein $R^2$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein $R^2$ is substituted with 0, 1, 2, 3, or 4 independently selected $R^5$ groups; wherein each of $R^{3a}$ and $R^{3b}$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each of $R^{3a}$ and $R^{3b}$ is independently substituted with 0, 1, 2, 3, or 4 independently selected $R^5$ groups; wherein $R^4$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, and 4-10 membered heteroaryl, and —(C1-C3 alkyl)(C6-C10 aryl), and wherein $R^4$ is substituted with 0, 1, 2, 3, or 4 independently selected $R^5$ groups; wherein each occurrence of $R^5$, when present, is independently selected from halogen, $—NO_2$, —CN, —OH, —SH, $—NH_2$, C1-C3 alkyl, C2-C4 alkenyl, C2-C4 alkynyl, C1-C3 haloalkyl, C1-C3 cyanoalkyl, C1-C3 hydroxyalkyl, C1-C3 haloalkoxy, C1-C3 alkoxy, C1-C3 thioalkyl, C1-C3 alkyl(C1-C3 alkoxy), C1-C3 alkylamino, (C1-C3)(C1-C3) dialkylamino, C3-C7 cycloalkyl, C6-C10 aryl, —(C═O)(C1-C3 alkyl), —(S═O)(C1-C3 alkyl), —$SO_2$(C1-C3 alkyl), —$CO_2R^{11}$, —(C═O)$NR^{12a}R^{12b}$, —$SO_2NR^{12a}R^{12b}$, —O(C═O)$NR^{12a}R^{12b}$, —$NHSO_2NR^{12a}R^{12b}$, and —NH(C═O)$NR^{12a}R^{12b}$; wherein each occurrence of $R^{11}$, when present, is independently selected from hydrogen and C1-C4 alkyl; and wherein each occurrence of $R^{12a}$ and $R^{12b}$, when present, is independently selected from hydrogen and C1-C3 alkyl, or a derivative thereof.

Also disclosed are methods of making a vinylphosphonate having a structure represented by a formula:

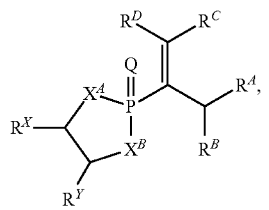

wherein Q is selected from O, S, and $NR^{26}$; wherein $R^{26}$, when present, is selected from hydrogen and C1-C8 alkyl; wherein each of $X^A$ and $X^B$ is independently selected from $NR^1$, O, and S; wherein each occurrence of $R^1$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each occurrence of $R^1$, when present, is independently substituted with 0, 1, 2, 3, or 4 independently selected $R^5$ groups; wherein each of $R^X$ and $R^Y$ is independently selected from hydrogen, C6-C10 aryl, and 4-10 membered heteroaryl, or wherein each of $R^X$ and $R^Y$ are optionally covalently bonded together and, together with the intermediate carbon atoms, comprise a 5- to 7-membered cycloalkyl or 5- to 7-membered aryl; wherein $R^A$ is an electron withdrawing group; wherein $R^B$ is selected from hydrogen, C1-C6 alkyl, C2-C6 alkylene, C3-C10 cycloalkyl, 4-10 membered heterocycloalkyl, C6-C10 aryl, —(C1-C3 alkyl)(C6-C10 aryl), and 4-10 membered heteroaryl, and wherein $R^B$ is substituted with 0, 1, 2, 3, or 4 independently selected $R^6$ groups; and wherein each of $R^C$ and $R^D$ is independently selected from hydrogen, C1-C6 alkyl, C3-C10 cycloalkyl, 4-10 membered heterocycloalkyl, C6-C10 aryl, and 4-10 membered heteroaryl, and wherein each of $R^C$ and $R^D$ is independently substituted with 0, 1, 2, 3, or 4 independently selected $R^6$ groups, or wherein each of $R^C$ and $R^D$ are optionally covalently bonded together and, together with the intermediate carbon atoms, comprise a 3- to 10-membered cycloalkyl; wherein each occurrence of $R^5$, when present, is independently selected from halogen, —$NO_2$, —CN, —OH, —SH, —$NH_2$, C1-C3 alkyl, C2-C4 alkenyl, C2-C4 alkynyl, C1-C3 haloalkyl, C1-C3 cyanoalkyl, C1-C3 hydroxyalkyl, C1-C3 haloalkoxy, C1-C3 alkoxy, C1-C3 thioalkyl, C1-C3 alkyl(C1-C3 alkoxy), C1-C3 alkylamino, (C1-C3)(C1-C3) dialkylamino, C3-C7 cycloalkyl, C6-C10 aryl, —(C═O)(C1-C3 alkyl), —(S═O)(C1-C3 alkyl), —$SO_2$(C1-C3 alkyl), —$CO_2R^{11}$, —(C═O)$NR^{12a}R^{12b}$, —$SO_2NR^{12a}R^{12b}$, —O(C═O)$NR^{12a}R^{12b}$, —$NHSO_2NR^{12a}R^{12b}$, and —NH(C═O)$NR^{12a}R^{12b}$; wherein each occurrence of $R^{11}$, when present, is independently selected from hydrogen and C1-C4 alkyl; wherein each occurrence of $R^{12a}$ and $R^{12b}$, when present, is independently selected from hydrogen and C1-C3 alkyl; and wherein each occurrence of $R^6$, when present, is independently selected from halogen, —$NO_2$, —$CO_2$(C1-C3 alkyl), C1-C3 alkyl, C1-C3 haloalkyl, C1-C3 alkoxy, C1-C3 alkoxycarbonyl, C3-C7 cycloalkyl, and phenyl, or a derivative thereof, the method comprising the step of reacting an allene having a structure represented by a formula:

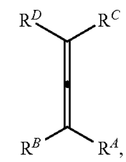

or a derivative thereof, with a compound having a structure represented by a formula:

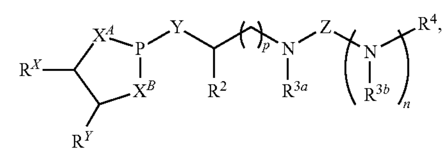

wherein n is selected from 0 and 1; wherein p is selected from 0, 1, 2, 3, 4, and 5; wherein Y is selected from O, S, and $NR^{26}$; wherein $R^{26}$, when present, is selected from hydrogen and C1-C8 alkyl; wherein Z is selected from C═O, C═S, S═O, and $SO_2$; wherein each of $R^X$ and $R^Y$ is independently selected from hydrogen, C6-C10 aryl, and 4-10 membered heteroaryl, or wherein each of $R^X$ and $R^Y$ are optionally covalently bonded together and, together with the intermediate carbon atoms, comprise a 5- to 7-membered cycloalkyl or 5- to 6-membered aryl; wherein $R^2$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein $R^2$ is substituted with 0, 1, 2, 3, or 4 independently selected $R^5$ groups; wherein each of $R^{3a}$ and $R^{3b}$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each of $R^{3a}$ and $R^{3b}$ is independently substituted with 0, 1, 2, 3, or 4 independently selected $R^5$ groups; and wherein $R^4$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, and 4-10 membered heteroaryl, and —(C1-C3 alkyl)(C6-C10 aryl), and wherein $R^4$ is substituted with 0, 1, 2, 3, or 4 independently selected $R^5$ groups, or a derivative thereof.

Also disclosed are methods of making a compound having a structure represented by a formula:

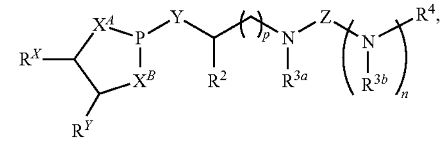

wherein n is selected from 0 and 1; wherein p is selected from 0, 1, 2, 3, 4, and 5; wherein each of $X^A$ and $X^B$ is independently selected from $NR^1$, O, and S; wherein each occurrence of $R^1$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each occurrence of $R^1$, when present, is independently substituted with 0, 1, 2, 3, or 4 independently selected $R^5$ groups; wherein Y is selected from O, S, and $NR^{26}$; wherein $R^{26}$, when present, is selected from hydrogen and C1-C8 alkyl; wherein Z is selected from C═O, C═S, S═O, and $SO_2$; wherein each of $R^X$ and $R^Y$ is independently selected from hydrogen, C6-C10 aryl, and 4-10 membered heteroaryl, or wherein each of $R^X$ and $R^Y$ are optionally covalently bonded together and, together with the intermediate carbon atoms, comprise a 5- to 7-membered cycloalkyl or 5- to 6-membered aryl; wherein $R^2$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein $R^2$ is substituted with 0, 1, 2, 3, or 4 independently selected $R^5$ groups; wherein each of $R^{3a}$ and $R^{3b}$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each of $R^{3a}$ and $R^{3b}$ is independently substituted with 0, 1, 2, 3, or 4 independently selected $R^5$ groups; wherein $R^4$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, and 4-10 membered heteroaryl, and —(C1-C3 alkyl)(C6-C10 aryl), and wherein $R^4$ is substituted with 0, 1, 2, 3, or 4 independently selected $R^5$ groups; wherein each occurrence of $R^5$, when present, is independently selected from halogen, $—NO_2$, —CN, —OH, —SH, $—NH_2$, C1-C3 alkyl, C2-C4 alkenyl, C2-C4 alkynyl, C1-C3 haloalkyl, C1-C3 cyanoalkyl, C1-C3 hydroxyalkyl, C1-C3 haloalkoxy, C1-C3 alkoxy, C1-C3 thioalkyl, C1-C3 alkyl(C1-C3 alkoxy), C1-C3 alkylamino, (C1-C3)(C1-C3) dialkylamino, C3-C7 cycloalkyl, C6-C10 aryl, —(C═O)(C1-C3 alkyl), —(S═O)(C1-C3 alkyl), $—SO_2$(C1-C3 alkyl), $—CO_2R^{11}$, $—(C═O)NR^{12a}R^{12b}$, $—SO_2NR^{12a}R^{12b}$, $—O(C═O)NR^{12a}R^{12b}$, $—NHSO_2NR^{12a}R^{12b}$, and $—NH(C═O)NR^{12a}R^{12b}$; wherein each occurrence of $R^{11}$, when present, is independently selected from hydrogen and C1-C4 alkyl; and wherein each occurrence of $R^{12a}$ and $R^{12b}$, when present, is independently selected from hydrogen and C1-C3 alkyl, or a derivative thereof, the method comprising: (a) providing a first compound having a structure represented by a formula:

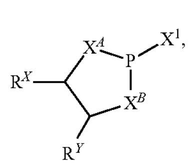

wherein $X^1$ is halogen, or a derivative thereof; and (b) reacting with a second compound having a structure represented by a formula:

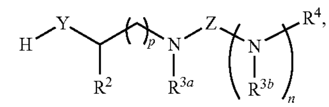

or a derivative thereof, in the presence of a base.

Also disclosed are compounds having a structure represented by a formula:

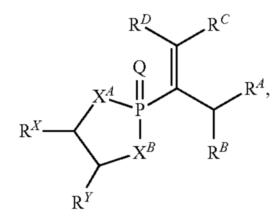

wherein Q is selected from O, S, and $NR^{26}$; wherein $R^{26}$, when present, is selected from hydrogen and C1-C8 alkyl; wherein each of $X^A$ and $X^B$ is independently selected from $NR^1$, O, and S; wherein each occurrence of $R^1$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each occurrence of $R^1$, when present, is independently substituted with 0, 1, 2, 3, or 4 independently selected $R^5$ groups; wherein each of $R^X$ and $R^Y$ is independently selected from hydrogen, C6-C10 aryl, and 4-10 membered heteroaryl, or wherein each of $R^X$ and $R^Y$ are optionally covalently bonded together and, together with the intermediate carbon atoms, comprise a 5- to 7-membered cycloalkyl or 5- to 7-membered aryl; wherein $R^A$ is an electron withdrawing group; wherein $R^B$ is selected from hydrogen, C1-C6 alkyl, C2-C6 alkylene, C3-C10 cycloalkyl, 4-10 membered heterocycloalkyl, C6-C10 aryl, —(C1-C3 alkyl)(C6-C10 aryl), and 4-10 membered heteroaryl, and wherein $R^B$ is substituted with 0, 1, 2, 3, or 4 independently selected $R^6$ groups; and wherein each of $R^C$ and $R^D$ is independently selected from hydrogen, C1-C6 alkyl, C3-C10 cycloalkyl, 4-10 membered heterocycloalkyl, C6-C10 aryl, and 4-10 membered heteroaryl, and wherein each of $R^C$ and $R^D$ is independently substituted with 0, 1, 2, 3, or 4 independently selected $R^6$ groups, or wherein each of $R^C$ and $R^D$ are optionally covalently bonded together and, together with the intermediate carbon atoms, comprise a 3- to 10-membered cycloalkyl; wherein each occurrence of $R^5$, when present, is independently selected from halogen, $—NO_2$, —CN, —OH, —SH, $—NH_2$, C1-C3 alkyl, C2-C4 alkenyl, C2-C4 alkynyl, C1-C3 haloalkyl, C1-C3 cyanoalkyl, C1-C3 hydroxyalkyl, C1-C3 haloalkoxy, C1-C3 alkoxy, C1-C3 thioalkyl, C1-C3 alkyl(C1-C3 alkoxy), C1-C3 alkylamino, (C1-C3)(C1-C3) dialkylamino, C3-C7 cycloalkyl, C6-C10 aryl, —(C═O)(C1-C3 alkyl), —(S═O)(C1-C3 alkyl), $—SO_2$(C1-C3 alkyl), $—CO_2R^{11}$, $—(C═O)NR^{12a}R^{12b}$, $—SO_2NR^{12a}R^{12b}$, $—O(C═O)NR^{12a}R^{12b}$, $—NHSO_2NR^{12a}R^{12b}$, and $—NH(C═O)NR^{12a}R^{12b}$; wherein each occurrence of $R^{11}$, when present, is independently selected from hydrogen and C1-C4 alkyl; wherein each occurrence of $R^{12a}$ and $R^{12b}$, when present, is independently selected from hydrogen and C1-C3 alkyl; and wherein each occurrence of $R^6$, when present, is independently selected from halogen, $—NO_2$, $—CO_2$(C1-C3 alkyl), C1-C3 alkyl, C1-C3 haloalkyl, C1-C3 alkoxy, C1-C3 alkoxycarbonyl, C3-C7 cycloalkyl, and phenyl, or a derivative thereof.

Also disclosed are compounds having a structure represented by a formula:

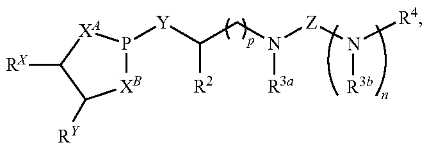

wherein n is selected from 0 and 1; wherein p is selected from 0, 1, 2, 3, 4, and 5; wherein each of $X^A$ and $X^B$ is independently selected from $NR^1$, O, and S; wherein each occurrence of $R^1$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each occurrence of $R^1$, when present, is independently substituted with 0, 1, 2, 3, or 4 independently selected $R^5$ groups; wherein Y is selected from $CH_2$, O, and S; wherein Z is selected from C═O, C═S, S═O, and $SO_2$; wherein each of $R^X$ and $R^Y$ is independently selected from hydrogen, C6-C10 aryl, and 4-10 membered heteroaryl, or wherein each of $R^X$ and $R^Y$ are optionally covalently bonded together and, together with the intermediate carbon atoms, comprise a 5- to 7-membered cycloalkyl or 5- to 6-membered aryl; wherein $R^2$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein $R^2$ is substituted with 0, 1, 2, 3, or 4 independently selected $R^5$ groups; wherein each of $R^{3a}$ and $R^{3b}$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each of $R^{3a}$ and $R^{3b}$ is independently substituted with 0, 1, 2, 3, or 4 independently selected $R^5$ groups; wherein $R^4$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, and 4-10 membered heteroaryl, and —(C1-C3 alkyl)(C6-C10 aryl), and wherein $R^4$ is substituted with 0, 1, 2, 3, or 4 independently selected $R^5$ groups; wherein each occurrence of $R^5$, when present, is independently selected from halogen, $—NO_2$, —CN, —OH, —SH, $—NH_2$, C1-C3 alkyl, C2-C4 alkenyl, C2-C4 alkynyl, C1-C3 haloalkyl, C1-C3 cyanoalkyl, C1-C3 hydroxyalkyl, C1-C3 haloalkoxy, C1-C3 alkoxy, C1-C3 thioalkyl, C1-C3 alkyl(C1-C3 alkoxy), C1-C3 alkylamino, (C1-C3)(C1-C3) dialkylamino, C3-C7 cycloalkyl, C6-C10 aryl, —(C═O)(C1-C3 alkyl), —(S═O)(C1-C3 alkyl), $—SO_2$(C1-C3 alkyl), $—CO_2R^{11}$, $—SO_2NR^{12a}R^{12b}$, $—O(C═O)NR^{12a}R^{12b}$, $—NHSO_2NR^{12a}R^{12b}$, and $—NH(C═O)NR^{12a}R^{12b}$; wherein each occurrence of $R^{11}$, when present, is independently selected from hydrogen and C1-C4 alkyl; and wherein each occurrence of $R^{12a}$ and $R^{12b}$, when present, is independently selected from hydrogen and C1-C3 alkyl, or a derivative thereof.

Also disclosed are methods of making a compound having a structure represented by a formula:

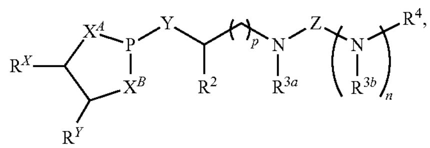

wherein n is selected from 0 and 1; wherein p is selected from 0, 1, 2, 3, 4, and 5; wherein each of $X^A$ and $X^B$ is independently selected from $NR^1$, O, and S; wherein each occurrence of $R^1$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each occurrence of $R^1$, when present, is independently substituted with 0, 1, 2, 3, or 4 independently selected $R^5$ groups; wherein Y is selected from $CH_2$, O, and S; wherein Z is selected from C═O, C═S, S═O, and $SO_2$; wherein each of $R^X$ and $R^Y$ is independently selected from hydrogen, C6-C10 aryl, and 4-10 membered heteroaryl, or wherein each of $R^X$ and $R^Y$ are optionally covalently bonded together and, together with the intermediate carbon atoms, comprise a 5- to 7-membered cycloalkyl or 5- to 6-membered aryl; wherein $R^2$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein $R^2$ is substituted with 0, 1, 2, 3, or 4 independently selected $R^5$ groups; wherein each of $R^{3a}$ and $R^{3b}$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each of $R^{3a}$ and $R^{3b}$ is independently substituted with 0, 1, 2, 3, or 4 independently selected $R^5$ groups; wherein $R^4$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, and 4-10 membered heteroaryl, and —(C1-C3 alkyl)(C6-C10 aryl), and wherein $R^4$ is substituted with 0, 1, 2, 3, or 4 independently selected $R^5$ groups; wherein each occurrence of $R^5$, when present, is independently selected from halogen, $—NO_2$, —CN, —OH, —SH, $—NH_2$, C1-C3 alkyl, C2-C4 alkenyl, C2-C4 alkynyl, C1-C3 haloalkyl, C1-C3 cyanoalkyl, C1-C3 hydroxyalkyl, C1-C3 haloalkoxy, C1-C3 alkoxy, C1-C3 thioalkyl, C1-C3 alkyl(C1-C3 alkoxy), C1-C3 alkylamino, (C1-C3)(C1-C3) dialkylamino, C3-C7 cycloalkyl, C6-C10 aryl, —(C═O)(C1-C3 alkyl), —(S═O)(C1-C3 alkyl), $—SO_2$(C1-C3 alkyl), $—CO_2R^{11}$, $—SO_2NR^{12a}R^{12b}$, $—O(C═O)NR^{12a}R^{12b}$, $NHSO_2NR^{12a}R^{12b}$, and $—NH(C═O)NR^{12a}R^{12b}$; wherein each occurrence of $R^{11}$, when present, is independently selected from hydrogen and C1-C4 alkyl; and wherein each occurrence of $R^{12a}$ and $R^{12b}$, when present, is independently selected from hydrogen and C1-C3 alkyl, or a derivative thereof, the method comprising: (a) providing a first compound having a structure represented by a formula:

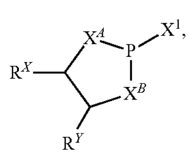

wherein $X^1$ is halogen, or a derivative thereof; and reacting with a second compound having a structure represented by a formula:

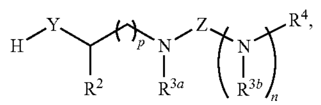

or a derivative thereof, in the presence of a base.

Also disclosed are methods of making a vinylphosphonate having a structure represented by a formula:

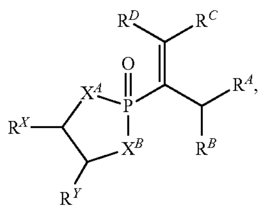

wherein each of $X^A$ and $X^B$ is independently selected from $NR^1$, O, and S; wherein each occurrence of $R^1$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each occurrence of $R^1$, when present, is independently substituted with 0, 1, 2, 3, or 4 independently selected $R^5$ groups; wherein each of $R^X$ and $R^Y$ is independently selected from hydrogen, C6-C10 aryl, and 4-10 membered heteroaryl, or wherein each of $R^X$ and $R^Y$ are optionally covalently bonded together and, together with the intermediate carbon atoms, comprise a 5- to 7-membered cycloalkyl or 5- to 7-membered aryl; wherein $R^A$ is an electron withdrawing group; wherein $R^B$ is selected from hydrogen, C1-C6 alkyl, C2-C6 alkylene, C3-C10 cycloalkyl, 4-10 membered heterocycloalkyl, C6-C10 aryl, —(C1-C3 alkyl)(C6-C10 aryl), and 4-10 membered heteroaryl, and wherein $R^B$ is substituted with 0, 1, 2, 3, or 4 independently selected $R^6$ groups; and wherein each of $R^C$ and $R^D$ is independently selected from hydrogen, C1-C6 alkyl, C3-C10 cycloalkyl, 4-10 membered heterocycloalkyl, C6-C10 aryl, and 4-10 membered heteroaryl, and wherein each of $R^C$ and $R^D$ is independently substituted with 0, 1, 2, 3, or 4 independently selected $R^6$ groups, or wherein each of $R^C$ and $R^D$ are optionally covalently bonded together and, together with the intermediate carbon atoms, comprise a 3- to 10-membered cycloalkyl; wherein each occurrence of $R^5$, when present, is independently selected from halogen, $—NO_2$, —CN, —OH, —SH, $—NH_2$, C1-C3 alkyl, C2-C4 alkenyl, C2-C4 alkynyl, C1-C3 haloalkyl, C1-C3 cyanoalkyl, C1-C3 hydroxyalkyl, C1-C3 haloalkoxy, C1-C3 alkoxy, C1-C3 thioalkyl, C1-C3 alkyl(C1-C3 alkoxy), C1-C3 alkylamino, (C1-C3)(C1-C3) dialkylamino, C3-C7 cycloalkyl, C6-C10 aryl, —(C═O)(C1-C3 alkyl), —(S═O)(C1-C3 alkyl), $—SO_2$(C1-C3 alkyl), $—CO_2R^{11}$, $—SO_2NR^{12a}R^{12b}$, —O(C═O)NR$^{12}$ $^{a}$R$^{12b}$, $—NHSO_2NR^{12a}R^{12b}$, and —NH(C═O)NR$^{12a}$R$^{12b}$; wherein each occurrence of $R^{11}$, when present, is independently selected from hydrogen and C1-C4 alkyl; wherein each occurrence of $R^{12a}$ and $R^{12b}$, when present, is independently selected from hydrogen and C1-C3 alkyl; and wherein each occurrence of $R^6$, when present, is independently selected from halogen, $—NO_2$, $—CO_2$(C1-C3 alkyl), C1-C3 alkyl, C1-C3 haloalkyl, C1-C3 alkoxy, C1-C3 alkoxycarbonyl, and phenyl, or a derivative thereof, the method comprising the step of reacting an allene having a structure represented by a formula:

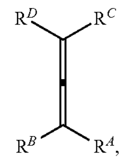

or a derivative thereof, with a compound having a structure represented by a formula:

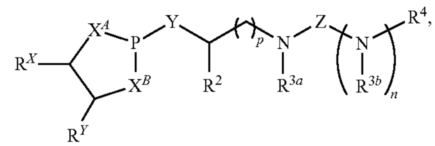

wherein n is selected from 0 and 1; wherein p is selected from 0, 1, 2, 3, 4, and 5; wherein Y is selected from $CH_2$, O, and S; wherein Z is selected from C═O, C═S, S═O, and $SO_2$; wherein each of $R^X$ and $R^Y$ is independently selected from hydrogen, C6-C10 aryl, and 4-10 membered heteroaryl, or wherein each of $R^X$ and $R^Y$ are optionally covalently bonded together and, together with the intermediate carbon atoms, comprise a 5- to 7-membered cycloalkyl or 5- to 6-membered aryl; wherein $R^2$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein $R^2$ is substituted with 0, 1, 2, 3, or 4 independently selected $R^5$ groups; wherein each of $R^{3a}$ and $R^{3b}$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each of $R^{3a}$ and $R^{3b}$ is independently substituted with 0, 1, 2, 3, or 4 independently selected $R^5$ groups; and wherein $R^4$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, and 4-10 membered heteroaryl, and —(C1-C3 alkyl)(C6-C10 aryl), and wherein $R^4$ is substituted with 0, 1, 2, 3, or 4 independently selected $R^5$ groups, or a derivative thereof.

Also disclosed are compounds of Formula (Ia):

(Ia)

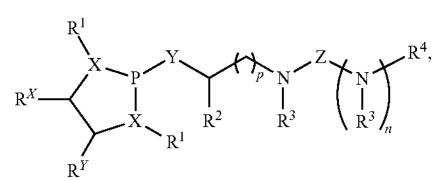

or a salt thereof, wherein: each X is independently selected from the group consisting of N, O, and S; Y is selected from the group consisting of $CH_2$, O, and S; Z is selected from the group consisting of C═O, C═S, S═O, and $SO_2$; $R^X$ is selected from the group consisting of H, $C_{6-10}$ aryl, and 4-10 membered heteroaryl ring; $R^Y$ is selected from the group consisting of H, $C_{6-10}$ aryl, and 4-10 membered heteroaryl ring; or $R^X$ and $R^Y$ in combination, together with the carbon atoms to which $R^X$ and $R^Y$ are attached, form a 5, 6, or 7-membered cycloalkyl ring or a 5, 6, or 7-membered aryl ring; each $R^1$ is independently selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; $R^2$ is selected from the group consisting of H, $C_{1-6}$ alkyl, $C_{1-6}$ haloalkyl, C2-6 alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; each $R^3$ is independently selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; $R^4$ is selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; each $R^5$ is independently selected from the group consisting of OH, $NO_2$, CN, halo, $C_{1-3}$ alkyl, $C_{2-4}$ alkenyl, $C_{2-4}$ alkynyl, $C_{1-3}$ haloalkyl, cyano-$C_{1-3}$ alkyl, HO—$C_{1-3}$ alkyl, $C_{1-3}$ alkoxy-$C_{1-3}$ alkyl, $C_{3-7}$ cycloalkyl, $C_{6-10}$ aryl, $C_{1-3}$ alkoxy, $C_{1-3}$ haloalkoxy, amino, $C_{1-3}$ alkylamino, di($C_{1-3}$ alkyl)amino, thio, $C_{1-3}$ alkylthio, $C_{1-3}$ alkylsulfinyl, $C_{1-3}$ alkylsulfonyl, carbamyl, $C_{1-3}$ alkylcarbamyl, di($C_{1-3}$ alkyl)carbamyl, carboxy, $C_{1-3}$ alkylcarbonyl, $C_{1-4}$ alkoxycarbonyl, $C_{1-3}$alkylcarbonylamino, $C_{1-3}$ alkylsulfonylamino, aminosulfonyl, $C_{1-3}$ alkylaminosulfonyl, di($C_{1-3}$ alkyl)aminosulfonyl, aminosulfonylamino, $C_{1-3}$ alkylaminosulfonylamino, di($C_{1-3}$ alkyl)aminosulfonylamino, aminocarbonylamino, $C_{1-3}$ alkylaminocarbonylamino, and di($C_{1-3}$ alkyl)aminocarbonylamino; n is 0 or 1; and p is 0, 1, 2, 3, 4, or 5.

Also disclosed are compounds of Formula (Ib):

(Ib)

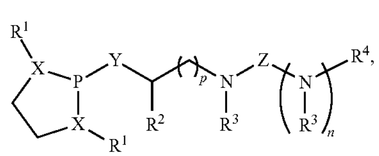

or a salt thereof, wherein: each X is independently selected from the group consisting of N, O, and S; Y is selected from the group consisting of $CH_2$, O, and S; Z is selected from the group consisting of C═O, C═S, S═O, and $SO_2$; each $R^1$ is independently selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; $R^2$ is selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; each $R^3$ is independently selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{13}$ alkylene-, and 4-10 membered heteroaryl are each optionally substituted by 1, 2, 3, or 4 independently selected $R^5$ groups; $R^4$ is selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; each $R^5$ is independently selected from the group consisting of OH, $NO_2$, CN, halo, $C_{1-3}$ alkyl, $C_{2-4}$ alkenyl, $C_{2-4}$ alkynyl, $C_{1-3}$ haloalkyl, cyano-$C_{1-3}$ alkyl, HO—$C_{1-3}$ alkyl, $C_{1-3}$ alkoxy-$C_{1-3}$ alkyl, $C_{3-7}$ cycloalkyl, $C_{6-10}$ aryl, $C_{1-3}$ alkoxy, $C_{1-3}$ haloalkoxy, amino, $C_{1-3}$ alkylamino, di($C_{1-3}$ alkyl)amino, thio, $C_{1-3}$ alkylthio, $C_{1-3}$ alkylsulfinyl, $C_{1-3}$ alkylsulfonyl, carbamyl, $C_{1-3}$ alkylcarbamyl, di($C_{1-3}$ alkyl)carbamyl, carboxy, $C_{1-3}$ alkylcarbonyl, $C_{1-4}$ alkoxycarbonyl, $C_{1-3}$ alkylcarbonylamino, $C_{1-3}$ alkylsulfonylamino, aminosulfonyl, $C_{1-3}$ alkylaminosulfonyl, di($C_{1-3}$ alkyl)aminosulfonyl, aminosulfonylamino, $C_{1-3}$ alkylaminosulfonylamino, di($C_{1-3}$ alkyl)aminosulfonylamino, aminocarbonylamino, $C_{1-3}$ alkylaminocarbonylamino, and di($C_{1-3}$ alkyl)aminocarbonylamino; n is 0 or 1; and p is 0, 1, 2, 3, 4, or 5.

Also disclosed are pharmaceutical compositions comprising a compound of Formula (Ia) or Formula (Ib), or a pharmaceutically acceptable salt thereof, and at least one pharmaceutically acceptable carrier.

Also disclosed is a process of preparing a compound or salt of Formula (IIa):

(IIa)

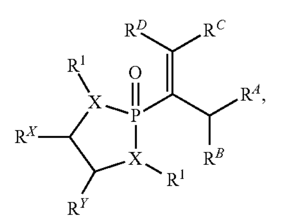

comprising reacting a compound or salt of Formula (III):

(III)

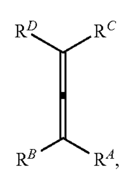

with a compound or salt of Formula (Ia):

(Ia)

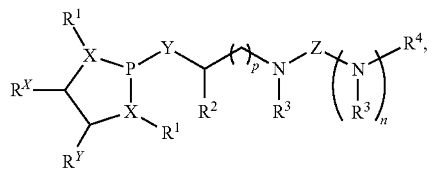

wherein: each X is independently selected from the group consisting of N, O, and S; Y is selected from the group consisting of $CH_2$, O, and S; Z is selected from the group consisting of C═O, C═S, S═O, and $SO_2$; $R^X$ is selected from the group consisting of H, $C_{6-10}$ aryl, and 4-10 membered heteroaryl ring; $R^Y$ is selected from the group consisting of H, $C_{6-10}$ aryl, and 4-10 membered heteroaryl ring; or $R^X$ and $R^Y$ in combination, together with the carbon atoms to which $R^X$ and $R^Y$ are attached, form a 5, 6, or 7-membered cycloalkyl ring or a 5, 6, or 7-membered aryl ring; each $R^1$ is independently selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; $R^2$ is selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; each $R^3$ is independently selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; $R^4$ is selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; each $R^5$ is independently selected from the group consisting of OH, $NO_2$, CN, halo, $C_{1-3}$ alkyl, $C_{2-4}$ alkenyl, $C_{2-4}$ alkynyl, $C_{1-3}$ haloalkyl, cyano-$C_{1-3}$ alkyl, HO—$C_{1-3}$ alkyl, $C_{1-3}$ alkoxy-$C_{1-3}$ alkyl, $C_{3-7}$ cycloalkyl, $C_{6-10}$ aryl, $C_{1-3}$alkoxy, $C_{1-3}$ haloalkoxy, amino, $C_{1-3}$ alkylamino, di($C_{1-3}$ alkyl)amino, thio, $C_{1-3}$ alkylthio, $C_{1-3}$ alkylsulfinyl, $C_{1-3}$ alkylsulfonyl, carbamyl, $C_{1-3}$ alkylcarbamyl, di($C_{1-3}$ alkyl)carbamyl, carboxy, $C_{1-3}$ alkylcarbonyl, $C_{1-4}$ alkoxycarbonyl, $C_{1-3}$ alkylcarbonylamino, $C_{1-3}$ alkylsulfonylamino, aminosulfonyl, $C_{1-3}$ alkylaminosulfonyl, di($C_{1-3}$ alkyl)aminosulfonyl, aminosulfonylamino, $C_{1-3}$ alkylaminosulfonylamino, di($C_{1-3}$ alkyl)aminosulfonylamino, aminocarbonylamino, $C_{1-3}$ alkylaminocarbonylamino, and di($C_{1-3}$ alkyl)aminocarbonylamino; $R^A$ is an electron withdrawing group; $R^B$ is selected from the group consisting of H, $C_{1-6}$ alkyl, $C_{2-6}$ alkylene, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^6$ groups; $R^C$ and $R^D$ are each independently selected from the group consisting of H, $C_{1-6}$ alkyl, $C_{3-10}$ cycloalkyl, 4-10 membered heterocycloalkyl, $C_{6-10}$ aryl, and 4-10 membered heteroaryl, wherein the $C_{1-6}$ alkyl, $C_{3-10}$ cycloalkyl, 4-10 membered heterocycloalkyl, $C_{6-10}$ aryl, and 4-10 membered heteroaryl are each optionally substituted by 1, 2, 3, or 4 independently selected $R^6$ groups; or $R^C$ and $R^D$ together with the C atom to which they are attached form a $C_{3-10}$ cycloalkyl group; each $R^{a1}$, $R^{b1}$, $R^{c1}$, $R^{d1}$, and $R^{e1}$ is independently selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, and 4-10 membered heteroaryl are each optionally substituted by 1, 2, 3, or 4 independently selected $R^6$ groups; or $R^{c1}$ and $R^{d1}$ together with the N atom to which they are attached form a 4-, 5-, 6-, or 7 membered heterocycloalkyl group, which is optionally substituted with $C_{1-3}$ alkyl; each $R^6$ is independently selected from the group consisting of H, $C_{1-3}$ alkyl, $C_{1-3}$ haloalkyl, $C_{1-3}$ alkoxy, $C_{1-3}$ alkoxycarbonyl, and phenyl; n is 0 or 1; p is 0, 1, 2, 3, 4, or 5.

Also disclosed is a process of preparing a compound or salt of Formula (IIb):

(IIb)

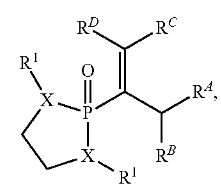

comprising reacting a compound or salt of Formula (III):

(III)

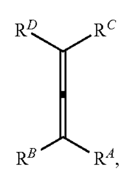

with a compound or salt of Formula (Ib):

(Ib)

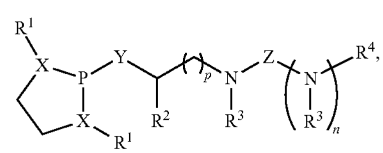

wherein: each X is independently selected from the group consisting of N, O, and S; Y is selected from the group consisting of $CH_2$, O, and S; Z is selected from the group consisting of C═O, C═S, S═O, and $SO_2$; each $R^1$ is independently selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; $R^2$ is selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; each $R^3$ is independently selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; $R^4$ is selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; each $R^5$ is independently selected from the group consisting of OH, $NO_2$, CN, halo, $C_{1-3}$ alkyl, $C_{2-4}$ alkenyl, $C_{2-4}$ alkynyl, $C_{1-3}$ haloalkyl, cyano-$C_{1-3}$ alkyl, HO—$C_{1-3}$ alkyl, $C_{1-3}$ alkoxy-$C_{1-3}$ alkyl, $C_{3-7}$ cycloalkyl, $C_{6-10}$ aryl, $C_{1-3}$ alkoxy, $C_{1-3}$ haloalkoxy, amino, $C_{1-3}$ alkylamino, di($C_{1-3}$ alkyl)amino, thio, $C_{1-3}$ alkylthio, $C_{1-3}$ alkylsulfinyl, $C_{1-3}$ alkylsulfonyl, carbamyl, $C_{1-3}$ alkylcarbamyl, di($C_{1-3}$ alkyl)carbamyl, carboxy, $C_{1-3}$ alkylcarbonyl, $C_{1-4}$ alkoxycarbonyl, $C_{1-3}$ alkylcarbonylamino, $C_{1-3}$ alkylsulfonylamino, aminosulfonyl, $C_{1-3}$ alkylaminosulfonyl, di($C_{1-3}$ alkyl)aminosulfonyl, aminosulfonylamino, $C_{1-3}$ alkylaminosulfonylamino, di($C_{1-3}$ alkyl)aminosulfonylamino, aminocarbonylamino, $C_{1-3}$ alkylaminocarbonylamino, and di($C_{1-3}$ alkyl)aminocarbonylamino; $R^A$ is an electron withdrawing group; $R^B$ is selected from the group consisting of H, $C_{1-6}$ alkyl, $C_{2-6}$ alkylene, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^6$ groups; $R^C$ and $R^D$ are each independently selected from the group consisting of H, $C_{1-6}$ alkyl, $C_{3-10}$ cycloalkyl, 4-10 membered heterocycloalkyl, $C_{6-10}$ aryl, and 4-10 membered heteroaryl, wherein the $C_{1-6}$ alkyl, $C_{3-10}$ cycloalkyl, 4-10 membered heterocycloalkyl, $C_{6-10}$ aryl, and 4-10 membered heteroaryl are each optionally substituted by 1, 2, 3, or 4 independently selected $R^6$ groups; or $R^C$ and $R^D$ together with the C atom to which they are attached form a $C_{3-10}$ cycloalkyl group; each $R^{a1}$, $R^{b1}$, $R^{c1}$, $R^{d1}$, and $R^{e1}$ is independently selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, and 4-10 membered heteroaryl are each optionally substituted by 1, 2, 3, or 4 independently selected $R^6$ groups; or $R^{c1}$ and $R^{d1}$ together with the N atom to which they are attached form a 4-, 5-, 6-, or 7 membered heterocycloalkyl group, which is optionally substituted with $C_{1-3}$ alkyl; each $R^6$ is independently selected from the group consisting of H, $C_{1-3}$ alkyl, $C_{1-3}$ haloalkyl, $C_{1-3}$ alkoxy, $C_{1-3}$ alkoxycarbonyl, and phenyl; n is 0 or 1; p is 0, 1, 2, 3, 4, or 5.

Also disclosed are compounds having a structure represented by a formula:

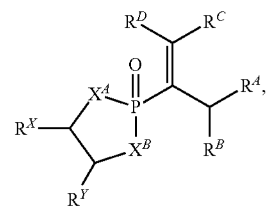

wherein each of $X^A$ and $X^B$ is independently selected from $NR^1$, 0, and S; wherein each occurrence of $R^1$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each occurrence of $R^1$, when present, is independently substituted with 0, 1, 2, 3, or 4 independently selected $R^5$ groups; wherein each of $R^X$ and $R^Y$ is independently selected from hydrogen, C6-C10 aryl, and 4-10 membered heteroaryl, or wherein each of $R^X$ and $R^Y$ are optionally covalently bonded together and, together with the intermediate carbon atoms, comprise a 5- to 7-membered cycloalkyl or 5- to 7-membered aryl; wherein $R^A$ is an electron withdrawing group; wherein $R^B$ is selected from hydrogen, C1-C6 alkyl, C2-C6 alkylene, C3-C10 cycloalkyl, 4-10 membered heterocycloalkyl, C6-C10 aryl, —(C1-C3 alkyl)(C6-C10 aryl), and 4-10 membered heteroaryl, and wherein $R^B$ is substituted with 0, 1, 2, 3, or 4 independently selected $R^6$ groups; and wherein each of $R^C$ and $R^D$ is independently selected from hydrogen, C1-C6 alkyl, C3-C10 cycloalkyl, 4-10 membered heterocycloalkyl, C6-C10 aryl, and 4-10 membered heteroaryl, and wherein each of $R^C$ and $R^D$ is independently substituted with 0, 1, 2, 3, or 4 independently selected $R^6$ groups, or wherein each of $R^C$ and $R^D$ are optionally covalently bonded together and, together with the intermediate carbon atoms, comprise a 3- to 10-membered cycloalkyl; wherein each occurrence of $R^5$, when present, is independently selected from halogen, —$NO_2$, —CN, —OH, —SH, —$NH_2$, C1-C3 alkyl, C2-C4 alkenyl, C2-C4 alkynyl, C1-C3 haloalkyl, C1-C3 cyanoalkyl, C1-C3 hydroxyalkyl, C1-C3 haloalkoxy, C1-C3 alkoxy, C1-C3 thioalkyl, C1-C3 alkyl(C1-C3 alkoxy), C1-C3 alkylamino, (C1-C3)(C1-C3) dialkylamino, C3-C7 cycloalkyl, C6-C10 aryl, —(C═O)(C1-C3 alkyl), —(S═O)(C1-C3 alkyl), —$SO_2$(C1-C3 alkyl), —$CO_2R^{11}$, —$SO_2NR^{12a}R^{12b}$, —O(C═O)$NR^{12a}R^{12b}$, —$NHSO_2NR^{12a}R^{12b}$, and —NH(C═O)$NR^{12a}R^{12b}$; wherein each occurrence of $R^{11}$, when present, is independently selected from hydrogen and C1-C4 alkyl; wherein each occurrence of $R^{12a}$ and $R^{12b}$, when present, is independently selected from hydrogen and C1-C3 alkyl; and wherein each occurrence of $R^6$, when present, is independently selected from halogen, —$NO_2$, —$CO_2$(C1-C3 alkyl), C1-C3 alkyl, C1-C3 haloalkyl, C1-C3 alkoxy, C1-C3 alkoxycarbonyl, and phenyl, or a derivative thereof.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

BRIEF DESCRIPTION OF THE DRAWINGS

The accompanying figures, which are incorporated in and constitute a part of this specification, illustrate several aspects and together with the description serve to explain the principles of the invention.

FIG. 1 shows a representative image of an X-ray crystal structure of compound 1a.

FIG. 2 shows a representative image of an X-ray crystal structure of compound 3a.

Figure 1:
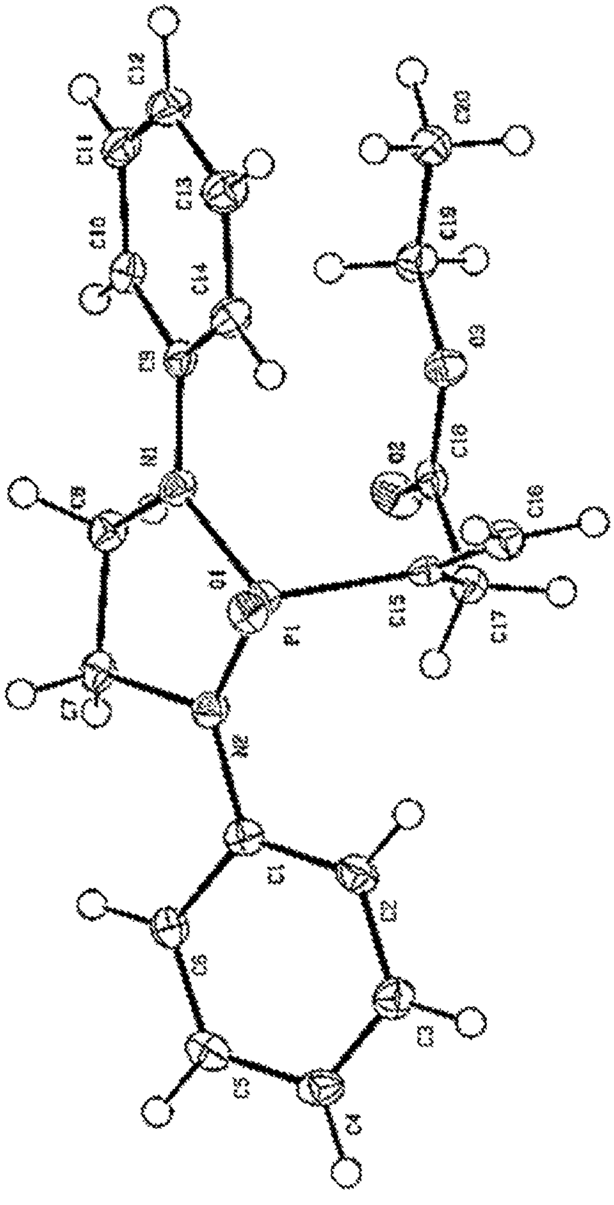

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein may be different from the actual publication dates, which can require independent confirmation.

A. Definitions

As used in the specification and the appended claims, the singular forms "a," "an" and "the" include plural referents unless the context clearly dictates otherwise. Thus, for example, reference to "a functional group," "an alkyl," or "a residue" includes mixtures of two or more such functional groups, alkyls, or residues, and the like.

Ranges can be expressed herein as from "about" one particular value, and/or to "about" another particular value. When such a range is expressed, a further aspect includes from the one particular value and/or to the other particular value. Similarly, when values are expressed as approximations, by use of the antecedent "about," it will be understood that the particular value forms a further aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

As used herein, the terms "optional" or "optionally" means that the subsequently described event or circumstance can or cannot occur, and that the description includes instances where said event or circumstance occurs and instances where it does not.

It is appreciated that certain features of the disclosure, which are, for clarity, described in the context of separate aspects, can also be provided in combination in a single aspect. Conversely, various features of the disclosure which are, for brevity, described in the context of a single aspect, can also be provided separately or in any suitable subcombination.

For the terms "for example" and "such as," and grammatical equivalences thereof, the phrase "and without limitation" is understood to follow unless explicitly stated otherwise.

The term "compound" as used herein is meant to include all stereoisomers, geometric isomers, tautomers, and isotopes of the structures depicted. Compounds herein identified by name or structure as one particular tautomeric form are intended to include other tautomeric forms unless otherwise specified.

All compounds, and salts thereof (e.g., pharmaceutically acceptable salts), can be found together with other substances such as water and solvents (e.g., hydrates and solvates).

Compounds provided herein also can include tautomeric forms. Tautomeric forms result from the swapping of a single bond with an adjacent double bond together with the concomitant migration of a proton. Tautomeric forms include prototropic tautomers that are isomeric protonation states having the same empirical formula and total charge. Example prototropic tautomers include ketone—enol pairs, amide—imidic acid pairs, lactam—lactim pairs, enamine—imine pairs, and annular forms where a proton can occupy two or more positions of a heterocyclic system, for example, 1H- and 3H-imidazole, 1H-, 2H- and 4H-1,2,4-triazole, 1H- and 2H-isoindole, and 1H- and 2H-pyrazole. Tautomeric forms can be in equilibrium or sterically locked into one form by appropriate substitution.

Compounds provided herein can also include all isotopes of atoms occurring in the intermediates or final compounds. Isotopes include those atoms having the same atomic number but different mass numbers. For example, isotopes of hydrogen include hydrogen, tritium, and deuterium.

The phrase "pharmaceutically acceptable" is employed herein to refer to those compounds, materials, compositions, and/or dosage forms that are, within the scope of sound medical judgment, suitable for use in contact with the tissues of human beings and animals without excessive toxicity, irritation, allergic response, or other problem or complication, commensurate with a reasonable benefit/risk ratio.

Also provided herein are pharmaceutically acceptable salts of the compounds described herein. As used herein, the term "pharmaceutically acceptable salts" refers to derivatives of the disclosed compounds wherein the parent compound is modified by converting an existing acid or base moiety to its salt form. Examples of pharmaceutically acceptable salts include, but are not limited to, mineral or organic acid salts of basic residues such as amines; alkali or organic salts of acidic residues such as carboxylic acids; and the like. The pharmaceutically acceptable salts of the compounds provided herein include the conventional non-toxic salts of the parent compound formed, for example, from non-toxic inorganic or organic acids. The pharmaceutically acceptable salts of the compounds provided herein can be synthesized from the parent compound that contains a basic or acidic moiety by conventional chemical methods. Generally, such salts can be prepared by reacting the free acid or base forms of these compounds with a stoichiometric amount of the appropriate base or acid in water or in an organic solvent, or in a mixture of the two. In various aspects, a non-aqueous media like ether, ethyl acetate, alcohols (e.g., methanol, ethanol, iso-propanol, or butanol) or acetonitrile (ACN) can be used. Lists of suitable salts are found in *Remington's Pharmaceutical Sciences,* 17th ed., Mack Publishing Company, Easton, Pa., 1985, p. 1418 and *Journal of Pharmaceutical Science,* 66, 2 (1977). Conventional methods for preparing salt forms are described, for example, in *Handbook of Pharmaceutical Salts: Properties, Selection, and Use*, Wiley-VCH, 2002.

In various aspects, the compounds provided herein, or salts thereof, are substantially isolated. By "substantially isolated" is meant that the compound is at least partially or substantially separated from the environment in which it was formed or detected. Partial separation can include, for example, a composition enriched in the compounds provided herein. Substantial separation can include compositions containing at least about 50%, at least about 60%, at least about 70%, at least about 80%, at least about 90%, at least about 95%, at least about 97%, or at least about 99% by weight of the compounds provided herein, or salt thereof. Methods for isolating compounds and their salts are routine in the art.

As used herein, chemical structures that contain one or more stereocenters depicted with dashed and bold bonds (i.e., ) are meant to indicate absolute stereochemistry of the stereocenter(s) present in the chemical structure. As used herein, bonds symbolized by a simple line do not indicate a stereo-preference. Unless otherwise indicated to the contrary, chemical structures, which include one or more stereocenters, illustrated herein without indicating absolute or relative stereochemistry encompass all possible stereoisomeric forms of the compound (e.g., diastereomers and enantiomers) and mixtures thereof. Structures with a single bold or dashed line, and at least one additional simple line, encompass a single enantiomeric series of all possible diastereomers.

Resolution of racemic mixtures of compounds can be carried out using appropriate methods. An exemplary method includes fractional recrystallization using a chiral resolving acid that is an optically active, salt-forming organic acid. Suitable resolving agents for fractional recrystallization methods are, for example, optically active acids, such as the D and L forms of tartaric acid, diacetyltartaric acid, dibenzoyltartaric acid, mandelic acid, malic acid, lactic acid, or the various optically active camphorsulfonic acids such as camphorsulfonic acid. Other resolving agents suitable for fractional crystallization methods include stereoisomerically pure forms of methylbenzylamine (e.g., S and R forms, or diastereomerically pure forms), 2-phenylglycinol, norephedrine, ephedrine, N-methylephedrine, cyclohexylethylamine, 1,2-diaminocyclohexane, and the like.

Resolution of racemic mixtures can also be carried out by elution on a column packed with an optically active resolving agent (e.g., dinitrobenzoylphenylglycine). Suitable elution solvent compositions can be determined by one skilled in the art.

The expressions "ambient temperature" and "room temperature" as used herein are understood in the art and refer generally to a temperature, e.g., a reaction temperature, that is about the temperature of the room in which the reaction is carried out, for example, a temperature from about 20° C. to about 30° C.

At various places in the present specification, divalent linking substituents are described. It is specifically intended that each divalent linking substituent include both the forward and backward forms of the linking substituent. For example, —NR(CR'R")$_n$— includes both —NR(CR'R")$_n$— and —(CR'R")$_n$NR—. Where the structure clearly requires a linking group, the Markush variables listed for that group are understood to be linking groups.

The term "n-membered" where n is an integer typically describes the number of ring-forming atoms in a moiety where the number of ring-forming atoms is n. For example, piperidinyl is an example of a 6-membered heterocycloalkyl ring, pyrazolyl is an example of a 5-membered heteroaryl ring, pyridyl is an example of a 6-membered heteroaryl ring, and 1,2,3,4-tetrahydro-naphthalene is an example of a 10-membered cycloalkyl group.

As used herein, the phrase "optionally substituted" means unsubstituted or substituted. As used herein, the term "substituted" means that a hydrogen atom is removed and replaced by a substituent. It is to be understood that substitution at a given atom is limited by valency.

Throughout the definitions, the term "$C_{n-m}$" indicates a range that includes the endpoints, wherein n and m are integers and indicate the number of carbons. Examples include $C_{1-4}$, $C_{1-6}$, and the like.

As used herein, the term "$C_{n-m}$ alkyl," employed alone or in combination with other terms, refers to a saturated hydrocarbon group that may be straight-chain or branched, having n to m carbons. Examples of alkyl moieties include, but are not limited to, chemical groups such as methyl, ethyl, n-propyl, isopropyl, n-butyl, tert-butyl, isobutyl, sec-butyl; higher homologs such as 2-methyl-1-butyl, n-pentyl, 3-pentyl, n-hexyl, 1,2,2-trimethylpropyl, and the like. In various aspects, the alkyl group contains from 1 to 6 carbon atoms, from 1 to 4 carbon atoms, from 1 to 3 carbon atoms, or 1 to 2 carbon atoms.

As used herein, "$C_{n-m}$ alkenyl" refers to an alkyl group having one or more double carbon-carbon bonds and having n to m carbons. Example alkenyl groups include, but are not limited to, ethenyl, n-propenyl, isopropenyl, n-butenyl, sec-butenyl, and the like. In various aspects, the alkenyl moiety contains 2 to 6, 2 to 4, or 2 to 3 carbon atoms.

As used herein, "$C_{n-m}$ alkynyl" refers to an alkyl group having one or more triple carbon-carbon bonds and having n to m carbons. Example alkynyl groups include, but are not limited to, ethynyl, propyn-1-yl, propyn-2-yl, and the like. In various aspects, the alkynyl moiety contains 2 to 6, 2 to 4, or 2 to 3 carbon atoms.

As used herein, the term "$C_{n-m}$ alkylene," employed alone or in combination with other terms, refers to a divalent alkyl linking group having n to m carbons. Examples of alkylene groups include, but are not limited to, ethan-1,2-diyl, propan-1,3-diyl, propan-1,2-diyl, butan-1,4-diyl, butan-1,3-diyl, butan-1,2-diyl, 2-methyl-propan-1,3-diyl, and the like. In various aspects, the alkylene moiety contains 2 to 6, 2 to 4, 2 to 3, 1 to 6, 1 to 4, or 1 to 2 carbon atoms.

As used herein, the term "$C_{n-m}$ alkoxy," employed alone or in combination with other terms, refers to a group of formula —O-alkyl, wherein the alkyl group has n to m carbons. Example alkoxy groups include methoxy, ethoxy, propoxy (e.g., n-propoxy and isopropoxy), tert-butoxy, and the like. In various aspects, the alkyl group has 1 to 6, 1 to 4, or 1 to 3 carbon atoms.

As used herein, the term "$C_{n-m}$ alkylamino" refers to a group of formula —NH(alkyl), wherein the alkyl group has n to m carbon atoms. In various aspects, the alkyl group has 1 to 6, 1 to 4, or 1 to 3 carbon atoms.

As used herein, the term "$C_{n-m}$ alkoxycarbonyl" refers to a group of formula —C(O)O-alkyl, wherein the alkyl group has n to m carbon atoms. In various aspects, the alkyl group has 1 to 6, 1 to 4, or 1 to 3 carbon atoms.

As used herein, the term "$C_{n-m}$ alkylcarbonyl" refers to a group of formula —C(O)— alkyl, wherein the alkyl group has n to m carbon atoms. In various aspects, the alkyl group has 1 to 6, 1 to 4, or 1 to 3 carbon atoms.

As used herein, the term "$C_{n-m}$ alkylcarbonylamino" refers to a group of formula —NHC(O)-alkyl, wherein the alkyl group has n to m carbon atoms. In various aspects, the alkyl group has 1 to 6, 1 to 4, or 1 to 3 carbon atoms.

As used herein, the term "$C_{n-m}$ alkylsulfonylamino" refers to a group of formula —NHS(O)$_2$-alkyl, wherein the alkyl group has n to m carbon atoms. In various aspects, the alkyl group has 1 to 6, 1 to 4, or 1 to 3 carbon atoms.

As used herein, the term "aminosulfonyl" refers to a group of formula —S(O)$_2$NH$_2$.

As used herein, the term "$C_{n-m}$ alkylaminosulfonyl" refers to a group of formula —S(O)$_2$NH(alkyl), wherein the alkyl group has n to m carbon atoms. In various aspects, the alkyl group has 1 to 6, 1 to 4, or 1 to 3 carbon atoms.

As used herein, the term "di($C_{n-m}$ alkyl)aminosulfonyl" refers to a group of formula —S(O)$_2$N(alkyl)$_2$, wherein each alkyl group independently has n to m carbon atoms. In various aspects, each alkyl group has, independently, 1 to 6, 1 to 4, or 1 to 3 carbon atoms.

As used herein, the term "aminosulfonylamino" refers to a group of formula —NHS(O)$_2$NH$_2$.

As used herein, the term "$C_{n-m}$ alkylaminosulfonylamino" refers to a group of formula —NHS(O)$_2$NH(alkyl), wherein the alkyl group has n to m carbon atoms. In various aspects, the alkyl group has 1 to 6, 1 to 4, or 1 to 3 carbon atoms.

As used herein, the term "di($C_{n-m}$ alkyl)aminosulfonylamino" refers to a group of formula —NHS(O)$_2$N(alkyl)$_2$, wherein each alkyl group independently has n to m carbon atoms. In various aspects, each alkyl group has, independently, 1 to 6, 1 to 4, or 1 to 3 carbon atoms.

As used herein, the term "aminocarbonylamino," employed alone or in combination with other terms, refers to a group of formula —NHC(O)NH$_2$.

As used herein, the term "$C_{n-m}$ alkylaminocarbonylamino" refers to a group of formula —NHC(O)NH(alkyl), wherein the alkyl group has n to m carbon atoms. In various aspects, the alkyl group has 1 to 6, 1 to 4, or 1 to 3 carbon atoms.

As used herein, the term "di($C_{n-m}$ alkyl)aminocarbonylamino" refers to a group of formula —NHC(O)N(alkyl)$_2$, wherein each alkyl group independently has n to m carbon atoms. In various aspects, each alkyl group has, independently, 1 to 6, 1 to 4, or 1 to 3 carbon atoms.

As used herein, the term "$C_{n-m}$ alkylcarbamyl" refers to a group of formula —C(O)—NH(alkyl), wherein the alkyl group has n to m carbon atoms. In various aspects, the alkyl group has 1 to 6, 1 to 4, or 1 to 3 carbon atoms.

As used herein, the term "thio" refers to a group of formula —SH.

As used herein, the term "$C_{n-m}$ alkylthio" refers to a group of formula —S-alkyl, wherein the alkyl group has n to m carbon atoms. In various aspects, the alkyl group has 1 to 6, 1 to 4, or 1 to 3 carbon atoms.

As used herein, the term "$C_{n-m}$ alkylsulfinyl" refers to a group of formula —S(O)— alkyl, wherein the alkyl group has n to m carbon atoms. In various aspects, the alkyl group has 1 to 6, 1 to 4, or 1 to 3 carbon atoms.

As used herein, the term "$C_{n-m}$ alkylsulfonyl" refers to a group of formula —S(O)$_2$-alkyl, wherein the alkyl group has n to m carbon atoms. In various aspects, the alkyl group has 1 to 6, 1 to 4, or 1 to 3 carbon atoms.

As used herein, the term "amino" refers to a group of formula —$NH_2$.

As used herein, the term "carbamyl" to a group of formula —$C(O)NH_2$.

As used herein, the term "carbonyl," employed alone or in combination with other terms, refers to a —C(═O)— group, which may also be written as C(O).

As used herein, the term "cyano-$C_{1-3}$ alkyl" refers to a group of formula —($C_{1-3}$ alkylene)-CN.

As used herein, the term "HO—$C_{1-3}$ alkyl" refers to a group of formula —($C_{1-3}$ alkylene)-OH.

As used herein, the term "$C_{1-3}$ alkoxy-$C_{1-3}$ alkyl" refers to a group of formula —($C_{1-3}$ alkylene)-O($C_{1-3}$ alkyl).

As used herein, the term "carboxy" refers to a group of formula —C(O)OH.

As used herein, the term "di($C_{n-m}$-alkyl)amino" refers to a group of formula —$N(alkyl)_2$, wherein the two alkyl groups each has, independently, n to m carbon atoms. In various aspects, each alkyl group independently has 1 to 6, 1 to 4, or 1 to 3 carbon atoms.

As used herein, the term "di($C_{n-m}$-alkyl)carbamyl" refers to a group of formula —$C(O)N(alkyl)_2$, wherein the two alkyl groups each has, independently, n to m carbon atoms. In various aspects, each alkyl group independently has 1 to 6, 1 to 4, or 1 to 3 carbon atoms.

As used herein, "halo" refers to F, C1, Br, or I. In various aspects, the halo group is F or Cl.

As used herein, "$C_{n-m}$ haloalkoxy" refers to a group of formula —O-haloalkyl having n to m carbon atoms. An example haloalkoxy group is $OCF_3$. In various aspects, the haloalkoxy group is fluorinated only. In various aspects, the alkyl group has 1 to 6, 1 to 4, or 1 to 3 carbon atoms.

As used herein, the term "$C_{n-m}$ haloalkyl," employed alone or in combination with other terms, refers to an alkyl group having from one halogen atom to 2s+1 halogen atoms which may be the same or different, where "s" is the number of carbon atoms in the alkyl group, wherein the alkyl group has n to m carbon atoms. In various aspects, the haloalkyl group is fluorinated only. In various aspects, the alkyl group has 1 to 6, 1 to 4, or 1 to 3 carbon atoms.

As used herein, the term "amine base" refers to a mono-substituted amine group (i.e., primary amine base), di-substituted amine group (i.e., secondary amine base), or a tri-substituted amine group (i.e., tertiary amine base). Example mono-substituted amine bases include methyl amine, ethyl amine, propyl amine, butyl amine, and the like. Example di-substituted amine bases include dimethylamine, diethylamine, dipropylamine, dibutylamine, pyrrolidine, piperidine, azepane, morpholine, and the like. In various aspects, the tertiary amine has the formula $N(R')_3$, wherein each R' is independently $C_{1-6}$ alkyl, 3-10 member cycloalkyl, 4-10 membered heterocycloalkyl, 1-10 membered heteroaryl, and 5-10 membered aryl, wherein the 3-10 member cycloalkyl, 4-10 membered heterocycloalkyl, 1-10 membered heteroaryl, and 5-10 membered aryl are optionally substituted by 1, 2, 3, 4, 5, or 6 $C_{1-6}$ alkyl groups. Example tertiary amine bases include trimethylamine, triethylamine, tripropylamine, triisopropylamine, tributylamine, tri-tert-butylamine, N,N-dimethylethanamine, N-ethyl-N-methylpropan-2-amine, N-ethyl-N-isopropylpropan-2-amine, morpholine, N-methylmorpholine, and the like. In various aspects, the term "tertiary amine base" refers to a group of formula $N(R)_3$, wherein each R is independently a linear or branched $C_{1-6}$ alkyl group.

As used herein, "cycloalkyl" refers to non-aromatic cyclic hydrocarbons including cyclized alkyl and/or alkenyl groups. Cycloalkyl groups can include mono- or polycyclic (e.g., having 2, 3 or 4 fused rings) groups and spirocycles. Cycloalkyl groups can have 3, 4, 5, 6, 7, 8, 9, or 10 ring-forming carbons ($C_{3-10}$). Ring-forming carbon atoms of a cycloalkyl group can be optionally substituted by oxo or sulfido (e.g., C(O) or C(S)). Cycloalkyl groups also include cycloalkylidenes. Example cycloalkyl groups include cyclopropyl, cyclobutyl, cyclopentyl, cyclohexyl, cycloheptyl, cyclopentenyl, cyclohexenyl, cyclohexadienyl, cycloheptatrienyl, norbornyl, norpinyl, norcamyl, and the like. In various aspects, cycloalkyl is cyclopropyl, cyclobutyl, cyclopentyl, cyclohexyl, cyclopentyl, or adamantyl. In various aspects, the cycloalkyl has 6-10 ring-forming carbon atoms. In various aspects, cycloalkyl is cyclohexyl or adamantyl. Also included in the definition of cycloalkyl are moieties that have one or more aromatic rings fused (i.e., having a bond in common with) to the cycloalkyl ring, for example, benzo or thienyl derivatives of cyclopentane, cyclohexane, and the like. A cycloalkyl group containing a fused aromatic ring can be attached through any ring-forming atom including a ring-forming atom of the fused aromatic ring.

As used herein, "heterocycloalkyl" refers to non-aromatic monocyclic or polycyclic heterocycles having one or more ring-forming heteroatoms selected from O, N, or S. Included in heterocycloalkyl are monocyclic 4-, 5-, 6-, and 7-membered heterocycloalkyl groups. Heterocycloalkyl groups can also include spirocycles. Example heterocycloalkyl groups include pyrrolidin-2-one, 1,3-isoxazolidin-2-one, pyranyl, tetrahydropuran, oxetanyl, azetidinyl, morpholino, thiomorpholino, piperazinyl, tetrahydrofuranyl, tetrahydrothienyl, piperidinyl, pyrrolidinyl, isoxazolidinyl, isothiazolidinyl, pyrazolidinyl, oxazolidinyl, thiazolidinyl, imidazolidinyl, azepanyl, benzazapene, and the like. Ring-forming carbon atoms and heteroatoms of a heterocycloalkyl group can be optionally substituted by oxo or sulfido (e.g., C(O), S(O), C(S), or $S(O)_2$, etc.). The heterocycloalkyl group can be attached through a ring-forming carbon atom or a ring-forming heteroatom. In various aspects, the heterocycloalkyl group contains 0 to 3 double bonds. In various aspects, the heterocycloalkyl group contains 0 to 2 double bonds. Also included in the definition of heterocycloalkyl are moieties that have one or more aromatic rings fused (i.e., having a bond in common with) to the cycloalkyl ring, for example, benzo or thienyl derivatives of piperidine, morpholine, azepine, etc. A heterocycloalkyl group containing a fused aromatic ring can be attached through any ring-forming atom including a ring-forming atom of the fused aromatic ring. In various aspects, the heterocycloalkyl has 4-10, 4-7 or 4-6 ring atoms with 1 or 2 heteroatoms independently selected from nitrogen, oxygen, or sulfur and having one or more oxidized ring members.

As used herein, the term "aryl," employed alone or in combination with other terms, refers to an aromatic hydrocarbon group, which may be monocyclic or polycyclic (e.g., having 2, 3 or 4 fused rings). The term "$C_{n-m}$ aryl" refers to an aryl group having from n to m ring carbon atoms. Aryl groups include, e.g., phenyl, naphthyl, anthracenyl, phenanthrenyl, indanyl, indenyl, and the like. In various aspects, aryl groups have from 6 to about 20 carbon atoms, from 6 to about 15 carbon atoms, or from 6 to about 10 carbon atoms. In various aspects, the aryl group is a substituted or unsubstituted phenyl.

As used herein, "heteroaryl" refers to a monocyclic or polycyclic aromatic heterocycle having at least one heteroatom ring member selected from sulfur, oxygen, and nitrogen. In various aspects, the heteroaryl ring has 1, 2, 3, or 4 heteroatom ring members independently selected from nitrogen, sulfur and oxygen. In various aspects, any ring-forming N in a heteroaryl moiety can be an N-oxide. In various aspects, the heteroaryl has 5-10 ring atoms and 1, 2, 3 or 4 heteroatom ring members independently selected from nitrogen, sulfur and oxygen. In various aspects, the heteroaryl has 5-6 ring atoms and 1 or 2 heteroatom ring members independently selected from nitrogen, sulfur and oxygen. In various aspects, the heteroaryl is a five-membered or six-membered heteroaryl ring. A five-membered heteroaryl ring is a heteroaryl with a ring having five ring atoms wherein one or more (e.g., 1, 2, or 3) ring atoms are independently selected from N, O, and S. Exemplary five-membered ring heteroaryls are thienyl, furyl, pyrrolyl, imidazolyl, thiazolyl, oxazolyl, pyrazolyl, isothiazolyl, isoxazolyl, 1,2,3-triazolyl, tetrazolyl, 1,2,3-thiadiazolyl, 1,2,3-oxadiazolyl, 1,2,4-triazolyl, 1,2,4-thiadiazolyl, 1,2,4-oxadiazolyl, 1,3,4-triazolyl, 1,3,4-thiadiazolyl, and 1,3,4-oxadiazolyl. A six-membered heteroaryl ring is a heteroaryl with a ring having six ring atoms wherein one or more (e.g., 1, 2, or 3) ring atoms are independently selected from N, O, and S. Exemplary six-membered ring heteroaryls are pyridyl, pyrazinyl, pyrimidinyl, triazinyl and pyridazinyl.

At certain places, the definitions or aspects refer to specific rings (e.g., an azetidine ring, a pyridine ring, etc.). Unless otherwise indicated, these rings can be attached to any ring member provided that the valency of the atom is not exceeded. For example, an azetidine ring may be attached at any position of the ring, whereas an azetidin-3-yl ring is attached at the 3-position.

As used herein, the term "electron withdrawing group" (EWG), employed alone or in combination with other terms, refers to an atom or group of atoms substituted onto a π-system (e.g., substituted onto an aryl or heteroaryl ring) that draws electron density away from the n-system through induction (e.g., withdrawing electron density about a σ-bond) or resonance (e.g., withdrawing electron density about a n-bond or n-system). Example electron withdrawing groups include, but are not limited to, halo groups (e.g., fluoro, chloro, bromo, iodo), nitriles (e.g., —CN), carbonyl groups (e.g., aldehydes, ketones, carboxylic acids, acid chlorides, esters, and the like), nitro groups (e.g., $—NO_2$), haloalkyl groups (e.g., $—CH_2F$, $—CHF_2$, $—CF_3$, and the like), alkenyl groups (e.g., vinyl), alkynyl groups (e.g., ethynyl), sulfonyl groups (e.g., S(O)R, $S(O)_2R$), sulfonate groups (e.g., $—SO_3H$), and sulfonamide groups (e.g., S(O)$N(R)_2$, $S(O)_2N(R)_2$). In various aspects, the electron withdrawing group is selected from the group consisting of halo, $C_{2-6}$ alkenyl, $C_{2-6}$ alkynyl, $C_{1-3}$ haloalkyl, CN, $NO_2$, $C(=O)OR^{a1}$, $C(=O)R^{b1}$, $C(=O)NR^{c1}R^{d1}$, $C(=O)SR^{e1}$, $—NR^{c1}S(O)R^{e1}$, $—NR^{c1}S(O)_2R^{e1}$, $S(=O)R^{e1}$, $S(=O)_2R^{e1}$, $S(=O)NR^{c1}R^{d1}$, $S(=O)_2NR^{c1}R^{d1}$, and $P(O)(OR^{a1})_2$. In various aspects, the electron withdrawing group is selected from the group consisting of $C(=O)OR^{a1}$, $C(=O)R^{b1}$, $C(=O)NR^{c1}R^{d1}$, $C(=O)SR^{e1}$, $S(=O)R^{e1}$, $S(=O)_2R^{e1}$, $S(=O)NR^{c1}R^{d1}$, and $S(=O)_2NR^{c1}R^{d1}$. In various aspects, the electron withdrawing group is $C(=O)OR^{a1}$. In various aspects, the electron withdrawing group is $C(=O)OR^{a1}$, wherein $R^{a1}$ is $C_{1-6}$ alkyl or ($C_{6-10}$ aryl)-$C_{1-3}$ alkylene. In various aspects, the electron withdrawing group is an ester.

Preparation of the compounds described herein can involve a reaction in the presence of an acid or a base. Example acids can be inorganic or organic acids and include, but are not limited to, strong and weak acids. Example acids include, but are not limited to, hydrochloric acid, hydrobromic acid, sulfuric acid, phosphoric acid, p-toluenesulfonic acid, 4-nitrobenzoic acid, methanesulfonic acid, benzenesulfonic acid, trifluoroacetic acid, and nitric acid. Example weak acids include, but are not limited to, acetic acid, propionic acid, butanoic acid, benzoic acid, tartaric acid, pentanoic acid, hexanoic acid, heptanoic acid, octanoic acid, nonanoic acid, and decanoic acid. Example bases include, without limitation, lithium hydroxide, sodium hydroxide, potassium hydroxide, lithium carbonate, sodium carbonate, potassium carbonate, sodium bicarbonate, and amine bases. Example strong bases include, but are not limited to, hydroxide, alkoxides, metal amides, metal hydrides, metal dialkylamides and arylamines, wherein; alkoxides include lithium, sodium and potassium salts of methyl, ethyl and t-butyl oxides; metal amides include sodium amide, potassium amide and lithium amide; metal hydrides include sodium hydride, potassium hydride and lithium hydride; and metal dialkylamides include lithium, sodium, and potassium salts of methyl, ethyl, n-propyl, iso-propyl, n-butyl, t-butyl, trimethylsilyl and cyclohexyl substituted amides (e.g., lithium N-isopropylcyclohexylamide).

The following abbreviations may be used herein: AcOH (acetic acid); aq. (aqueous); atm. (atmosphere(s)); $Br_2$ (bromine); Bn (benzyl); calc. (calculated); d (doublet); dd (doublet of doublets); DCM (dichloromethane); DMF (N,N-dimethylformamide); Et (ethyl); $Et_2O$ (diethyl ether); EtOAc (ethyl acetate); EtOH (ethanol); EWG (electron withdrawing group); g (gram(s)); h (hour(s)); $H_2$ (hydrogen gas); HCl (hydrochloric acid/hydrogen choride); HPLC (high performance liquid chromatography); $H_2SO_4$ (sulfuric acid); Hz (hertz); $I_2$ (iodine); IPA (isopropyl alcohol); J (coupling constant); KOH (potassium hydroxide); $K_3PO_4$ (potassium phosphate); LCMS (liquid chromatography—mass spectrometry); LiICA (lithium N-isopropylcyclohexylamide); m (multiplet); M (molar); MS (Mass spectrometry); Me (methyl); MeCN (acetonitrile); MeOH (methanol); mg (milligram(s)); min. (minutes(s)); mL (milliliter(s)); mmol (millimole(s)); N (normal); $NaBH_3CN$ (sodium cyanoborohydride); NHP (N-heterocyclic phosphine); NHP—$C_1$ (N-heterocyclic phosphine chloride); $Na_2CO_3$ (sodium carbonate); $NaHCO_3$ (sodium bicarbonate); NaOH (sodium hydroxide); $Na_2SO_4$ (sodium sulfate); nM (nanomolar); NMR (nuclear magnetic resonance spectroscopy); $PCl_3$ (trichlorophosphine); PMP (4-methoxyphenyl); RP-HPLC (reverse phase high performance liquid chromatography); t (triplet or tertiary); t-Bu (tert-butyl); TEA (triethylamine); TFA (trifluoroacetic acid); THF (tetrahydrofuran); TLC (thin layer chromatography); g (microgram(s)); L (microliter(s)); M (micromolar); wt % (weight percent).

B. N-Heterocyclic Phosphines

In one aspect, the invention relates to compounds useful in C—C and C—P bond-forming techniques. More specifically, in one aspect, the present invention relates to compounds useful in chemical reactions including, but not limited to, hydroformylations, Heck reactions, cross-coupling reactions, allylic substitutions, Pudovik-type reactions, Michael-type reactions, and Michaelis-Arbuzov reaction. The present invention further relates to compounds useful in the preparation of vinylphosphonates.

The disclosed N-heterocyclic phosphines (NHPs) are useful in, for example, generating phosphorus-carbon bonds under metal-free reaction conditions. As provided herein, one application of NHPs in organic synthesis is the formation of vinylphosphonates. In various aspects, the reaction of an appropriately substituted allene and NHP compound can promote a tandem Michael addition/Arbuzov reaction to generate vinylphosphonates. This process can deliver a regio- and stereoselective (e.g., E/Z ratio of about 6:1 to about 20:1) reaction via dual activation of the allene by a bi-functional NHP-thiourea scaffold which functions as Lewis base and Brønsted acid. Forming phosphorus-carbon bonds under metal-free reaction conditions is also useful in, for example, polymer synthesis, where metal impurities may impart undesirable material or thermal properties. Organophosphorus compounds (i.e., compounds having a P—C bond) are also useful, for example, as fire retardants and insecticides, and the production of these compounds via metal-free reactions is desirable.

It is contemplated that each disclosed derivative can be optionally further substituted. It is also contemplated that any one or more derivative can be optionally omitted from the invention. It is understood that a disclosed compound can be provided by the disclosed methods. It is also understood that the disclosed compounds can be employed in the disclosed methods of using.

1. Structure

In one aspect, compounds of Formula (Ia):

(Ia)

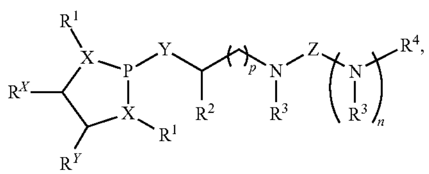

or a salt thereof, wherein: each X is independently selected from the group consisting of N, O, and S; Y is selected from the group consisting of $CH_2$, O, and S; Z is selected from the group consisting of C═O, C═S, S═O, and $SO_2$; $R^X$ is selected from the group consisting of H, $C_{6-10}$ aryl, and 4-10 membered heteroaryl ring; $R^Y$ is selected from the group consisting of H, $C_{6-10}$ aryl, and 4-10 membered heteroaryl ring; or $R^X$ and $R^Y$ in combination, together with the carbon atoms to which $R^X$ and $R^Y$ are attached, form a 5, 6, or 7-membered cycloalkyl ring or a 5, 6, or 7-membered aryl ring; each $R^1$ is independently selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; $R^2$ is selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; each $R^3$ is independently selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; $R^4$ is selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; each $R^5$ is independently selected from the group consisting of OH, $NO_2$, CN, halo, $C_{1-3}$ alkyl, $C_{2-4}$ alkenyl, $C_{2-4}$ alkynyl, $C_{1-3}$ haloalkyl, cyano-$C_{1-3}$ alkyl, HO—$C_{1-3}$ alkyl, $C_{1-3}$ alkoxy-$C_{1-3}$ alkyl, $C_{3-7}$ cycloalkyl, $C_{6-10}$ aryl, $C_{1-3}$ alkoxy, $C_{1-3}$ haloalkoxy, amino, $C_{1-3}$ alkylamino, di($C_{1-3}$ alkyl)amino, thio, $C_{1-3}$ alkylthio, $C_{1-3}$ alkylsulfinyl, $C_{1-3}$ alkylsulfonyl, carbamyl, $C_{1-3}$ alkylcarbamyl, di($C_{1-3}$ alkyl)carbamyl, carboxy, $C_{1-3}$ alkylcarbonyl, $C_{1-4}$ alkoxycarbonyl, $C_{1-3}$ alkylcarbonylamino, $C_{1-3}$ alkylsulfonylamino, aminosulfonyl, $C_{1-3}$ alkylaminosulfonyl, di($C_{1-3}$ alkyl)aminosulfonyl, aminosulfonylamino, $C_{1-3}$ alkylaminosulfonylamino, di($C_{1-3}$ alkyl)aminosulfonylamino, aminocarbonylamino, $C_{1-3}$ alkylaminocarbonylamino, and di($C_{1-3}$ alkyl)aminocarbonylamino; n is 0 or 1; and p is 0, 1, 2, 3, 4, or 5 are disclosed. In a further aspect, the salt is a pharmaceutically acceptable salt.

In one aspect, compounds of Formula (Ib):

(Ib)

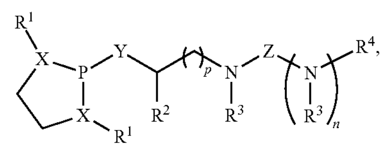

or a salt thereof, wherein: each X is independently selected from the group consisting of N, O, and S; Y is selected from the group consisting of $CH_2$, O, and S; Z is selected from the group consisting of C═O, C═S, S═O, and $SO_2$; each $R^1$ is independently selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; $R^2$ is selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; each $R^3$ is independently selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; $R^4$ is selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; each $R^5$ is independently selected from the group consisting of OH, $NO_2$, CN, halo, $C_{1-3}$ alkyl, $C_{2-4}$ alkenyl, $C_{2-4}$ alkynyl, $C_{1-3}$ haloalkyl, cyano-$C_{1-3}$ alkyl, HO—$C_{1-3}$ alkyl, $C_{1-3}$alkoxy-$C_{1-3}$ alkyl, $C_{3-7}$ cycloalkyl, $C_{6-10}$ aryl, $C_{1-3}$alkoxy, $C_{1-3}$ haloalkoxy, amino, $C_{1-3}$ alkylamino, di($C_{1-3}$ alkyl)amino, thio, $C_{1-3}$ alkylthio, $C_{1-3}$ alkylsulfinyl, $C_{1-3}$ alkylsulfonyl, carbamyl, $C_{1-3}$ alkylcarbamyl, di($C_{1-3}$ alkyl)carbamyl, carboxy, $C_{1-3}$ alkylcarbonyl, $C_{1-4}$ alkoxycarbonyl, $C_{1-3}$alkylcarbonylamino, $C_{1-3}$ alkylsulfonylamino, aminosulfonyl, $C_{1-3}$ alkylaminosulfonyl, di($C_{1-3}$ alkyl)aminosulfonyl, aminosulfonylamino, $C_{1-3}$ alkylaminosulfonylamino, di($C_{1-3}$ alkyl)aminosulfonylamino, aminocarbonylamino, $C_{1-3}$ alkylaminocarbonylamino, and di($C_{1-3}$ alkyl) aminocarbonylamino; n is 0 or 1; and p is 0, 1, 2, 3, 4, or 5 are disclosed. In a further aspect, the salt is a pharmaceutically acceptable salt.

In one aspect, compounds having a structure represented by a formula:

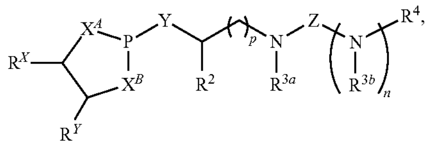

wherein n is selected from 0 and 1; wherein p is selected from 0, 1, 2, 3, 4, and 5; wherein each of $X^A$ and $X^B$ is independently selected from $NR^1$, O, and S; wherein each occurrence of $R^1$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each occurrence of $R^1$, when present, is independently substituted with 0, 1, 2, 3, or 4 independently selected $R^5$ groups; wherein Y is selected from O and S; wherein Z is selected from C═O, C═S, S═O, and $SO_2$; wherein each of $R^X$ and $R^Y$ is independently selected from hydrogen, C1-C8 alkyl, C6-C10 aryl, and 4-10 membered heteroaryl, or wherein each of $R^X$ and $R^Y$ are optionally covalently bonded together and, together with the intermediate carbon atoms, comprise a 5- to 7-membered cycloalkyl or 5- to 6-membered aryl; wherein $R^2$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein $R^2$ is substituted with 0, 1, 2, 3, or 4 independently selected $R^5$ groups; wherein each of $R^{3a}$ and $R^{3b}$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each of $R^{3a}$ and $R^{3b}$ is independently substituted with 0, 1, 2, 3, or 4 independently selected $R^5$ groups; wherein $R^4$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, and 4-10 membered heteroaryl, and —(C1-C3 alkyl)(C6-C10 aryl), and wherein $R^4$ is substituted with 0, 1, 2, 3, or 4 independently selected $R^5$ groups; wherein each occurrence of $R^5$, when present, is independently selected from halogen, —$NO_2$, —CN, —OH, —SH, —$NH_2$, C1-C3 alkyl, C2-C4 alkenyl, C2-C4 alkynyl, C1-C3 haloalkyl, C1-C3 cyanoalkyl, C1-C3 hydroxyalkyl, C1-C3 haloalkoxy, C1-C3 alkoxy, C1-C3 thioalkyl, C1-C3 alkyl(C1-C3 alkoxy), C1-C3 alkylamino, (C1-C3)(C1-C3) dialkylamino, C3-C7 cycloalkyl, C6-C10 aryl, —(C═O)(C1-C3 alkyl), —(S═O)(C1-C3 alkyl), —$SO_2$(C1-C3 alkyl), —$CO_2R^{11}$, (C═O)$NR^{12a}R^{12b}$, —$SO_2NR^{12a}R^{12b}$, —O(C═O) $NR^{12a}R^{12b}$, —$NHSO_2NR^{12a}R^{12b}$, and —NH(C═O) $NR^{12a}R^{12b}$; wherein each occurrence of $R^{11}$, when present, is independently selected from hydrogen and C1-C4 alkyl; and wherein each occurrence of $R^{12a}$ and $R^{12b}$, when present, is independently selected from hydrogen and C1-C3 alkyl, or a derivative thereof.

In one aspect, compounds having a structure represented by a formula:

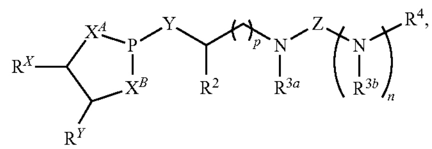

wherein n is selected from 0 and 1; wherein p is selected from 0, 1, 2, 3, 4, and 5; wherein each of $X^A$ and $X^B$ is independently selected from $NR^1$, O, and S; wherein each occurrence of $R^1$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each occurrence of $R^1$, when present, is independently substituted with 0, 1, 2, 3, or 4 independently selected $R^5$ groups; wherein Y is selected from $CH_2$, O, and S; wherein Z is selected from C═O, C═S, S═O, and $SO_2$; wherein each of $R^X$ and $R^Y$ is independently selected from hydrogen, C6-C10 aryl, and 4-10 membered heteroaryl, or wherein each of $R^X$ and $R^Y$ are optionally covalently bonded together and, together with the intermediate carbon atoms, comprise a 5- to 7-membered cycloalkyl or 5- to 6-membered aryl; wherein $R^2$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein $R^2$ is substituted with 0, 1, 2, 3, or 4 independently selected $R^5$ groups; wherein each of $R^{3a}$ and $R^{3b}$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each of $R^{3a}$ and $R^{3b}$ is independently substituted with 0, 1, 2, 3, or 4 independently selected $R^5$ groups; wherein $R^4$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, and 4-10 membered heteroaryl, and —(C1-C3 alkyl)(C6-C10 aryl), and wherein $R^4$ is substituted with 0, 1, 2, 3, or 4 independently selected $R^5$ groups; wherein each occurrence of $R^5$, when present, is independently selected from halogen, —$NO_2$, —CN, —OH, —SH, —$NH_2$, C1-C3 alkyl, C2-C4 alkenyl, C2-C4 alkynyl, C1-C3 haloalkyl, C1-C3 cyanoalkyl, C1-C3 hydroxyalkyl, C1-C3 haloalkoxy, C1-C3 alkoxy, C1-C3 thioalkyl, C1-C3 alkyl(C1-C3 alkoxy), C1-C3 alkylamino, (C1-C3)(C1-C3) dialkylamino, C3-C7 cycloalkyl, C6-C10 aryl, —(C═O)(C1-C3 alkyl), —(S═O)(C1-C3 alkyl), —$SO_2$(C1-C3 alkyl), —$CO_2R^{11}$, —$SO_2NR^{12a}R^{12b}$, —O(C═O)$NR^{12a}R^{12b}$, —$NHSO_2NR^{12a}R^{12b}$, and —NH(C═O)$NR^{12a}R^{12b}$; wherein each occurrence of $R^{11}$, when present, is independently selected from hydrogen and C1-C4 alkyl; and wherein each occurrence of $R^{12a}$ and $R^{12b}$, when present, is independently selected from hydrogen and C1-C3 alkyl, or a derivative thereof.

In a further aspect, each X is N; Y is O; Z is selected from the group consisting of C═O, C═S, and $SO_2$; each $R^1$ is $C_{6-10}$ aryl, wherein each $C_{6-10}$ aryl is optionally substituted by 1 or 2 independently selected $R^5$ groups; $R^2$ is H or $C_{1-6}$ alkyl; each $R^3$ is independently selected from H and $C_{1-6}$ alkyl; $R^4$ is $C_{6-10}$ aryl or ($C_{6-10}$ aryl)-$C_{1-3}$ alkylene-, wherein the $C_{6-10}$ aryl and ($C_{6-10}$ aryl)-$C_{1-3}$ alkylene- are each optionally substituted by 1 or 2 independently selected $R^5$ groups; each $R^5$ is independently selected from the group consisting of $NO_2$, halo, $C_{1-3}$ alkyl, $C_{1-3}$ alkoxy, $C_{1-3}$ haloalkyl; and p is 1 or 2.

In a further aspect, each X is N; Y is S; Z is selected from the group consisting of C═O, C═S, and $SO_2$; each $R^1$ is $C_{6-10}$ aryl, wherein each $C_{6-10}$ aryl is optionally substituted by 1 or 2 independently selected $R^5$ groups; $R^2$ is H or $C_{1-6}$ alkyl; each $R^3$ is independently selected from H and $C_{1-6}$ alkyl; $R^4$ is $C_{6-10}$ aryl or ($C_{6-10}$ aryl)-$C_{1-3}$ alkylene-, wherein the $C_{6-10}$ aryl and ($C_{6-10}$ aryl)-$C_{1-3}$ alkylene- are each optionally substituted by 1 or 2 independently selected $R^5$ groups; each $R^5$ is independently selected from the group consisting of $NO_2$, halo, $C_{1-3}$ alkyl, $C_{1-3}$ alkoxy, $C_{1-3}$ haloalkyl; and p is 1 or 2.

In a further aspect, the compound of Formula (Ia) or Formula (Ib) is not:

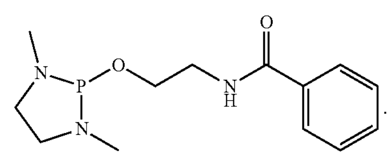 [SMILES: CN1CCN(C)P1OCCNC(=O)c1ccccc1]

In a further aspect, the compound of Formula (Ia) or Formula (Ib) is a compound of Formula (Ic):

(Ic)

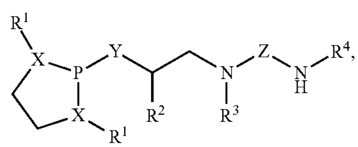

or a salt thereof. In a still further aspect, each X is independently selected from the group consisting of N, O, and S; Y is selected from the group consisting of $CH_2$, O, and S; Z is selected from the group consisting of C═O, C═S, S═O, and $SO_2$; each $R^1$ is independently selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{13}$ alkylene-, and 4-10 membered heteroaryl are each optionally substituted by 1, 2, 3, or 4 independently selected $R^5$ groups; $R^2$ is selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; $R^3$ is selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; $R^4$ is selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; and each $R^5$ is independently selected from the group consisting of OH, $NO_2$, CN, halo, $C_{1-3}$ alkyl, $C_{2-4}$ alkenyl, $C_{2-4}$ alkynyl, $C_{1-3}$ haloalkyl, cyano-$C_{1-3}$ alkyl, HO—$C_{1-3}$ alkyl, $C_{1-3}$ alkoxy-$C_{1-3}$ alkyl, $C_{3-7}$ cycloalkyl, $C_{6-10}$ aryl, $C_{1-3}$ alkoxy, $C_{1-3}$ haloalkoxy, amino, $C_{1-3}$ alkylamino, di($C_{1-3}$ alkyl)amino, thio, $C_{1-3}$ alkylthio, $C_{1-3}$ alkylsulfinyl, $C_{1-3}$ alkylsulfonyl, carbamyl, $C_{1-3}$ alkylcarbamyl, di($C_{1-3}$ alkyl)carbamyl, carboxy, $C_{1-3}$ alkylcarbonyl, $C_{1-4}$ alkoxycarbonyl, $C_{1-3}$ alkylcarbonylamino, $C_{1-3}$ alkylsulfonylamino, aminosulfonyl, $C_{1-3}$ alkylaminosulfonyl, di($C_{1-3}$ alkyl)aminosulfonyl, aminosulfonylamino, $C_{1-3}$ alkylaminosulfonylamino, di($C_{1-3}$ alkyl)aminosulfonylamino, aminocarbonylamino, $C_{1-3}$ alkylaminocarbonylamino, and di($C_{1-3}$ alkyl)aminocarbonylamino. In a still further aspect, the salt is a pharmaceutically acceptable salt.

In a further aspect, the compound of Formula (Ia) or Formula (Ib) is a compound of Formula (Id):

(Id)

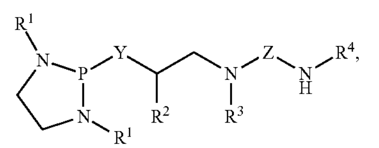

or a salt thereof. In a still further aspect, Y is selected from the group consisting of $CH_2$, O, and S; Z is selected from the group consisting of C═O, C═S, S═O, and $SO_2$; each $R^1$ is independently selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; $R^2$ is selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; $R^3$ is selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; $R^4$ is selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; and each $R^5$ is independently selected from the group consisting of OH, $NO_2$, CN, halo, $C_{1-3}$ alkyl, $C_{2-4}$ alkenyl, $C_{2-4}$ alkynyl, $C_{1-3}$ haloalkyl, cyano-$C_{1-3}$ alkyl, HO—$C_{1-3}$ alkyl, $C_{1-3}$ alkoxy-$C_{1-3}$ alkyl, $C_{3-7}$ cycloalkyl, $C_{6-10}$ aryl, $C_{1-3}$ alkoxy, $C_{1-3}$ haloalkoxy, amino, $C_{1-3}$ alkylamino, di($C_{1-3}$ alkyl)amino, thio, $C_{1-3}$ alkylthio, $C_{1-3}$ alkylsulfinyl, $C_{1-3}$ alkylsulfonyl, carbamyl, $C_{1-3}$ alkylcarbamyl, di($C_{1-3}$ alkyl)carbamyl, carboxy, $C_{1-3}$ alkylcarbonyl, $C_{1-4}$ alkoxycarbonyl, $C_{1-3}$ alkylcarbonylamino, $C_{1-3}$ alkylsulfonylamino, aminosulfonyl, $C_{1-3}$ alkylaminosulfonyl, di($C_{1-3}$ alkyl)aminosulfonyl, aminosulfonylamino, $C_{1-3}$ alkylaminosulfonylamino, di($C_{1-3}$ alkyl)aminosulfonylamino, aminocarbonylamino, $C_{1-3}$ alkylaminocarbonylamino, and di($C_{1-3}$ alkyl)aminocarbonylamino. In a still further aspect, the salt is a pharmaceutically acceptable salt.

In a further aspect, the compound of Formula (Ia) or Formula (Ib) is a compound of Formula (Ie):

(Ie)

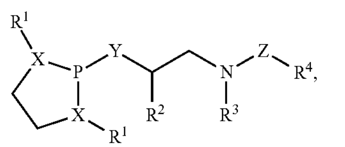

or a salt thereof. In a still further aspect, each X is independently selected from the group consisting of N, O, and S; Y is selected from the group consisting of $CH_2$, O, and S; Z is selected from the group consisting of C═O, C═S, S═O, and $SO_2$; each $R^1$ is independently selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; $R^2$ is selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; $R^3$ is selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{13}$ alkylene-, and 4-10 membered heteroaryl are each optionally substituted by 1, 2, 3, or 4 independently selected $R^5$ groups; $R^4$ is selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; and each $R^5$ is independently selected from the group consisting of OH, $NO_2$, CN, halo, $C_{1-3}$ alkyl, $C_{2-4}$ alkenyl, $C_{2-4}$ alkynyl, $C_{1-3}$ haloalkyl, cyano-$C_{1-3}$ alkyl, HO—$C_{1-3}$ alkyl, $C_{1-3}$ alkoxy-$C_{1-3}$ alkyl, $C_{3-7}$ cycloalkyl, $C_{6-10}$ aryl, $C_{1-3}$ alkoxy, $C_{1-3}$ haloalkoxy, amino, $C_{1-3}$ alkylamino, di($C_{1-3}$ alkyl)amino, thio, $C_{1-3}$ alkylthio, $C_{1-3}$ alkylsulfinyl, $C_{1-3}$ alkylsulfonyl, carbamyl, $C_{1-3}$ alkylcarbamyl, di($C_{1-3}$ alkyl)carbamyl, carboxy, $C_{1-3}$ alkylcarbonyl, $C_{1-4}$ alkoxycarbonyl, $C_{1-3}$ alkylcarbonylamino, $C_{1-3}$ alkylsulfonylamino, aminosulfonyl, $C_{1-3}$ alkylaminosulfonyl, di($C_{1-3}$ alkyl)aminosulfonyl, aminosulfonylamino, $C_{1-3}$ alkylaminosulfonylamino, di($C_{1-3}$ alkyl)aminosulfonylamino, aminocarbonylamino, $C_{1-3}$ alkylaminocarbonylamino, and di($C_{1-3}$ alkyl)aminocarbonylamino. In a still further aspect, the salt is a pharmaceutically acceptable salt.

In a further aspect, the compound of Formula (Ia) or Formula (Ib) is a compound of Formula (If):

(If)

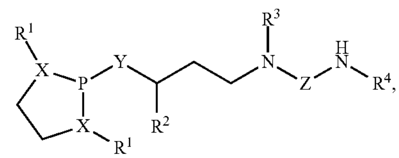

or a salt thereof. In a still further aspect, each X is independently selected from the group consisting of N, O, and S; Y is selected from the group consisting of $CH_2$, O, and S; Z is selected from the group consisting of C═O, C═S, S═O, and $SO_2$; each $R^1$ is independently selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; $R^2$ is selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; $R^3$ is selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; $R^4$ is selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups;

and each $R^5$ is independently selected from the group consisting of OH, $NO_2$, CN, halo, $C_{1-3}$ alkyl, $C_{2-4}$ alkenyl, $C_{2-4}$ alkynyl, $C_{1-3}$ haloalkyl, cyano-$C_{1-3}$ alkyl, HO—$C_{1-3}$ alkyl, $C_{1-3}$ alkoxy-$C_{1-3}$ alkyl, $C_{3-7}$ cycloalkyl, $C_{6-10}$ aryl, $C_{1-3}$ alkoxy, $C_{1-3}$ haloalkoxy, amino, $C_{1-3}$ alkylamino, di($C_{1-3}$ alkyl)amino, thio, $C_{1-3}$ alkylthio, $C_{1-3}$ alkylsulfinyl, $C_{1-3}$ alkylsulfonyl, carbamyl, $C_{1-3}$ alkylcarbamyl, di($C_{1-3}$ alkyl)carbamyl, carboxy, $C_{1-3}$ alkylcarbonyl, $C_{1-4}$ alkoxycarbonyl, $C_{1-3}$ alkylcarbonylamino, $C_{1-3}$ alkylsulfonylamino, aminosulfonyl, $C_{1-3}$ alkylaminosulfonyl, di($C_{1-3}$ alkyl)aminosulfonyl, aminosulfonylamino, $C_{1-3}$ alkylaminosulfonylamino, di($C_{1-3}$ alkyl)aminosulfonylamino, aminocarbonylamino, $C_{1-3}$ alkylaminocarbonylamino, and di($C_{1-3}$ alkyl)aminocarbonylamino. In a still further aspect, the salt is a pharmaceutically acceptable salt.

In a further aspect, the compound of Formula (Ia) or Formula (Ib) is a compound of Formula (Ig):

(Ig)

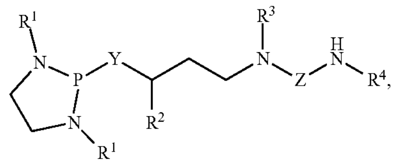

or a salt thereof. In a still further aspect, Y is selected from the group consisting of $CH_2$, O, and S; Z is selected from the group consisting of C═O, C═S, S═O, and $SO_2$; each $R^1$ is independently selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; $R^2$ is selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; $R^3$ is selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; $R^4$ is selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; and each $R^5$ is independently selected from the group consisting of OH, $NO_2$, CN, halo, $C_{1-3}$ alkyl, $C_{2-4}$ alkenyl, $C_{2-4}$ alkynyl, $C_{1-3}$ haloalkyl, cyano-$C_{1-3}$ alkyl, HO—$C_{1-3}$ alkyl, $C_{1-3}$ alkoxy-$C_{1-3}$ alkyl, $C_{3-7}$ cycloalkyl, $C_{6-10}$ aryl, $C_{1-3}$ alkoxy, $C_{1-3}$ haloalkoxy, amino, $C_{1-3}$ alkylamino, di($C_{1-3}$ alkyl)amino, thio, $C_{1-3}$ alkylthio, $C_{1-3}$ alkylsulfinyl, $C_{1-3}$ alkylsulfonyl, carbamyl, $C_{1-3}$ alkylcarbamyl, di($C_{1-3}$ alkyl)carbamyl, carboxy, $C_{1-3}$ alkylcarbonyl, $C_{1-4}$ alkoxycarbonyl, $C_{1-3}$ alkylcarbonylamino, $C_{1-3}$ alkylsulfonylamino, aminosulfonyl, $C_{1-3}$ alkylaminosulfonyl, di($C_{1-3}$ alkyl)aminosulfonyl, aminosulfonylamino, $C_{1-3}$ alkylaminosulfonylamino, di($C_{1-3}$ alkyl)aminosulfonylamino, aminocarbonylamino, $C_{1-3}$ alkylaminocarbonylamino, and di($C_{1-3}$ alkyl)aminocarbonylamino. In a still further aspect, the salt is a pharmaceutically acceptable salt.

In a further aspect, the compound of Formula (Ia) or Formula (Ib) is a compound of Formula (Ih):

(Ih)

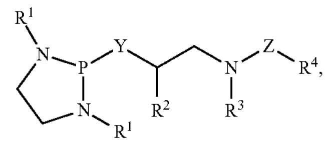

or a salt thereof. In a still further aspect, Y is selected from the group consisting of $CH_2$, O, and S; Z is selected from the group consisting of C═O, C═S, S═O, and $SO_2$; each $R^1$ is independently selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; $R^2$ is selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; $R^3$ is selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; $R^4$ is selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; and each $R^5$ is independently selected from the group consisting of OH, $NO_2$, CN, halo, $C_{1-3}$ alkyl, $C_{2-4}$ alkenyl, $C_{2-4}$ alkynyl, $C_{1-3}$ haloalkyl, cyano-$C_{1-3}$ alkyl, HO—$C_{1-3}$ alkyl, $C_{1-3}$ alkoxy-$C_{1-3}$ alkyl, $C_{3-7}$ cycloalkyl, $C_{6-10}$ aryl, $C_{1-3}$ alkoxy, $C_{1-3}$ haloalkoxy, amino, $C_{1-3}$ alkylamino, di($C_{1-3}$ alkyl)amino, thio, $C_{1-3}$ alkylthio, $C_{1-3}$ alkylsulfinyl, $C_{1-3}$ alkylsulfonyl, carbamyl, $C_{1-3}$ alkylcarbamyl, di($C_{1-3}$ alkyl)carbamyl, carboxy, $C_{1-3}$ alkylcarbonyl, $C_{1-4}$ alkoxycarbonyl, $C_{1-3}$ alkylcarbonylamino, $C_{1-3}$ alkylsulfonylamino, aminosulfonyl, $C_{1-3}$ alkylaminosulfonyl, di($C_{1-3}$ alkyl)aminosulfonyl, aminosulfonylamino, $C_{1-3}$ alkylaminosulfonylamino, di($C_{1-3}$ alkyl)aminosulfonylamino, aminocarbonylamino, $C_{1-3}$ alkylaminocarbonylamino, and di($C_{1-3}$ alkyl)aminocarbonylamino. In a still further aspect, the salt is a pharmaceutically acceptable salt.

In a further aspect, the compound has a structure represented by a formula:

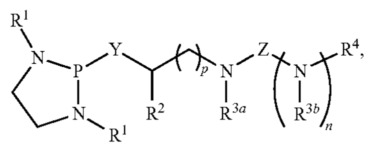

wherein n is selected from 0 and 1; wherein p is selected from 0, 1, 2, 3, 4, and 5; wherein each occurrence of $R^1$, when present, is independently selected from hydrogen, C1-C6 alkyl, and C6-C10 aryl, and wherein each occurrence of $R^1$, when present, is independently substituted with 0, 1, 2, 3, or 4 independently selected $R^5$ groups; wherein Y is selected from O, S, and $NR^{26}$; wherein $R^{26}$, when present, is selected from hydrogen and C1-C8 alkyl; wherein Z is selected from C═O, C═S, S═O, and $SO_2$; wherein $R^2$ is selected from hydrogen and C1-C6 alkyl substituted with 0, 1, 2, 3, or 4 independently selected $R^5$ groups; wherein each of $R^{3a}$ and $R^{3b}$, when present, is independently selected from hydrogen and C1-C6 alkyl substituted with 0, 1, 2, 3, or 4 independently selected $R^5$ groups; wherein $R^4$ is selected from C3-C10 cycloalkyl, C6-C10 aryl, and —(C1-C3 alkyl)(C6-C10 aryl), and wherein $R^4$ is substituted with 0, 1, 2, 3, or 4 independently selected $R^5$ groups; wherein each occurrence of $R^5$, when present, is independently selected from halogen, —$NO_2$, —CN, —OH, —SH, —$NH_2$, C1-C3 alkyl, C1-C3 haloalkyl, C1-C3 hydroxyalkyl, C1-C3 alkoxy, C1-C3 thioalkyl, C1-C3 alkylamino, and (C1-C3)(C1-C3) dialkylamino; or a derivative thereof.

In a further aspect, the compound has a structure represented by a formula:

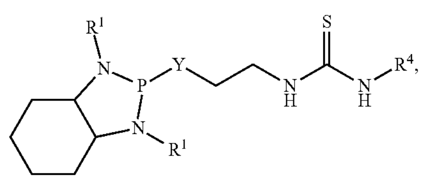

wherein n is selected from 0 and 1; wherein p is selected from 0, 1, 2, 3, 4, and 5; wherein each occurrence of $R^1$, when present, is independently selected from hydrogen, C1-C6 alkyl, and C6-C10 aryl, and wherein each occurrence of $R^1$, when present, is independently substituted with 0, 1, 2, 3, or 4 independently selected $R^5$ groups; wherein Y is selected from O, S, and $NR^{26}$; wherein $R^{26}$, when present, is selected from hydrogen and C1-C8 alkyl; wherein Z is selected from C═O, C═S, S═O, and $SO_2$; wherein $R^2$ is selected from hydrogen and C1-C6 alkyl substituted with 0, 1, 2, 3, or 4 independently selected $R^5$ groups; wherein each of $R^{3a}$ and $R^{3b}$, when present, is independently selected from hydrogen and C1-C6 alkyl substituted with 0, 1, 2, 3, or 4 independently selected $R^5$ groups; wherein $R^4$ is selected from C3-C10 cycloalkyl, C6-C10 aryl, and —(C1-C3 alkyl)(C6-C10 aryl), and wherein $R^4$ is substituted with 0, 1, 2, 3, or 4 independently selected $R^5$ groups; wherein each occurrence of $R^5$, when present, is independently selected from halogen, —$NO_2$, —CN, —OH, —SH, —$NH_2$, C1-C3 alkyl, C1-C3 haloalkyl, C1-C3 hydroxyalkyl, C1-C3 alkoxy, C1-C3 thioalkyl, C1-C3 alkylamino, and (C1-C3)(C1-C3) dialkylamino; or a derivative thereof.

In a further aspect, the compound has a structure represented by a formula selected from:

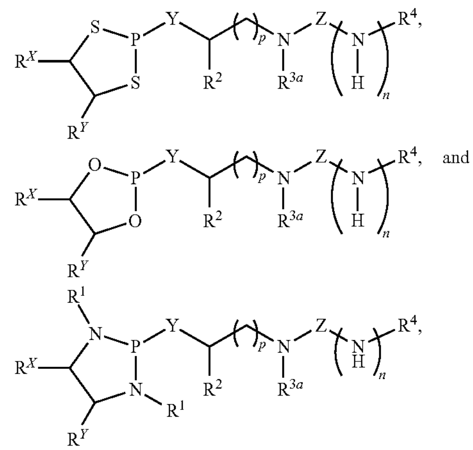

or a derivative thereof.

In a further aspect, the compound has a structure represented by a formula selected from:

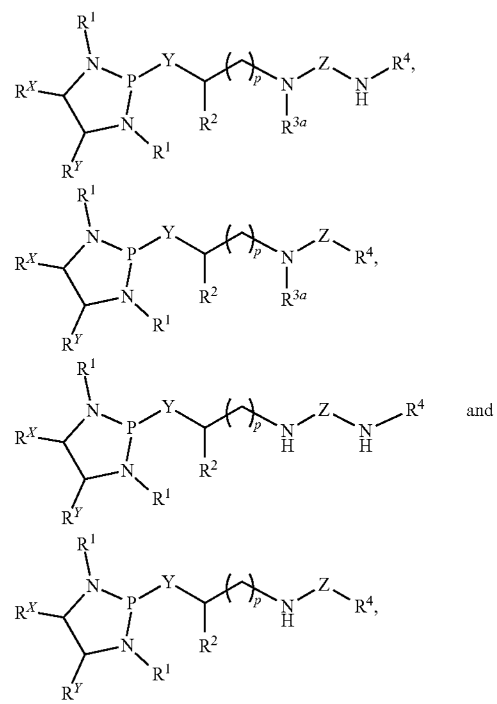

or a derivative thereof.

In a further aspect, the compound has a structure represented by a formula:

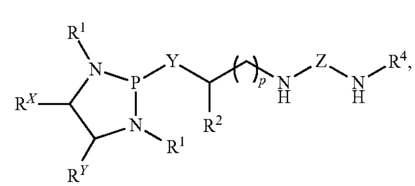

or a derivative thereof.

In a further aspect, the compound has a structure represented by a formula selected from:

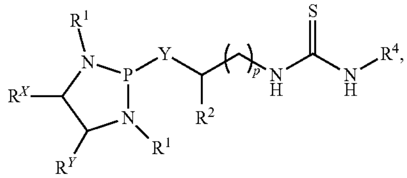

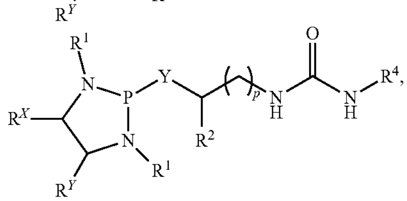

and

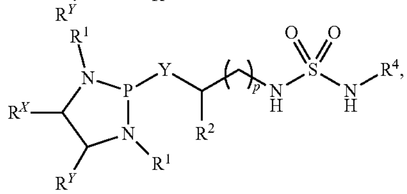

or a derivative thereof.

In a further aspect, the compound has a structure represented by a formula:

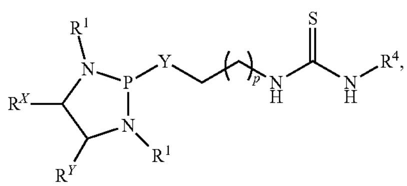

or a derivative thereof.

In a further aspect, the compound has a structure represented by a formula selected from:

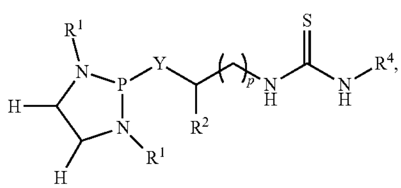

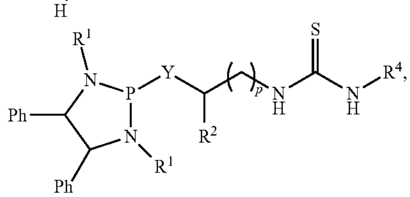

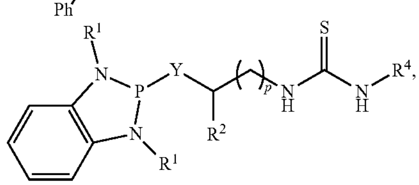

and

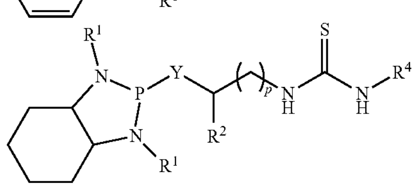

or a derivative thereof.

In a further aspect, the compound has a structure represented by a formula:

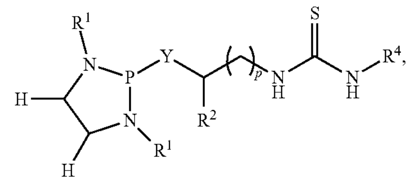

or a derivative thereof.

In a further aspect, the compound has a structure represented by a formula:

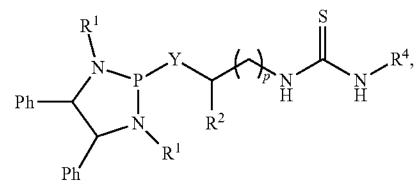

or a derivative thereof.

In a further aspect, the compound has a structure represented by a formula:

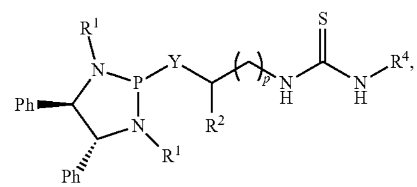

or a derivative thereof.

In a further aspect, the compound has a structure represented by a formula:

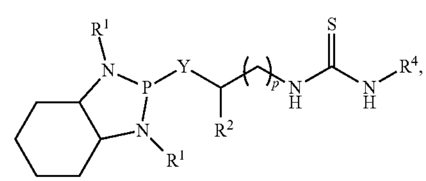

or a derivative thereof.

In a further aspect, the compound has a structure represented by a formula:

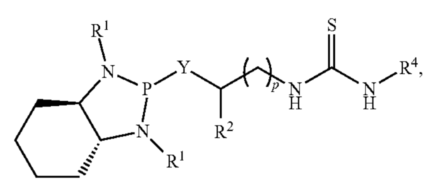

or a derivative thereof.

Non-limiting examples of a compound of Formula (I) (e.g., a compound of Formula (Ia), (Ib), (Ic), (Id), (Ie), (If), (Ig), and/or (Ig) include:

-continued
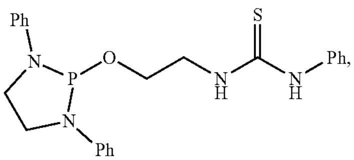
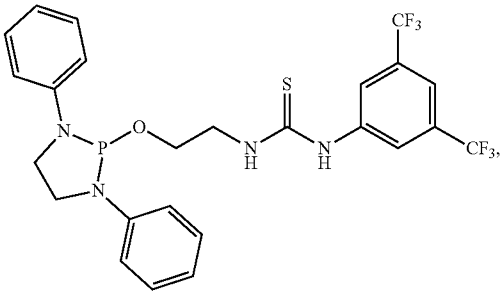
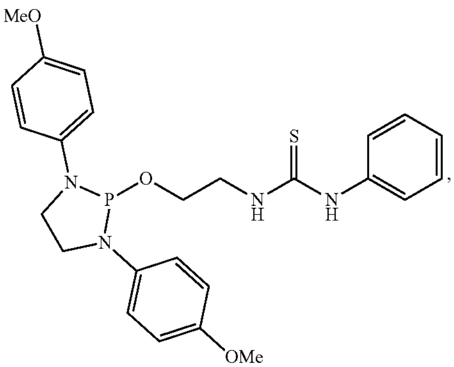
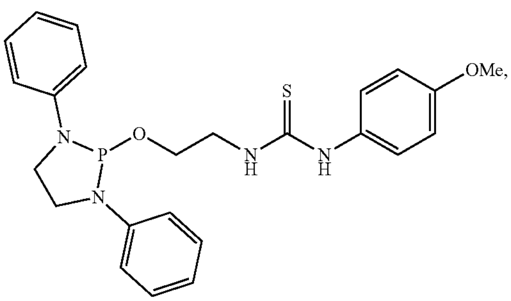
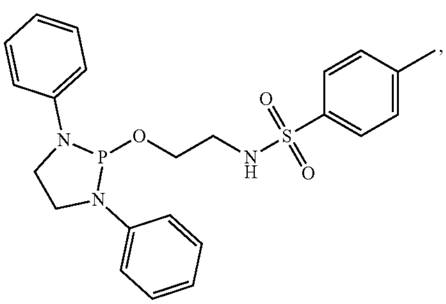
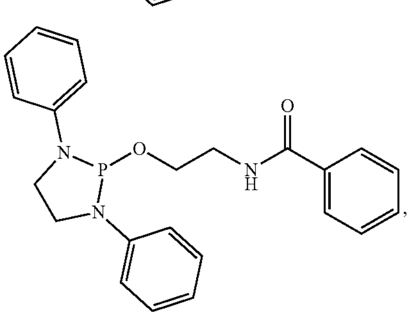
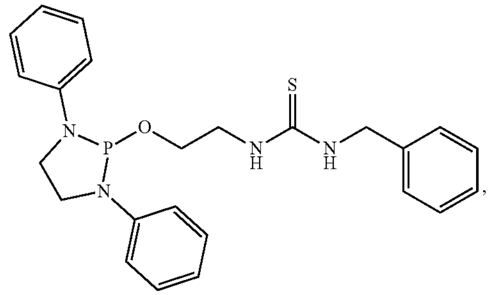
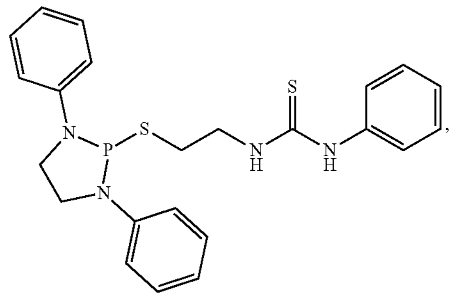
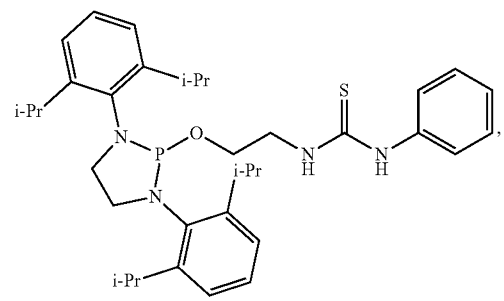
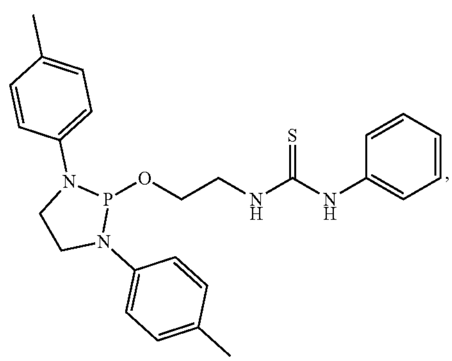
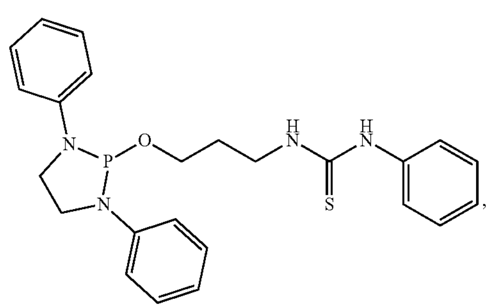

-continued
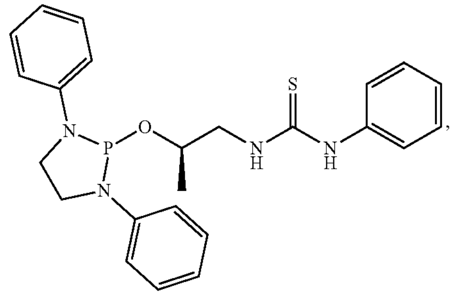
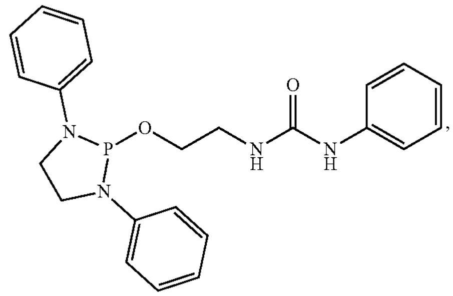
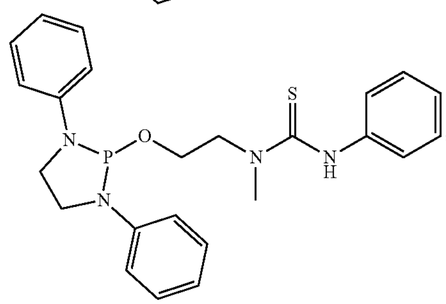
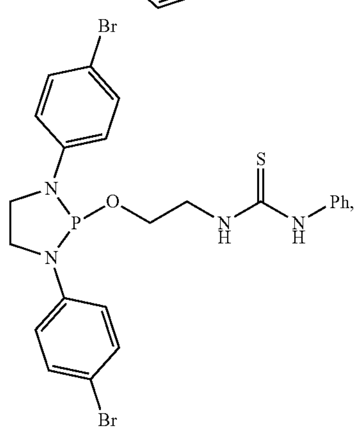
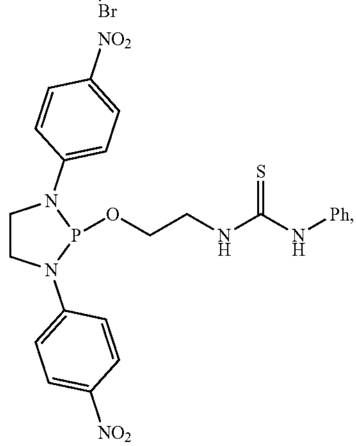
-continued
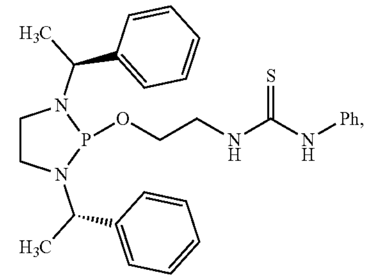
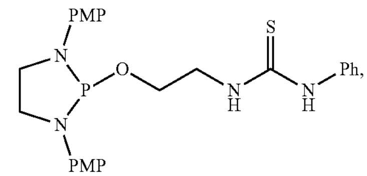
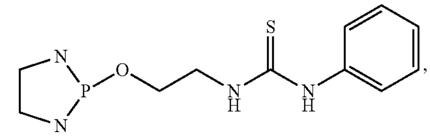
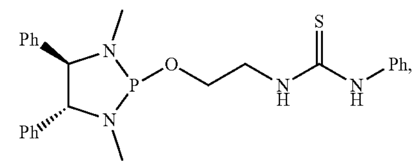
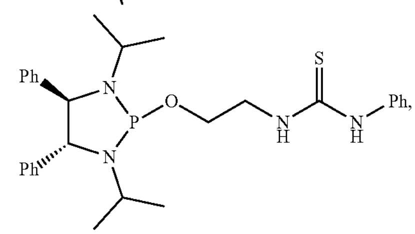
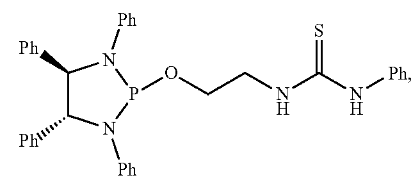
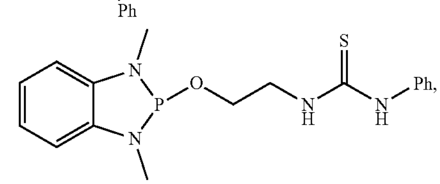
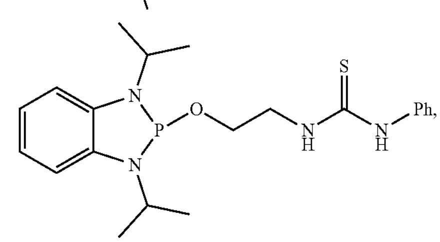
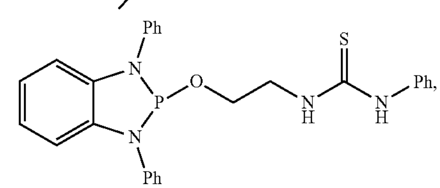

-continued

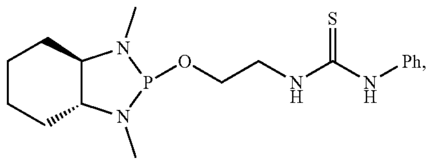

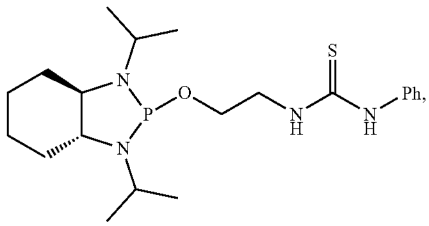

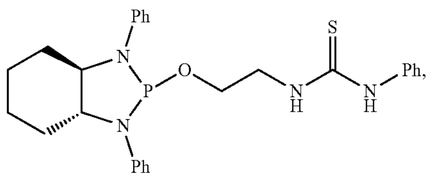

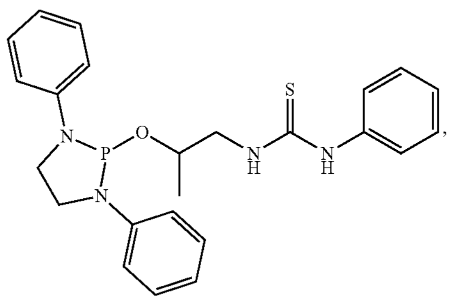

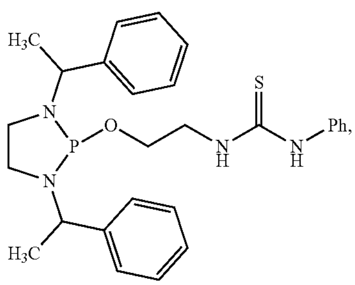

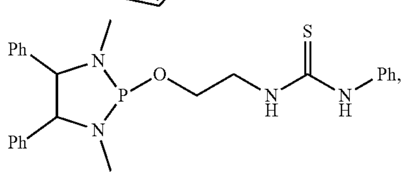

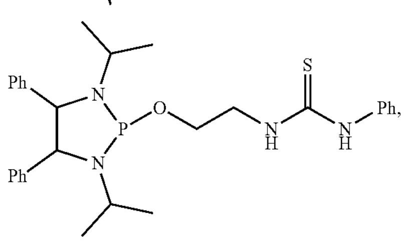

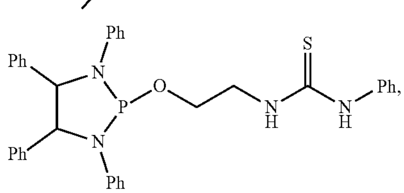

-continued

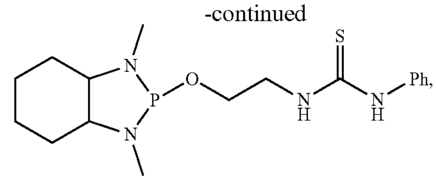

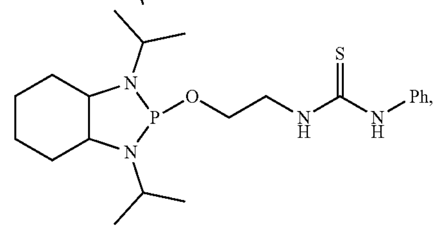

and

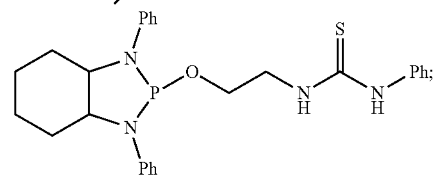

or a salt thereof. In a further aspect, the salt is a pharmaceutically acceptable salt.

In one aspect, n is selected from 0 and 1. In a further aspect, n is 1. In a still further aspect, n is 0.

In one aspect, p is selected from 0, 1, 2, 3, 4, and 5. In a further aspect, p is selected from 0, 1, 2, 3, and 4. In a still further aspect, p is selected from 0, 1, 2, and 3. In yet a further aspect, p is selected from 0, 1, and 2. In an even further aspect, p is selected from 0 and 1. In a still further aspect, p is selected from 1 and 2. In yet a further aspect, p is 5. In an even further aspect, p is 4. In a still further aspect, p is 3. In yet a further aspect, p is 2. In an even further aspect, p is 1. In a still further aspect, p is 0.

a. Q Groups

In one aspect, Q is selected from O, S, and $NR^{26}$. In a further aspect, Q is selected from O and S. In a still further aspect, Q is selected from O and $NR^{26}$. In yet a further aspect, Q is selected from S and $NR^{26}$. In an even further aspect, Q is S. In a still further aspect, Q is $NR^{26}$. In yet a further aspect, Q is O.

b. X, $X^A$, and $X^B$ Groups

In one aspect, each X is independently selected from N, O, and S. In various aspects, each X is N. In a further aspect, each X is independently selected from N and O. In a still further aspect, each X is independently selected from O and S. In yet a further aspect, each X is independently selected from N and S. In an even further aspect, each X is N. In a still further aspect, each X is O. In yet a further aspect, each X is S.

In one aspect, each of $X^A$ and $X^B$ is independently selected from $NR^1$, O, and S. In a further aspect, each of $X^A$ and $X^B$ is independently selected from $NR^1$ and O. In a still further aspect, each of $X^A$ and $X^B$ is independently selected from $NR^1$ and S. In yet a further aspect, each of $X^A$ and $X^B$ is independently selected from O and S. In an even further aspect, each of $X^A$ and $X^B$ is $NR^1$. In a still further aspect, each of $X^A$ and $X^B$ is O. In yet a further aspect, each of $X^A$ and $X^B$ is S.

c. $X^1$ Groups

In one aspect, $X^1$ is halogen. In a further aspect, $X^1$ is selected from —Br, —Cl, and —F. In a still further aspect, $X^1$ is selected from —Cl and —F. In yet a further aspect, $X^1$ is —I. In an even further aspect, $X^1$ is —Br. In a still further aspect, $X^1$ is —Cl. In yet a further aspect, $X^1$ is —F.

d. $X^2$ Groups

In one aspect, each $X^2$ is independently selected from the group consisting of —NH—, —O—, and —S—. In a further aspect, each $X^2$ is independently selected from the group consisting of —NH— and —O—. In a still further aspect, each $X^2$ is independently selected from the group consisting of —NH— and —S—. In yet a further aspect, each $X^2$ is independently selected from the group consisting of —O— and —S—. In an even further aspect, each $X^2$ is —NH. In a still further aspect, each $X^2$ is —O—. In yet a further aspect, each $X^2$ is —S—.

e. $X^3$ Groups

In one aspect, $X^3$ is selected from halogen, tosyl, and mesyl. In a further aspect, $X^3$ is selected from —Cl, —F, tosyl, and mesyl. In a still further aspect, $X^3$ is selected from —Cl, tosyl, and mesyl. In yet a further aspect, $X^3$ is tosyl. In an even further aspect, $X^3$ is mesyl. In a still further aspect, $X^3$ is —Cl. In yet a further aspect, $X^3$ is —F.

f. Y Groups

In one aspect, Y is selected from $CH_2$, O, and S. In a further aspect, Y is selected from O and S. In a still further aspect, Y is selected from $CH_2$ and S. In yet a further aspect, Y is selected from $CH_2$ and O. In an even further aspect, Y is O. In a still further aspect, Y is S. In yet a further aspect, Y is $CH_2$.

In one aspect, Y is selected from O, S, and $NR^{26}$. In a further aspect, Y is selected from O and S. In a still further aspect, Y is selected from O and $NR^{26}$. In yet a further aspect, Y is selected from S and $NR^{26}$. In an even further aspect, Y is S. In a still further aspect, Y is $NR^{26}$. In yet a further aspect, Y is O.

g. $Y^1$ Groups

In one aspect, $Y^1$ is OH, SH, or —$CH_3$. In a further aspect, $Y^1$ is OH. In a still further aspect, $Y^1$ is SH. In yet a further aspect, $Y^1$ is —$CH_3$.

h. Z Groups

In one aspect, Z is selected from C═O, C═S, S═O, and $SO_2$. In a further aspect, Z is selected from C═O, C═S and $SO_2$. In a still further aspect, Z is selected from C═O, C═S and S═O. In yet a further aspect, Z is selected from C═O and C═S. In an even further aspect, Z is selected from C═O and S═O. In a still further aspect, Z is selected from C═O and $SO_2$. In yet a further aspect, Z is selected from C═S and S═O. In an even further aspect, Z is selected from C═S and $SO_2$. In a still further aspect, Z is selected from S═O and $SO_2$. In yet a further aspect, Z is C═O. In an even further aspect, Z is C═S. In a still further aspect, Z is S═O. In yet a further aspect, Z is $SO_2$.

i. $R^1$ Groups

In one aspect, each $R^1$ is independently selected from H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups. In a further aspect, each $R^1$ is independently selected from the group consisting of H, $C_{1-3}$ alkyl, $C_{1-3}$ haloalkyl, $C_{2-4}$ alkenyl, $C_{2-4}$ alkynyl, $C_{3-8}$ cycloalkyl, 4-8 membered heterocycloalkyl, $C_{6-8}$ aryl, ($C_{6-8}$ aryl)-$C_{1-3}$ alkylene-, and 4-8 membered heteroaryl, wherein the $C_{1-3}$ alkyl, $C_{3}$-8 cycloalkyl, 4-8 membered heterocycloalkyl, $C_{6-8}$ aryl, ($C_{6-8}$ aryl)-$C_{1-3}$ alkylene-, and 4-8 membered heteroaryl are each optionally substituted by 1, 2, 3, or 4 independently selected $R^5$ groups.

In one aspect, each occurrence of $R^1$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each occurrence of $R^1$, when present, is independently substituted with 0, 1, 2, 3, or 4 independently selected $R^5$ groups. In a further aspect, each occurrence of $R^1$, when present, is independently selected from hydrogen, C1-C3 alkyl, C1-C3 haloalkyl, C2-C4 alkenyl, C2-C4 alkynyl, C3-C8 cycloalkyl, 4-8 membered heterocycloalkyl, C6-C8 aryl, —(C1-C3 alkyl)(C6-C8 aryl), and 4-8 membered heteroaryl, and wherein each occurrence of $R^1$, when present, is independently substituted with 0, 1, 2, 3, or 4 independently selected $R^5$ groups. In a still further aspect, each occurrence of $R^1$ is H.

In a further aspect, each $R^1$ is independently selected from the group consisting of H, $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl. In a still further aspect, each $R^1$ is independently selected from $C_{1-6}$ alkyl, ($C_{6-10}$ aryl)-$C_{1-3}$ alkylene, and $C_{6-10}$ aryl. In yet a further aspect, each $R^1$ is independently $C_{1-6}$ alkyl, optionally substituted by 1 $R^5$ group. In an even further aspect, each $R^1$ is methyl.

In a further aspect, each $R^1$ is ethyl, substituted by 1 $R^5$; and $R^5$ is phenyl.

In a further aspect, each $R^1$ is independently $C_{6-10}$ aryl optionally substituted by 1 or 2 independently selected $R^5$ groups; and $R^5$ is $NO_2$, halo, $C_{1-3}$ alkyl or $C_{1-3}$ alkoxy. In a still further aspect, each $R^1$ is phenyl, optionally substituted by 1 or 2 independently selected $R^5$ groups; and $R^5$ is $NO_2$, halo, $C_{1-3}$ alkyl or $C_{1-3}$ alkoxy. In yet a further aspect, each $R^1$ is phenyl, optionally substituted by 1 or 2 independently selected $R^5$ groups; and $R^5$ is selected from the group consisting of $NO_2$, bromo, methyl, isopropyl, and methoxy.

In a further aspect, each occurrence of $R^1$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each occurrence of $R^1$, when present, is independently substituted with 0, 1, 2, or 3 independently selected $R^5$ groups. In a still further aspect, each occurrence of $R^1$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each occurrence of $R^1$, when present, is independently substituted with 0, 1, or 2 independently selected $R^5$ groups. In yet a further aspect, each occurrence of $R^1$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each occurrence of $R^1$, when present, is independently substituted with 0 or 1 $R^5$ group. In an even further aspect, each occurrence of $R^1$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each occurrence of $R^1$, when present, is independently monosubstituted with a $R^5$ group. In a still further aspect, each occurrence of $R^1$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each occurrence of $R^1$, when present, is unsubstituted.

In a further aspect, each occurrence of $R^1$, when present, is independently selected from C1-C6 alkyl, C3-C10 cycloalkyl, C6-C10 aryl, and —(C1-C3 alkyl)(C6-C10 aryl). In a still further aspect, each occurrence of $R^1$, when present, is independently selected from C1-C4 alkyl, C3-C8 cycloalkyl, C6-C8 aryl, and —(C1-C3 alkyl)(C6-C8 aryl). In yet a further aspect, each occurrence of $R^1$, when present, is independently selected from methyl, ethyl, n-propyl, i-propyl, cyclohexyl, phenyl, and benzyl. In a still further aspect, each occurrence of $R^1$, when present, is independently selected from methyl, ethyl, cyclohexyl, phenyl and benzyl. In yet a further aspect, each occurrence of $R^1$, when present, is independently selected from methyl, cyclohexyl, phenyl, and benzyl. In an even further aspect, each occurrence of $R^1$, when present, is independently selected from cyclohexyl, phenyl, and benzyl. In a still further aspect, each occurrence of $R^1$, when present, is cyclohexyl. In yet a further aspect, each occurrence of $R^1$, when present, is phenyl. In an even further aspect, each occurrence of $R^1$, when present, is benzyl.

In a further aspect, each occurrence of $R^1$, when present, is independently selected from C1-C6 alkyl and C6-C10 aryl. In a still further aspect, each occurrence of $R^1$, when present, is independently selected from C1-C4 alkyl and C6-C8 aryl. In yet a further aspect, each occurrence of $R^1$, when present, is independently selected from methyl, ethyl, n-propyl, i-propyl, and phenyl. In an even further aspect, each occurrence of $R^1$, when present, is independently selected from methyl, ethyl, and phenyl. In a still further aspect, each occurrence of $R^1$, when present, is independently selected from ethyl and phenyl. In yet a further aspect, each occurrence of $R^1$, when present, is independently selected from methyl and phenyl.

In a further aspect, each occurrence of $R^1$, when present, is independently selected from hydrogen and C1-C6 alkyl. In a still further aspect, each occurrence of $R^1$, when present, is independently selected from hydrogen, methyl, ethyl, n-propyl, i-propyl, n-butyl, i-butyl, s-butyl, and t-butyl. In yet a further aspect, each occurrence of $R^1$, when present, is independently selected from hydrogen, methyl, ethyl, n-propyl, and i-propyl. In an even further aspect, each occurrence of $R^1$, when present, is independently selected from hydrogen, methyl, and ethyl. In a still further aspect, each occurrence of $R^1$, when present, is independently selected from hydrogen and ethyl. In yet a further aspect, each occurrence of $R^1$, when present, is independently selected from hydrogen and methyl.

In a further aspect, each occurrence of $R^1$, when present, is independently C1-C6 alkyl. In a still further aspect, each occurrence of $R^1$, when present, is independently selected from methyl, ethyl, n-propyl, i-propyl, n-butyl, i-butyl, s-butyl, and t-butyl. In yet a further aspect, each occurrence of $R^1$, when present, is independently selected from methyl, ethyl, n-propyl, and i-propyl. In an even further aspect, each occurrence of $R^1$, when present, is independently selected from methyl and ethyl. In a still further aspect, each occurrence of $R^1$, when present, is ethyl. In yet a further aspect, each occurrence of $R^1$, when present, is methyl.

j. $R^2$ Groups

In one aspect, $R^2$ is selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups. In a further aspect, $R^2$ is selected from the group consisting of H, $C_{1-3}$ alkyl, $C_{1-3}$ haloalkyl, $C_{2-4}$ alkenyl, $C_{2-4}$ alkynyl, $C_{3-8}$ cycloalkyl, 4-8 membered heterocycloalkyl, $C_{6-8}$ aryl, ($C_{6-8}$ aryl)-$C_{1-3}$ alkylene, and 4-8 membered heteroaryl, wherein the $C_{1-3}$ alkyl, $C_{3-8}$ cycloalkyl, 4-8 membered heterocycloalkyl, $C_{6-8}$ aryl, ($C_{6-8}$ aryl)-$C_{1-3}$ alkylene-, and 4-8 membered heteroaryl are each optionally substituted by 1, 2, 3, or 4 independently selected $R^5$ groups. In a still further aspect, $R^2$ is H.

In one aspect, $R^2$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein $R^2$ is substituted with 0, 1, 2, 3, or 4 independently selected $R^5$ groups. In a further aspect, $R^2$ is selected from hydrogen, C1-C3 alkyl, C1-C3 haloalkyl, C2-C4 alkenyl, C2-C4 alkynyl, C3-C8 cycloalkyl, 4-8 membered heterocycloalkyl, C6-C8 aryl, —(C1-C3 alkyl)(C6-C8 aryl), and 4-8 membered heteroaryl, and wherein $R^2$ is substituted with 0, 1, 2, 3, or 4 independently selected $R^5$ groups.

In a further aspect, $R^2$ is selected from the group consisting of H, $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl. In a still further aspect, $R^2$ is H or $C_{1-6}$ alkyl. In yet a further aspect, $R^2$ is $C_{1-6}$ alkyl. In an even further aspect, $R^2$ is methyl.

In a further aspect, $R^2$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein $R^2$ is substituted with 0, 1, 2, or 3 independently selected $R^5$ groups. In a still further aspect, $R^2$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein $R^2$ is substituted with 0, 1, or 2 independently selected $R^5$ groups. In yet a further aspect, $R^2$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein $R^2$ is substituted with 0 or 1 $R^5$ group. In an even further aspect, $R^2$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein $R^2$ is monosubstituted with a $R^5$ group. In a still further aspect, $R^2$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein $R^2$ is unsubstituted.

In a further aspect, $R^2$ is selected from hydrogen and C1-C6 alkyl. In a still further aspect, $R^2$ is selected from hydrogen, methyl, ethyl, n-propyl, i-propyl, n-butyl, i-butyl, s-butyl, and t-butyl. In yet a further aspect, $R^2$ is selected from hydrogen, methyl, ethyl, n-propyl, and i-propyl. In an even further aspect, $R^2$ is selected from hydrogen, methyl and ethyl. In a still further aspect, $R^2$ is selected from hydrogen and ethyl. In yet a further aspect, $R^2$ is selected from hydrogen and methyl.

In a further aspect, $R^2$ is C1-C6 alkyl. In a still further aspect, $R^2$ is selected from methyl, ethyl, n-propyl, i-propyl, n-butyl, i-butyl, s-butyl, and t-butyl. In yet a further aspect, $R^2$ is selected from methyl, ethyl, n-propyl, and i-propyl. In an even further aspect, $R^2$ is selected from methyl and ethyl. In a still further aspect, $R^2$ is ethyl. In yet a further aspect, $R^2$ is methyl.

k. $R^3$, $R^{3A}$, and $R^{3B}$ Groups

In one aspect, each $R^3$ is independently selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups. In a further aspect, each $R^3$ is independently selected from the group consisting of H, $C_{1-3}$ alkyl, $C_{1-3}$ haloalkyl, $C_{2-4}$ alkenyl, $C_{2-4}$ alkynyl, $C_{3-8}$ cycloalkyl, 4-8 membered heterocycloalkyl, $C_{6-8}$ aryl, ($C_{6-8}$ aryl)-$C_{1-3}$ alkylene-, and 4-8 membered heteroaryl, wherein the $C_{1-3}$ alkyl, $C_{3-8}$ cycloalkyl, 4-8 membered heterocycloalkyl, $C_{6-8}$ aryl, ($C_{6-8}$ aryl)-$C_{1-3}$ alkylene-, and 4-8 membered heteroaryl are each optionally substituted by 1, 2, 3, or 4 independently selected $R^5$ groups. In a still further aspect, each $R^3$ is H.

In one aspect, each of $R^{3a}$ and $R^{3b}$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each of $R^{3a}$ and $R^{3b}$ is independently substituted with 0, 1, 2, 3, or 4 independently selected $R^5$ groups. In a further aspect, each of $R^{3a}$ and $R^{3b}$, when present, is independently selected from hydrogen, C1-C3 alkyl, C1-C3 haloalkyl, C2-C8 alkenyl, C2-C8 alkynyl, C3-C8 cycloalkyl, 4-8 membered heterocycloalkyl, C6-C8 aryl, —(C1-C3 alkyl)(C6-C8 aryl), and 4-8 membered heteroaryl, and wherein each of $R^{3a}$ and $R^{3b}$ is independently substituted with 0, 1, 2, 3, or 4 independently selected $R^5$ groups. In a still further aspect, each of $R^{3a}$ and $R^{3b}$, when present, is hydrogen.

In a further aspect, each $R^3$ is independently selected from the group consisting of H, $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl. In a still further aspect, each $R^3$ is independently selected from H and $C_{1-6}$ alkyl. In yet a further aspect, each $R^3$ is independently selected from H and methyl. In an even further aspect, each $R^3$ is H.

In a further aspect, each of $R^{3a}$ and $R^{3b}$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each of $R^{3a}$ and $R^{3b}$ is independently substituted with 0, 1, 2, or 3 independently selected $R^5$ groups. In a still further aspect, each of $R^{3a}$ and $R^{3b}$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each of $R^{3a}$ and $R^{3b}$ is independently substituted with 0, 1, or 2 independently selected $R^5$ groups. In yet a further aspect, each of $R^{3a}$ and $R^{3b}$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each of $R^{3a}$ and $R^{3b}$ is independently substituted with 0 or 1 $R^5$ group. In an even further aspect, each of $R^{3a}$ and $R^{3b}$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each of $R^{3a}$ and $R^{3b}$ is independently monosubstituted with a $R^5$ group. In a still further aspect, each of $R^{3a}$ and $R^{3b}$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each of $R^{3a}$ and $R^{3b}$ is unsubstituted.

In a further aspect, each of $R^{3a}$ and $R^{3b}$, when present, is independently selected from hydrogen and C1-C6 alkyl. In a still further aspect, each of $R^{3a}$ and $R^{3b}$, when present, is independently selected from hydrogen, methyl, ethyl, n-propyl, i-propyl, n-butyl, i-butyl, s-butyl, and t-butyl. In yet a further aspect, each of $R^{3a}$ and $R^{3b}$, when present, is independently selected from hydrogen, methyl, ethyl, n-propyl, and i-propyl. In an even further aspect, each $R^3$ is independently selected from H, methyl, and ethyl. In a still further aspect, each of $R^{3a}$ and $R^{3b}$, when present, is independently selected from hydrogen and ethyl. In yet a further aspect, each of $R^{3a}$ and $R^{3b}$, when present, is independently selected from hydrogen and methyl.

In a further aspect, each of $R^{3a}$ and $R^{3b}$, when present, is independently C1-C6 alkyl. In a still further aspect, each of $R^{3a}$ and $R^{3b}$, when present, is independently selected from methyl, ethyl, n-propyl, i-propyl, n-butyl, i-butyl, s-butyl, and t-butyl. In yet a further aspect, each of $R^{3a}$ and $R^{3b}$, when present, is independently selected from methyl, ethyl, n-propyl, and i-propyl. In an even further aspect, each of $R^{3a}$ and $R^{3b}$, when present, is independently selected from methyl and ethyl. In a still further aspect, each of $R^{3a}$ and $R^{3b}$, when present, is ethyl. In yet a further aspect, each of $R^{3a}$ and $R^{3b}$, when present, is methyl.

l. $R^4$ Groups

In one aspect, $R^4$ is selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups. In a further aspect, $R^4$ is selected from the group consisting of H, $C_{1-3}$ alkyl, $C_{1-3}$ haloalkyl, $C_{2-4}$ alkenyl, $C_{2-4}$ alkynyl, $C_{3-8}$ cycloalkyl, 4-8 membered heterocycloalkyl, $C_{6-8}$ aryl, ($C_{6-8}$ aryl)-$C_{1-3}$ alkylene-, and 4-8 membered heteroaryl, wherein the $C_{1-8}$ alkyl, $C_{3-8}$ cycloalkyl, 4-8 membered heterocycloalkyl, $C_{6-8}$ aryl, ($C_{6-8}$ aryl)-$C_{1-3}$ alkylene-, and 4-8 membered heteroaryl are each optionally substituted by 1, 2, 3, or 4 independently selected $R^5$ groups. In a still further aspect, $R^4$ is H.

In one aspect, $R^4$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, and 4-10 membered heteroaryl, and —(C1-C3 alkyl)(C6-C10 aryl), and wherein $R^4$ is substituted with 0, 1, 2, 3, or 4 independently selected $R^5$ groups. In a further aspect, $R^4$ is selected from hydrogen, C1-C3 alkyl, C1-C3 haloalkyl, C2-C4 alkenyl, C2-C4 alkynyl, C3-C8 cycloalkyl, 4-8 membered heterocycloalkyl, C6-C8 aryl, and 4-8 membered heteroaryl, and —(C1-C3 alkyl)(C6-C8 aryl), and wherein $R^4$ is substituted with 0, 1, 2, 3, or 4 independently selected $R^5$ groups.

In a further aspect, $R^4$ is selected from the group consisting of H, $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl. In a still further aspect, $R^4$ is $C_{6-10}$ aryl or ($C_{6-10}$ aryl)-$C_{1-6}$ alkylene-. In yet a further aspect, $R^4$ is ($C_{6-10}$ aryl)-$C_{1-6}$ alkylene-. In an even further aspect, $R^4$ is benzyl.

In a further aspect, $R^4$ is $C_{6-10}$ aryl, optionally substituted by 1 or 2 independently selected $R^5$ groups; and $R^5$ is selected from the group consisting of $C_{1-3}$ alkyl, $C_{1-3}$ alkoxy, and $C_{1-3}$ haloalkyl. In a still further aspect, $R^4$ is phenyl, optionally substituted by 1 or 2 independently selected $R^5$ groups; and $R^5$ is selected from the group consisting of $C_{1-3}$ alkyl, $C_{1-3}$ alkoxy, and $C_{1-3}$ haloalkyl. In yet a further aspect, $R^4$ is phenyl, optionally substituted by 1 or 2 independently selected $R^5$ groups; and $R^5$ is selected from the group consisting of methyl, trifluoromethyl, and methoxy.

In a further aspect, $R^4$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, and 4-10 membered heteroaryl, and —(C1-C3 alkyl)(C6-C10 aryl), and wherein $R^4$ is substituted with 0, 1, 2, or 3 independently selected $R^5$ groups. In a still further aspect, $R^4$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, and 4-10 membered heteroaryl, and —(C1-C3 alkyl)(C6-C10 aryl), and wherein $R^4$ is substituted with 0, 1, or 2 independently selected $R^5$ groups. In yet a further aspect, $R^4$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, and 4-10 membered heteroaryl, and —(C1-C3 alkyl)(C6-C10 aryl), and wherein $R^4$ is substituted with 0 or 1 $R^5$ group. In an even further aspect, $R^4$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, and 4-10 membered heteroaryl, and —(C1-C3 alkyl)(C6-C10 aryl), and wherein $R^4$ is monosubstituted with a $R^5$ group. In a still further aspect, $R^4$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, and 4-10 membered heteroaryl, and —(C1-C3 alkyl)(C6-C10 aryl), and wherein $R^4$ is unsubstituted.

In a further aspect, $R^4$ is selected from C3-C10 cycloalkyl, C6-C10 aryl, and —(C1-C3 alkyl)(C6-C10 aryl). In a still further aspect, $R^4$ is selected from C3-C8 cycloalkyl, C6-C8 aryl, and —(C1-C3 alkyl)(C6-C8 aryl). In yet a further aspect, $R^4$ is selected from cyclohexyl, phenyl, and benzyl. In an even further aspect, $R^4$ is selected from cyclohexyl and phenyl. In a still further aspect, $R^4$ is selected from cyclohexyl and benzyl. In yet a further aspect, $R^4$ is selected from phenyl and benzyl. In an even further aspect, $R^4$ is cyclohexyl. In a still further aspect, $R^4$ is phenyl. In an even further aspect, $R^4$ is benzyl.

m. $R^5$ Groups

In one aspect, each $R^5$ is independently selected from the group consisting of OH, $NO_2$, CN, halo, $C_{1-3}$ alkyl, $C_{2-4}$ alkenyl, $C_{2-4}$ alkynyl, $C_{1-3}$ haloalkyl, cyano-$C_{1-3}$ alkyl, HO—$C_{1-3}$ alkyl, $C_{1-3}$ alkoxy-$C_{1-3}$ alkyl, $C_{3-7}$ cycloalkyl, $C_{6-10}$ aryl, $C_{1-3}$ alkoxy, $C_{1-3}$ haloalkoxy, amino, $C_{1-3}$ alkylamino, di($C_{1-3}$ alkyl)amino, thio, $C_{1-3}$ alkylthio, $C_{1-3}$ alkylsulfinyl, $C_{1-3}$ alkylsulfonyl, carbamyl, $C_{1-3}$ alkylcarbamyl, di($C_{1-3}$ alkyl)carbamyl, carboxy, $C_{1-3}$ alkylcarbonyl, $C_{1-4}$ alkoxycarbonyl, $C_{1-3}$ alkylcarbonylamino, $C_{1-3}$ alkylsulfonylamino, aminosulfonyl, $C_{1-3}$ alkylaminosulfonyl, di($C_{1-3}$ alkyl)aminosulfonyl, aminosulfonylamino, $C_{1-3}$ alkylaminosulfonylamino, di($C_{1-3}$ alkyl)aminosulfonylamino, aminocarbonylamino, $C_{1-3}$ alkylaminocarbonylamino, and di($C_{1-3}$ alkyl)aminocarbonylamino.

In one aspect, $R^5$, when present, is independently selected from halogen, —$NO_2$, —CN, —OH, —SH, —$NH_2$, C1-C3 alkyl, C2-C4 alkenyl, C2-C4 alkynyl, C1-C3 haloalkyl, C1-C3 cyanoalkyl, C1-C3 hydroxyalkyl, C1-C3 haloalkoxy, C1-C3 alkoxy, C1-C3 thioalkyl, C1-C3 alkyl(C1-C3 alkoxy), C1-C3 alkylamino, (C1-C3)(C1-C3) dialkylamino, C3-C7 cycloalkyl, C6-C10 aryl, —(C═O)(C1-C3 alkyl), —(S═O)(C1-C3 alkyl), —$SO_2$(C1-C3 alkyl), —$CO_2R^{11}$, —(C═O)$NR^{12a}R^{12b}$, —$SO_2NR^{12a}R^{12b}$, —O(C═O)$NR^{12a}R^{12b}$, —$NHSO_2NR^{12a}R^{12b}$, and —NH(C═O)$NR^{12a}R^{12b}$. In a further aspect, $R^5$, when present, is independently selected from —F, —Cl, —$NO_2$, —CN, —OH, —SH, —$NH_2$, methyl, ethyl, ethenyl, propenyl, ethynyl, propynyl, —$CH_2F$, —$CHF_2$, —$CF_3$, —$CH_2CH_2F$, —$CH_2Cl$, —$CHCl_2$, —$CCl_3$, —$CH_2CH_2Cl$, —$CH_2CN$, —$CH_2CH_2CN$, —$CH_2OH$, —$CH_2CH_2OH$, —$OCH_2F$, —$OCHF_2$, —$OCF_3$, —$OCH_3$, —$OCH_2CH_3$, —$SCH_3$, —$SCH_2CH_3$, —$CH_2OCH_3$, —$CH_2CH_2OCH_2CH_3$, —$NHCH_3$, —$NHCH_2CH_3$, —$N(CH_3)_2$, —$NH(CH_2CH_3)_2$, cyclopropyl, cyclobutyl, cyclopentyl, phenyl, —(C═O)$CH_3$, —(C═O)$CH_2CH_3$, —(S═O)$CH_3$, —(S═O)$CH_2CH_3$, —$SO_2CH_3$, —$SO_2CH_2CH_3$, —$CO_2CH_3$, —$CO_2CH_2CH_3$, —(C═O)$NH_2$, —(C═O)$NHCH_3$, —(C═O)$N(CH_3)_2$, —$SO_2NH_2$, —$SO_2NHCH_3$, —$SO_2N(CH_3)_2$, —O(C═O)$NH_2$, —O(C═O)$NHCH_3$, —O(C═O)$N(CH_3)_2$, —$NHSO_2NH_2$, —$NHSO_2NHCH_3$, —$NHSO_2N(CH_3)_2$, —NH(C═O)$NH_2$, —NH(C═O)$NHCH_3$, and —NH(C═O)$N(CH_3)_2$. In a still further aspect, $R^5$, when present, is independently selected from —F, —Cl, —$NO_2$, —CN, —OH, —SH, —$NH_2$, methyl, ethenyl, ethynyl, —$CH_2F$, —$CHF_2$, —$CF_3$, —$CH_2Cl$, —$CHCl_2$, —$CCl_3$, —$CH_2CN$, —$CH_2OH$, —$OCH_2F$, —$OCHF_2$, —$OCF_3$, —$OCH_3$, —$SCH_3$, —$CH_2OCH_3$, —$NHCH_3$, —$N(CH_3)_2$, cyclopropyl, cyclobutyl, phenyl, —(C═O)$CH_3$, —(S═O)$CH_3$, —$SO_2CH_3$, —$CO_2CH_3$, —(C═O)$NH_2$, —(C═O)$NHCH_3$, —(C═O)$N(CH_3)_2$, —$SO_2NH_2$, —$SO_2NHCH_3$, —$SO_2N(CH_3)_2$, —O(C═O)$NH_2$, —O(C═O)$NHCH_3$, —O(C═O)$N(CH_3)_2$, —$NHSO_2NH_2$, —$NHSO_2NHCH_3$, —$NHSO_2N(CH_3)_2$, —NH(C═O)$NH_2$, —NH(C═O)$NHCH_3$, and —NH(C═O)$N(CH_3)_2$.

In a further aspect, $R^5$, when present, is independently selected from halogen, —$NO_2$, —CN, —OH, —SH, —$NH_2$, C1-C3 alkyl, C1-C3 haloalkyl, C1-C3 alkoxy, C1-C3 thioalkyl, C1-C3 alkyl(C1-C3 alkoxy), C1-C3 alkylamino, and (C1-C3)(C1-C3) dialkylamino. In a further aspect, $R^5$, when present, is independently selected from —F, —Cl, —$NO_2$, —CN, —OH, —SH, —$NH_2$, methyl, ethyl, —$CH_2F$, —$CHF_2$, —$CF_3$, —$CH_2CH_2F$, —$CH_2Cl$, —$CHCl_2$, —$CCl_3$, —$CH_2CH_2Cl$, —$OCH_3$, —$OCH_2CH_3$, —$SCH_3$, —$SCH_2CH_3$, —$CH_2OCH_3$, —$CH_2CH_2OCH_2CH_3$, —$NHCH_3$, —$NHCH_2CH_3$, —$N(CH_3)_2$, and —$NH(CH_2CH_3)_2$. In a still further aspect, $R^5$, when present, is independently selected from —F, —Cl, —$NO_2$, —CN, —OH, —SH, —$NH_2$, methyl, —$CH_2F$, —$CHF_2$, —$CF_3$, —$CH_2Cl$, —$CHCl_2$, —$CCl_3$, —$OCH_3$, —$SCH_3$, —$CH_2OCH_3$, —$NHCH_3$, and —$N(CH_3)_2$.

In a further aspect, $R^5$, when present, is independently selected from halogen, —$NO_2$, —CN, —OH, —SH, —$NH_2$, C1-C3 alkyl, C1-C3 haloalkyl, and C1-C3 alkoxy. In a further aspect, $R^5$, when present, is independently selected from —F, —Cl, $—NO_2$, —CN, —OH, —SH, $—NH_2$, methyl, ethyl, $—CH_2F$, $—CHF_2$, $—CF_3$, $—CH_2CH_2F$, $—CH_2C1$, $—CHCl_2$, $—CCl_3$, $—CH_2CH_2C1$, $—OCH_3$, and $—OCH_2CH_3$. In a still further aspect, $R^5$, when present, is independently selected from —F, —Cl, $—NO_2$, —CN, —OH, —SH, $—NH_2$, methyl, $—CH_2F$, $—CHF_2$, $—CF_3$, $—CH_2Cl$, $—CHCl_2$, $—CCl_3$, and $—OCH_3$.

In a further aspect, $R^5$, when present, is independently selected from C1-C3 alkyl, C1-C3 haloalkyl, and C1-C3 alkoxy. In a further aspect, $R^5$, when present, is independently selected from methyl, ethyl, $—CH_2F$, $—CHF_2$, $—CF_3$, $—CH_2CH_2F$, $—CH_2Cl$, $—CHCl_2$, $—CCl_3$, $—CH_2CH_2Cl$, $—OCH_3$, and $—OCH_2CH_3$. In a still further aspect, $R^5$, when present, is independently selected from methyl, $—CH_2F$, $—CHF_2$, $—CF_3$, $—CH_2Cl$, $—CHCl_2$, $—CCl_3$, and $—OCH_3$.

In a further aspect, $R^5$, when present, is independently selected from C1-C3 alkyl and C1-C3 alkoxy. In a further aspect, $R^5$, when present, is independently selected from methyl, ethyl, $—OCH_3$, and $—OCH_2CH_3$. In a still further aspect, $R^5$, when present, is independently selected from methyl and $—OCH_3$.

In a further aspect, $R^5$, when present, is C1-C3 haloalkyl. In a further aspect, $R^5$, when present, is independently selected from $—CH_2F$, $—CHF_2$, $—CF_3$, $—CH_2CH_2F$, $—CH_2C1$, $—CHCl_2$, $—CCl_3$, and $—CH_2CH_2Cl$. In a still further aspect, $R^5$, when present, is independently selected from $—CH_2F$, $—CHF_2$, $—CF_3$, $—CH_2C1$, $—CHCl_2$, and $—CCl_3$. In yet a further aspect, $R^5$, when present, is independently selected from $—CHF_2$, $—CF_3$, $—CHCl_2$, and $—CCl_3$. In an even further aspect, $R^5$, when present, is independently selected from $—CF_3$ and $—CCl_3$. In a still further aspect, $R^5$, when present, is $—CF_3$. In yet a further aspect, $R^5$, when present, is $—CCl_3$.

In a further aspect, $R^5$, when present, is independently selected from $—OCH_3$, $—OCH_2CH_3$, $—OCH_2CH_2CH_3$, and $—OCH(CH_3)_2$. In a still further aspect, $R^5$, when present, is independently selected from $—OCH_3$ and $—OCH_2CH_3$. In yet a further aspect, $R^5$, when present, is $—OCH_2CH_2CH_3$. In an even further aspect, $R^5$, when present, is $—OCH(CH_3)_2$. In a still further aspect, $R^5$, when present, is $—OCH_2CH_3$. In yet a further aspect, $R^5$, when present, is $—OCH_3$.

In a further aspect, $R^5$, when present, is independently selected from methyl, ethyl, n-propyl, and i-propyl. In a still further aspect, $R^5$, when present, is independently selected from methyl and ethyl. In yet a further aspect, $R^5$, when present, is n-propyl. In an even further aspect, $R^5$, when present, is i-propyl. In a still further aspect, $R^5$, when present, is ethyl. In yet a further aspect, $R^5$, when present, is methyl.

n. $R^6$ Groups

In one aspect, each $R^6$ is independently selected from the group consisting of H, $C_{1-3}$ alkyl, $C_{1-3}$ haloalkyl, $C_{1-3}$ alkoxy, $C_{1-3}$ alkoxycarbonyl, C3-C7 cycloalkyl, and phenyl.

In one aspect, each occurrence of $R^6$, when present, is independently selected from halogen, $—NO_2$, $—CO_2$(C1-C3 alkyl), C1-C3 alkyl, C1-C3 haloalkyl, C1-C3 alkoxy, C1-C3 alkoxycarbonyl, C3-C7 cycloalkyl, and phenyl. In a further aspect, each occurrence of $R^6$, when present, is independently selected from C1-C3 alkyl, C1-C3 haloalkyl, C1-C3 alkoxy, C1-C3 alkoxycarbonyl, C3-C7 cycloalkyl, and phenyl.

In a further aspect, each occurrence of $R^6$, when present, is independently selected from —F, —Cl, $—NO_2$, $—CO_2CH_3$, $—CO_2CH_2$, $CH_3$, methyl, ethyl, $—CH_2F$, $—CHF_2$, $—CF_3$, $—CH_2CH_2F$, $—CH_2Cl$, $—CHCl_2$, $—CCl_3$, $—CH_2CH_2Cl$, $—OCH_3$, $—OCH_2CH_3$, $—O(C{=}O)CH_3$, $—O(C{=}O)CH_2CH_3$, cyclopropyl, cyclobutyl, and phenyl. In a still further aspect, each occurrence of $R^6$, when present, is independently selected from —F, —Cl, $—NO_2$, $—CO_2CH_3$, methyl, $—CH_2F$, $—CHF_2$, $—CF_3$, $—CH_2Cl$, $—CHCl_2$, $—CCl_3$, $—OCH_3$, $—O(C{=}O)CH_3$, cyclopropyl, and phenyl.

In a further aspect, each occurrence of $R^6$, when present, is independently selected from methyl, ethyl, $—CH_2F$, $—CHF_2$, $—CF_3$, $—CH_2CH_2F$, $—CH_2Cl$, $—CHCl_2$, $—CCl_3$, $—CH_2CH_2C1$, $—OCH_3$, $—OCH_2CH_3$, $—O(C{=}O)CH_3$, $—O(C{=}O)CH_2CH_3$, and phenyl. In a still further aspect, each occurrence of $R^6$, when present, is independently selected from methyl, $—CH_2F$, $—CHF_2$, $—CF_3$, $—CH_2Cl$, $—CHCl_2$, $—CCl_3$, $—OCH_3$, $—O(C{=}O)CH_3$, and phenyl.

o. $R^{11}$ Groups

In one aspect, each occurrence of $R^{11}$, when present, is independently selected from hydrogen and C1-C4 alkyl. In a further aspect, each occurrence of $R^{11}$, when present, is independently selected from hydrogen, methyl, ethyl, n-propyl, and i-propyl. In a still further aspect, each occurrence of $R^{11}$, when present, is independently selected from hydrogen, methyl, and ethyl. In yet a further aspect, each occurrence of $R^{11}$, when present, is independently selected from hydrogen and ethyl. In an even further aspect, each occurrence of $R^{11}$, when present, is independently selected from hydrogen and methyl. In a still further aspect, each occurrence of $R^{11}$, when present, is ethyl. In yet a further aspect, each occurrence of $R^{11}$, when present, is methyl. In an even further aspect, each occurrence of $R^{11}$, when present, is hydrogen.

p. $R^{12A}$ and $R^{12B}$ Groups

In one aspect, each occurrence of $R^{12a}$ and $R^{12b}$, when present, is independently selected from hydrogen and C1-C3 alkyl. In a further aspect, each occurrence of $R^{12a}$ and $R^{12b}$, when present, is independently selected from hydrogen, methyl, and ethyl. In a still further aspect, each occurrence of $R^{12a}$ and $R^{12b}$, when present, is independently selected from hydrogen and ethyl. In yet a further aspect, each occurrence of $R^{12a}$ and $R^{12b}$, when present, is independently selected from hydrogen and methyl. In an even further aspect, each occurrence of $R^{12a}$ and $R^{12b}$, when present, is ethyl. In a still further aspect, each occurrence of $R^{12a}$ and $R^{12b}$, when present, is methyl. In yet a further aspect, each occurrence of $R^{12a}$ and $R^{12b}$, when present, is hydrogen.

q. $R^{20}$ Groups

In one aspect, $R^{20}$ is selected from C1-C8 alkyl and C6-C10 aryl and substituted with 0, 1, 2, or 3 independently selected $R^5$ groups. In a further aspect, $R^{20}$ is selected from C1-C4 alkyl and C6-C8 aryl and substituted with 0, 1, 2, or 3 independently selected $R^5$ groups.

In a further aspect, $R^{20}$ is selected from C1-C8 alkyl and C6-C10 aryl and substituted with 0, 1, or 2 independently selected $R^5$ groups. In a still further aspect, $R^{20}$ is selected from C1-C8 alkyl and C6-C10 aryl and substituted with 0 or 1 $R^5$ groups. In yet a further aspect, $R^{20}$ is selected from C1-C8 alkyl and C6-C10 aryl and monosubstituted with a $R^5$ group. In an even further aspect, $R^{20}$ is selected from C1-C8 alkyl and C6-C10 aryl and unsubstituted.

In a further aspect, $R^{20}$ is C6-C10 aryl substituted with 0, 1, 2, or 3 independently selected $R^5$ groups. In a still further aspect, $R^{20}$ is C6-C8 aryl substituted with 0, 1, 2, or 3 independently selected $R^5$ groups. In yet a further aspect, $R^{20}$ is phenyl substituted with 0, 1, 2, or 3 independently selected $R^5$ groups.

In a further aspect, $R^{20}$ is C1-C4 alkyl substituted with 0, 1, 2, or 3 independently selected $R^5$ groups. In a still further aspect, $R^{20}$ is selected from methyl, ethyl, n-propyl, and i-propyl and substituted with 0, 1, 2, or 3 independently selected $R^5$ groups. In yet a further aspect, $R^{20}$ is selected from methyl and ethyl and substituted with 0, 1, 2, or 3 independently selected $R^5$ groups. In an even further aspect, $R^{20}$ is ethyl substituted with 0, 1, 2, or 3 independently selected $R^5$ groups. In a still further aspect, $R^{20}$ is methyl substituted with 0, 1, 2, or 3 independently selected $R^5$ groups.

In a further aspect, $R^{20}$ is C1-C8 alkyl substituted with 0, 1, or 2 independently selected $R^5$ groups. In a still further aspect, $R^{20}$ is C1-C8 alkyl substituted with 0 or 1 $R^5$ group. In yet a further aspect, $R^{20}$ is C1-C8 alkyl monosubstituted with a $R^5$ group. In an even further aspect, $R^{20}$ is unsubstituted C1-C8 alkyl.

r. $R^{21A}$ and $R^{21B}$ Groups

In one aspect, each of $R^{21a}$ and $R^{21b}$ is independently C1-C8 alkyl substituted with 0, 1, 2, or 3 independently selected $R^5$ groups. In a further aspect, each of $R^{21a}$ and $R^{21b}$ is independently C1-C4 alkyl substituted with 0, 1, 2, or 3 independently selected $R^5$ groups. In a still further aspect, each of $R^{21a}$ and $R^{21b}$ is independently selected from methyl, ethyl, n-propyl, and i-propyl and substituted with 0, 1, 2, or 3 independently selected $R^5$ groups. In yet a further aspect, each of $R^{21a}$ and $R^{21b}$ is independently selected from methyl and ethyl and substituted with 0, 1, 2, or 3 independently selected $R^5$ groups. In an even further aspect, each of $R^{21a}$ and $R^{21b}$ is ethyl substituted with 0, 1, 2, or 3 independently selected $R^5$ groups. In a still further aspect, each of $R^{21a}$ and $R^{21b}$ is methyl substituted with 0, 1, 2, or 3 independently selected $R^5$ groups.

In a further aspect, each of $R^{21a}$ and $R^{21b}$ is independently C1-C8 alkyl substituted with 0, 1, or 2 independently selected $R^5$ groups. In a still further aspect, each of $R^{21a}$ and $R^{21b}$ is independently C1-C8 alkyl substituted with 0 or 1 $R^5$ group. In yet a further aspect, each of $R^{21a}$ and $R^{21b}$ is independently C1-C8 alkyl monosubstituted with a $R^5$ group. In an even further aspect, each of $R^{21a}$ and $R^{21b}$ is independently C1-C8 alkyl and unsubstituted.

s. $R^{22A}$ and $R^{22B}$ Groups

In one aspect, each of $R^{22a}$ and $R^{22b}$ is independently selected from C1-C8 alkyl, C3-C10 cycloalkyl, 4-10 membered heterocycloalkyl, C6-C10 aryl, and 4-10 membered heteroaryl and wherein each of $R^{22a}$ and $R^{22b}$ is independently substituted with 0, 1, 2, or 3 independently selected $R^5$ groups. In a further aspect, each of $R^{22a}$ and $R^{22b}$ is independently selected from C1-C4 alkyl, C3-C8 cycloalkyl, 4-8 membered heterocycloalkyl, C6-C8 aryl, and 4-8 membered heteroaryl and wherein each of $R^{22a}$ and $R^{22b}$ is independently substituted with 0, 1, 2, or 3 independently selected $R^5$ groups. In a still further aspect, each of $R^{22a}$ and $R^{22b}$ is independently selected from methyl, ethyl, n-propyl, iso-propyl, cyclopropyl, cyclobutyl, cyclopentyl, cyclohexyl, phenyl, and pyridinyl and wherein each of $R^{22a}$ and $R^{22b}$ is independently substituted with 0, 1, 2, or 3 independently selected $R^5$ groups.

In a further aspect, each of $R^{22a}$ and $R^{22b}$ is independently selected from C1-C8 alkyl, C3-C10 cycloalkyl, 4-10 membered heterocycloalkyl, C6-C10 aryl, and 4-10 membered heteroaryl and wherein each of $R^{22a}$ and $R^{22b}$ is independently substituted with 0, 1, or 2 independently selected $R^5$ groups. In a still further aspect, each of $R^{22a}$ and $R^{22b}$ is independently selected from C1-C8 alkyl, C3-C10 cycloalkyl, 4-10 membered heterocycloalkyl, C6-C10 aryl, and 4-10 membered heteroaryl and wherein each of $R^{22a}$ and $R^{22b}$ is independently substituted with 0 or 1 $R^5$ group. In yet a further aspect, each of $R^{22a}$ and $R^{22b}$ is independently selected from C1-C8 alkyl, C3-C10 cycloalkyl, 4-10 membered heterocycloalkyl, C6-C10 aryl, and 4-10 membered heteroaryl and wherein each of $R^{22a}$ and $R^{22b}$ is independently monosubstituted with a $R^5$ group. In an even further aspect, each of $R^{22a}$ and $R^{22b}$ is independently selected from C1-C8 alkyl, C3-C10 cycloalkyl, 4-10 membered heterocycloalkyl, C6-C10 aryl, and 4-10 membered heteroaryl and unsubstituted.

t. $R^{23}$ Groups

In one aspect, $R^{23}$, when present, is C1-C8 alkyl. In a further aspect, $R^{23}$, when present, is C1-C4 alkyl. In a still further aspect, $R^{23}$, when present, is selected from methyl, ethyl, n-propyl, and i-propyl. In yet a further aspect, $R^{23}$, when present, is selected from methyl and ethyl. In an even further aspect, $R^{23}$, when present, is ethyl. In a still further aspect, $R^{23}$, when present, is methyl.

u. $R^{24A}$ and $R^{24B}$ Groups

In one aspect, each of $R^{24a}$ and $R^{24b}$ is independently selected from C1-C4 alkyl. In a further aspect, each of $R^{24a}$ and $R^{24b}$ is independently selected from methyl, ethyl, n-propyl, and i-propyl. In a still further aspect, each of $R^{24a}$ and $R^{24b}$ is independently selected from methyl and ethyl. In yet a further aspect, each of $R^{24a}$ and $R^{24b}$ is ethyl. In an even further aspect, each of $R^{24a}$ and $R^{24b}$ is methyl.

v. $R^{25}$ Groups

In one aspect, $R^{25}$ is selected from C1-C4 alkyl and C1-C4 alkoxy. In a further aspect, $R^{25}$ is selected from methyl, ethyl, n-propyl, i-propyl, methoxy, ethoxy, n-propoxy, and i-propoxy. In a still further aspect, $R^{25}$ is selected from methyl, ethyl, methoxy, and ethoxy. In yet a further aspect, $R^{25}$ is selected from methyl and methoxy.

In a further aspect, $R^{25}$ is C1-C4 alkyl. In a still further aspect, $R^{25}$ is selected from methyl, ethyl, n-propyl, and i-propyl. In yet a further aspect, $R^{25}$ is selected from methyl and ethyl. In an even further aspect, $R^{25}$ is ethyl. In a still further aspect, $R^{25}$ is methyl.

In a further aspect, $R^{25}$ is C1-C4 alkoxy. In a still further aspect, $R^{25}$ is selected from methoxy, ethoxy, n-propoxy, and i-propoxy. In yet a further aspect, $R^{25}$ is selected from methoxy and ethoxy. In an even further aspect, $R^{25}$ is ethoxy. In a still further aspect, $R^{25}$ is methoxy.

w. $R^{26}$ Groups

In one aspect, $R^{26}$ is selected from hydrogen and C1-C8 alkyl. In a further aspect, $R^{26}$ is selected from hydrogen and C1-C4 alkyl. In a still further aspect, $R^{26}$ is selected from hydrogen, methyl, ethyl, n-propyl, and i-propyl. In yet a further aspect, $R^{26}$ is selected from hydrogen, methyl, and ethyl. In an even further aspect, $R^{26}$ is selected from hydrogen and ethyl. In a still further aspect, $R^{26}$ is selected from hydrogen and methyl. In yet a further aspect, $R^{26}$ is ethyl. In an even further aspect, $R^{26}$ is methyl. In a still further aspect, $R^{26}$ is hydrogen.

x. $R^A$ Groups

In one aspect, $R^A$ is an electron withdrawing group.

In a further aspect, the electron withdrawing group is selected from the group consisting of halo, $C_{2-6}$ alkenyl, $C_{2-6}$ alkynyl, $C_{1-3}$ haloalkyl, CN, $NO_2$, $C(=O)OR^{a1}$, $C(=O)R^{b1}$, $C(=O)NR^{c1}R^{d1}$, $C(=O)SR^{e1}$, $-NR^{c1}S(O)R^{e1}$, $-NR^{c1}S(O)_2R^{e1}$, $S(=O)R^{e1}$, $S(=O)_2R^{e1}$, $S(=O)NR^{c1}R^{d1}$, $S(=O)_2NR^{c1}R^{d1}$, and $P(O)(OR^{a1})_2$. In a still further aspect, the electron withdrawing group is selected from the group consisting of $C(=O)OR^{a1}$, $C(=O)R^{b1}$, $C(=O)NR^{c1}R^{d1}$, $C(=O)SR^{e1}$, $S(=O)R^{e1}$, $S(=O)_2R^{e1}$, $S(=O)NR^{c1}R^{d1}$, and $S(=O)_2NR^{c1}R^{d1}$. In yet a further aspect, the electron withdrawing group is $C(=O)OR^{a1}$.

In a further aspect, the electron withdrawing group is selected from halogen, —CN, $-NO_2$, C2-C6 alkenyl, C2-C6 alkynyl, C1-C3 haloalkyl, —$CO_2R^{a1}$, —(C═O)$R^{b1}$, (C═O)$NR^{c1}R^{d1}$, —(C═O)$SR^{e1}$, —$NR^{c1}$(S═O)$R^{e1}$, —$NR^{c1}SO_2R^{e1}$, —(S═O)$R^{e1}$, —$SO_2R^{e1}$, —(S═O)$NR^{c1}R^{d1}$, —$SO_2NR^{c1}R^{d1}$, —(P═O)$(R^{a1})_2$, and —(P═O)$(OR^{a1})_2$. In a still further aspect, the electron withdrawing group is selected from halogen, —CN, —$NO_2$, C2-C6 alkenyl, C2-C6 alkynyl, C1-C3 haloalkyl, —$CO_2R^{a1}$, —(C═O)$R^{b1}$, —(C═O)$NR^{c1}R^{d1}$, —(C═O)$SR^{e1}$, —$NR^{c1}$(S═O)$R^{e1}$, —$NR^{c1}SO_2R^{e1}$, —(S═O)$R^{e1}$, —$SO_2R^{e1}$, —(S═O)$NR^{c1}R^{d1}$, —$SO_2NR^{c1}R^{d1}$, and —(P═O)$(OR^{a1})_2$. In yet a further aspect, the electron withdrawing group is —$CO_2R^{a1}$.

In a further aspect, the electron withdrawing group is C(═O)$OR^{a1}$, wherein $R^{a1}$ is $C_{1-6}$ alkyl or ($C_{6-10}$ aryl)-$C_{1-3}$ alkylene.

y. $R^B$ Groups

In one aspect, $R^B$ is selected from the group consisting of H, $C_{1-6}$ alkyl, $C_{2-6}$ alkylene, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^6$ groups.

In one aspect, $R^B$ is selected from hydrogen, C1-C6 alkyl, C2-C6 alkylene, C3-C10 cycloalkyl, 4-10 membered heterocycloalkyl, C6-C10 aryl, —(C1-C3 alkyl)(C6-C10 aryl), and 4-10 membered heteroaryl, and wherein $R^B$ is substituted with 0, 1, 2, 3, or 4 independently selected $R^6$ groups.

In a further aspect, $R^B$ is selected from the group consisting of H, $C_{1-6}$ alkyl, $C_{2-6}$ alkylene, $C_{6-10}$ aryl, and ($C_{6-10}$ aryl)-$C_{1-3}$ alkylene-. In a still further aspect, $R^B$ is selected from the group consisting of H, $C_{1-6}$ alkyl, $C_{2-6}$ alkylene, $C_{6-10}$ aryl, and ($C_{6-10}$ aryl)-$C_{1-3}$ alkylene-, wherein the $C_{1-6}$ alkyl, $C_{6-10}$ aryl, and ($C_{6-10}$ aryl)-$C_{1-3}$ alkylene- are each optionally substituted by 1 or 2 independently selected $R^6$ groups. In yet a further aspect, $R^B$ is selected from the group consisting of H, $C_{1-6}$ alkyl, $C_{2-6}$ alkylene, $C_{6-10}$ aryl, and ($C_{6-10}$ aryl)-$C_{1-3}$ alkylene-, wherein the $C_{1-6}$ alkyl, $C_{6-10}$ aryl, and ($C_{6-10}$ aryl)-$C_{1-3}$ alkylene- are each optionally substituted by 1 or 2 independently selected $R^6$ groups.

In a further aspect, $R^B$ is selected from hydrogen, C1-C6 alkyl, C2-C6 alkylene, C3-C10 cycloalkyl, 4-10 membered heterocycloalkyl, C6-C10 aryl, —(C1-C3 alkyl)(C6-C10 aryl), and 4-10 membered heteroaryl, and wherein $R^B$ is substituted with 0, 1, 2, or 3 independently selected $R^6$ groups. In a still further aspect, $R^B$ is selected from hydrogen, C1-C6 alkyl, C2-C6 alkylene, C3-C10 cycloalkyl, 4-10 membered heterocycloalkyl, C6-C10 aryl, —(C1-C3 alkyl)(C6-C10 aryl), and 4-10 membered heteroaryl, and wherein $R^B$ is substituted with 0, 1, or 2 independently selected $R^6$ groups. In yet a further aspect, $R^B$ is selected from hydrogen, C1-C6 alkyl, C2-C6 alkylene, C3-C10 cycloalkyl, 4-10 membered heterocycloalkyl, C6-C10 aryl, —(C1-C3 alkyl)(C6-C10 aryl), and 4-10 membered heteroaryl, and wherein $R^B$ is substituted with 0 or 1 $R^6$ group. In an even further aspect, $R^B$ is selected from hydrogen, C1-C6 alkyl, C2-C6 alkylene, C3-C10 cycloalkyl, 4-10 membered heterocycloalkyl, C6-C10 aryl, —(C1-C3 alkyl)(C6-C10 aryl), and 4-10 membered heteroaryl, and wherein $R^B$ is monosubstituted with a $R^6$ group. In a still further aspect, $R^B$ is selected from hydrogen, C1-C6 alkyl, C2-C6 alkylene, C3-C10 cycloalkyl, 4-10 membered heterocycloalkyl, C6-C10 aryl, —(C1-C3 alkyl)(C6-C10 aryl), and 4-10 membered heteroaryl, and wherein $R^B$ is unsubstituted.

In a further aspect, $R^B$ is selected from hydrogen and C1-C6 alkyl. In a still further aspect, $R^B$ is selected from hydrogen and C1-C3 alkyl. In yet a further aspect, $R^B$ is selected from hydrogen, methyl, and ethyl. In an even further aspect, $R^B$ is selected from hydrogen and ethyl. In a still further aspect, $R^B$ is selected from hydrogen and methyl. In yet a further aspect, $R^B$ is hydrogen.

In a further aspect, $R^B$ is selected from C1-C6 alkyl and C2-C6 alkylene. In a still further aspect, $R^B$ is selected from C1-C3 alkyl and C2-C4 alkylene. In yet a further aspect, $R^B$ is selected from methyl, ethyl, ethylene, and propylene. In an even further aspect, $R^B$ is selected from methyl and ethylene. In a still further aspect, $R^B$ is methyl. In yet a further aspect, $R^B$ is ethyl. In an even further aspect, $R^B$ is ethylene. In a still further aspect, $R^B$ is propylene.

In a further aspect, $R^B$ is C6-C10 aryl substituted with 0, 1, 2, 3, or 4 independently selected $R^6$ groups. In a still further aspect, $R^B$ is C6-C10 aryl substituted with 0, 1, 2, or 3 independently selected $R^6$ groups. In yet a further aspect, $R^B$ is C6-C10 aryl substituted with 0, 1, or 2 independently selected $R^6$ groups. In an even further aspect, $R^B$ is C6-C10 aryl substituted with 0 or 1 $R^6$ group. In a still further aspect, $R^B$ is C6-C10 aryl monosubstituted with a $R^6$ group. In yet a further aspect, $R^B$ is unsubstituted C6-C10 aryl.

In a further aspect, $R^B$ is phenyl substituted with 0, 1, 2, 3, or 4 independently selected $R^6$ groups. In a still further aspect, $R^B$ is phenyl substituted with 0, 1, 2, or 3 independently selected $R^6$ groups. In yet a further aspect, $R^B$ is phenyl substituted with 0, 1, or 2 independently selected $R^6$ groups. In an even further aspect, $R^B$ is phenyl substituted with 0 or 1 $R^6$ group. In a still further aspect, $R^B$ is phenyl monosubstituted with a $R^6$ group. In yet a further aspect, $R^B$ is unsubstituted phenyl.

In a further aspect, $R^B$ is —(C1-C3 alkyl)(C6-C10 aryl) substituted with 0, 1, 2, 3, or 4 independently selected $R^6$ groups. In a still further aspect, $R^B$ is —(C1-C3 alkyl)(C6-C10 aryl) substituted with 0, 1, 2, or 3 independently selected $R^6$ groups. In yet a further aspect, $R^B$ is —(C1-C3 alkyl)(C6-C10 aryl) substituted with 0, 1, or 2 independently selected $R^6$ groups. In an even further aspect, $R^B$ is —(C1-C3 alkyl)(C6-C10 aryl) substituted with 0 or 1 $R^6$ group. In a still further aspect, $R^B$ is —(C1-C3 alkyl)(C6-C10 aryl) monosubstituted with a $R^6$ group. In yet a further aspect, $R^B$ is unsubstituted —(C1-C3 alkyl)(C6-C10 aryl).

In a further aspect, $R^B$ is benzyl substituted with 0, 1, 2, 3, or 4 independently selected $R^6$ groups. In a still further aspect, $R^B$ is benzyl substituted with 0, 1, 2, or 3 independently selected $R^6$ groups. In yet a further aspect, $R^B$ is benzyl substituted with 0, 1, or 2 independently selected $R^6$ groups. In an even further aspect, $R^B$ is benzyl substituted with 0 or 1 $R^6$ group. In a still further aspect, $R^B$ is benzyl monosubstituted with a $R^6$ group. In yet a further aspect, $R^B$ is unsubstituted benzyl.

z. $R^C$ AND $R^D$ Groups

In one aspect, $R^C$ and $R^D$ are each independently selected from the group consisting of H, $C_{1-6}$ alkyl, $C_{3-10}$ cycloalkyl, 4-10 membered heterocycloalkyl, $C_{6-10}$ aryl, and 4-10 membered heteroaryl, wherein the $C_{1-6}$ alkyl, $C_{3-10}$ cycloalkyl, 4-10 membered heterocycloalkyl, $C_{6-10}$ aryl, and 4-10 membered heteroaryl are each optionally substituted by 1, 2, 3, or 4 independently selected $R^6$ groups; or $R^C$ and $R^D$ together with the C atom to which they are attached form a $C_{3-10}$ cycloalkyl group.

In one aspect, each of $R^C$ and $R^D$ is independently selected from hydrogen, C1-C6 alkyl, C3-C10 cycloalkyl, 4-10 membered heterocycloalkyl, C6-C10 aryl, and 4-10 membered heteroaryl, and wherein each of $R^C$ and $R^D$ is independently substituted with 0, 1, 2, 3, or 4 independently selected $R^6$ groups, or wherein each of $R^C$ and $R^D$ are optionally covalently bonded together and, together with the intermediate carbon atoms, comprise a 3- to 10-membered cycloalkyl.

In a further aspect, each of $R^C$ and $R^D$ is independently selected from hydrogen, C1-C6 alkyl, C3-C10 cycloalkyl, 4-10 membered heterocycloalkyl, C6-C10 aryl, and 4-10 membered heteroaryl, and wherein each of $R^C$ and $R^D$ is independently substituted with 0, 1, 2, 3, or 4 independently selected $R^6$ groups. In a still further aspect, each of $R^C$ and $R^D$ is independently selected from hydrogen, C1-C6 alkyl, C3-C10 cycloalkyl, 4-10 membered heterocycloalkyl, C6-C10 aryl, and 4-10 membered heteroaryl, and wherein each of $R^C$ and $R^D$ is independently substituted with 0, 1, 2, or 3 independently selected $R^6$ groups. In yet a further aspect, each of $R^C$ and $R^D$ is independently selected from hydrogen, C1-C6 alkyl, C3-C10 cycloalkyl, 4-10 membered heterocycloalkyl, C6-C10 aryl, and 4-10 membered heteroaryl, and wherein each of $R^C$ and $R^D$ is independently substituted with 0, 1, or 2 independently selected $R^6$ groups. In an even further aspect, each of $R^C$ and $R^D$ is independently selected from hydrogen, C1-C6 alkyl, C3-C10 cycloalkyl, 4-10 membered heterocycloalkyl, C6-C10 aryl, and 4-10 membered heteroaryl, and wherein each of $R^C$ and $R^D$ is substituted with 0 or 1 $R^6$ group. In a still further aspect, each of $R^C$ and $R^D$ is independently selected from hydrogen, C1-C6 alkyl, C3-C10 cycloalkyl, 4-10 membered heterocycloalkyl, C6-C10 aryl, and 4-10 membered heteroaryl, and wherein each of $R^C$ and $R^D$ is monosubstituted with a $R^6$ group. In yet a further aspect, each of $R^C$ and $R^D$ is independently selected from hydrogen, C1-C6 alkyl, C3-C10 cycloalkyl, 4-10 membered heterocycloalkyl, C6-C10 aryl, and 4-10 membered heteroaryl, and wherein each of $R^C$ and $R^D$ is unsubstituted.

In a further aspect, each of $R^C$ and $R^D$ is independently selected from hydrogen and C1-C6 alkyl. In a still further aspect, each of $R^C$ and $R^D$ is independently selected from hydrogen, methyl, ethyl, n-propyl, and i-propyl. In yet a further aspect, each of $R^C$ and $R^D$ is independently selected from hydrogen, methyl, and ethyl. In an even further aspect, each of $R^C$ and $R^D$ is independently selected from hydrogen and ethyl. In a still further aspect, each of $R^C$ and $R^D$ is independently selected from hydrogen and methyl. In yet a further aspect, each of $R^C$ and $R^D$ is hydrogen.

In a further aspect, each of $R^C$ and $R^D$ are optionally covalently bonded together and, together with the intermediate carbon atoms, comprise a 3- to 10-membered cycloalkyl. In a still further aspect, each of $R^C$ and $R^D$ are optionally covalently bonded together and, together with the intermediate carbon atoms, comprise a 3- to 8-membered cycloalkyl. In yet a further aspect, each of $R^C$ and $R^D$ are optionally covalently bonded together and, together with the intermediate carbon atoms, comprise a 3- to 6-membered cycloalkyl. In an even further aspect, each of $R^C$ and $R^D$ are optionally covalently bonded together and, together with the intermediate carbon atoms, comprise a cyclopropyl. In a still further aspect, each of $R^C$ and $R^D$ are optionally covalently bonded together and, together with the intermediate carbon atoms, comprise a cyclobutyl. In yet a further aspect, each of $R^C$ and $R^D$ are optionally covalently bonded together and, together with the intermediate carbon atoms, comprise a cyclopentyl. In an even further aspect, each of $R^C$ and $R^D$ are optionally covalently bonded together and, together with the intermediate carbon atoms, comprise a cyclohexyl.

In a further aspect, $R^C$ and $R^D$ are each independently selected from the group consisting of H, $C_{1-6}$ alkyl, and $C_{6-10}$ aryl. In a still further aspect, $R^C$ and $R^D$ together with the C atom to which they are attached form a $C_{3-10}$ cycloalkyl group.

aa. $R^{A1}$, $R^{B1}$, $R^{C1}$, $R^{D1}$, and $R^{e1}$ Groups

In one aspect, each $R^{a1}$, $R^{b1}$, $R^{c1}$, $R^{d1}$, and $R^{e1}$ is independently selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, $(C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, and 4-10 membered heteroaryl are each optionally substituted by 1, 2, 3, or 4 independently selected $R^6$ groups; or $R^{c1}$ and $R^{d1}$ together with the N atom to which they are attached form a 4-, 5-, 6-, or 7 membered heterocycloalkyl group, which is optionally substituted with $C_{1-3}$ alkyl.

In one aspect, wherein each occurrence of $R^{a1}$, $R^{b1}$, $R^{e1}$, $R^{d1}$, and $R^{e1}$, when present, is independently selected from hydrogen, C1-C6 alkyl, C1-C6 alkoxy, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each occurrence of $R^{a1}$, $R^{b1}$, $R^{e1}$, $R^{d1}$, $R^{e1}$, when present, is independently substituted with 0, 1, 2, 3, or 4 independently selected $R^6$ groups; or wherein each of $R^{c1}$ and $R^{d1}$ are optionally covalently bonded together and, together with the intermediate atoms, comprises a 4- to 7-membered heterocycloalkyl optionally substituted with a C1-C3 alkyl. In a further aspect, wherein each occurrence of $R^{a1}$, $R^{b1}$, $R^{c1}$, $R^{d1}$, and $R^{e1}$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each occurrence of $R^{a1}$, $R^{b1}$, $R^{c1}$, $R^{d1}$, $R^{e1}$, when present, is independently substituted with 0, 1, 2, 3, or 4 independently selected $R^6$ groups; or wherein each of $R^{c1}$ and $R^{d1}$ are optionally covalently bonded together and, together with the intermediate atoms, comprises a 4- to 7-membered heterocycloalkyl optionally substituted with a C1-C3 alkyl.

bb. $R^X$ AND $R^Y$ Groups

In one aspect, $R^X$ is selected from the group consisting of H, $C_{6-10}$ aryl, and 4-10 membered heteroaryl ring; $R^Y$ is selected from the group consisting of H, $C_{6-10}$ aryl, and 4-10 membered heteroaryl ring; or $R^X$ and $R^Y$ in combination, together with the carbon atoms to which $R^X$ and $R^Y$ are attached, form a 5, 6, or 7-membered cycloalkyl ring or a 5, 6, or 7-membered aryl ring.

In one aspect, each of $R^X$ and $R^Y$ is independently selected from hydrogen, C1-C8 alkyl, C6-C10 aryl, and 4-10 membered heteroaryl, or wherein each of $R^X$ and $R^Y$ are optionally covalently bonded together and, together with the intermediate carbon atoms, comprise a 5- to 7-membered cycloalkyl or 5- to 6-membered aryl.

In a further aspect, $R^X$ is selected from the group consisting of H and $C_{6-10}$ aryl. In a still further aspect, $R^X$ is phenyl. In yet a further aspect, $R^X$ is H.

In a further aspect, $R^Y$ is selected from the group consisting of H and $C_{6-10}$ aryl. In a still further aspect, $R^Y$ is phenyl. In yet a further aspect, $R^Y$ is H.

In a further aspect, $R^X$ and $R^Y$ are each H. In a still further aspect, $R^X$ and $R^Y$ are each phenyl.

In a further aspect, $R^X$ and $R^Y$ in combination, together with the carbon atoms to which $R^X$ and $R^Y$ are attached, form a 5, 6, or 7-member cycloalkyl ring or a 5, 6, or 7-member aryl ring. In a still further aspect, $R^X$ and $R^Y$ in combination, together with the carbon atoms to which $R^X$ and $R^Y$ are attached, form a 5, 6, or 7-member cycloalkyl ring. In yet a further aspect, $R^X$ and $R^Y$ in combination, together with the carbon atoms to which $R^X$ and $R^Y$ are attached, form a cyclohexyl ring. In an even further aspect, $R^X$ and $R^Y$ in combination, together with the carbon atoms to which $R^X$ and $R^Y$ are attached, form a 5, 6, or 7-member aryl ring. In a still further aspect, $R^X$ and $R^Y$ in combination, together with the carbon atoms to which $R^X$ and $R^Y$ are attached, form a phenyl ring.

In a further aspect, each of $R^X$ and $R^Y$ is independently selected from hydrogen, C1-C8 alkyl, C6-C10 aryl, and 4-10 membered heteroaryl. In a still further aspect, each of $R^X$ and $R^Y$ is independently selected from hydrogen, C1-C4 alkyl, C6-C8 aryl, and 4-8 membered heteroaryl. In yet a further aspect, each of $R^X$ and $R^Y$ is independently selected from hydrogen, phenyl, and cyclohexyl. In an even further aspect, each of $R^X$ and $R^Y$ is hydrogen. In a still further aspect, each of $R^X$ and $R^Y$ is phenyl. In yet a further aspect, each of $R^X$ and $R^Y$ is cyclohexyl.

In a further aspect, each of $R^X$ and $R^Y$ is independently C1-C8 alkyl. In a still further aspect, each of $R^X$ and $R^Y$ is independently C1-C4 alkyl. In yet a further aspect, each of $R^X$ and $R^Y$ is independently selected from methyl, ethyl, n-propyl, and i-propyl. In an even further aspect, each of $R^X$ and $R^Y$ is independently selected from methyl and ethyl. In a still further aspect, each of $R^X$ and $R^Y$ is ethyl. In yet a further aspect, each of $R^X$ and $R^Y$ is methyl.

In a further aspect, each of $R^X$ and $R^Y$ are optionally covalently bonded together and, together with the intermediate carbon atoms, comprise a 5- to 7-membered cycloalkyl or 5- to 6-membered aryl. In a still further aspect, each of $R^X$ and $R^Y$ are optionally covalently bonded together and, together with the intermediate carbon atoms, comprise a 5- to 7-membered cycloalkyl. In yet a further aspect, each of $R^X$ and $R^Y$ are optionally covalently bonded together and, together with the intermediate carbon atoms, comprise a cyclohexyl ring. In an even further aspect, each of $R^X$ and $R^Y$ are optionally covalently bonded together and, together with the intermediate carbon atoms, comprise a 5- to 6-membered aryl. In a still further aspect, each of $R^X$ and $R^Y$ are optionally covalently bonded together and, together with the intermediate carbon atoms, comprise a phenyl.

2. N-Heterocyclic Phosphine Examples

In one aspect, a compound is selected from:

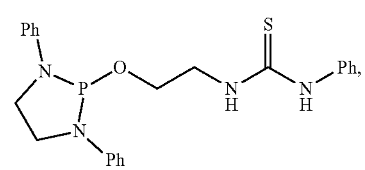

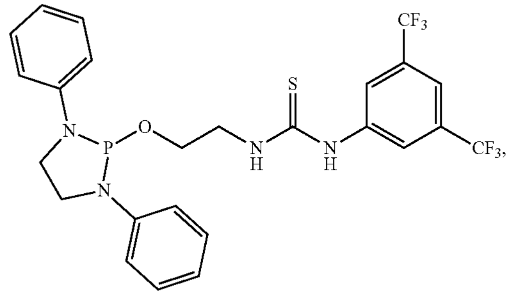

-continued

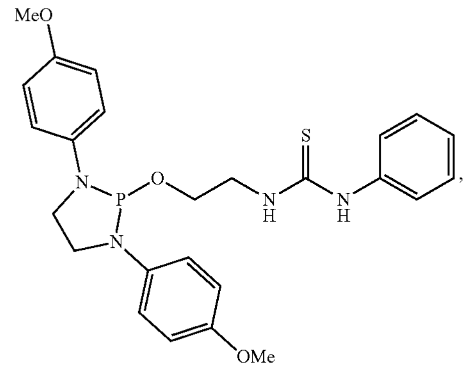

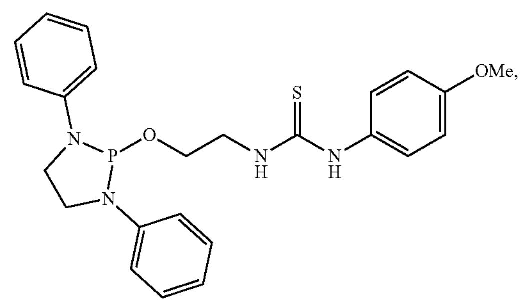

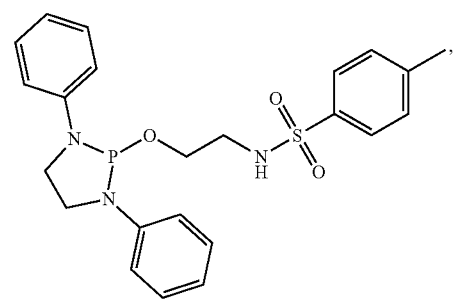

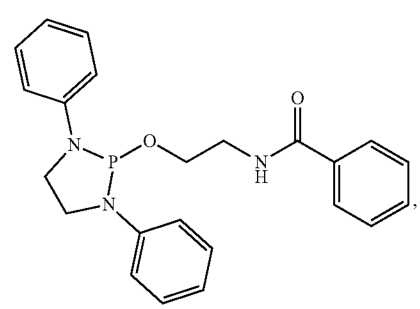

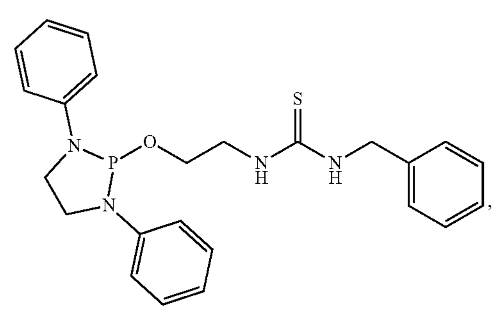

-continued
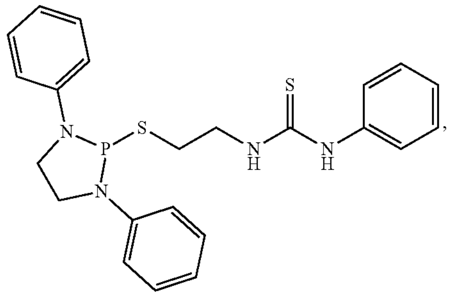
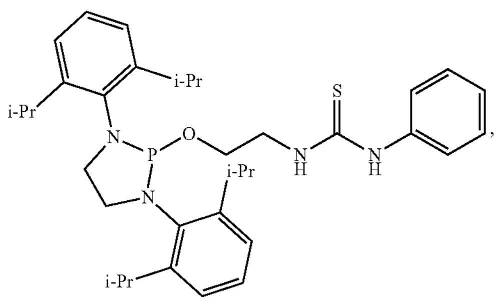
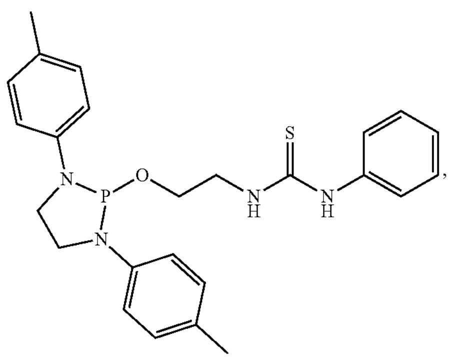
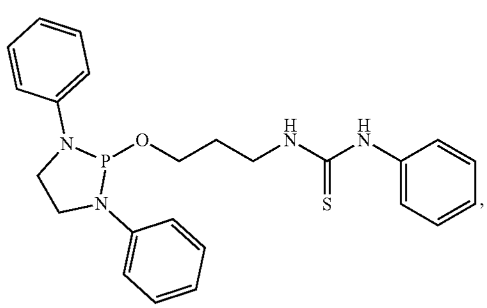
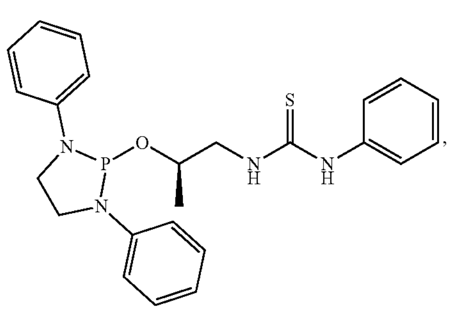
-continued
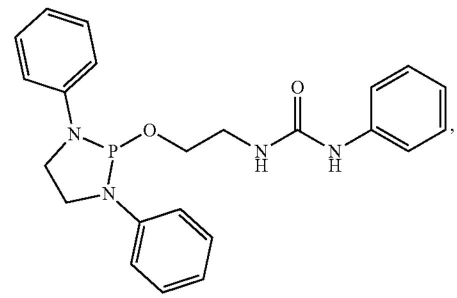
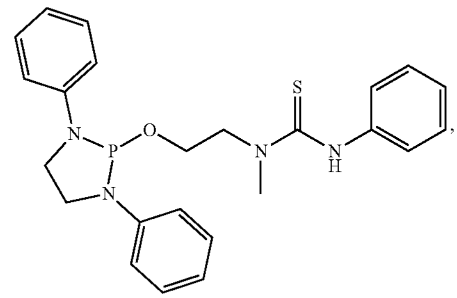
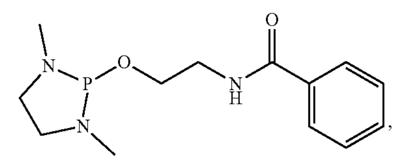
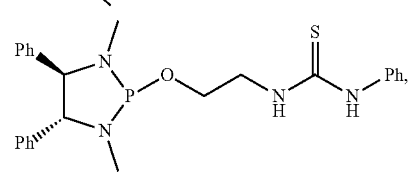
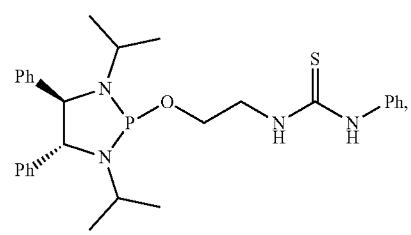
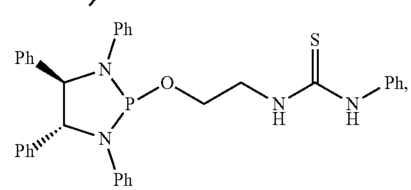
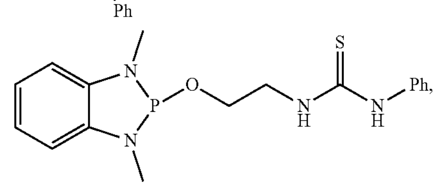
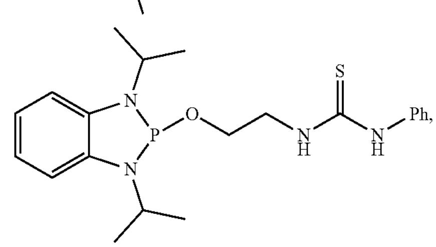

-continued
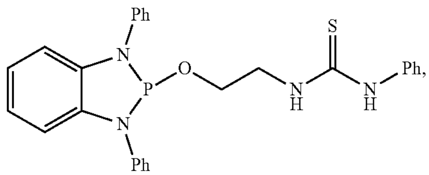
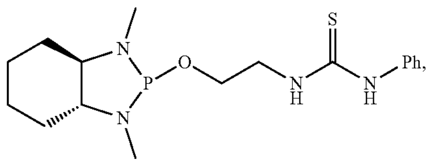
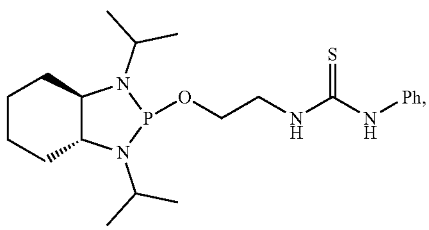
and
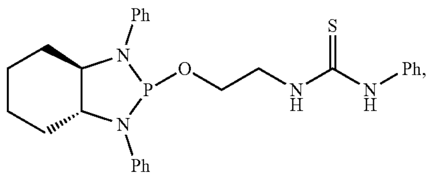
or a derivative thereof.
In one aspect, a compound can be present as:
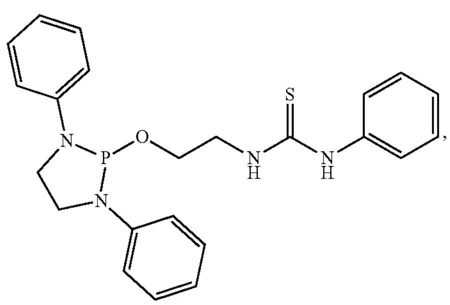
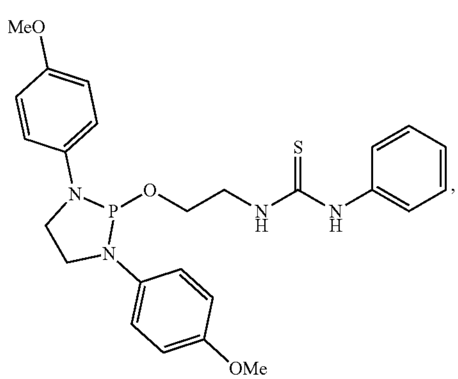
-continued
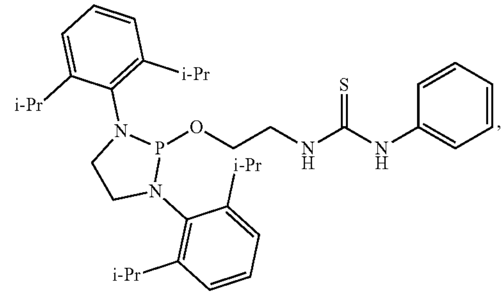
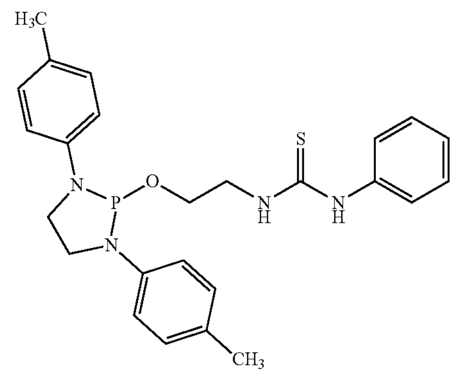
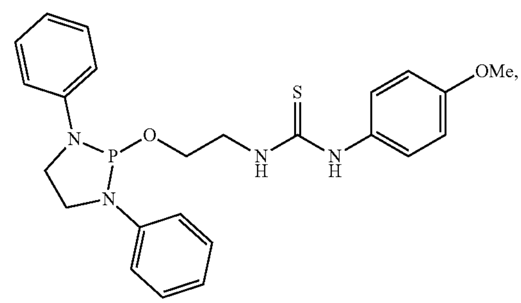
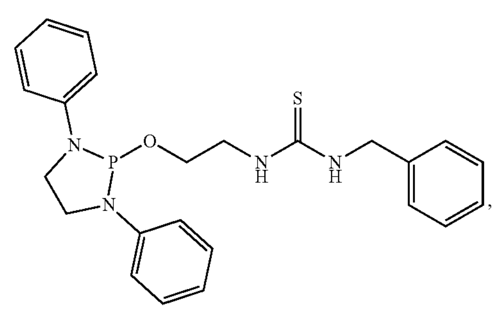
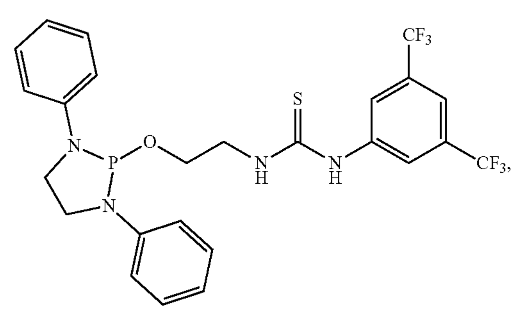

-continued

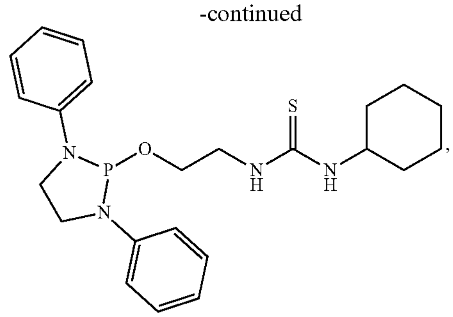

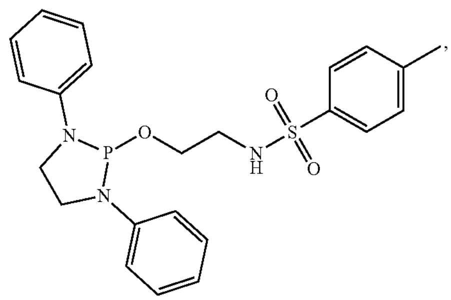

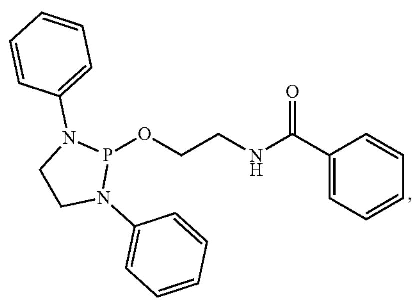

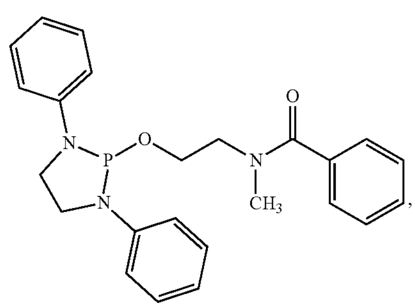

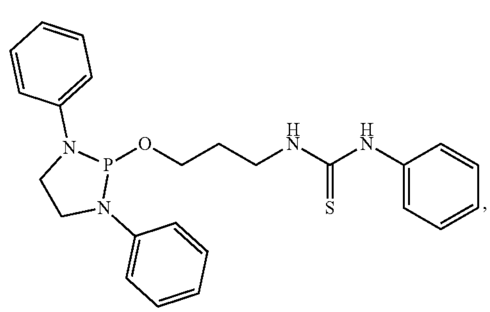

-continued

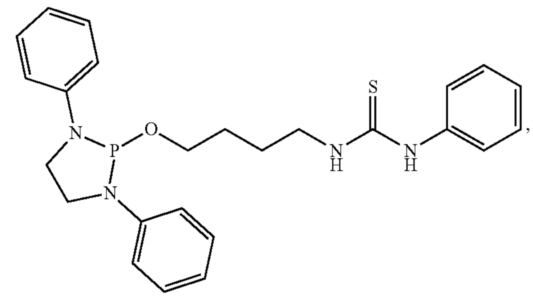

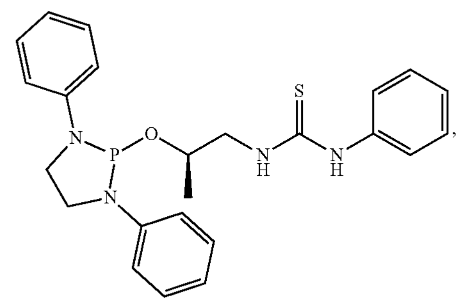

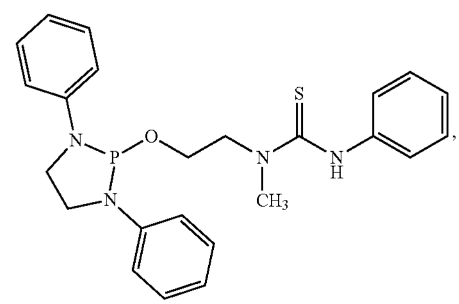

or a derivative thereof.

3. Prophetic Compound Examples

The following compound examples are prophetic, and can be prepared using the synthesis methods described herein above and other general methods as needed as would be known to one skilled in the art. It is anticipated that the prophetic compounds would be useful in the preparation of vinylphosphonates, and such utility can be determined using the synthetic methods described herein below.

In one aspect, a compound can be selected from:

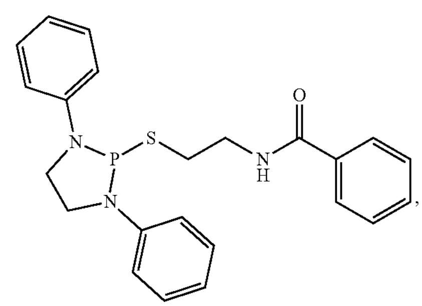

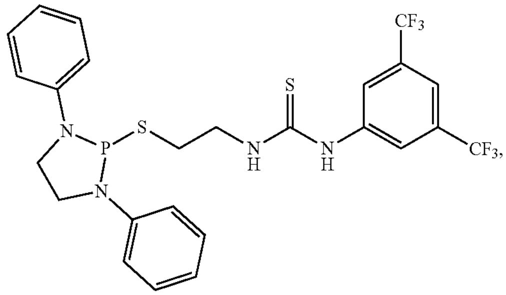
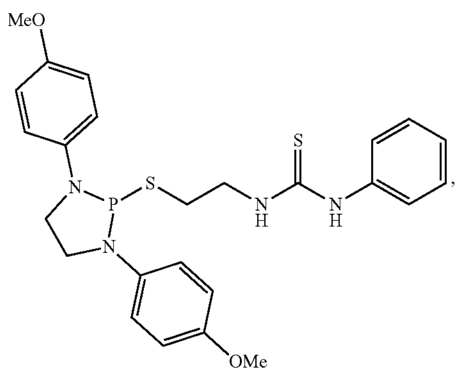
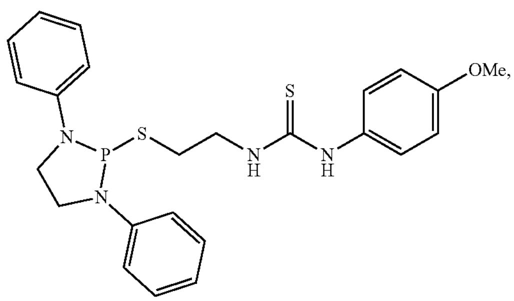
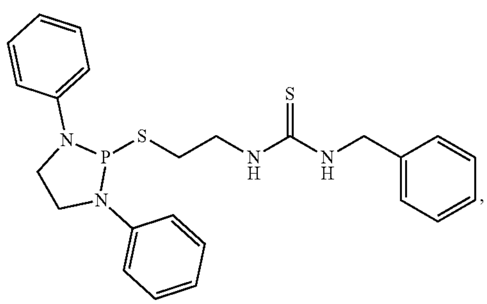
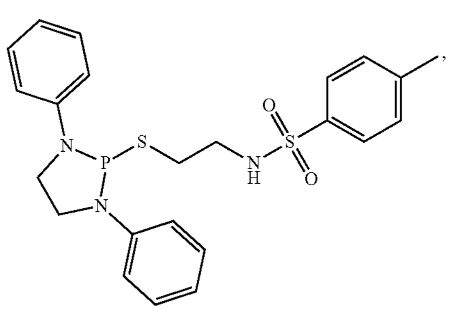
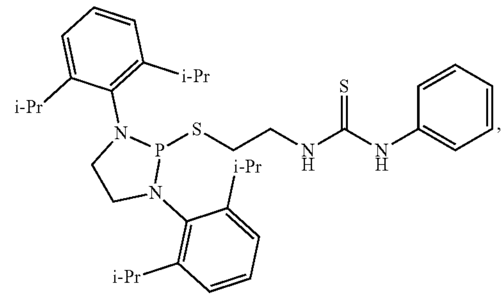
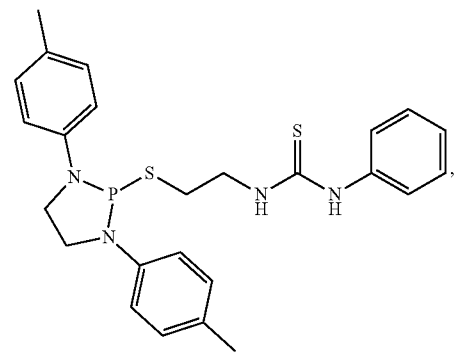
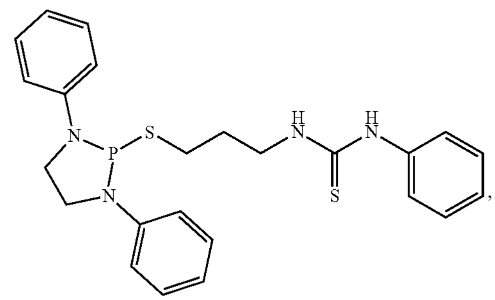
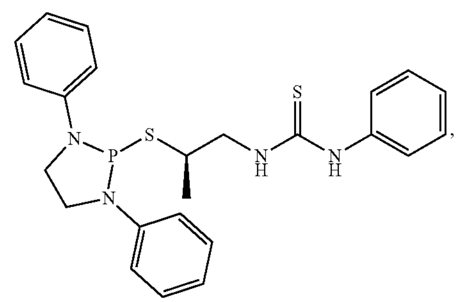
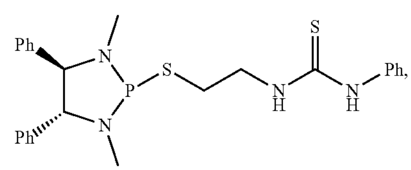
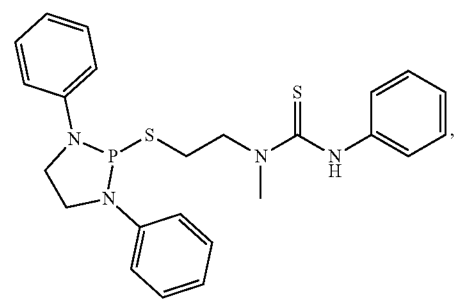

-continued
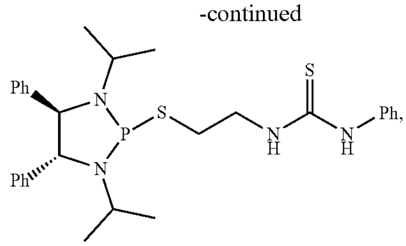
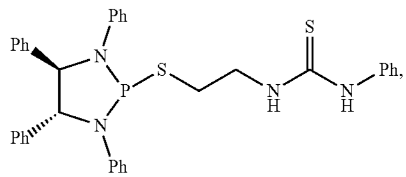
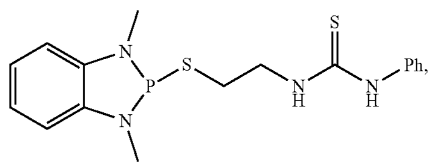
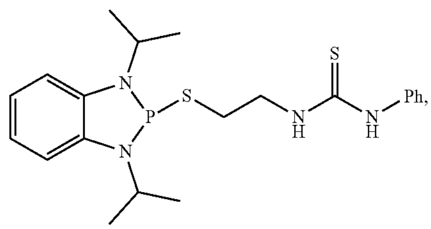
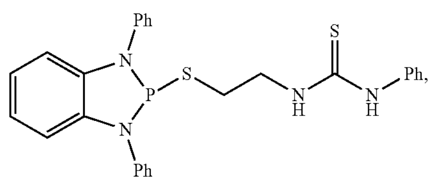
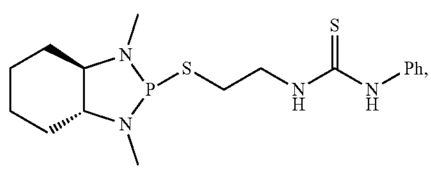
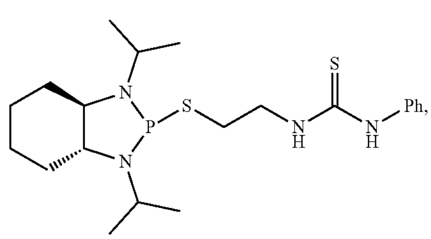
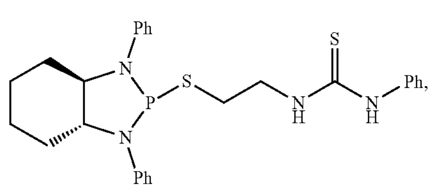
-continued
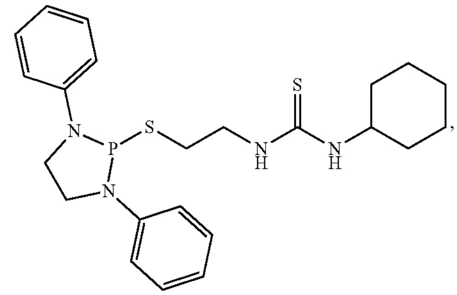
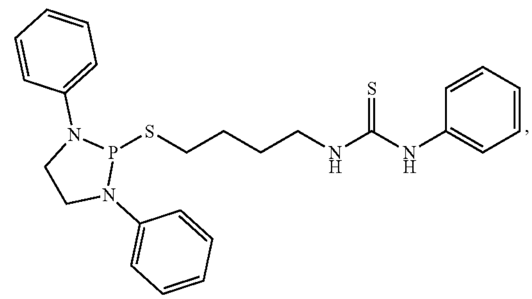
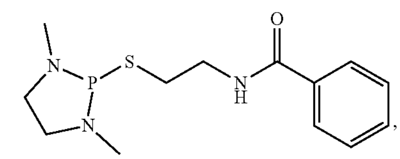
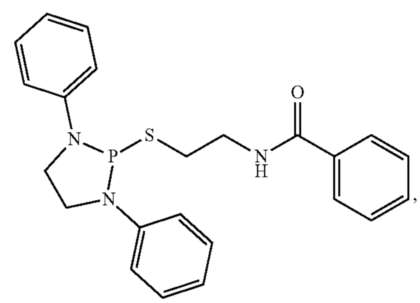
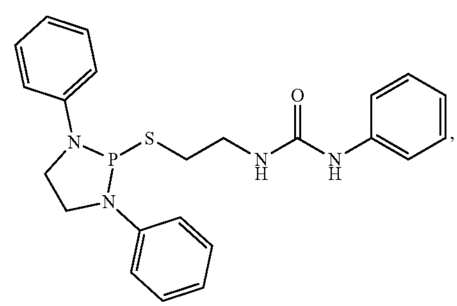
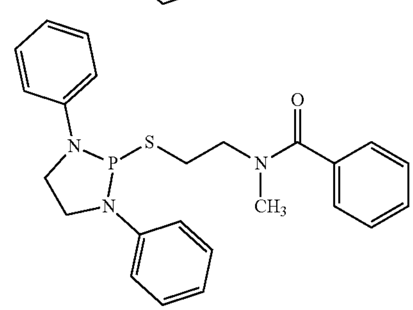
and -continued
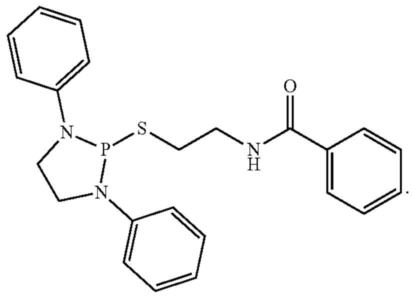
In one aspect, a compound can be present as:
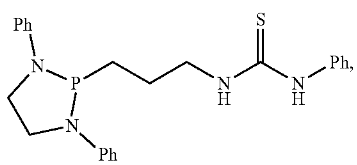
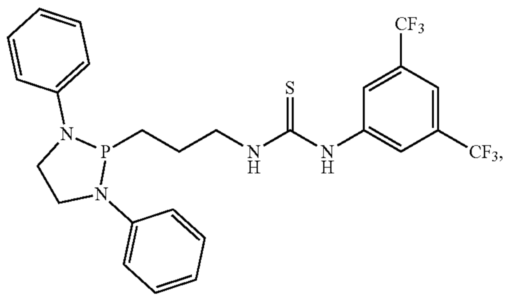
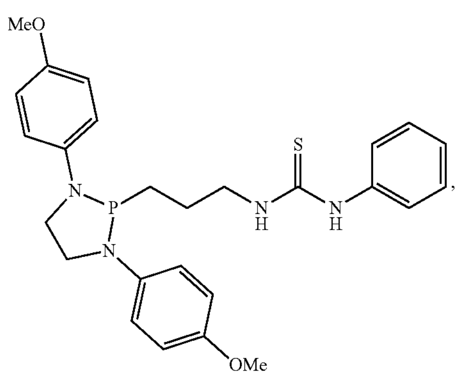
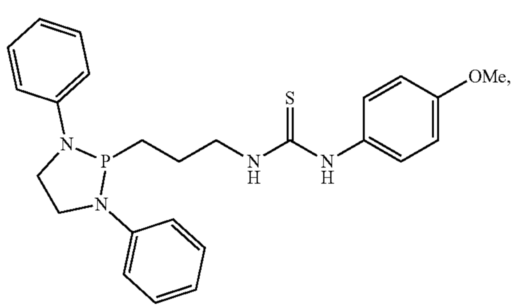
-continued
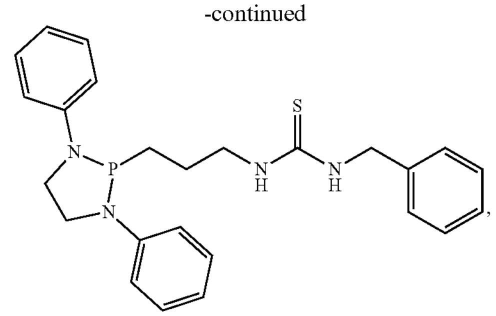
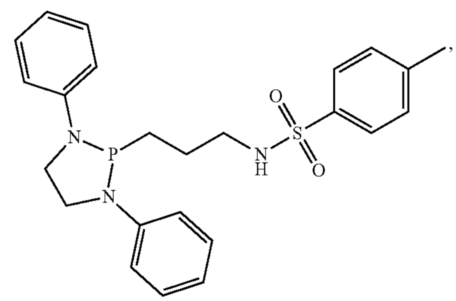
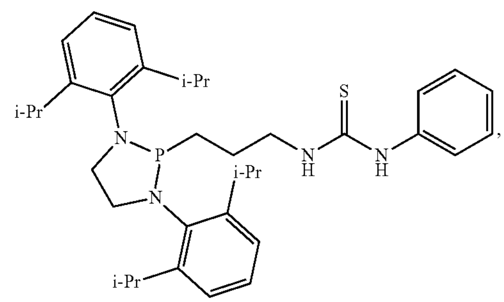
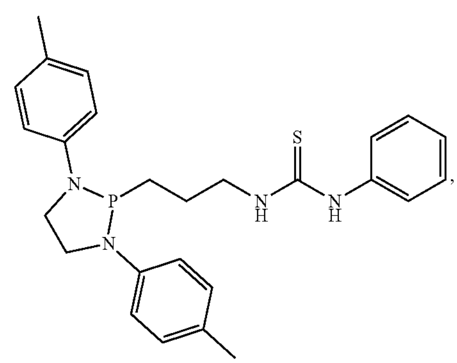
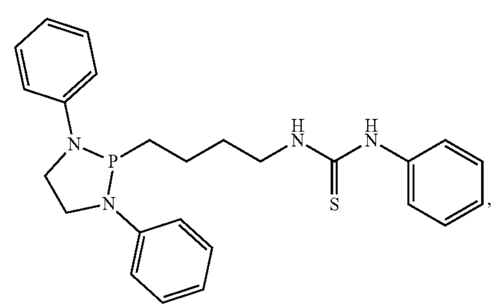

-continued
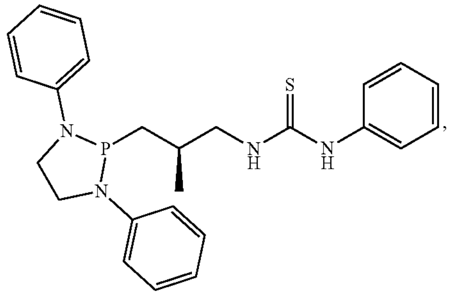
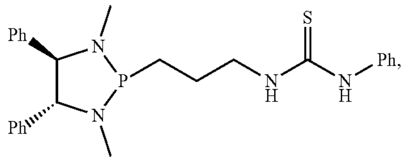
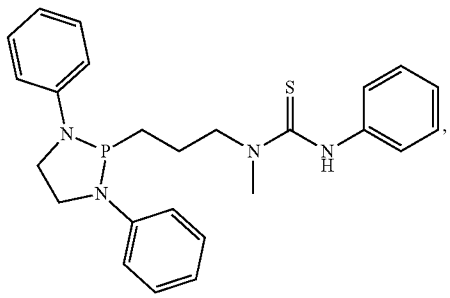
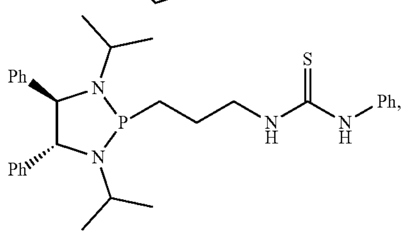
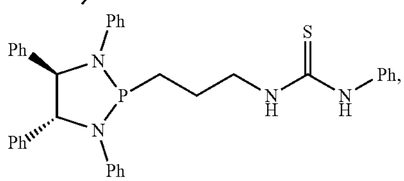
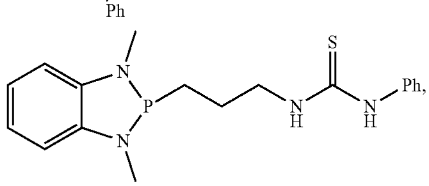
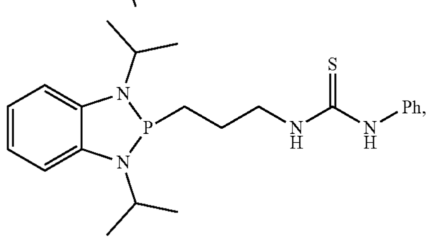
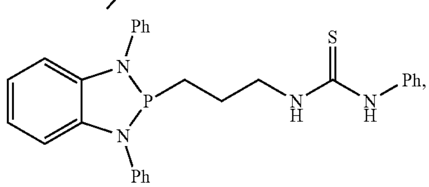
-continued
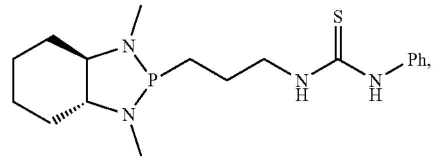
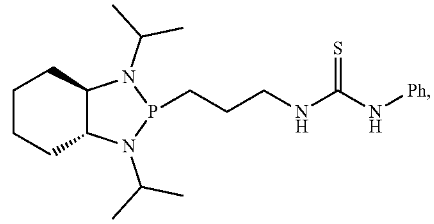
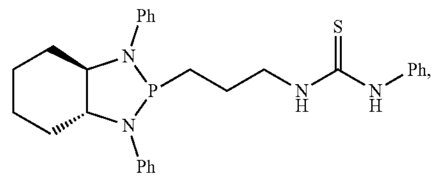
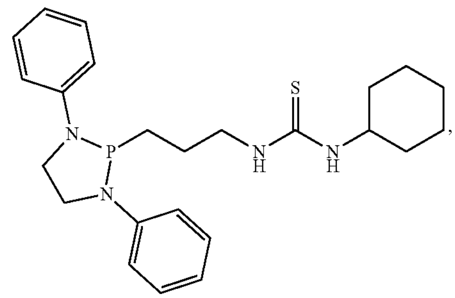
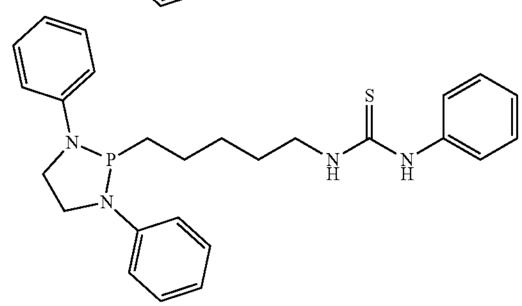
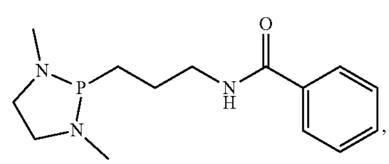
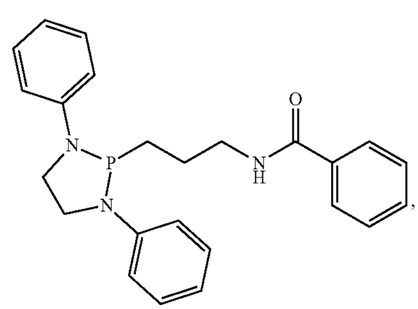

-continued
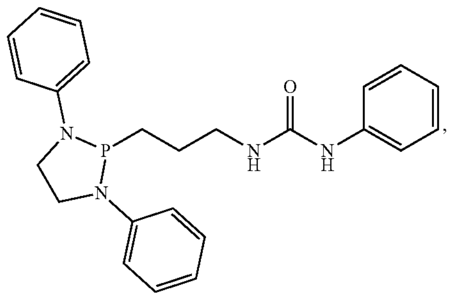
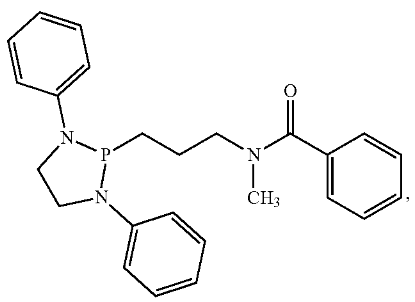
and
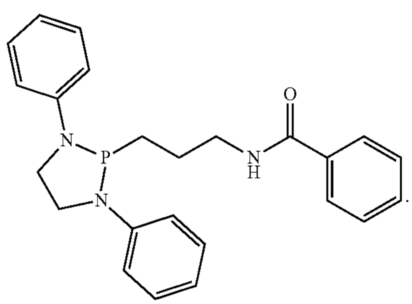
In one aspect, a compound can be present as:
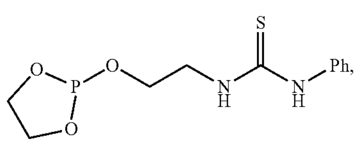
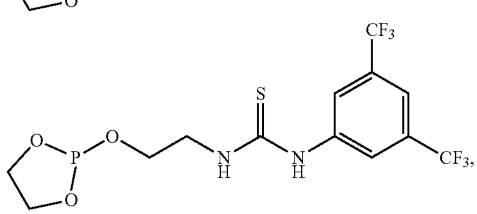
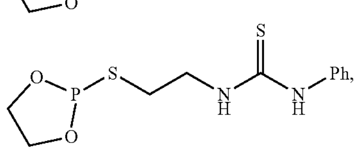
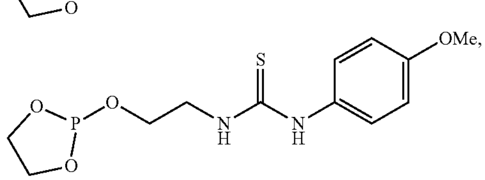
-continued
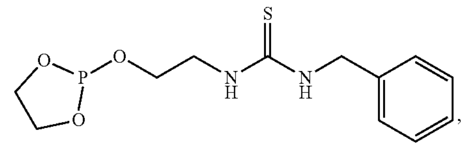
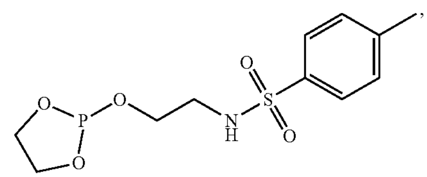
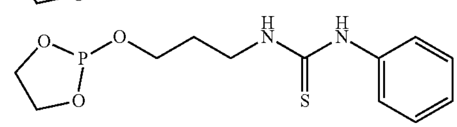
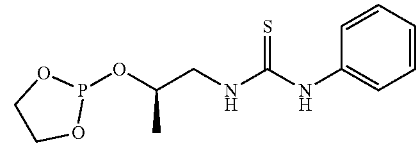
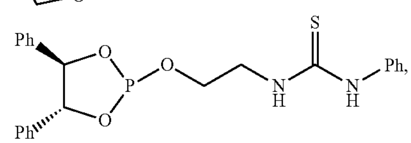
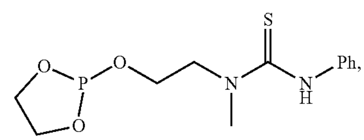
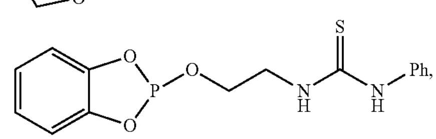
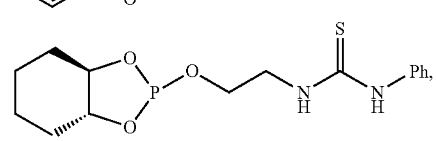
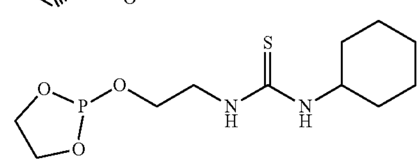
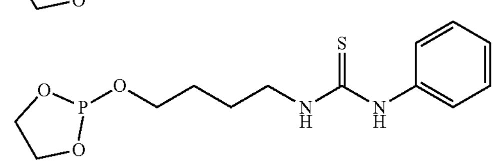
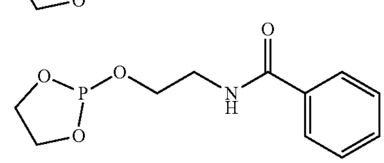
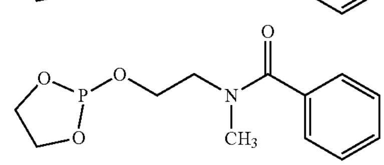
and -continued

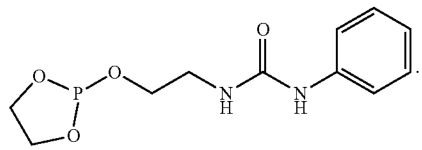

In one aspect, a compound can be present as:

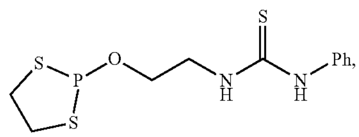

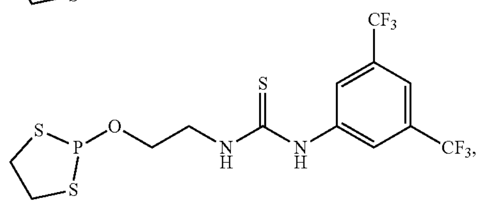

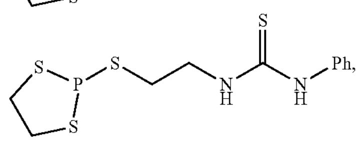

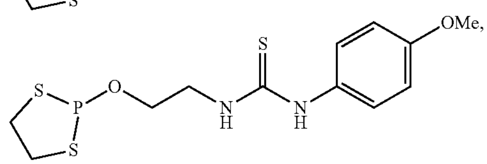

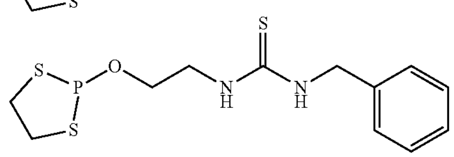

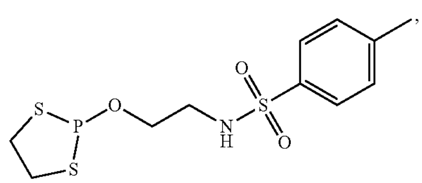

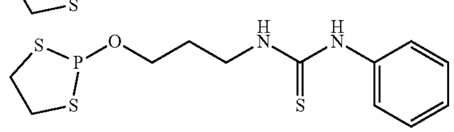

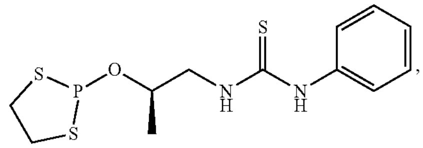

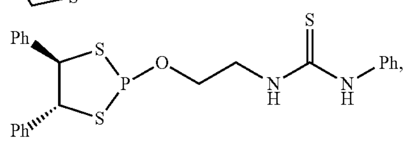

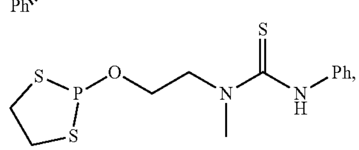

-continued

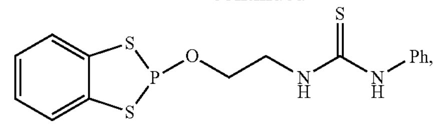

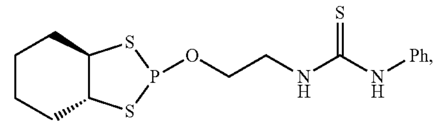

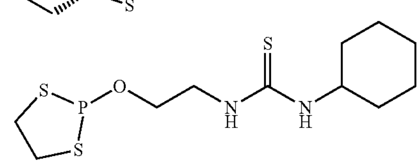

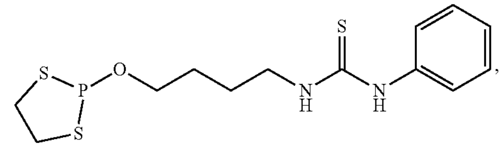

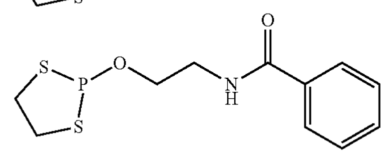

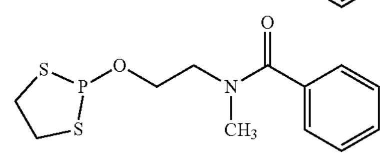

and

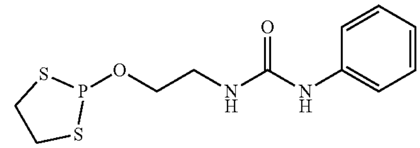

C. Methods of Making N-Heterocyclic Phosphines

In one aspect, the invention relates to methods of making a compound having a structure represented by a formula:

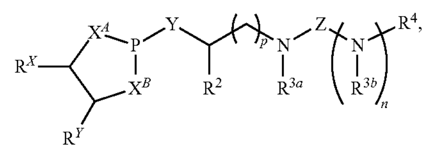

wherein n is selected from 0 and 1; wherein p is selected from 0, 1, 2, 3, 4, and 5; wherein each of $X^A$ and $X^B$ is independently selected from $NR^1$, O, and S; wherein each occurrence of $R^1$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each occurrence of $R^1$, when present, is independently substituted with 0, 1, 2, 3, or 4 independently selected $R^5$ groups; wherein Y is selected from O, S, and $NR^{26}$; wherein $R^{26}$, when present, is selected from hydrogen and C1-C8 alkyl; wherein Z is selected from C═O, C═S, S═O, and $SO_2$; wherein each of $R^X$ and $R^Y$ is independently selected from hydrogen, C6-C10 aryl, and 4-10 membered heteroaryl, or wherein each of $R^X$ and $R^Y$ are optionally covalently bonded together and, together with the intermediate carbon atoms, comprise a 5- to 7-membered cycloalkyl or 5- to 6-membered aryl; wherein $R^2$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein $R^2$ is substituted with 0, 1, 2, 3, or 4 independently selected $R^5$ groups; wherein each of $R^{3a}$ and $R^{3b}$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each of $R^{3a}$ and $R^{3b}$ is independently substituted with 0, 1, 2, 3, or 4 independently selected $R^5$ groups; wherein $R^4$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, and 4-10 membered heteroaryl, and —(C1-C3 alkyl)(C6-C10 aryl), and wherein $R^4$ is substituted with 0, 1, 2, 3, or 4 independently selected $R^5$ groups; wherein each occurrence of $R^5$, when present, is independently selected from halogen, $—NO_2$, —CN, —OH, —SH, $—NH_2$, C1-C3 alkyl, C2-C4 alkenyl, C2-C4 alkynyl, C1-C3 haloalkyl, C1-C3 cyanoalkyl, C1-C3 hydroxyalkyl, C1-C3 haloalkoxy, C1-C3 alkoxy, C1-C3 thioalkyl, C1-C3 alkyl(C1-C3 alkoxy), C1-C3 alkylamino, (C1-C3)(C1-C3) dialkylamino, C3-C7 cycloalkyl, C6-C10 aryl, —(C═O)(C1-C3 alkyl), —(S═O)(C1-C3 alkyl), $—SO_2$(C1-C3 alkyl), $—CO_2R^{11}$, $—(C{=}O)NR^{12a}R^{12b}$, $—SO_2NR^{12a}R^{12b}$, $—O(C{=}O)NR^{12a}R^{12b}$, $—NHSO_2NR^{12a}R^{12b}$, and $—NH(C{=}O)NR^{12a}R^{12b}$; wherein each occurrence of $R^{11}$, when present, is independently selected from hydrogen and C1-C4 alkyl; and wherein each occurrence of $R^{12a}$ and $R^{12b}$, when present, is independently selected from hydrogen and C1-C3 alkyl, or a derivative thereof, the method comprising: (a) providing a first compound having a structure represented by a formula:

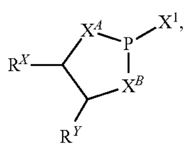

wherein $X^1$ is halogen, or a derivative thereof; and (b) reacting with a second compound having a structure represented by a formula:

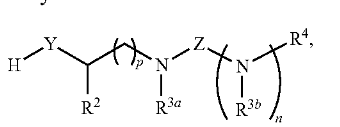

or a derivative thereof, in the presence of a base.

In one aspect, the invention relates to methods of making a compound having a structure represented by a formula:

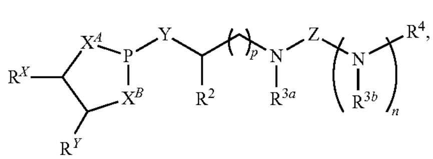

wherein n is selected from 0 and 1; wherein p is selected from 0, 1, 2, 3, 4, and 5; wherein each of $X^A$ and $X^B$ is independently selected from $NR^1$, O, and S; wherein each occurrence of $R^1$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each occurrence of $R^1$, when present, is independently substituted with 0, 1, 2, 3, or 4 independently selected $R^5$ groups; wherein Y is selected from $CH_2$, O, and S; wherein Z is selected from C═O, C═S, S═O, and $SO_2$; wherein each of $R^X$ and $R^Y$ is independently selected from hydrogen, C6-C10 aryl, and 4-10 membered heteroaryl, or wherein each of $R^X$ and $R^Y$ are optionally covalently bonded together and, together with the intermediate carbon atoms, comprise a 5- to 7-membered cycloalkyl or 5- to 6-membered aryl; wherein $R^2$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein $R^2$ is substituted with 0, 1, 2, 3, or 4 independently selected $R^5$ groups; wherein each of $R^{3a}$ and $R^{3b}$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each of $R^{3a}$ and $R^{3b}$ is independently substituted with 0, 1, 2, 3, or 4 independently selected $R^5$ groups; wherein $R^4$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, and 4-10 membered heteroaryl, and —(C1-C3 alkyl)(C6-C10 aryl), and wherein $R^4$ is substituted with 0, 1, 2, 3, or 4 independently selected $R^5$ groups; wherein each occurrence of $R^5$, when present, is independently selected from halogen, $—NO_2$, —CN, —OH, —SH, $—NH_2$, C1-C3 alkyl, C2-C4 alkenyl, C2-C4 alkynyl, C1-C3 haloalkyl, C1-C3 cyanoalkyl, C1-C3 hydroxyalkyl, C1-C3 haloalkoxy, C1-C3 alkoxy, C1-C3 thioalkyl, C1-C3 alkyl(C1-C3 alkoxy), C1-C3 alkylamino, (C1-C3)(C1-C3) dialkylamino, C3-C7 cycloalkyl, C6-C10 aryl, —(C═O)(C1-C3 alkyl), —(S═O)(C1-C3 alkyl), $—SO_2$(C1-C3 alkyl), $—CO_2R^{11}$, $—SO_2NR^{12a}R^{12b}$, $—O(C{=}O)NR^{12a}R^{12b}$, $—NHSO_2NR^{12a}R^{12b}$, and $—NH(C{=}O)NR^{12a}R^{12b}$; wherein each occurrence of $R^{11}$, when present, is independently selected from hydrogen and C1-C4 alkyl; and wherein each occurrence of $R^{12a}$ and $R^{12b}$, when present, is independently selected from hydrogen and C1-C3 alkyl, or a derivative thereof, the method comprising: (a) providing a first compound having a structure represented by a formula:

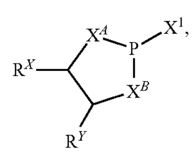

wherein $X^1$ is halogen, or a derivative thereof; and (b) reacting with a second compound having a structure represented by a formula:

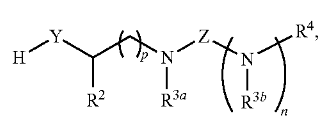

or a derivative thereof, in the presence of a base.

In a further aspect, the base is an amine base. In a still further aspect, the base is selected from trimethylamine, tripropylamine, triisopropylamine, tri-tert-butylamine, N,N-dimethylethanamine, N-ethyl-N-methylpropan-2-amine, N-ethyl-N-isopropylpropan-2-amine, morpholine, N-methylmorpholine, diisopropylethylamine, DABCO, triphenylamine, quinuclidine, trimethylamine, tripropylamine, triisopropylamine, tri-tert-butylamine, pyrrolidine, pyridine, 2,6-lutidine, 1,8-diazabicyclo[5.4.0]undec-7-ene, tributylamine, and triethylamine. In yet a further aspect, the base is triethylamine.

In a further aspect, providing comprises reacting a compound having a structure represented by a formula:

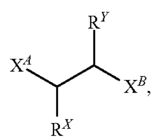

with a phosphine in the presence of a base.

In a further aspect, the phosphine is a trihalophosphine. In a still further aspect, the phosphine is selected from tribromophosphine and trichlorophosphine. In yet a further aspect, the phosphine is trichlorophosphine.

In a further aspect, the base is an amine base. In a still further aspect, the base is selected from diisopropylethylamine, DABCO, triphenylamine, quinuclidine, pyrrolidine, pyridine, 2,6-lutidine, 1,8-diazabicyclo[5.4.0]undec-7-ene, Hunig's base, tributylamine, and triethylamine. In yet a further aspect, the base is triethylamine.

The compounds provided herein, including salts thereof, can be prepared using known organic synthesis techniques and can be synthesized according to any of numerous possible synthetic routes.

The reactions for preparing the compounds provided herein can be carried out in suitable solvents that can be readily selected by one of skill in the art of organic synthesis. Suitable solvents can be substantially non-reactive with the starting materials (reactants), the intermediates, or products at the temperatures at which the reactions are carried out, e.g., temperatures which can range from the solvent's freezing temperature to the solvent's boiling temperature. A given reaction can be carried out in one solvent or a mixture of more than one solvent. Depending on the particular reaction step, suitable solvents for a particular reaction step can be selected by the skilled artisan.

Preparation of the compounds provided herein can involve the protection and deprotection of various chemical groups. The chemistry of protecting groups can be found, for example, in *Protecting Group Chemistry*, 1$^{st}$ Ed., Oxford University Press, 2000; *March's Advanced Organic Chemistry: Reactions, Mechanisms, and Structure*, 5$^{th}$ Ed., Wiley-Interscience Publication, 2001; and Petursson, S. et al., "*Protecting Groups in Carbohydrate Chemistry*," *J. Chem. Educ.*, 74(11), 1297 (1997).

Reactions can be monitored using an appropriate method. For example, product formation can be monitored by spectroscopic means, such as nuclear magnetic resonance spectroscopy (e.g., $^{1}$H or $^{13}$C), infrared spectroscopy, spectrophotometry (e.g., UV-visible), mass spectrometry, or by chromatographic methods such as high performance liquid chromatography (HPLC), liquid chromatography-mass spectroscopy (LCMS), or thin layer chromatography (TLC). Compounds can be purified using appropriate methods such as high performance liquid chromatography (HPLC) ("*Preparative LC-MS Purification: Improved Compound Specific Method Optimization*" K. F. Blom, et al., *J. Combi. Chem.* 6(6), 874 (2004)) and normal phase silica chromatography.

Thus, in various aspects, a process of preparing a compound of Formula (I) is provided, comprising reacting a compound or salt of Formula (IV):

(IV)

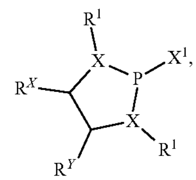

with a compound or a salt of Formula (V):

(V)

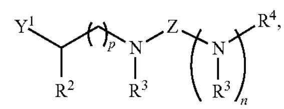

in the presence of a base, wherein: variables $R^1$, X, $R^X$, and $R^Y$ of Formula (IV) and variables $R^2$, $R^3$, Z, $R^4$, n, and p are defined according to the definitions described herein for compounds of Formula (I) (e.g., a compound of Formula (Ia), (Ib), (Ic), (Id), (Ie), (If), (Ig), and/or (Ih)); $X^1$ is halo; and $Y^1$ is OH, SH, or —$CH_3$.

In various aspects, the salt of the compound of Formula (IV) is a pharmaceutically acceptable salt. In various aspects, the salt of the compound of Formula (V) is a pharmaceutically acceptable salt.

In various aspects, each X is N. In various aspects, each X is O. In various aspects, each X is S.

In various aspects, $X^1$ is chloro.

In various aspects, $Y^1$ is OH. In various aspects, $Y^1$ is SH.

In various aspects, the base is a strong base, for example, lithium hydroxide, sodium hydroxide, potassium hydroxide, lithium carbonate, sodium carbonate, potassium carbonate, sodium bicarbonate, or an amine base. In various aspects, the base is an amine base, for example, diisopropylethylamine, DABCO, triphenylamine, quinuclidine, trimethylamine, triethylamine, tripropylamine, triisopropylamine, tributylamine, tri-tert-butylamine, N,N-dimethylethanamine, N-ethyl-N-methylpropan-2-amine, N-ethyl-N-isopropylpropan-2-amine, morpholine, or N-methylmorpholine. In various aspects, the base is a tertiary amine base, for example, trimethylamine, triethylamine, tripropylamine, triisopropylamine, tributylamine, or tri-tert-butylamine. In various aspects, the base is triethylamine.

In various aspects, the reaction is run at a temperature at from about −10° C. to about 10° C., for example, from about −10° C. to about −5° C., from about −10° C. to about 0° C., from about −10° C. to about 5° C., from about −10° C. to about 10° C., from about −5° C. to about 0° C., from about −5° C. to about 5° C., from about −5° C. to about 10° C., from about 0° C. to about 5° C., from about 0° C. to about 10° C., or from about 5° C. to about 10° C. In various aspects, the reacting is run at a temperature at about 0° C.

In various aspects, about 1 to about 1.5 equivalents of the compound or salt of Formula (IV) is used based on 1 equivalent of the compound or salt of Formula (V), for example, about 1 equivalent, about 1.1 equivalents, about 1.15 equivalents, about 1.2 equivalents, about 1.25 equivalents, about 1.3 equivalents, about 1.35 equivalents, about 1.4 equivalents, about 1.45 equivalents, or about 1.5 equivalents. In various aspects, about 1 equivalent of the compound or salt of Formula (IV) is used based on 1 equivalent of the compound or salt of Formula (V).

In various aspects, about 1 to about 1.5 equivalents of base is used based on 1 equivalent of the compound or salt of Formula (V), for example, about 1 equivalent, about 1.1 equivalents, about 1.15 equivalents, about 1.2 equivalents, about 1.25 equivalents, about 1.3 equivalents, about 1.35 equivalents, about 1.4 equivalents, about 1.45 equivalents, or about 1.5 equivalents. In various aspects, about 1.25 equivalents of base is used based on 1 equivalent of the compound or salt of Formula (V).

In various aspects, the process comprises a solvent component. In various aspects, the solvent component comprises dichloromethane. In various aspects, the solvent component comprises toluene.

In various aspects, a process of preparing a compound or salt of Formula (IV) is provided, comprising reacting a compound or salt of Formula (VI):

(VI)

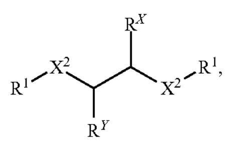

with a phosphine in the presence of a base, wherein: variables $R^1$, $R^X$, and $R^Y$ of Formula (VI) are defined according to the definitions described herein for compounds of Formula (I) (e.g., a compound of Formula (Ia), (Ib), (Ic), (Id), (Ie), (If), (Ig), and/or (Ih)); and each $X^2$ is independently selected from the group consisting of —NH—, —O—, and —S—.

In various aspects, the salt of the compound of Formula (IV) is a pharmaceutically acceptable salt. In various aspects, the salt of the compound of Formula (VI) is a pharmaceutically acceptable salt.

In various aspects, each $X^2$ is —NH—.

In various aspects, the phosphine is a trihalophosphine, for example, triiodophosphine, tribromophosphine, or trichlorophosphine. In various aspects, the phosphine is trichlorophosphine.

In various aspects, about 0.5 to about 2 equivalents of phosphine is used based on 1 equivalent of the compound or salt of Formula (VI), for example, about 0.5 equivalents, about 0.6 equivalents, about 0.7 equivalents, about 0.8 equivalents, about 0.9 equivalents, about 1 equivalent, about 1.1 equivalents, about 1.2 equivalents, about 1.3 equivalents, about 1.4 equivalents, about 1.5 equivalents, about 1.6 equivalents, about 1.7 equivalents, about 1.8 equivalents, about 1.9 equivalents, about 2.0 equivalents, about 2.1 equivalents, about 2.2 equivalents, about 2.3 equivalents, about 2.4 equivalents, or about 2.5 equivalents. In various aspects, about 1 equivalent of phosphine is used based on 1 equivalent of the compound or salt of Formula (VI).

In various aspects, the base is a strong base, for example, lithium hydroxide, sodium hydroxide, potassium hydroxide, lithium carbonate, sodium carbonate, potassium carbonate, sodium bicarbonate, or an amine base. In various aspects, the base is an amine base, for example, diisopropylethylamine, DABCO, triphenylamine, quinuclidine, trimethylamine, triethylamine, tripropylamine, triisopropylamine, tributylamine, tri-tert-butylamine, N,N-dimethylethanamine, N-ethyl-N-methylpropan-2-amine, N-ethyl-N-isopropylpropan-2-amine, morpholine, or N-methylmorpholine. In various aspects, the base is a tertiary amine base, for example, trimethylamine, triethylamine, tripropylamine, triisopropylamine, tributylamine, or tri-tert-butylamine. In various aspects, the base is triethylamine.

In various aspects, about 1.5 to about 2.5 equivalents of base is used based on 1 equivalent of the compound or salt of Formula (VI), for example, about 1 equivalent, about 1.1 equivalents, about 1.2 equivalents, about 1.3 equivalents, about 1.4 equivalents, about 1.5 equivalents, about 1.6 equivalents, about 1.7 equivalents, about 1.8 equivalents, about 1.9 equivalents, about 2.0 equivalents, about 2.1 equivalents, about 2.2 equivalents, about 2.3 equivalents, about 2.4 equivalents, or about 2.5 equivalents. In various aspects, about 2.0 equivalents of base is used based on 1 equivalent of the compound or salt of Formula (VI).

In various aspects, the reacting is run at a temperature from about −100° C. to about 10° C., for example, from about −100° C. to about −90° C., from about −100° C. to about −80° C., from about −100° C. to about −70° C., from about −100° C. to about −60° C., from about −100° C. to about −50° C., from about −100° C. to about −40° C., from about −100° C. to about −30° C., from about −100° C. to about −20° C., from about −100° C. to about −10° C., from about −100° C. to about 0° C., from about −100° C. to about 5° C., from about −100° C. to about 10° C., from about −80° C. to about −70° C., from about −80° C. to about −60° C., from about −80° C. to about −50° C., from about −80° C. to about −40° C., from about −80° C. to about −30° C., from about −80° C. to about −20° C., from about −80° C. to about −10° C., from about −80° C. to about 0° C., from about −80° C. to about 5° C., from about −80° C. to about 10° C., from about −50° C. to about −40° C., from about −50° C. to about −30° C., from about −50° C. to about −20° C., from about −50° C. to about −10° C., from about −50° C. to about 0° C., from about −50° C. to about 5° C., from about −50° C. to about 10° C., from about −20° C. to about −10° C., from about −20° C. to about 0° C., from about −20° C. to about 5° C., from about −20° C. to about 10° C., or from about 0° C. to about 10° C. In various aspects, the reacting is run at a temperature from about −78° C. to about 0° C. In various aspects, the reacting is run at a temperature that is about −78° C. In various aspects, the reacting is run at a temperature that is about 0° C.

In various aspects, the process further comprises heating the reaction to room temperature.

In various aspects, the process further comprises a solvent component. In various aspects, the solvent component comprises dichloromethane.

It will be appreciated by one skilled in the art that the processes described are not the exclusive means by which compounds of the invention may be synthesized and that a broad repertoire of synthetic organic reactions is available to be potentially employed in synthesizing compounds of the invention. The person skilled in the art knows how to select and implement appropriate synthetic routes. Suitable synthetic methods of starting materials, intermediates and products may be identified by reference to the literature, including reference sources such as: *Advances in Heterocyclic Chemistry*, Vols. 1-107 (Elsevier, 1963-2012); *Journal of Heterocyclic Chemistry* Vols. 1-49 (Journal of Heterocyclic Chemistry, 1964-2012); Carreira, et al. (Ed.) *Science of Synthesis*, Vols. 1-48 (2001-2010) and Knowledge Updates KU2010/1-4; 2011/1-4; 2012/1-2 (Thieme, 2001-2012); Katritzky, et al. (Ed.) *Comprehensive Organic Functional*

*Group Transformations*, (Pergamon Press, 1996); Katritzky et al. (Ed.); *Comprehensive Organic Functional Group Transformations II* (Elsevier, 2nd Edition, 2004); Katritzky et al. (Ed.), *Comprehensive Heterocyclic Chemistry* (Pergamon Press, 1984); Katritzky et al., *Comprehensive Heterocyclic Chemistry II*, (Pergamon Press, 1996); Smith et al., *March's Advanced Organic Chemistry: Reactions, Mechanisms, and Structure*, 6th Ed. (Wiley, 2007); Trost et al. (Ed.), *Comprehensive Organic Synthesis* (Pergamon Press, 1991).

1. Route I

In one aspect, substituted N-heterocyclic phosphine halide intermediates can be prepared as shown below.

SCHEME 1A.

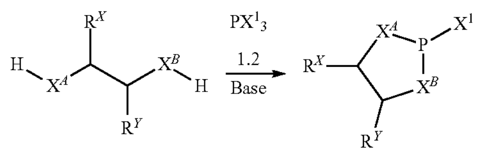

1.1 1.3

Compounds are represented in generic form, with substituents as noted in compound descriptions elsewhere herein and wherein $X^1$ is halogen. A more specific example is set forth below.

SCHEME 1B.

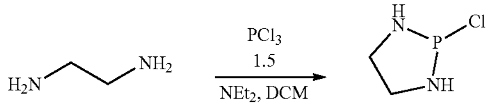

1.4 1.6

In one aspect, the synthesis of N-heterocyclic phosphine halide intermediates can begin with an ethylene derivative. Ethylene derivatives are commercially available or readily prepared by one skilled in the art. Thus, compounds of type 1.6, and similar compounds, can be prepared according to reaction Scheme 1B above. Compounds of type 1.6 can be prepared by a cyclization reaction of an appropriate ethylene derivative, e.g., 1.4 as shown above. The cyclization reaction is carried out in the presence of an appropriate phosphorous trihalide, e.g., 1.5 as shown above, and an appropriate base, e.g., triethylamine, in an appropriate solvent, e.g., dichloromethane. As can be appreciated by one skilled in the art, the above reaction provides an example of a generalized approach wherein compounds similar in structure to the specific reactants above (compounds similar to compounds of type 1.1 and 1.2), can be substituted in the reaction to provide substituted N-heterocyclic phosphine halide intermediates similar to Formula 1.3.

2. Route II

In one aspect, substituted N-heterocyclic phosphine analogs can be prepared as shown below.

SCHEME 2A.

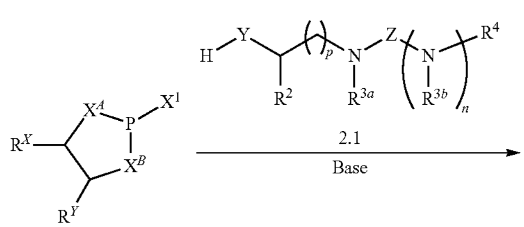

1.3

-continued

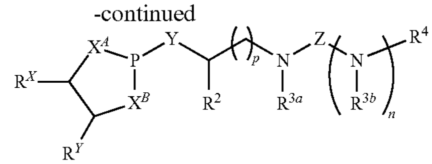

2.2

Compounds are represented in generic form, with substituents as noted in compound descriptions elsewhere herein, wherein $X^1$ is halogen, and wherein Y is selected from O, S, and $NR^{26}$. A more specific example is set forth below.

SCHEME 2B

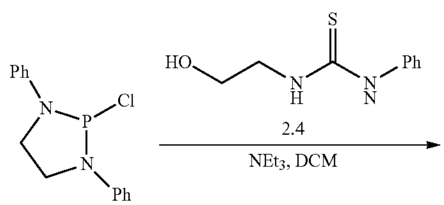

2.3

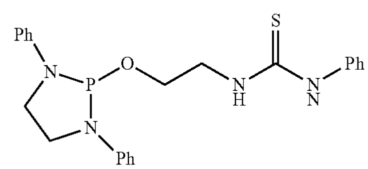

2.5

In one aspect, the synthesis of N-heterocyclic phosphine analogs can begin with an N-heterocyclic phosphine halide. N-heterocyclic phosphine halides are commercially available or readily prepared by one skilled in the art. Thus, compounds of type 2.5, and similar compounds, can be prepared according to reaction Scheme 2B above. Compounds of type 2.5 can be prepared by a substitution reaction of an appropriate N-heterocyclic phosphine halide, e.g., 2.3 as shown above. The substitution reaction is carried out in the presence of an appropriate urea, thiourea, sulfonyl, or sulfonyl derivative, e.g., 2.4 as shown above, and an appropriate base, e.g., triethylamine, in an appropriate solvent, e.g., dichloromethane. As can be appreciated by one skilled in the art, the above reaction provides an example of a generalized approach wherein compounds similar in structure to the specific reactants above (compounds similar to compounds of type 1.3 and 2.1), can be substituted in the reaction to provide substituted N-heterocyclic phosphine analogs similar to Formula 2.3.

D. Vinylphosphonates

In one aspect, the invention relates to vinylphosphonates useful as intermediates in, for example, the synthesis of Doxapram, a known respiratory stimulant. The use of the disclosed vinylphosphonates as intermediates in the synthesis of other pharmaceutically active compounds is also envisioned.

It is contemplated that each disclosed derivative can be optionally further substituted. It is also contemplated that any one or more derivative can be optionally omitted from the invention. It is understood that a disclosed compound can be provided by the disclosed methods. It is also understood that the disclosed compounds can be employed in the disclosed methods of using.

1. Structure

In one aspect, compounds having a structure represented by a formula:

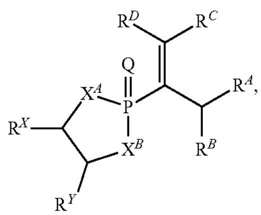

wherein Q is selected from O, S, and $NR^{26}$; wherein $R^{26}$, when present, is selected from hydrogen and C1-C8 alkyl; wherein each of $X^A$ and $X^B$ is independently selected from $NR^1$, O, and S; wherein each occurrence of $R^1$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each occurrence of $R^1$, when present, is independently substituted with 0, 1, 2, 3, or 4 independently selected $R^5$ groups; wherein each of $R^X$ and $R^Y$ is independently selected from hydrogen, C6-C10 aryl, and 4-10 membered heteroaryl, or wherein each of $R^X$ and $R^Y$ are optionally covalently bonded together and, together with the intermediate carbon atoms, comprise a 5- to 7-membered cycloalkyl or 5- to 7-membered aryl; wherein $R^A$ is an electron withdrawing group; wherein $R^B$ is selected from hydrogen, C1-C6 alkyl, C2-C6 alkylene, C3-C10 cycloalkyl, 4-10 membered heterocycloalkyl, C6-C10 aryl, —(C1-C3 alkyl)(C6-C10 aryl), and 4-10 membered heteroaryl, and wherein $R^B$ is substituted with 0, 1, 2, 3, or 4 independently selected $R^6$ groups; and wherein each of $R^C$ and $R^D$ is independently selected from hydrogen, C1-C6 alkyl, C3-C10 cycloalkyl, 4-10 membered heterocycloalkyl, C6-C10 aryl, and 4-10 membered heteroaryl, and wherein each of $R^C$ and $R^D$ is independently substituted with 0, 1, 2, 3, or 4 independently selected $R^6$ groups, or wherein each of $R^C$ and $R^D$ are optionally covalently bonded together and, together with the intermediate carbon atoms, comprise a 3- to 10-membered cycloalkyl; wherein each occurrence of $R^5$, when present, is independently selected from halogen, $—NO_2$, —CN, —OH, —SH, $—NH_2$, C1-C3 alkyl, C2-C4 alkenyl, C2-C4 alkynyl, C1-C3 haloalkyl, C1-C3 cyanoalkyl, C1-C3 hydroxyalkyl, C1-C3 haloalkoxy, C1-C3 alkoxy, C1-C3 thioalkyl, C1-C3 alkyl(C1-C3 alkoxy), C1-C3 alkylamino, (C1-C3)(C1-C3) dialkylamino, C3-C7 cycloalkyl, C6-C10 aryl, —(C═O)(C1-C3 alkyl), —(S═O)(C1-C3 alkyl), $—SO_2$(C1-C3 alkyl), $—CO_2R^{11}$, —(C═O)$NR^{12a}R^{12b}$, $—SO_2NR^{12a}R^{12b}$, —O(C═O)$NR^{12a}R^{12b}$, $—NHSO_2NR^{12a}R^{12b}$, and —NH(C═O)$NR^{12a}R^{12b}$; wherein each occurrence of $R^{11}$, when present, is independently selected from hydrogen and C1-C4 alkyl; wherein each occurrence of $R^{12a}$ and $R^{12b}$, when present, is independently selected from hydrogen and C1-C3 alkyl; and wherein each occurrence of $R^6$, when present, is independently selected from halogen, $—NO_2$, $—CO_2$(C1-C3 alkyl), C1-C3 alkyl, C1-C3 haloalkyl, C1-C3 alkoxy, C1-C3 alkoxycarbonyl, C3-C7 cycloalkyl, and phenyl, or a derivative thereof.

In one aspect, compounds having a structure represented by a formula:

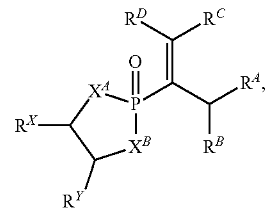

wherein each of $X^A$ and $X^B$ is independently selected from $NR^1$, O, and S; wherein each occurrence of $R^1$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each occurrence of $R^1$, when present, is independently substituted with 0, 1, 2, 3, or 4 independently selected $R^5$ groups; wherein each of $R^X$ and $R^Y$ is independently selected from hydrogen, C6-C10 aryl, and 4-10 membered heteroaryl, or wherein each of $R^X$ and $R^Y$ are optionally covalently bonded together and, together with the intermediate carbon atoms, comprise a 5- to 7-membered cycloalkyl or 5- to 7-membered aryl; wherein $R^A$ is an electron withdrawing group; wherein $R^B$ is selected from hydrogen, C1-C6 alkyl, C2-C6 alkylene, C3-C10 cycloalkyl, 4-10 membered heterocycloalkyl, C6-C10 aryl, —(C1-C3 alkyl)(C6-C10 aryl), and 4-10 membered heteroaryl, and wherein $R^B$ is substituted with 0, 1, 2, 3, or 4 independently selected $R^6$ groups; and wherein each of $R^C$ and $R^D$ is independently selected from hydrogen, C1-C6 alkyl, C3-C10 cycloalkyl, 4-10 membered heterocycloalkyl, C6-C10 aryl, and 4-10 membered heteroaryl, and wherein each of $R^C$ and $R^D$ is independently substituted with 0, 1, 2, 3, or 4 independently selected $R^6$ groups, or wherein each of $R^C$ and $R^D$ are optionally covalently bonded together and, together with the intermediate carbon atoms, comprise a 3- to 10-membered cycloalkyl; wherein each occurrence of $R^5$, when present, is independently selected from halogen, $—NO_2$, —CN, —OH, —SH, $—NH_2$, C1-C3 alkyl, C2-C4 alkenyl, C2-C4 alkynyl, C1-C3 haloalkyl, C1-C3 cyanoalkyl, C1-C3 hydroxyalkyl, C1-C3 haloalkoxy, C1-C3 alkoxy, C1-C3 thioalkyl, C1-C3 alkyl(C1-C3 alkoxy), C1-C3 alkylamino, (C1-C3)(C1-C3) dialkylamino, C3-C7 cycloalkyl, C6-C10 aryl, —(C═O)(C1-C3 alkyl), —(S═O)(C1-C3 alkyl), $—SO_2$(C1-C3 alkyl), $—CO_2R^{11}$, $—SO_2NR^{12a}R^{12b}$, —O(C═O)$NR^{12a}R^{12b}$, $—NHSO_2NR^{12a}R^{12b}$, and —NH(C═O)$NR^{12a}R^{12b}$; wherein each occurrence of $R^{11}$, when present, is independently selected from hydrogen and C1-C4 alkyl; wherein each occurrence of $R^{12a}$ and $R^{12b}$, when present, is independently selected from hydrogen and C1-C3 alkyl; and wherein each occurrence of $R^6$, when present, is independently selected from halogen, $—NO_2$, $—CO_2$(C1-C3 alkyl), C1-C3 alkyl, C1-C3 haloalkyl, C1-C3 alkoxy, C1-C3 alkoxycarbonyl, and phenyl, or a derivative thereof are disclosed.

In a further aspect, the compound has a structure represented by a formula:

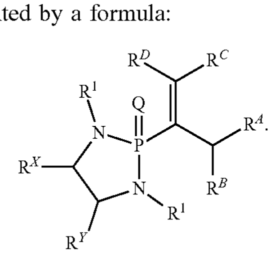

In a further aspect, the compound has a structure represented by a formula selected from:

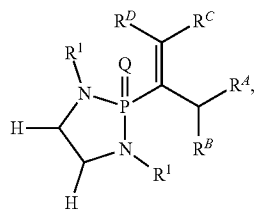

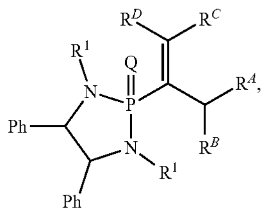

and

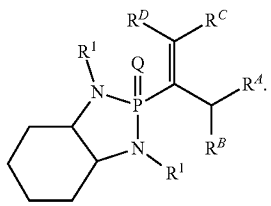

In a further aspect, the compound has a structure represented by a formula:

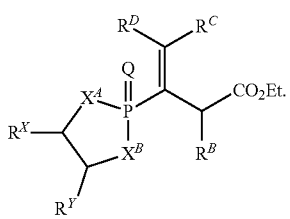

In a further aspect, the compound has a structure represented by a formula:

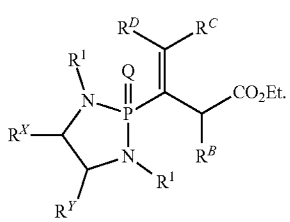

In a further aspect, the compound has a structure represented by a formula:

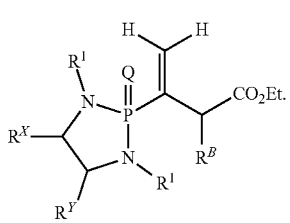

2. Vinylphosphonate Examples

In one aspect, a compound is selected from:

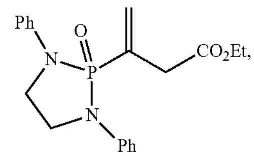

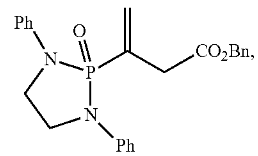

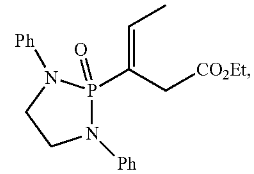

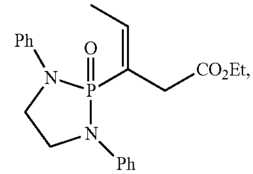

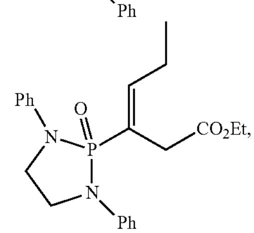

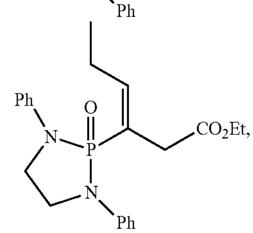

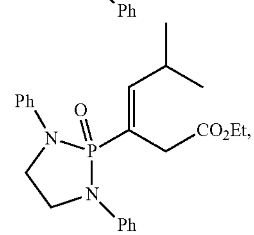

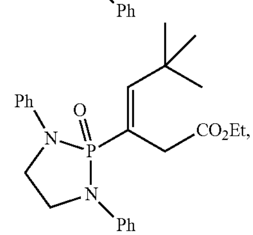

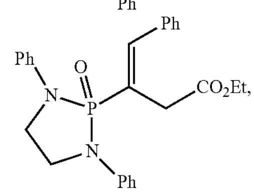

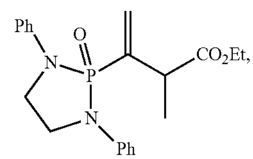

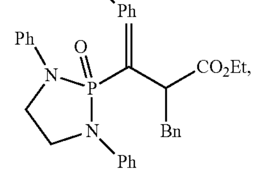

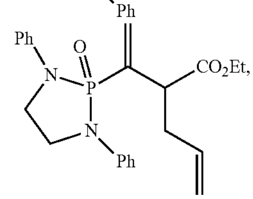

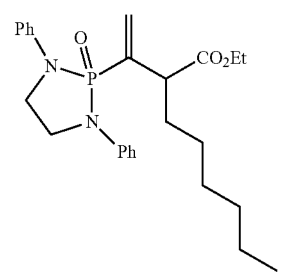

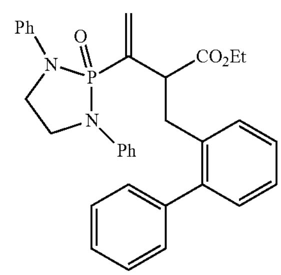

-continued
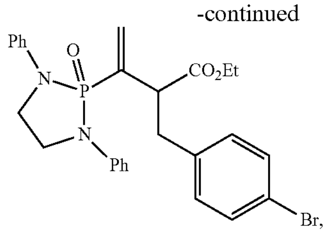
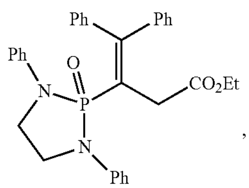
,
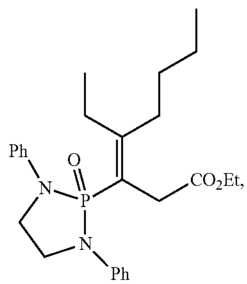
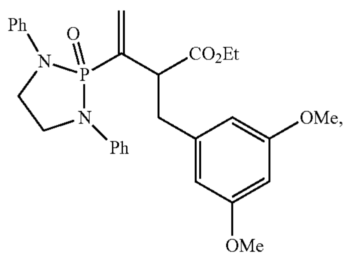
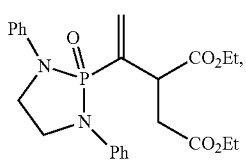
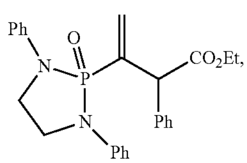
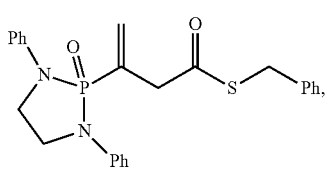
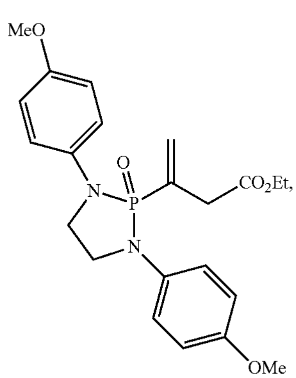
-continued
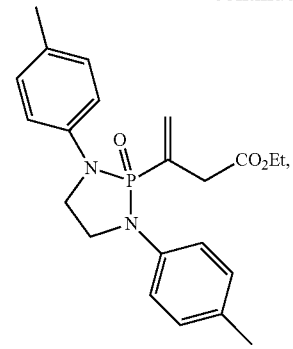
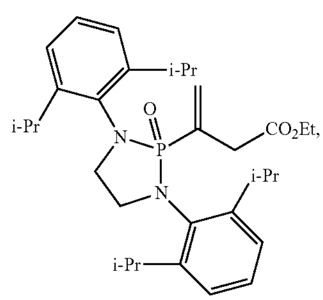
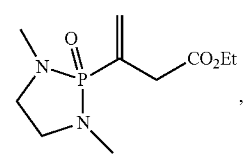
,
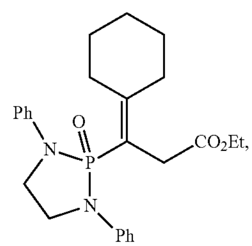
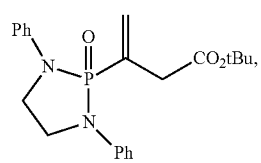
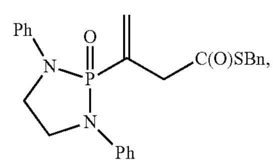
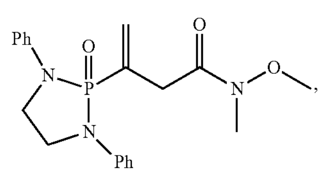
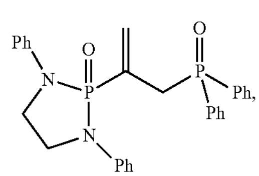
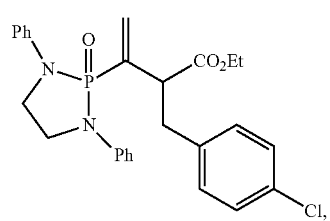

-continued
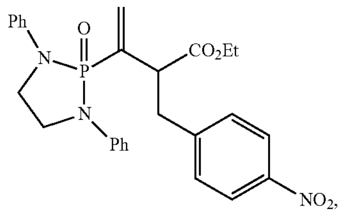
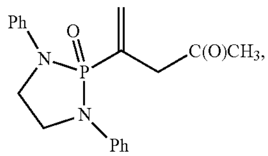
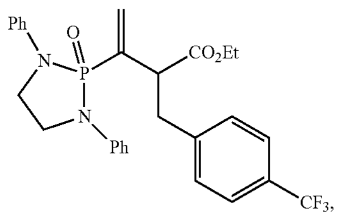
and
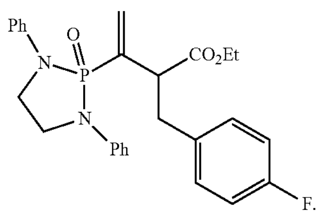
3. Prophetic Compound Examples
The following compound examples are prophetic, and can be prepared using the synthesis methods described herein above and other general methods as needed as would be known to one skilled in the art. Thus, in one aspect, a compound can be present selected from:
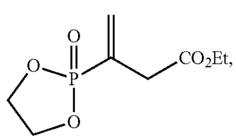
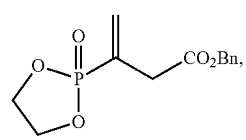
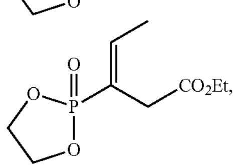
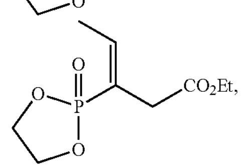
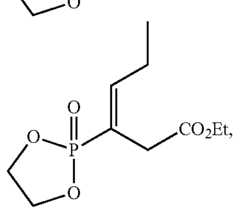
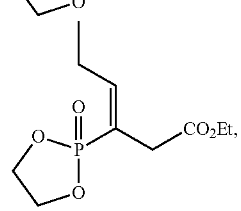
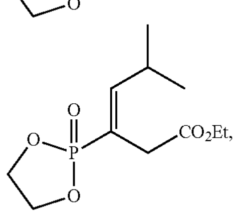
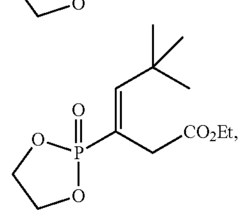
-continued
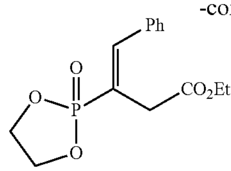
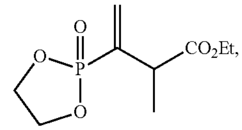
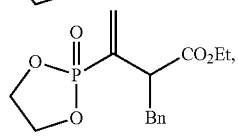
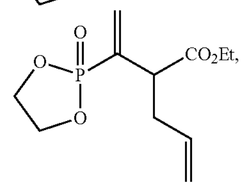
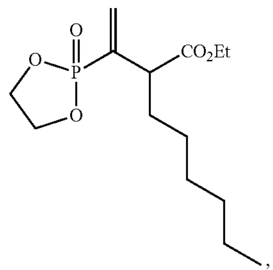
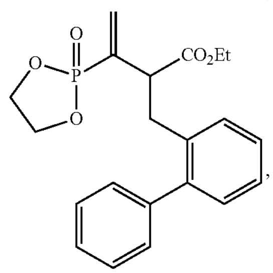
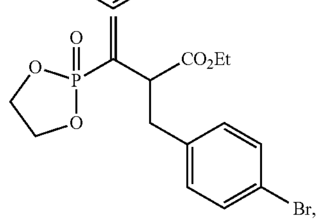
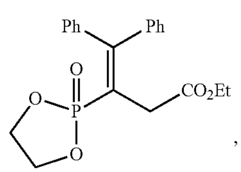
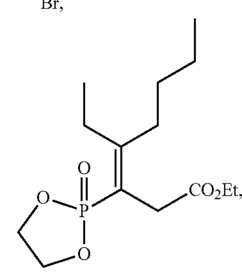
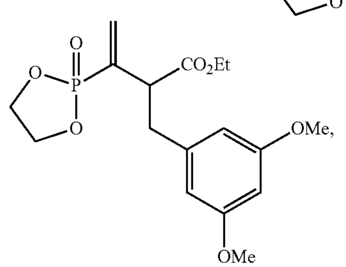
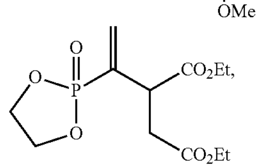
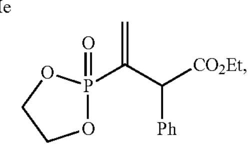

-continued
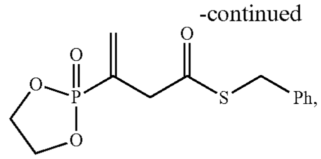
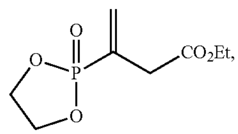
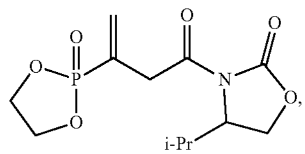
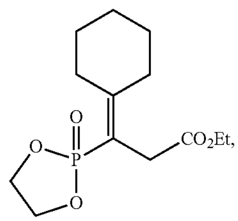
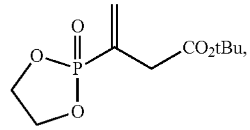
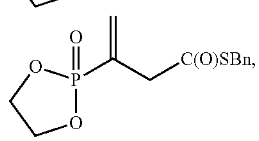
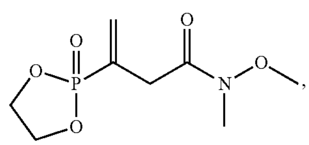
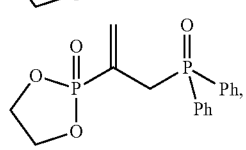
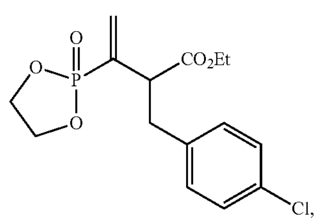
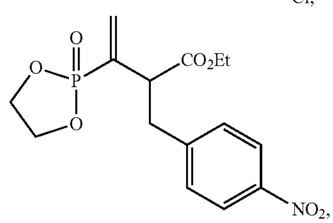
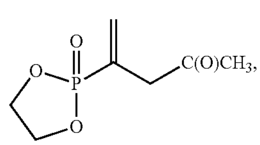
-continued
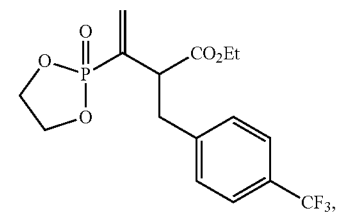
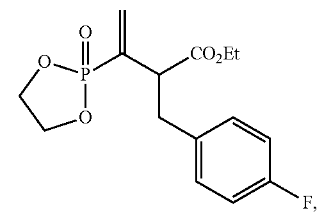
and
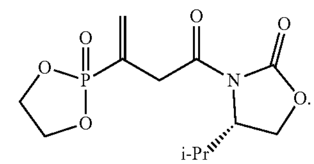
In one aspect, a compound can be selected from:
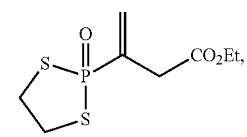
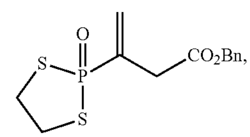
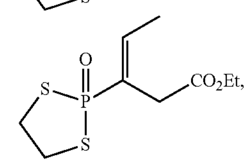
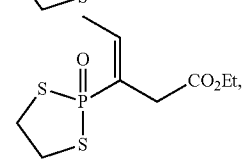
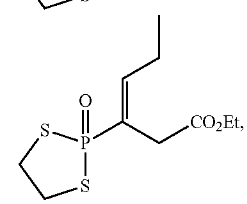
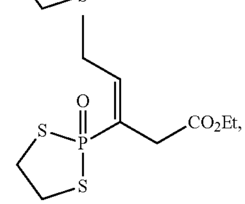
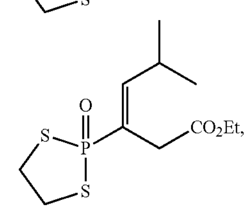
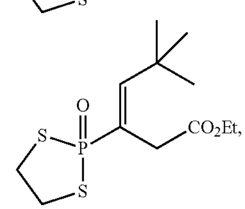
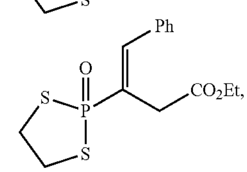
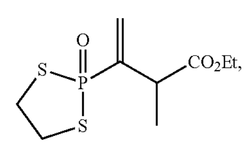
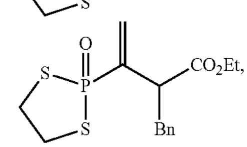
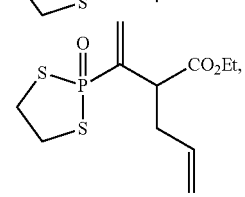

-continued
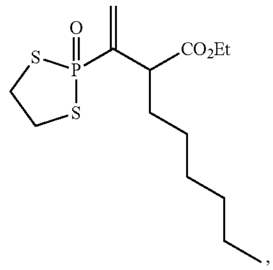
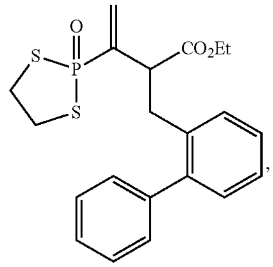
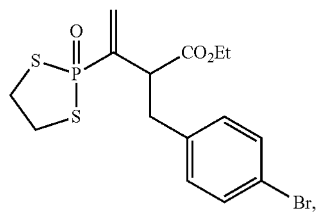
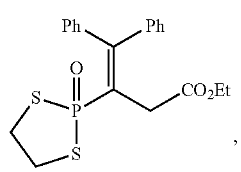
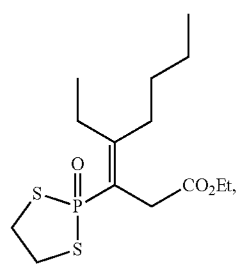
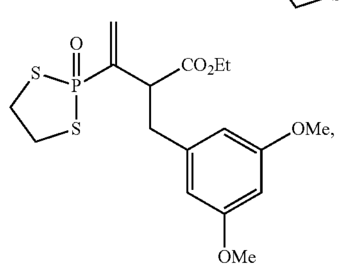
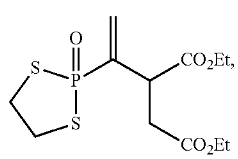
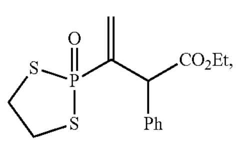
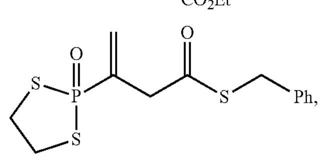
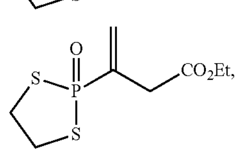
-continued
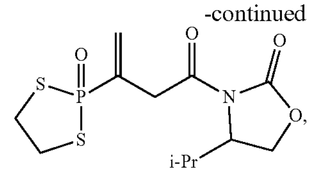
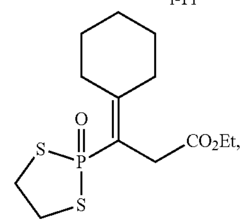
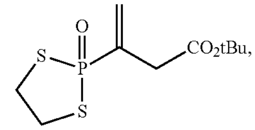
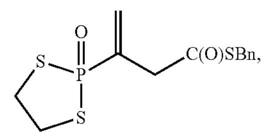
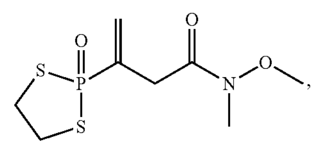
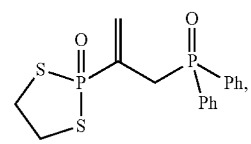
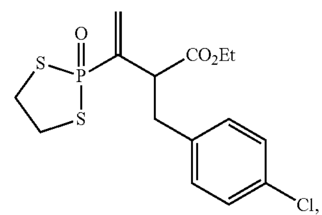
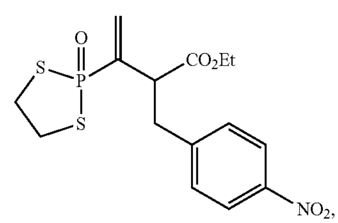
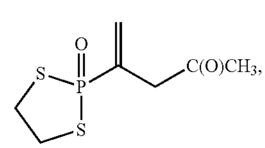
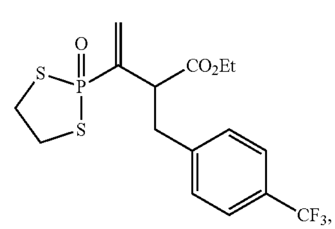

-continued
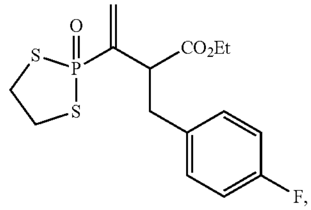
and
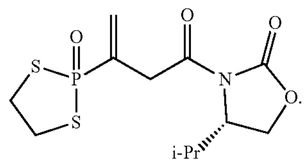
In one aspect, a compound can be selected from:
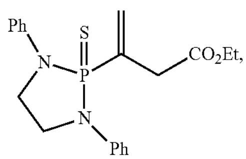
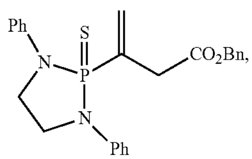
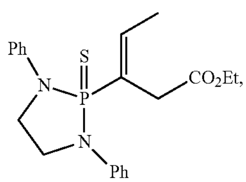
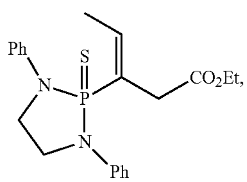
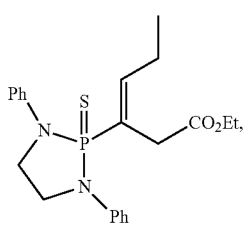
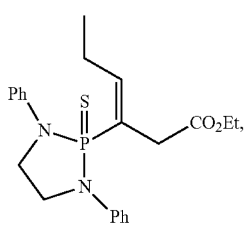
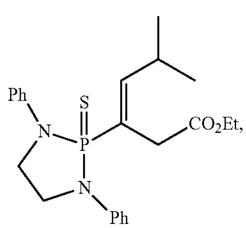
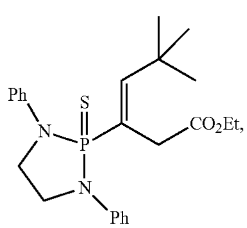
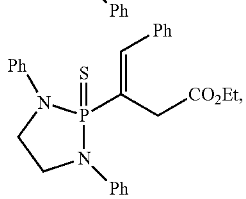
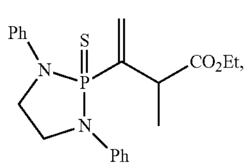
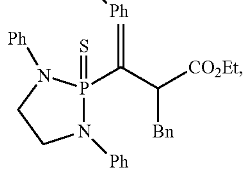
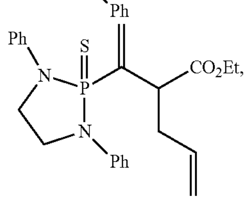
-continued
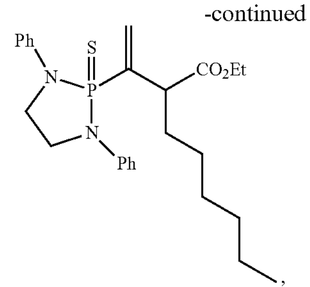
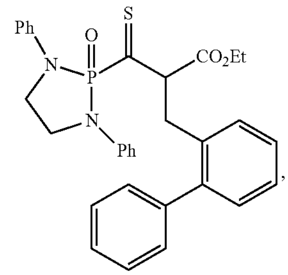
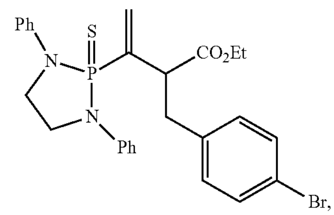
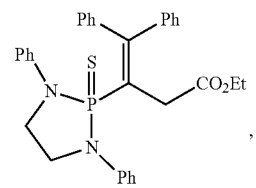
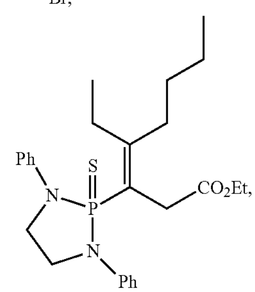
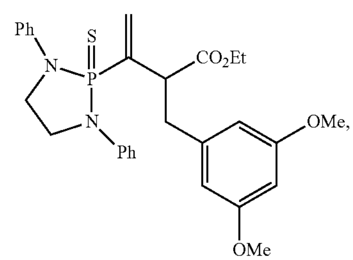
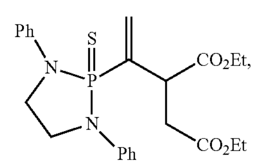
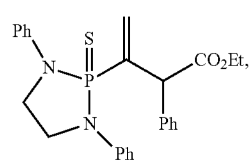
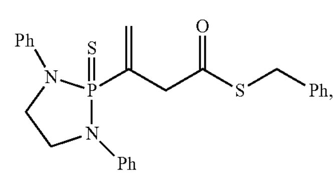

-continued
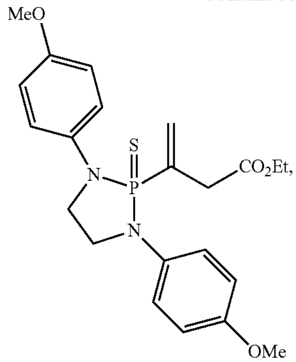
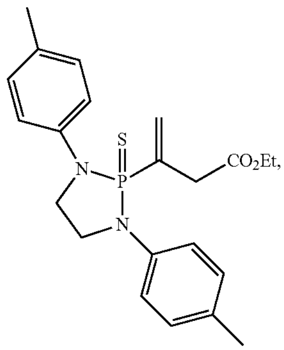
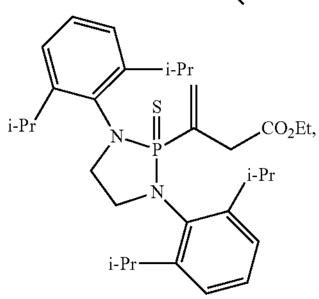
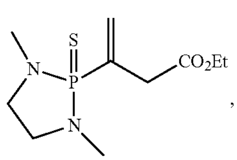
,
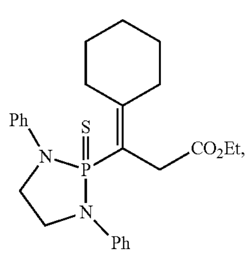
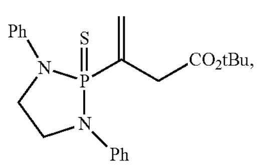
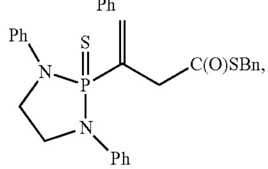
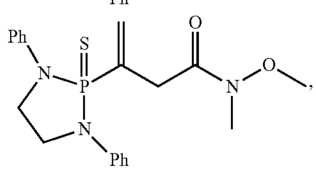
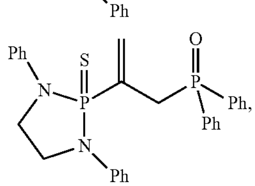
-continued
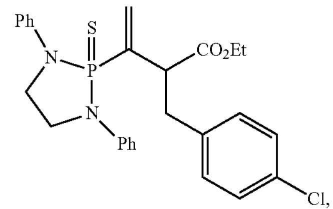
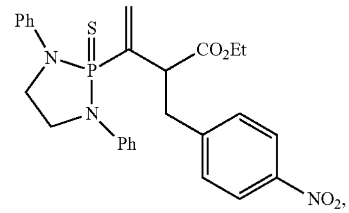
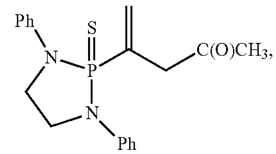
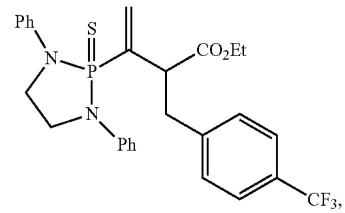
and
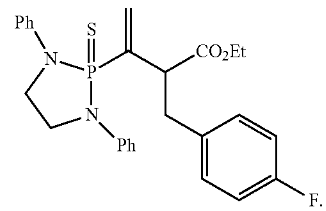
In one aspect, a compound can be selected from:
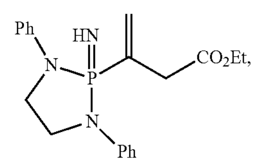
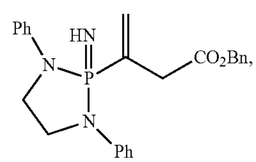
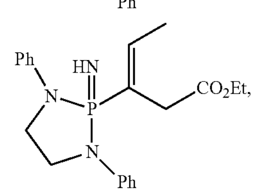
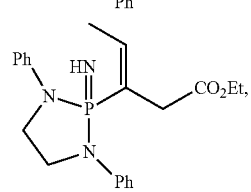
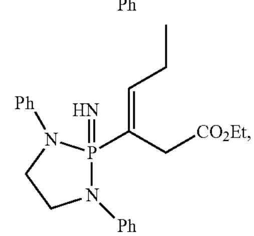
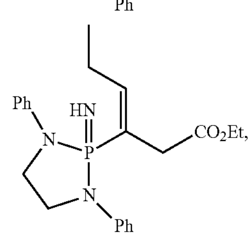

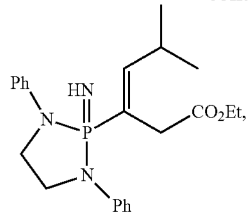
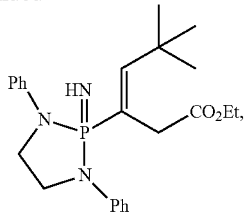
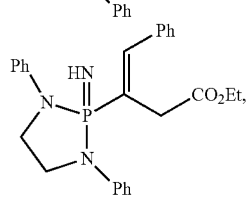
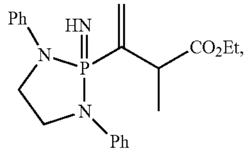
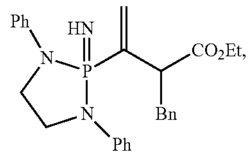
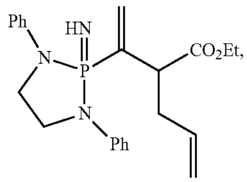
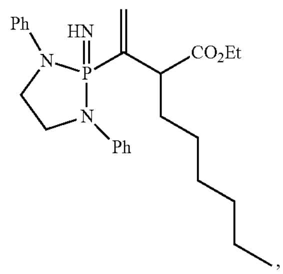
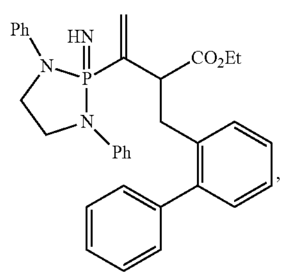
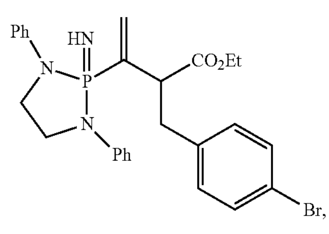
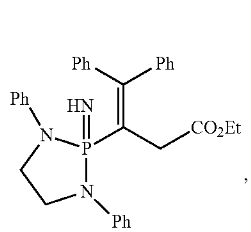
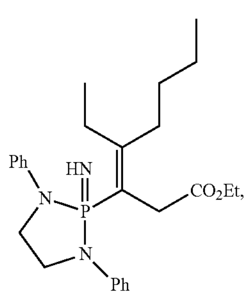
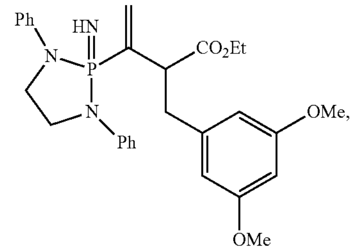
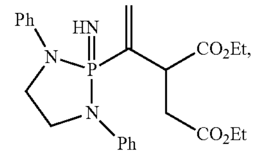
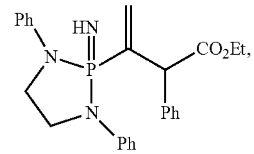
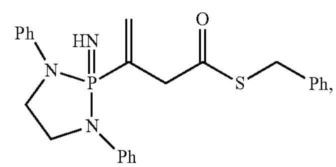
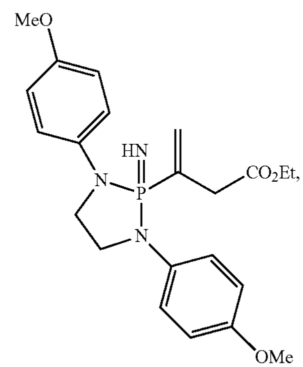
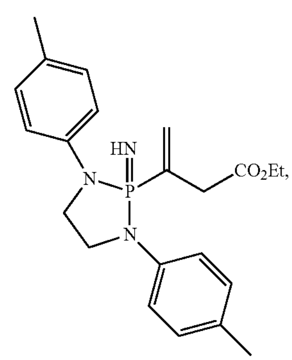
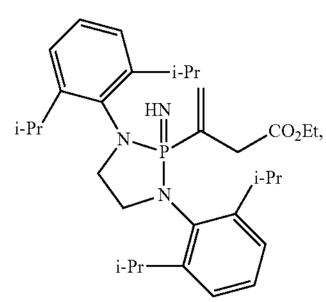

-continued

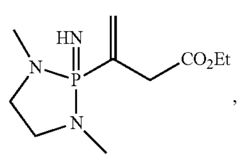

, and

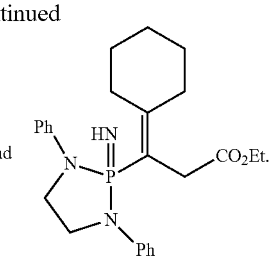

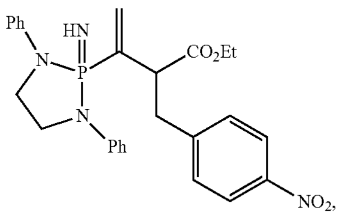

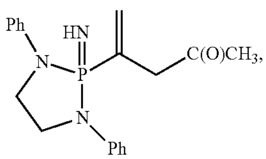

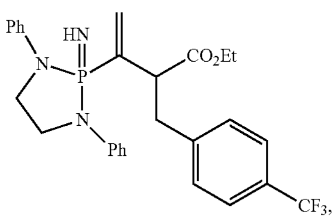

and.

E. Methods of Making Vinylphosphonates

In one aspect, the invention relates to methods of making N-heterocyclic phosphines useful in the preparation of vinylphosphonates. The vinylphosphonates of this invention can be prepared by employing reactions as shown in the following schemes, in addition to other standard manipulations that are known in the literature, exemplified in the experimental sections or clear to one skilled in the art. For clarity, examples having a single substituent are shown where multiple substituents are allowed under the definitions disclosed herein.

Thus, in one aspect, the invention relates to a process of preparing a compound or salt of Formula (II):

(II)

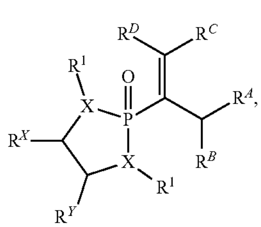

is provided, comprising reacting a compound or salt of Formula (III):

(III)

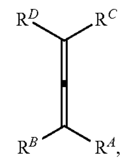

with a compound or salt of Formula (I):

(I)

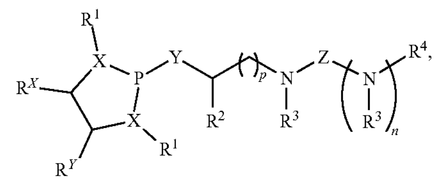

wherein the compound of Formula (I) (e.g., a compound of Formula (Ia), (Ib), (Ic), (Id), (Ie), (If), (Ig), and/or (Ih)) is defined as described herein; variables $R^1$, X, $R^X$, and $R^Y$ of Formula (II) are defined according to the definitions described herein for compounds of Formula (I) (e.g., a compound of Formula (Ia), (Ib), (Ic), (Id), (Ie), (If), (Ig), and/or (Ih)); $R^A$ is an electron withdrawing group; $R^B$ is selected from the group consisting of H, $C_{1-6}$ alkyl, $C_{2-6}$ alkylene, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^6$ groups; $R^C$ and $R^D$ re each independently selected from the group consisting of H, $C_{1-6}$ alkyl, $C_{3-10}$ cycloalkyl, 4-10 membered heterocycloalkyl, $C_{6-10}$ aryl, and 4-10 membered heteroaryl, wherein the $C_{1-6}$ alkyl, $C_{3-10}$ cycloalkyl, 4-10 membered heterocycloalkyl, $C_{6-10}$ aryl, and 4-10 membered heteroaryl are each optionally substituted by 1, 2, 3, or 4 independently selected $R^6$ groups; or $R^C$ and $R^D$ together with the C atom to which they are attached form a $C_{3-10}$ cycloalkyl group; each $R^{a1}$, $R^{b1}$, $R^{c1}$, $R^{d1}$, and $R^{e1}$ is independently selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, and 4-10 membered heteroaryl are each optionally substituted by 1, 2, 3, or 4 independently selected $R^6$ groups; or $R^{c1}$ and $R^{d1}$ together with the N atom to which they are attached form a 4-, 5-, 6-, or 7 membered heterocycloalkyl group, which is optionally substituted with $C_{1-3}$ alkyl; and each $R^6$ is independently selected from the group consisting of H, $C_{1-3}$ alkyl, $C_{1-3}$ haloalkyl, $C_{1-3}$ alkoxy, $C_{1-3}$alkoxycarbonyl, and phenyl.

In one aspect, the invention relates to a process of preparing a compound or salt of Formula (IIb):

(IIb)

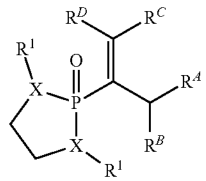

comprising reacting a compound or salt of Formula (III):

(III)

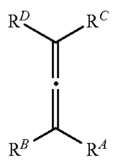

with a compound or salt of Formula (Ib):

(Ib)

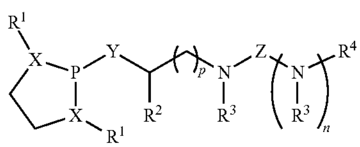

wherein: each X is independently selected from the group consisting of N, O, and S; Y is selected from the group consisting of $CH_2$, O, and S; Z is selected from the group consisting of C═O, C═S, S═O, and $SO_2$; each $R^1$ is independently selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; $R^2$ is selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; each $R^3$ is independently selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; $R^4$ is selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^5$ groups; each $R^5$ is independently selected from the group consisting of OH, $NO_2$, CN, halo, $C_{1-3}$ alkyl, $C_{2-4}$ alkenyl, $C_{2-4}$ alkynyl, $C_{1-3}$ haloalkyl, cyano-$C_{1-3}$ alkyl, HO—$C_{1-3}$ alkyl, $C_{1-3}$ alkoxy-$C_{1-3}$ alkyl, $C_{3-7}$ cycloalkyl, $C_{6-10}$ aryl, $C_{1-3}$ alkoxy, $C_{1-3}$ haloalkoxy, amino, $C_{1-3}$ alkylamino, di($C_{1-3}$ alkyl)amino, thio, $C_{1-3}$ alkylthio, $C_{1-3}$ alkylsulfinyl, $C_{1-3}$ alkylsulfonyl, carbamyl, $C_{1-3}$ alkylcarbamyl, di($C_{1-3}$ alkyl)carbamyl, carboxy, $C_{1-3}$ alkylcarbonyl, $C_{1-4}$ alkoxycarbonyl, $C_{1-3}$ alkylcarbonylamino, $C_{1-3}$ alkylsulfonylamino, aminosulfonyl, $C_{1-3}$ alkylaminosulfonyl, di($C_{1-3}$ alkyl)aminosulfonyl, aminosulfonylamino, $C_{1-3}$ alkylaminosulfonylamino, di($C_{1-3}$ alkyl)aminosulfonylamino, aminocarbonylamino, $C_{1-3}$ alkylaminocarbonylamino, and di($C_{1-3}$ alkyl)aminocarbonylamino; $R^A$ is an electron withdrawing group; $R^B$ is selected from the group consisting of H, $C_{1-6}$ alkyl, $C_{2-6}$ alkylene, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl are each optionally substituted by 1, 2, 3, or 4 independently selected $R^6$ groups; $R^C$ and $R^D$ are each independently selected from the group consisting of H, $C_{1-6}$ alkyl, $C_{3-10}$ cycloalkyl, 4-10 membered heterocycloalkyl, $C_{6-10}$ aryl, and 4-10 membered heteroaryl, wherein the $C_{1-6}$ alkyl, $C_{3-10}$ cycloalkyl, 4-10 membered heterocycloalkyl, $C_{6-10}$ aryl, and 4-10 membered heteroaryl are each optionally substituted by 1, 2, 3, or 4 independently selected $R^6$ groups; or $R^C$ and $R^D$ together with the C atom to which they are attached form a $C_{3-10}$ cycloalkyl group; each $R^{a1}$, $R^{b1}$, $R^{c1}$, $R^{d1}$, and $R^{e1}$ is independently selected from the group consisting of H, $C_{1-6}$ alkyl, $C_{1-6}$ haloalkyl, $C_{2-6}$ alkenyl, $C_{2-6}$ alkynyl, $C_{3-10}$ cycloalkyl, 4-10 membered heterocycloalkyl, $C_{6-10}$ aryl, ($C_{6-10}$ aryl)-$C_{1-3}$ alkylene-, and 4-10 membered heteroaryl, wherein the $C_{1-6}$ alkyl, $C_{3-10}$ cycloalkyl, 4-10 membered heterocycloalkyl, $C_{6-10}$ aryl, and 4-10 membered heteroaryl are each optionally substituted by 1, 2, 3, or 4 independently selected $R^6$ groups; or $R^{c1}$ and $R^{d1}$ together with the N atom to which they are attached form a 4-, 5-, 6-, or 7 membered heterocycloalkyl group, which is optionally substituted with $C_{1-3}$ alkyl; each $R^6$ is independently selected from the group consisting of H, $C_{1-3}$ alkyl, $C_{1-3}$ haloalkyl, $C_{1-3}$ alkoxy, $C_{1-3}$ alkoxycarbonyl, and phenyl; n is 0 or 1; p is 0, 1, 2, 3, 4, or 5.

In one aspect, the invention relates to methods of making a vinylphosphonate having a structure represented by a formula:

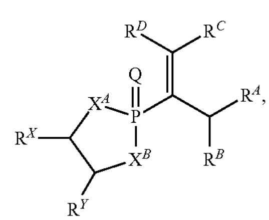

wherein Q is selected from O, S, and $NR^{26}$; wherein $R^{26}$, when present, is selected from hydrogen and C1-C8 alkyl; wherein each of $X^A$ and $X^B$ is independently selected from $NR^1$, O, and S; wherein each occurrence of $R^1$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each occurrence of $R^1$, when present, is independently substituted with 0, 1, 2, 3, or 4 independently selected $R^5$ groups; wherein each of $R^X$ and $R^Y$ is independently selected from hydrogen, C6-C10 aryl, and 4-10 membered heteroaryl, or wherein each of $R^X$ and $R^Y$ are optionally covalently bonded together and, together with the intermediate carbon atoms, comprise a 5- to 7-membered cycloalkyl or 5- to 7-membered aryl; wherein $R^A$ is an electron withdrawing group; wherein $R^B$ is selected from hydrogen, C1-C6 alkyl, C2-C6 alkylene, C3-C10 cycloalkyl, 4-10 membered heterocycloalkyl, C6-C10 aryl, —(C1-C3 alkyl)(C6-C10 aryl), and 4-10 membered heteroaryl, and wherein $R^B$ is substituted with 0, 1, 2, 3, or 4 independently selected $R^6$ groups; and wherein each of $R^C$ and $R^D$ is independently selected from hydrogen, C1-C6 alkyl, C3-C10 cycloalkyl, 4-10 membered heterocycloalkyl, C6-C10 aryl, and 4-10 membered heteroaryl, and wherein each of $R^C$ and $R^D$ is independently substituted with 0, 1, 2, 3, or 4 independently selected $R^6$ groups, or wherein each of $R^C$ and $R^D$ are optionally covalently bonded together and, together with the intermediate carbon atoms, comprise a 3- to 10-membered cycloalkyl; wherein each occurrence of $R^5$, when present, is independently selected from halogen, $—NO_2$, —CN, —OH, —SH, $—NH_2$, C1-C3 alkyl, C2-C4 alkenyl, C2-C4 alkynyl, C1-C3 haloalkyl, C1-C3 cyanoalkyl, C1-C3 hydroxyalkyl, C1-C3 haloalkoxy, C1-C3 alkoxy, C1-C3 thioalkyl, C1-C3 alkyl(C1-C3 alkoxy), C1-C3 alkylamino, (C1-C3)(C1-C3) dialkylamino, C3-C7 cycloalkyl, C6-C10 aryl, —(C═O)(C1-C3 alkyl), —(S═O)(C1-C3 alkyl), $—SO_2$(C1-C3 alkyl), $—CO_2R^{11}$, —(C═O)$NR^{12a}R^{12b}$, $—SO_2NR^{12a}R^{12b}$, —O(C═O)$NR^{12a}R^{12b}$, $—NHSO_2NR^{12a}R^{12b}$, and —NH(C═O)$NR^{12a}R^{12b}$; wherein each occurrence of $R^{11}$, when present, is independently selected from hydrogen and C1-C4 alkyl; wherein each occurrence of $R^{12a}$ and $R^{12b}$, when present, is independently selected from hydrogen and C1-C3 alkyl; and wherein each occurrence of $R^6$, when present, is independently selected from halogen, $—NO_2$, $—CO_2$(C1-C3 alkyl), C1-C3 alkyl, C1-C3 haloalkyl, C1-C3 alkoxy, C1-C3 alkoxycarbonyl, C3-C7 cycloalkyl, and phenyl, or a derivative thereof, the method comprising the step of reacting an allene having a structure represented by a formula:

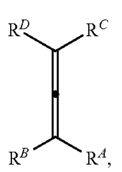

or a derivative thereof, with a compound having a structure represented by a formula:

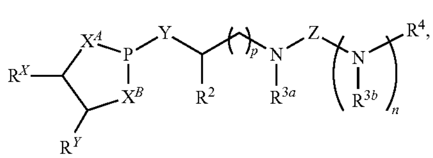

wherein n is selected from 0 and 1; wherein p is selected from 0, 1, 2, 3, 4, and 5; wherein Y is selected from O, S, and $NR^{26}$; wherein $R^{26}$, when present, is selected from hydrogen and C1-C8 alkyl; wherein Z is selected from C═O, C═S, S═O, and $SO_2$; wherein each of $R^X$ and $R^Y$ is independently selected from hydrogen, C6-C10 aryl, and 4-10 membered heteroaryl, or wherein each of $R^X$ and $R^Y$ are optionally covalently bonded together and, together with the intermediate carbon atoms, comprise a 5- to 7-membered cycloalkyl or 5- to 6-membered aryl; wherein $R^2$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein $R^2$ is substituted with 0, 1, 2, 3, or 4 independently selected $R^5$ groups; wherein each of $R^{3a}$ and $R^{3b}$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each of $R^{3a}$ and $R^{3b}$ is independently substituted with 0, 1, 2, 3, or 4 independently selected $R^5$ groups; and wherein $R^4$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, and 4-10 membered heteroaryl, and —(C1-C3 alkyl)(C6-C10 aryl), and wherein $R^4$ is substituted with 0, 1, 2, 3, or 4 independently selected $R^5$ groups, or a derivative thereof.

In one aspect, the invention relates to methods of making a vinylphosphonate having a structure represented by a formula:

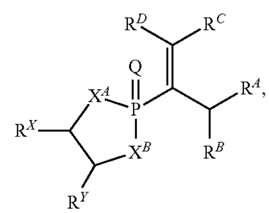

wherein each of $X^A$ and $X^B$ is independently selected from $NR^1$, O, and S; wherein each occurrence of $R^1$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each occurrence of $R^1$, when present, is independently substituted with 0, 1, 2, 3, or 4 independently selected $R^5$ groups; wherein each of $R^X$ and $R^Y$ is independently selected from hydrogen, C6-C10 aryl, and 4-10 membered heteroaryl, or wherein each of $R^X$ and $R^Y$ are optionally covalently bonded together and, together with the intermediate carbon atoms, comprise a 5- to 7-membered cycloalkyl or 5- to 7-membered aryl; wherein $R^A$ is an electron withdrawing group; wherein $R^B$ is selected from hydrogen, C1-C6 alkyl, C2-C6 alkylene, C3-C10 cycloalkyl, 4-10 membered heterocycloalkyl, C6-C10 aryl, —(C1-C3 alkyl)(C6-C10 aryl), and 4-10 membered heteroaryl, and wherein $R^B$ is substituted with 0, 1, 2, 3, or 4 independently selected $R^6$ groups; and wherein each of $R^C$ and $R^D$ is independently selected from hydrogen, C1-C6 alkyl, C3-C10 cycloalkyl, 4-10 membered heterocycloalkyl, C6-C10 aryl, and 4-10 membered heteroaryl, and wherein each of $R^C$ and $R^D$ is independently substituted with 0, 1, 2, 3, or 4 independently selected $R^6$ groups, or wherein each of $R^C$ and $R^D$ are optionally covalently bonded together and, together with the intermediate carbon atoms, comprise a 3- to 10-membered cycloalkyl; wherein each occurrence of $R^5$, when present, is independently selected from halogen, $—NO_2$, —CN, —OH, —SH, $—NH_2$, C1-C3 alkyl, C2-C4 alkenyl, C2-C4 alkynyl, C1-C3 haloalkyl, C1-C3 cyanoalkyl, C1-C3 hydroxyalkyl, C1-C3 haloalkoxy, C1-C3 alkoxy, C1-C3 thioalkyl, C1-C3 alkyl(C1-C3 alkoxy), C1-C3 alkylamino, (C1-C3)(C1-C3) dialkylamino, C3-C7 cycloalkyl, C6-C10 aryl, —(C═O)(C1-C3 alkyl), —(S═O)(C1-C3 alkyl), —$SO_2$(C1-C3 alkyl), —$CO_2R^{11}$, —$SO_2NR^{12a}R^{12b}$, —O(C═O)$NR^{12a}R^{12b}$, —$NHSO_2NR^{12a}R^{12b}$, and —NH(C═O)$NR^{12a}R^{12b}$; wherein each occurrence of $R^1$, when present, is independently selected from hydrogen and C1-C4 alkyl; wherein each occurrence of $R^{12a}$ and $R^{12b}$, when present, is independently selected from hydrogen and C1-C3 alkyl; and wherein each occurrence of $R^6$, when present, is independently selected from halogen, —$NO_2$, —$CO_2$(C1-C3 alkyl), C1-C3 alkyl, C1-C3 haloalkyl, C1-C3 alkoxy, C1-C3 alkoxycarbonyl, and phenyl, or a derivative thereof, the method comprising the step of reacting an allene having a structure represented by a formula:

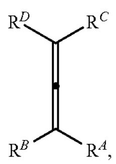

or a derivative thereof, with a compound having a structure represented by a formula:

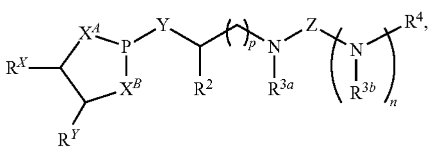

wherein n is selected from 0 and 1; wherein p is selected from 0, 1, 2, 3, 4, and 5; wherein Y is selected from $CH_2$, O, and S; wherein Z is selected from C═O, C═S, S═O, and $SO_2$; wherein each of $R^X$ and $R^Y$ is independently selected from hydrogen, C6-C10 aryl, and 4-10 membered heteroaryl, or wherein each of $R^X$ and $R^Y$ are optionally covalently bonded together and, together with the intermediate carbon atoms, comprise a 5- to 7-membered cycloalkyl or 5- to 6-membered aryl; wherein $R^2$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein $R^2$ is substituted with 0, 1, 2, 3, or 4 independently selected $R^5$ groups; wherein each of $R^{3a}$ and $R^{3b}$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each of $R^{3a}$ and $R^{3b}$ is independently substituted with 0, 1, 2, 3, or 4 independently selected $R^5$ groups; and wherein $R^4$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, and 4-10 membered heteroaryl, and —(C1-C3 alkyl)(C6-C10 aryl), and wherein $R^4$ is substituted with 0, 1, 2, 3, or 4 independently selected $R^5$ groups, or a derivative thereof.

In various aspects, the salt of the compound of Formula (I) is a pharmaceutically acceptable salt. In various aspects, the salt of the compound of Formula (II) is a pharmaceutically acceptable salt. In various aspects, the salt of the compound of Formula (III) is a pharmaceutically acceptable salt.

Non-limiting examples of compounds of Formula (III) include:

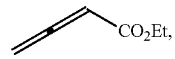

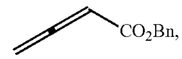

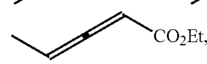

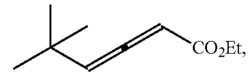

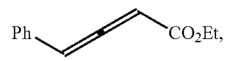

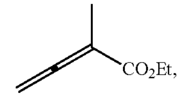

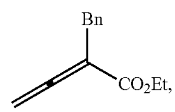

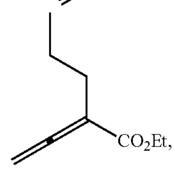

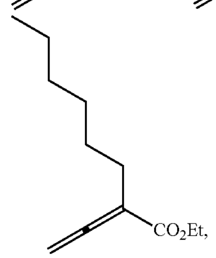

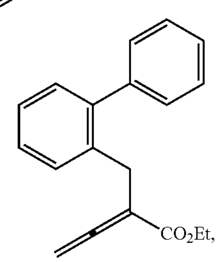

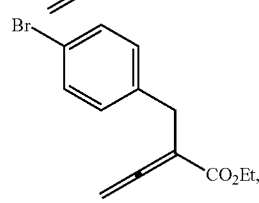

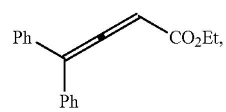

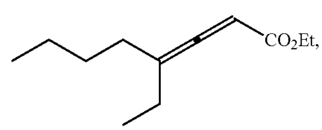

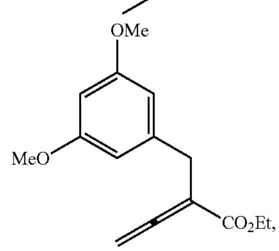

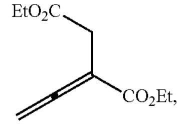

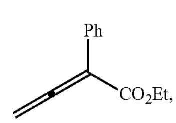

and

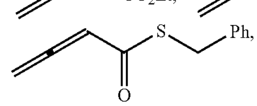

or a salt thereof.

In various aspects, the salt is a pharmaceutically acceptable salt.

Non-limiting examples of compounds of Formula (IIa) or (IIb) include:
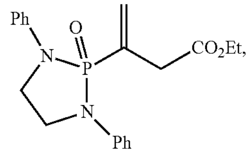
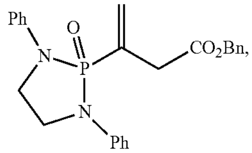
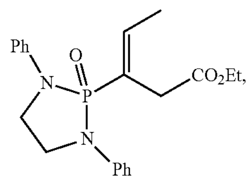
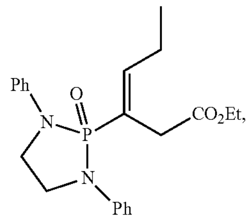
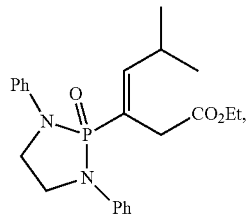
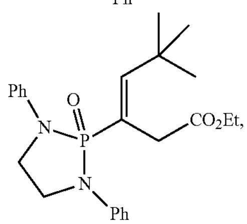
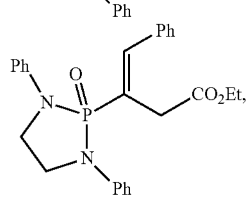
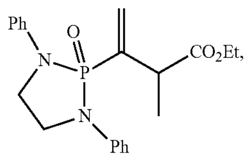
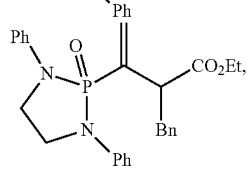
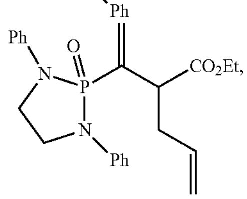
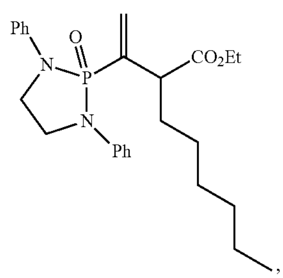
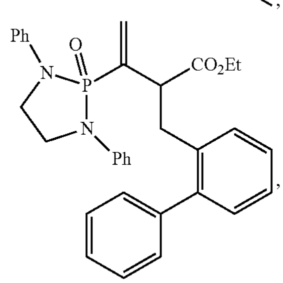
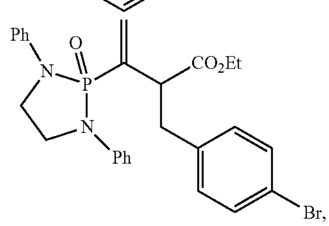
-continued
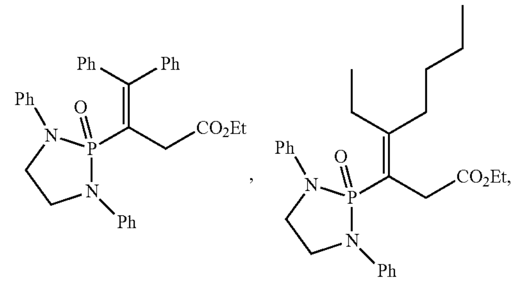
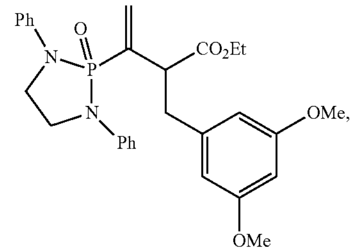
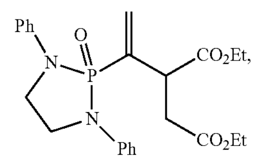
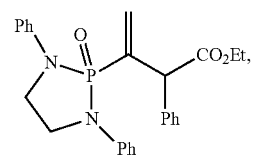
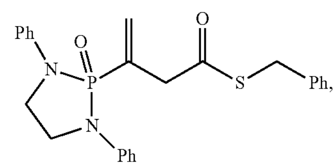
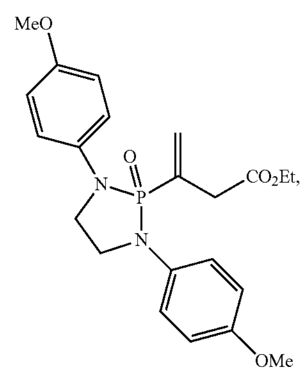
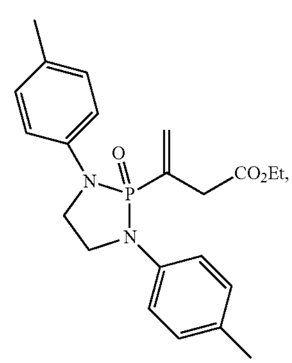

-continued

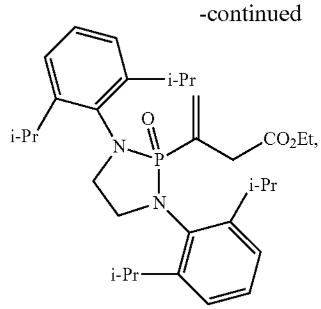

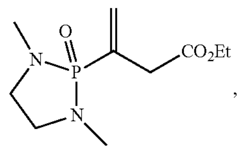

,

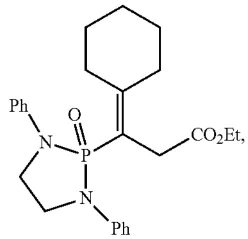

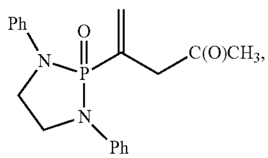

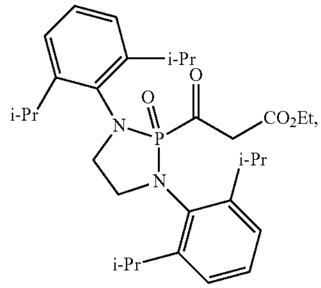

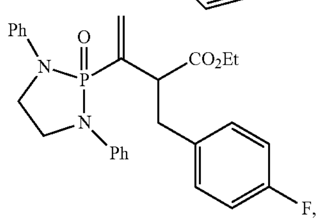

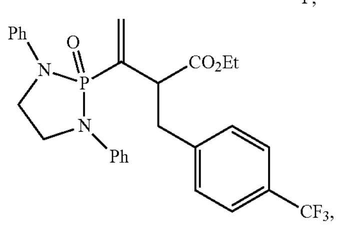

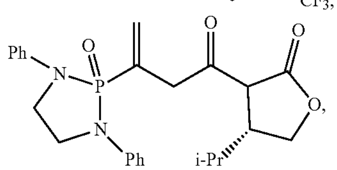

and

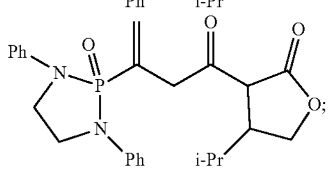

or a salt thereof.

In various aspects, the salt is a pharmaceutically acceptable salt.

In various aspects, the compound of Formula (IIa) or (IIb) is:

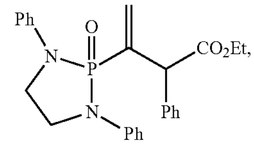 [SMILES: C=C(C(C(=O)OCC)c1ccccc1)P1(=O)N(c2ccccc2)CCN1c1ccccc1]

or a salt thereof.

In various aspects, the salt is a pharmaceutically acceptable salt.

In various aspects, the process provided herein can be used to prepare bioactive compounds having a phosphorus-carbon bond. A non-limiting list of bioactive compounds that can be prepared includes, for example, tamiphoshor (see *Angew. Chem. Int. Ed.* 2008, 47, 5788-5791); phosphorus chromones (see *Tetrahedron* 2014, 70, 417-426); inhibitors of Farnesyl Protein Transferase (see *Bioorg. Med. Chem.,* 1998, 6, 687-694); anti-inflammatory compounds (e.g., (E)-diethyl (2-(3-hydroxy-3-phenylpropyl)hex-1-en-1-yl)phosphonate; see *Eur. J. Pharmacol.* 2007, 556, 9-13); and antibiotics (e.g., dehydrophos and fosfomycin; see *PNAS,* 2010, 107, 17557-17562).

In various aspects, the process can be run at a temperature from about 0° C. to about 40° C., for example, from about 0° C. to about 35° C., from about 0° C. to about 30° C., from about 0° C. to about 25° C., from about 0° C. to about 20° C., from about 0° C. to about 15° C., from about 0° C. to about 10° C., from about 0° C. to about 5° C., from about 10° C. to about 40° C., from about 10° C. to about 35° C., from about 10° C. to about 30° C., from about 10° C. to about 25° C., from about 10° C. to about 20° C., from about 10° C. to about 15° C., from about 20° C. to about 40° C., from about 20° C. to about 35° C., from about 20° C. to about 30° C., from about 20° C. to about 25° C., from about 25° C. to about 40° C., from about 20° C. to about 35° C., from about 20° C. to about 30° C., or from about 20° C. to about 25° C. In various aspects, the process is run at a temperature that is about room temperature.

In various aspects, the process comprises a solvent component. In various aspects, the solvent component comprises dichloromethane.

In various aspects, the process is a regioselective process.

In various aspects, the process is a stereoselective process. In various aspects, the stereoselective process forms a compound of Formula (IIa) or (IIb) having an E:Z ratio of from about 2:1 to about 99:1, for example, about 2:1, about 4:3, about 3:2, about 3:1, about 5:1, about 10:1, about 15:1, about 20:1, about 25:1, about 30:1, about 35:1, about 40:1, about 45:1, about 50:1, about 55:1, about 60:1, about 65:1, about 70:1, about 75:1, about 80:1, about 85:1, about 90:1, about 95:1, about 99:1. In various aspects, the stereoselective process forms a compound of Formula (II) having an E:Z ratio of from about 5:1 to about 20:1. In a further aspect, the process of preparing a compound of Formula (IIa) or Formula (IIb) is a stereoselective process, wherein the compound of Formula (IIa) or Formula (IIb) has an E:Z ratio of from about 2:1 to about 50:1. In a still further aspect, the process of preparing a compound of Formula (IIa) or Formula (IIb) is a stereoselective process, wherein the compound of Formula (IIa) or Formula (IIb) has an E:Z ratio of from about 2:1 to about 30:1. In yet a further aspect, the process of preparing a compound of Formula (IIa) or Formula (IIb) is a stereoselective process, wherein the compound of Formula (IIa) or Formula (IIb) has an E:Z ratio of from about 5:1 to about 20:1.

In a further aspect, the compound is prepared by reacting a first compound having a structure represented by a formula:

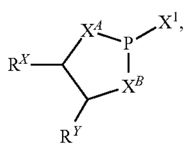

wherein $X^1$ is halogen, or a derivative thereof, with a compound having a structure represented by a formula:

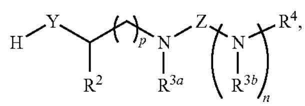

or a derivative thereof, in the presence of a base. In a still further aspect, the first compound is prepared by reacting a second compound having a structure represented by a formula:

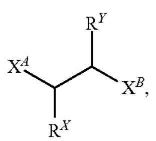

with a phosphine in the presence of a base.

In a further aspect, the compound of Formula (Ia) or Formula (Ib) is prepared by a process comprising reacting a compound or salt of Formula (IV):

(IV)

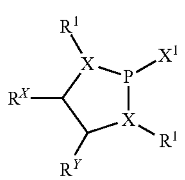

with a compound or salt of Formula (V):

(V)

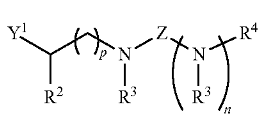

in the presence of a base, wherein: $X^1$ is halo; and $Y^1$ is OH, SH, or —$CH_3$.

In a further aspect, the base is an amine base. In a still further aspect, the base is selected from diisopropylethylamine, DABCO, triphenylamine, quinuclidine, trimethylamine, tripropylamine, triisopropylamine, tri-tert-butylamine, N,N-dimethylethanamine, N-ethyl-N-methylpropan-2-amine, N-ethyl-N-isopropylpropan-2-amine, morpholine, N-methylmorpholine, trimethylamine, tripropylamine, triisopropylamine, tri-tert-butylamine, pyrrolidine, pyridine, 2,6-lutidine, 1,8-diazabicyclo[5.4.0]undec-7-ene, tributylamine, and triethylamine. In yet a further aspect, the base is triethylamine.

In a further aspect, the reaction is run at a temperature at from about −10° C. to about 10° C. In a still further aspect, the reaction is run at a temperature at from about −5° C. to about 10° C. In yet a further aspect, the reaction is run at a temperature at from about 0° C. to about 10° C. In an even further aspect, the reaction is run at a temperature at from about 5° C. to about 10° C. In a still further aspect, the reaction is run at a temperature at from about −10° C. to about 5° C. In yet a further aspect, the reaction is run at a temperature at from about −10° C. to about 0° C. In an even further aspect, the reaction is run at a temperature at from about −10° C. to about −5° C. In a still further aspect, the reaction is run at a temperature at about 0° C.

In a further aspect, the compound or salt of Formula (IV) is prepared by a process comprising reacting a compound or salt of Formula (VI):

(VI)

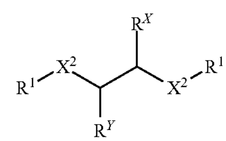

with a phosphine in the presence of a base, wherein: each $X^2$ is independently selected from the group consisting of —NH—, —O—, and —S—.

In a further aspect, the phosphine is a trihalophosphine. In a still further aspect, the phosphine is selected from tribromophosphine and trichlorophosphine. In yet a further aspect, the phosphine is trichlorophosphine.

In a further aspect, the base is an amine base. In a still further aspect, the base is selected from diisopropylethylamine, DABCO, triphenylamine, quinuclidine, trimethylamine, tripropylamine, triisopropylamine, tri-tert-butylamine, N,N-dimethylethanamine, N-ethyl-N-methylpropan-2-amine, N-ethyl-N-isopropylpropan-2-amine, morpholine, N-methylmorpholine, trimethylamine, tripropylamine, triisopropylamine, tri-tert-butylamine, pyrrolidine, pyridine, 2,6-lutidine, 1,8-diazabicyclo[5.4.0]undec-7-ene, tributylamine, and triethylamine. In yet a further aspect, the base is triethylamine.

In a further aspect, the reaction is run at a temperature at from about −10° C. to about 10° C. In a still further aspect, the reaction is run at a temperature at from about −5° C. to about 10° C. In yet a further aspect, the reaction is run at a temperature at from about 0° C. to about 10° C. In an even further aspect, the reaction is run at a temperature at from about 5° C. to about 10° C. In a still further aspect, the reaction is run at a temperature at from about −10° C. to about 5° C. In yet a further aspect, the reaction is run at a temperature at from about −10° C. to about 0° C. In an even further aspect, the reaction is run at a temperature at from about −10° C. to about −5° C. In a still further aspect, the reaction is run at a temperature at about 0° C.

In a further aspect, the process further comprises heating the reaction to room temperature.

1. Route I

In one aspect, allene intermediates can be prepared as shown below.

SCHEME 3A.

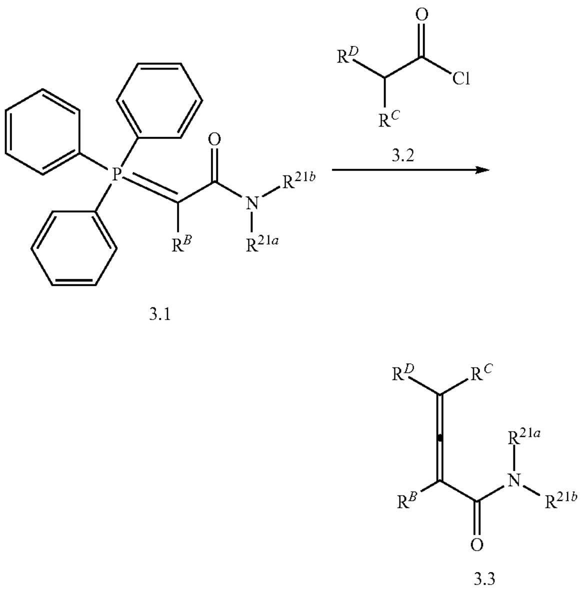

Compounds are represented in generic form, with substituents as noted in compound descriptions elsewhere herein. A more specific example is set forth below.

SCHEME 3B.

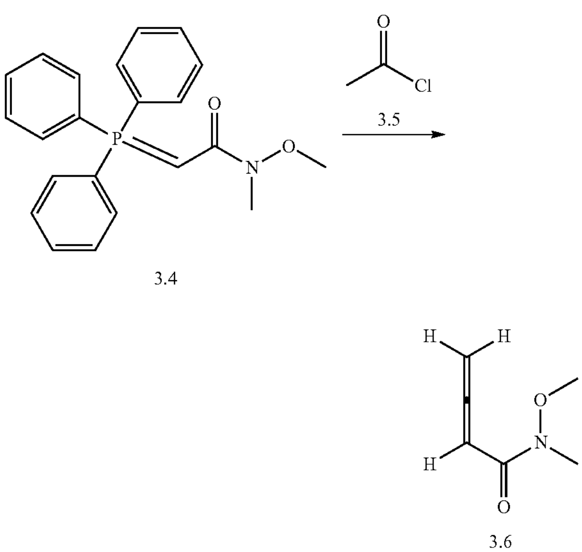

In one aspect, the synthesis of allene intermediates can begin with an allene. Allenes are commercially available or readily prepared by one skilled in the art. Thus, compounds of type 3.6, and similar compounds, can be prepared according to reaction Scheme 3B above. Compounds of type 3.6 can be prepared by a Wittig-like reaction of an appropriate triphenylphosphine derivative, e.g., 3.4 as shown above. The Wittig-like reaction is carried out in the presence of an appropriate acyl halide, e.g., 3.5 as shown above, in an appropriate solvent, e.g., dichloromethane. As can be appreciated by one skilled in the art, the above reaction provides an example of a generalized approach wherein compounds similar in structure to the specific reactants above (compounds similar to compounds of type 3.1 and 3.2), can be substituted in the reaction to provide substituted allene intermediates similar to Formula 3.3.

2. Route II

In one aspect, allene intermediates can be prepared as shown below.

SCHEME 4A.

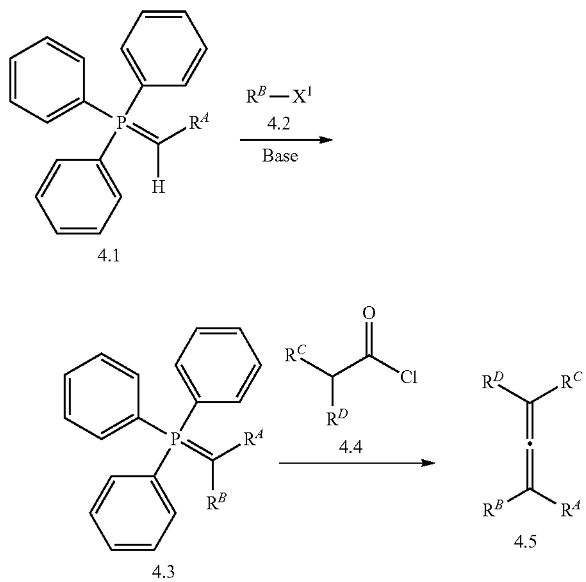

Compounds are represented in generic form, with substituents as noted in compound descriptions elsewhere herein. A more specific example is set forth below.

SCHEME 4B.

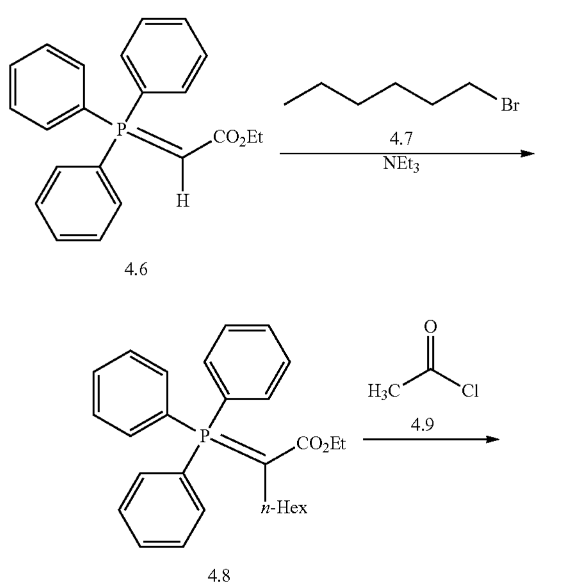

-continued

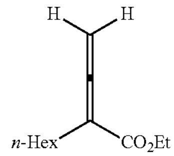

4.10

In one aspect, the synthesis of allene intermediates can begin with a triphenylphosphine derivative. Triphenylphosphine derivatives are commercially available or readily prepared by one skilled in the art. Thus, compounds of type 4.10, and similar compounds, can be prepared according to reaction Scheme 4B above. Compounds of type 4.8 can be prepared by an alkylation reaction of an appropriate triphenylphosphine derivative, e.g., 4.6 as shown above. The alkylation reaction is carried out in the presence of an appropriate alkyl halide, e.g., 4.5 as shown above, in the presence of an appropriate base, e.g., triethylamine as shown above. Compounds of type 4.10 can be prepared by a Wittig-like reaction of an appropriate triphenylphosphine derivative, e.g., 4.8 as shown above. As can be appreciated by one skilled in the art, the above reaction provides an example of a generalized approach wherein compounds similar in structure to the specific reactants above (compounds similar to compounds of type 4.1, 4.2, 4.3, and 4.4), can be substituted in the reaction to provide substituted allene intermediates similar to Formula 4.5.

3. Route III

The compounds of provided herein may be useful in, for example, phosphorus-carbon bond forming reactions (e.g., the synthesis of vinylphosphonates), as shown below. Thus, in one aspect, vinylphosphonate analogs can be prepared as shown below.

SCHEME 5A.

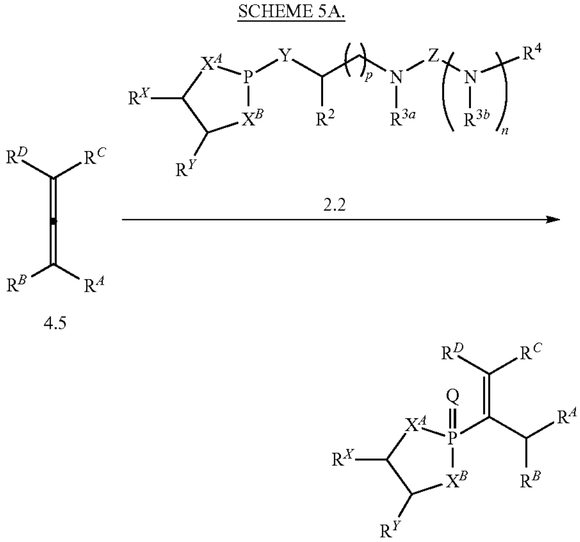

Compounds are represented in generic form, with substituents as noted in compound descriptions elsewhere herein and wherein each of Y and Q is selected from O, S, and $NR^{26}$. A more specific example is set forth below.

SCHEME 5B.

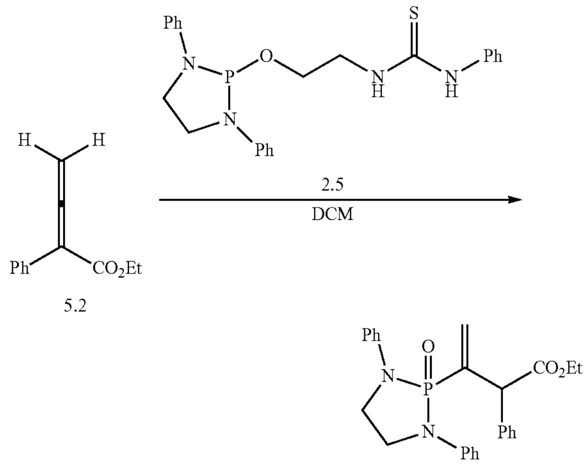

In one aspect, the synthesis of vinylphosphonate analogs can begin with an allene. Allenes are commercially available or readily prepared by one skilled in the art. Thus, compounds of type 5.3, and similar compounds, can be prepared according to reaction Scheme 5B above. Compounds of type 5.3 can be prepared by oxidation of an appropriate N-heterocyclic phosphine, e.g., 2.5 as shown above. The oxidation is carried out in the presence of an appropriate allene, e.g., 5.2 as shown above, in an appropriate solvent, e.g., dichloromethane. As can be appreciated by one skilled in the art, the above reaction provides an example of a generalized approach wherein compounds similar in structure to the specific reactants above (compounds similar to compounds of type 2.2 and 4.4), can be substituted in the reaction to provide substituted vinylphosphonate analogs similar to Formula 5.1.

4. Route IV

Once prepared, vinyldiazaphosphonates may be further functionalized using a variety of methods known in the art. Thus, in one aspect, substituted vinylphosphonate analogs can be prepared as shown below.

SCHEME 6A.

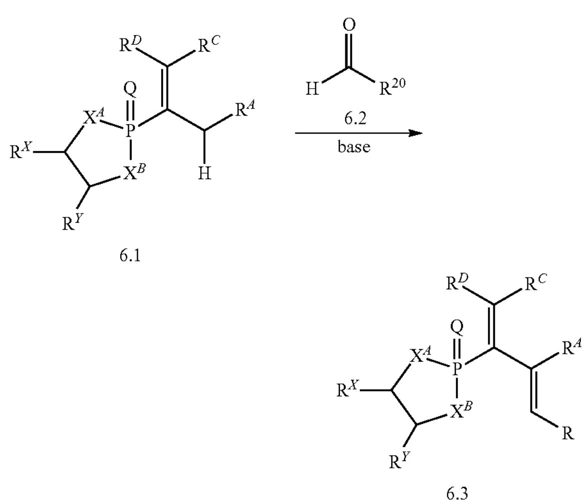

Compounds are represented in generic form, with substituents as note in compound descriptions elsewhere herein and wherein $R^{20}$ is selected from C1-C8 alkyl and C6-C10 aryl and substituted with 0, 1, 2, or 3 independently selected $R^5$ groups and wherein Q is selected from O, S, and $NR^{26}$. A more specific example is set forth below.

SCHEME 6B.

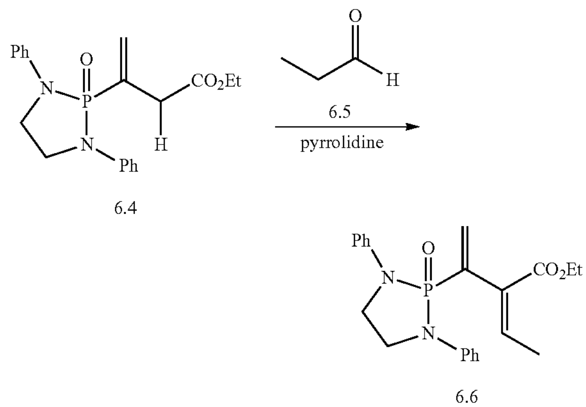

In one aspect, compounds of type 6.6, and similar compounds, can be prepared according to reaction Scheme 6B above. Compounds of type 6.6 can be prepared by dehydration of an appropriate vinylphosphonate, e.g., 6.4 as shown above. The dehydration is carried out in the presence of an appropriate aldehyde, e.g., 6.5 as shown above, in the presence of an appropriate base, e.g., pyrrolidine. As can be appreciated by one skilled in the art, the above reaction provides an example of a generalized approach wherein compounds similar in structure to the specific reactants above (compounds similar to compounds of type 6.1 and 6.2), can be substituted in the reaction to provide substituted vinylphosphonate analogs similar to Formula 6.3.

5. Route V

In one aspect, substituted vinylphosphonate analogs can be prepared as shown below.

SCHEME 7A.

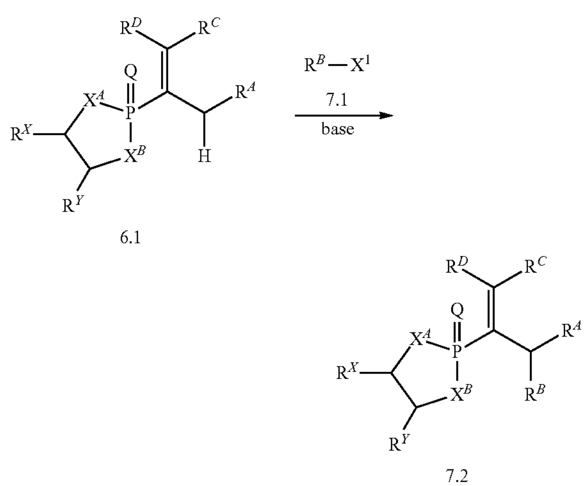

Compounds are represented in generic form, with substituents as noted in compound descriptions elsewhere herein and wherein $X^1$ is halogen and wherein Q is selected from O, S, and $NR^{26}$. A more specific example is set forth below.

SCHEME 7B.

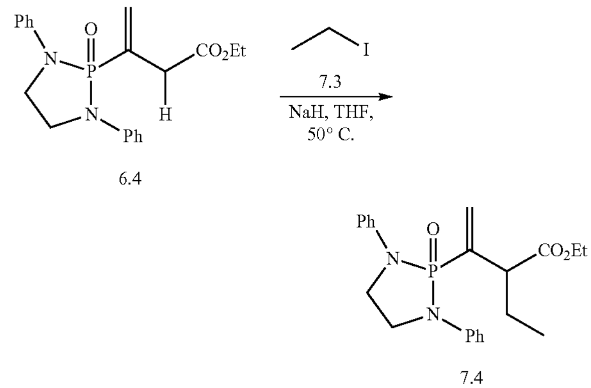

In one aspect, compounds of type 7.4, and similar compounds, cane prepared according to reaction Scheme 7B above. Compounds of type 7.5 can be prepared by alkylation of an appropriate vinylphosphonate, e.g., 6.4 as shown above. The alkylation is carried out in the presence of an appropriate alkyl halide, e.g., 7.3 as shown above, in the presence of an appropriate base, e.g., sodium hydride, an appropriate solvent, tetrahydrofuran (THF), at an appropriate temperature, e.g., 50° C. As can be appreciated by one skilled in the art, the above reaction provides an example of a generalized approach wherein compounds similar in structure to the specific reactants above (compounds similar to compounds of type 6.1 and 7.1), can be substituted in the reaction to provide substituted vinylphosphonate analogs similar to Formula 7.2.

6. Route VI

In one aspect, substituted vinylphosphonate analogs can be prepared as shown below.

SCHEME 8A.

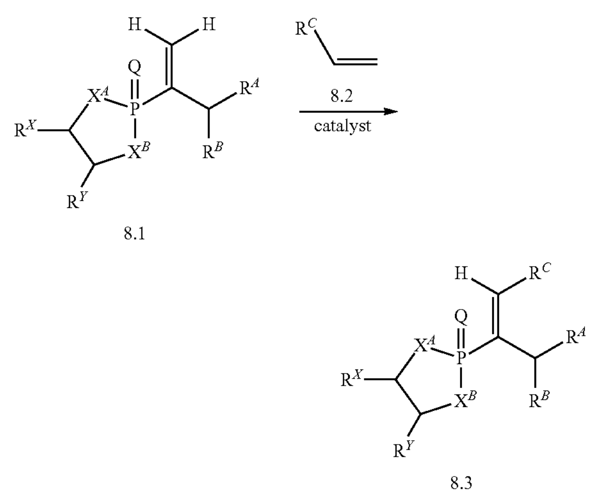

Compounds are represented in generic form, with substituents as noted in compound descriptions elsewhere herein and wherein Q is selected from O, S, and $NR^{26}$. A more specific example is set forth below.

SCHEME 8B.

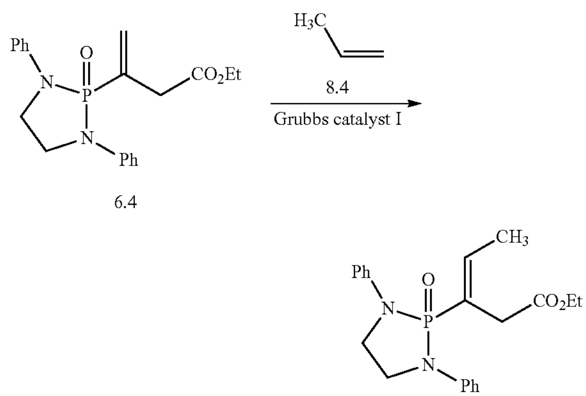

6.4

8.5

In one aspect, compounds of type 8.5, and similar compounds, can be prepared according to reaction Scheme 8B above. Compounds of type 8.5 can be prepared by olefin metathesis of an appropriate vinylphosphonate, e.g., 6.4 as shown above. The olefin metathesis is carried out in the presence of an appropriate alkene, e.g., 8.4 as shown above, in the presence of an appropriate catalyst, e.g., first generation Grubbs catalyst as shown above. As can be appreciated by one skilled in the art, the above reaction provides an example of a generalized approach wherein compounds similar in structure to the specific reactants above (compounds similar to compounds of type 8.1 and 8.2), can be substituted in the reaction to provide substituted vinylphosphonate analogs similar to Formula 8.3.

7. Route VII

In one aspect, substituted vinylphosphonate analogs can be prepared as shown below.

SCHEME 9A.

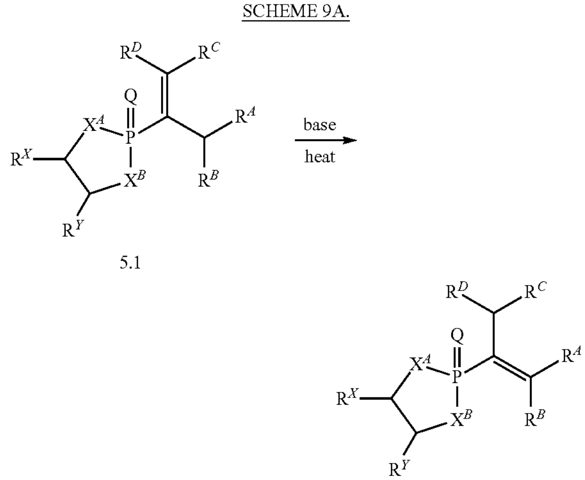

5.1

9.1

Compounds are represented in generic form, with substituents as noted in compound descriptions elsewhere herein and wherein Q is selected from O, S, and $NR^{26}$. A more specific example is set forth below.

SCHEME 9B.

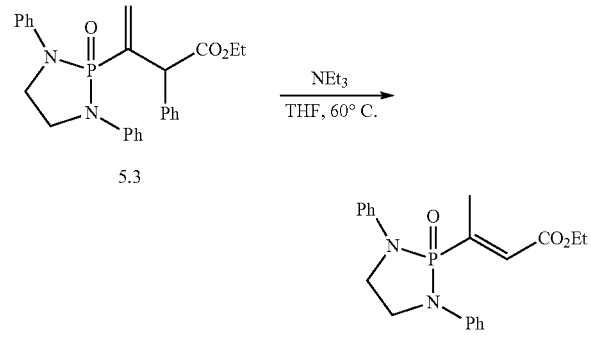

5.3

9.2

In one aspect, compounds of type 9.2, and similar compounds, can be prepared according to reaction Scheme 9B above. Compounds of type 9.2 can be prepared by tautomerization of an appropriate vinylphosphonate, e.g., 5.3 as shown above. The tautomerization is carried out in the presence of an appropriate base, e.g., triethylamine, and an appropriate solvent, e.g., tetrahydrofuran (THF), at an appropriate temperature, e.g., 60° C. As can be appreciated by one skilled in the art, the above reaction provides an example of a generalized approach wherein compounds similar in structure to the specific reactants above (compounds similar to compounds of type 5.1), can be substituted in the reaction to provide substituted vinylphosphonate analogs similar to Formula 9.2.

8. Route VIII

In one aspect, substituted vinylphosphonate analogs can be prepared as shown below.

SCHEME 10A.

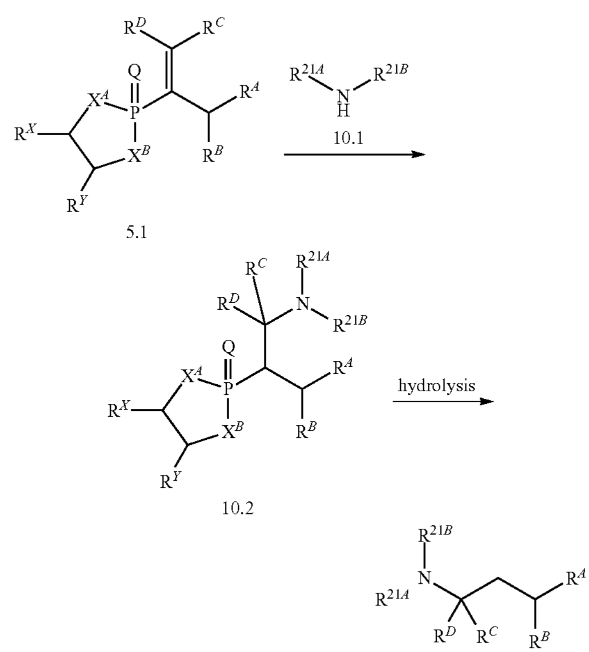

5.1

10.2

10.3

Compounds are represented in generic form, with substituents as noted in compound descriptions elsewhere herein and wherein each of $R^{21a}$ and $R^{21b}$ is independently selected from C1-C8 alkyl and C6-C10 aryl and substituted with 0, 1, 2, or 3 independently selected $R^5$ groups and wherein Q is selected from O, S, and $NR^{26}$. A more specific example is set forth below.

SCHEME 10B.

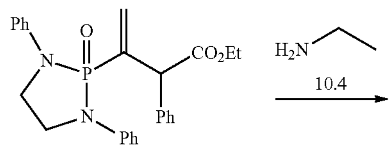

5.3

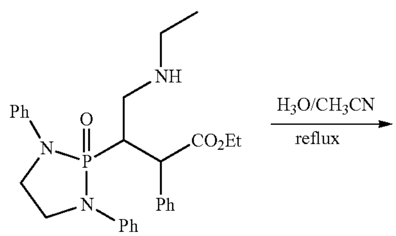

10.5

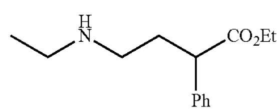

10.6

In one aspect, compounds of type 10.6, and similar compounds, can be prepared according to reaction Scheme 10B above. Compounds of type 10.5 can be prepared by alkylation of an appropriate amine, e.g., 10.4 as shown above. Appropriate amines are commercially available or can be prepared by methods known in the art. The alkylation is carried out in the presence of an appropriate vinylphosphonate, e.g., 5.3 as shown above. Compounds of type 10.6 can be prepared by hydrolysis of a compound of type 10.5. The hydrolysis is carried out in the presence of an appropriate polar solvent system, e.g., water and acetonitrile as shown, at an appropriate temperature, e.g., reflux. As can be appreciated by one skilled in the art, the above reaction provides an example of a generalized approach wherein compounds similar in structure to the specific reactants above (compounds similar to compounds of type 5.1 and 10.2), can be substituted in the reaction to provide substituted vinylphosphonate analogs similar to Formula 10.3.

9. Route IX

In one aspect, substituted vinylphosphonate analogs can be prepared as shown below.

SCHEME 11A.

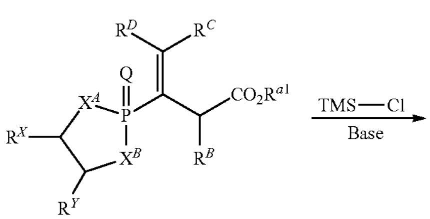

11.1

-continued

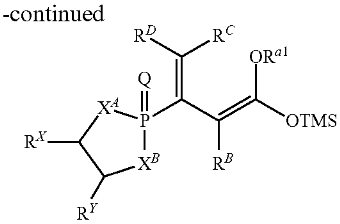

11.2

Compounds are represented in generic form, with substituents as noted in compound descriptions elsewhere herein and wherein Q is selected from O, S, and $NR^{26}$. A more specific example is set forth below.

SCHEME 11B.

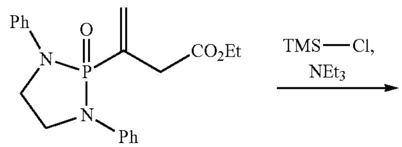

6.4

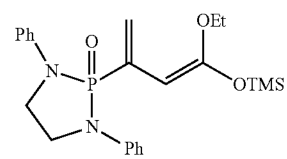

11.3

In one aspect, compounds of type 11.3, and similar compounds, can be prepared according to reaction Scheme 11B above. Compounds of type 11.3 can be prepared by silyl protection of an appropriate vinylphosphonate, e.g., 6.4 as shown above. The silyl protection is carried out in the presence of an appropriate silyl halide, e.g., trimethylsilyl chloride as shown above, in the presence of an appropriate base, e.g., triethylamine. As can be appreciated by one skilled in the art, the above reaction provides an example of a generalized approach wherein compounds similar in structure to the specific reactants above (compounds similar to compounds of type 11.1), can be substituted in the reaction to provide substituted vinylphosphonate analogs similar to Formula 11.3.

10. Route X

In one aspect, substituted vinylphosphonate analogs can be prepared as shown below.

SCHEME 12A.

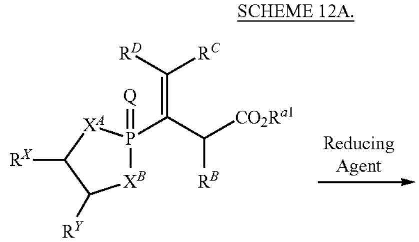

11.1

-continued

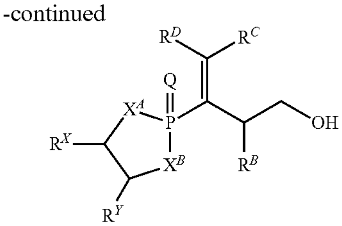

12.1

Compounds are represented in generic form, with substituents as noted in compound descriptions elsewhere herein and wherein Q is selected from O, S, and $NR^{26}$. A more specific example is set forth below.

SCHEME 12B.

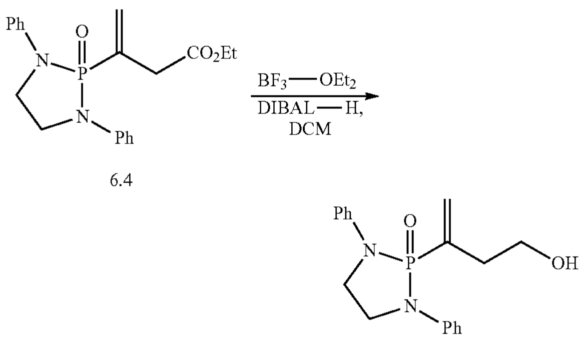

6.4

12.2

In one aspect, compounds of type 12.2, and similar compounds, can be prepared according to reaction Scheme 12B above. Compounds of type 12.2 can be prepared by reduction of an appropriate ester, e.g., 6.4 as shown above. The reduction is carried out in the presence of an appropriate Lewis acid, e.g., boron trifluoride diethyl etherate as shown above, in the presence of an appropriate reducing agent, e.g., diisobutyl aluminium hydride (DIBAL-H), in an appropriate solvent, e.g., dichloromethane. As can be appreciated by one skilled in the art, the above reaction provides an example of a generalized approach wherein compounds similar in structure to the specific reactants above (compounds similar to compounds of type 11.1), can be substituted in the reaction to provide substituted vinylphosphonate analogs similar to Formula 11.2.

11. Route XI

In one aspect, substituted vinylphosphonate analogs can be prepared as shown below.

SCHEME 13A.

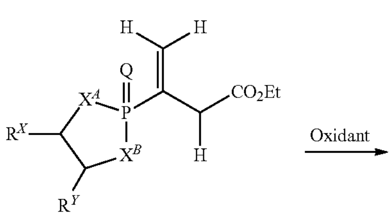

13.1

-continued

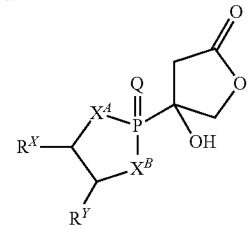

13.2

Compounds are represented in generic form, with substituents as noted in compound descriptions elsewhere herein and wherein Q is selected from O, S, and $NR^{26}$. A more specific example is set forth below.

SCHEME 13B.

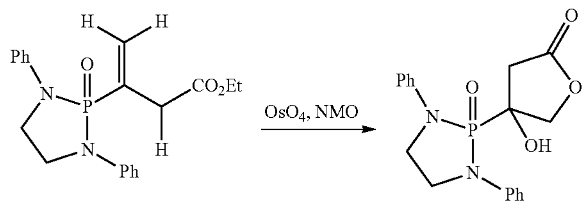

6.4

13.3

In one aspect, compounds of type 13.3, and similar compounds, can be prepared according to reaction Scheme 13B above. Compounds of type 13.3 can be prepared by oxidation of an appropriate vinylphosphonate, e.g., 6.4 as shown above. The oxidation is carried out in the presence of an appropriate oxidant, e.g., osmium tetraoxide as shown above, and an appropriate base, e.g., N-methylmorpholine (NMO). As can be appreciated by one skilled in the art, the above reaction provides an example of a generalized approach wherein compounds similar in structure to the specific reactants above (compounds similar to compounds of type 13.1), can be substituted in the reaction to provide substituted vinylphosphonate analogs similar to Formula 13.3.

12. Route XII

In one aspect, substituted vinylphosphonate analogs can be prepared as shown below.

SCHEME 14A.

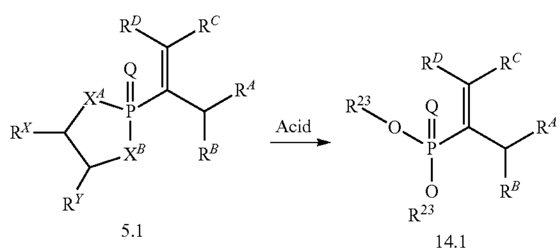

5.1

14.1

Compounds are represented in generic form, with substituents as noted in compound descriptions elsewhere herein and wherein each $R^{23}$ is C1-C8 alkyl substituted with 0, 1, 2, or 3 independently selected $R^5$ groups and wherein Q is selected from O, S, and $NR^{26}$. A more specific example is set forth below.

SCHEME 14B.

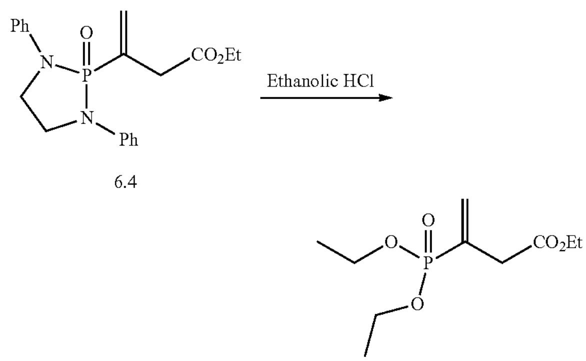

6.4

14.2

In one aspect, compounds of type 14.2, and similar compounds, can be prepared according to reaction Scheme 14B above. Compounds of type 14.2 can be prepared by a displacement reaction of an appropriate vinylphosphonate, e.g., 6.4 as shown above. The displacement reaction is carried out in the presence of an appropriate acid, e.g., ethanolic hydrochloride as shown above. As can be appreciated by one skilled in the art, the above reaction provides an example of a generalized approach wherein compounds similar in structure to the specific reactants above (compounds similar to compounds of type 5.1), can be substituted in the reaction to provide substituted vinylphosphonate analogs similar to Formula 14.2.

13. Route XIII

In one aspect, substituted vinylphosphonate analogs can be prepared as shown below.

SCHEME 15A.

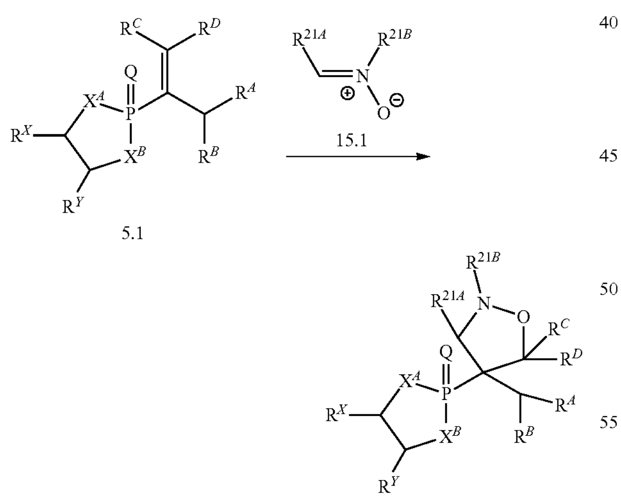

5.1

15.1

15.2

Compounds are represented in generic form, with substituents as noted in compound descriptions elsewhere herein and wherein each of $R^{21a}$ and $R^{21b}$ is independently selected from C1-C8 alkyl and C6-C10 aryl and substituted with 0, 1, 2, or 3 independently selected $R^5$ groups and wherein Q is selected from O, S, and $NR^{26}$. A more specific example is set forth below.

SCHEME 15B.

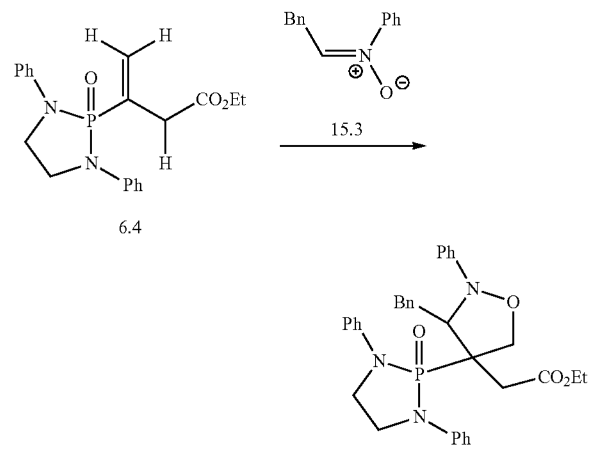

6.4

15.3

15.4

In one aspect, compounds of type 15.4, and similar compounds, can be prepared according to reaction Scheme 15B above. Compounds of type 15.4 can be prepared by Wittig-like reaction of an appropriate N-oxide, e.g., 15.3 as shown above. As can be appreciated by one skilled in the art, the above reaction provides an example of a generalized approach wherein compounds similar in structure to the specific reactants above (compounds similar to compounds of type 5.1 and 15.1), can be substituted in the reaction to provide substituted vinylphosphonate analogs similar to Formula 15.2.

14. Route XIV

In one aspect, substituted vinylphosphonate analogs can be prepared as shown below.

SCHEME 16A.

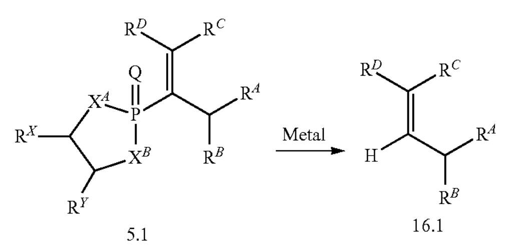

5.1

16.1

Compounds are represented in generic form, with substituents as noted in compound descriptions elsewhere herein and wherein Q is selected from O, S, and $NR^{26}$. A more specific example is set forth below.

SCHEME 16B.

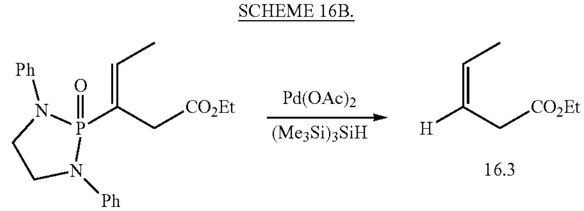

16.2

16.3

In one aspect, compounds of type 16.3, and similar compounds, can be prepared according to reaction Scheme 16B above. Compounds of type 16.3 can be prepared by reduction of an appropriate vinylphosphonate, e.g., 16.2 as shown above. The reduction is carried out in the presence of an appropriate metal catalyst, e.g., $Pd(OAc)_2$ as shown above and an appropriate hydride source, e.g., $(Me_3Si)_3SiH$ as shown above. As can be appreciated by one skilled in the art, the above reaction provides an example of a generalized approach wherein compounds similar in structure to the specific reactants above (compounds similar to compounds of type 5.1), can be substituted in the reaction to provide substituted vinylphosphonate analogs similar to Formula 5.1.

15. Route XV

In one aspect, substituted vinylphosphonate analogs can be prepared as shown below.

SCHEME 17A.

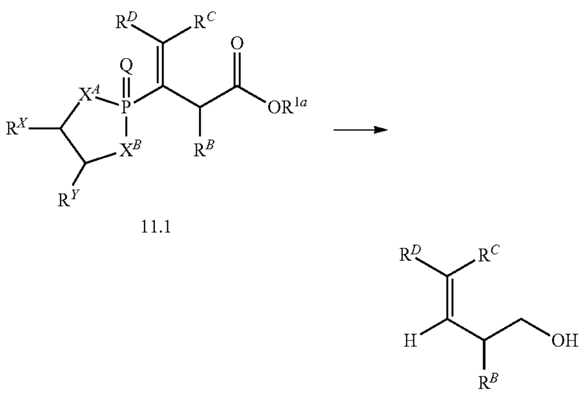

11.1

17.1

Compounds are represented in generic form, with substituents as noted in compound descriptions elsewhere herein and wherein Q is selected from O, S, and $NR^{26}$. A more specific example is set forth below.

SCHEME 17B.

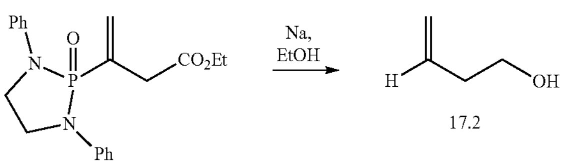

17.2

6.4

In one aspect, compounds of type 17.2, and similar compounds, can be prepared according to reaction Scheme 17B above. Compounds of type 17.2 can be prepared by reduction of an appropriate vinylphosphonate, e.g., 6.4 as shown above. The reduction is carried out in the presence of an appropriate metal, e.g., sodium as shown above, and an appropriate protic solvent, e.g., ethanol as shown above. As can be appreciated by one skilled in the art, the above reaction provides an example of a generalized approach wherein compounds similar in structure to the specific reactants above (compounds similar to compounds of type 11.1), can be substituted in the reaction to provide substituted vinylphosphonate analogs similar to Formula 17.1.

16. Route XVI

In one aspect, substituted vinylphosphonate analogs can be prepared as shown below.

SCHEME 18A.

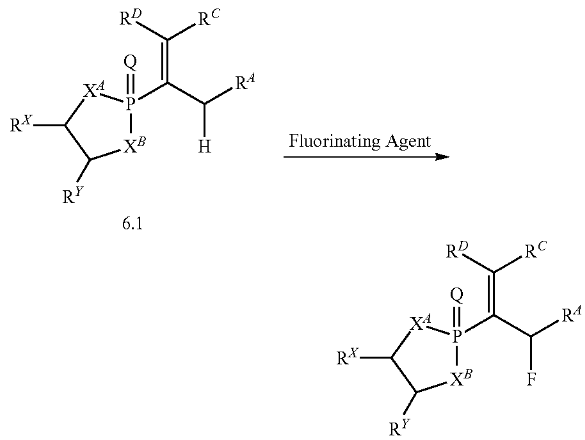

6.1

18.1

Compounds are represented in generic form, with substituents as noted in compound descriptions elsewhere herein and wherein Q is selected from O, S, and $NR^{26}$. A more specific example is set forth below.

SCHEME 18B.

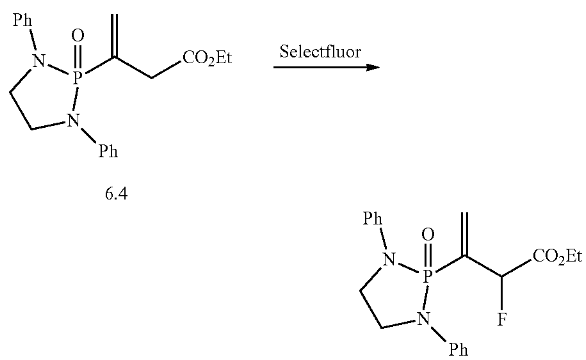

6.4

18.2

In one aspect, compounds of type 18.2, and similar compounds, can be prepared according to reaction Scheme 18B above. Compounds of type 18.2 can be prepared by fluorination of an appropriate vinylphosphonate, e.g., 6.4 as shown above. The fluorination is carried out in the presence of an appropriate fluorinating agent, e.g., selectfluor as shown above. As can be appreciated by one skilled in the art, the above reaction provides an example of a generalized approach wherein compounds similar in structure to the specific reactants above (compounds similar to compounds of type 6.1), can be substituted in the reaction to provide substituted vinylphosphonate analogs similar to Formula 18.1.

17. Route XVII

In one aspect, substituted vinylphosphonate analogs can be prepared as shown below.

SCHEME 19A.

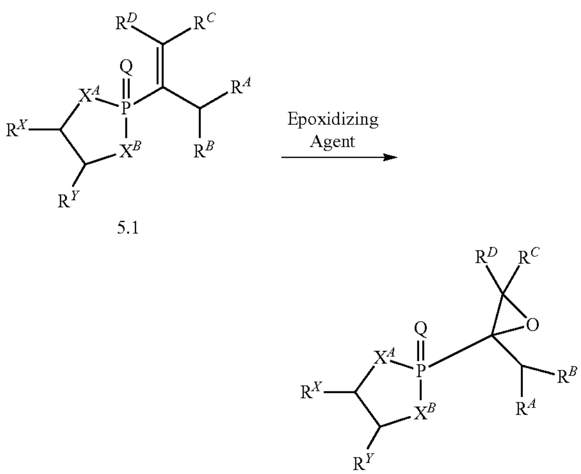

5.1

19.1

Compounds are represented in generic form, with substituents as noted in compound descriptions elsewhere herein and wherein Q is selected from O, S, and $NR^{26}$. A more specific example is set forth below.

SCHEME 19B.

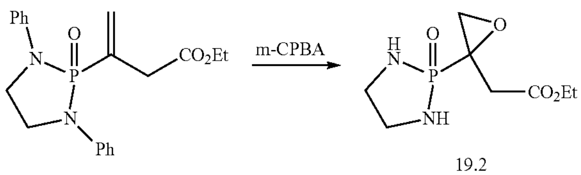

6.4 19.2

In one aspect, compounds of type 19.2, and similar compounds, can be prepared according to reaction Scheme 19B above. Compounds of type 19.2 can be prepared by oxidation of an appropriate vinylphosphonate, e.g., 6.4 as shown above. The oxidation is carried out in the presence of an appropriate epoxidizing agent, e.g., meta-chloroperoxybenzoic acid (m-CPBA) as shown above. As can be appreciated by one skilled in the art, the above reaction provides an example of a generalized approach wherein compounds similar in structure to the specific reactants above (compounds similar to compounds of type 5.1), can be substituted in the reaction to provide substituted vinylphosphonate analogs similar to Formula 19.1.

18. Route XVIII

In one aspect, substituted vinylphosphonate analogs can be prepared as shown below.

SCHEME 20A.

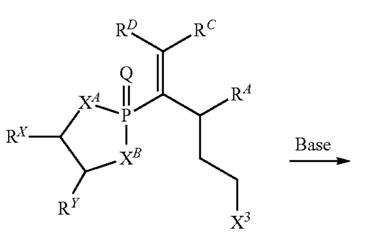

20.1

-continued

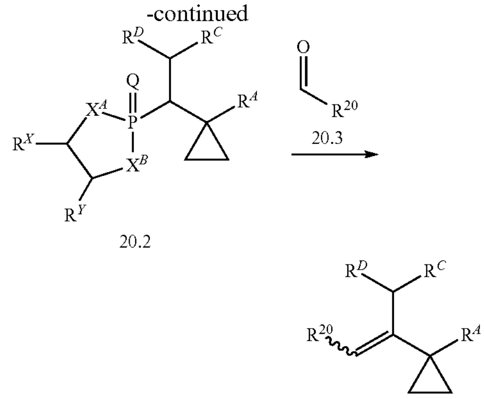

20.2

20.3

20.4

Compounds are represented in generic form, with substituents as noted in compound descriptions elsewhere herein, wherein $X^3$ is selected from halogen, tosyl, and mesyl, and wherein $R^{20}$ is selected from C1-C8 alkyl and C6-C10 aryl and substituted with 0, 1, 2, or 3 independently selected $R^5$ groups and wherein Q is selected from O, S, and $NR^{26}$. A more specific example is set forth below.

SCHEME 20B.

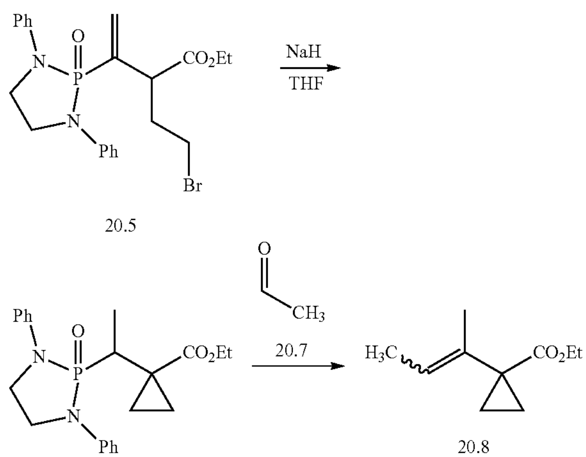

20.5

20.7

20.6 20.8

In one aspect, compounds of type 20.8, and similar compounds, can be prepared according to reaction Scheme 20B above. Compounds of type 20.6 can be prepared by cyclization of an appropriate alkyl halide, e.g., 20.5 as shown above. The cyclization is carried out in the presence of an appropriate base, e.g., sodium hydride as shown above, and an appropriate solvent, e.g., tetrahydrofuran (THF) as shown above. Compounds of type 20.8 can be prepared by Wittig-like reaction of an appropriate phosphonate, e.g., 20.6 as shown above. The Wittig-like reaction is carried out in the presence of an appropriate aldehyde, e.g., 20.7 as shown above. As can be appreciated by one skilled in the art, the above reaction provides an example of a generalized approach wherein compounds similar in structure to the specific reactants above (compounds similar to compounds of type 20.1, 20.2, and 20.3), can be substituted in the reaction to provide substituted vinylphosphonate analogs similar to Formula 20.4.

19. Route XIX

In one aspect, substituted vinylphosphonate analogs can be prepared as shown below.

SCHEME 21A.

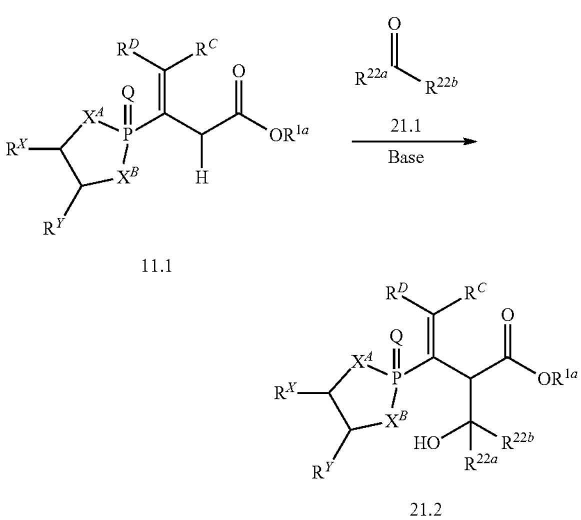

Compounds are represented in generic form, with substituents as noted in compound descriptions elsewhere herein, wherein each of $R^{22a}$ and $R^{22b}$ is independently selected from C1-C8 alkyl, C3-C10 cycloalkyl, 4-10 membered heterocycloalkyl, C6-C10 aryl, and 4-10 membered heteroaryl and wherein each of $R^{22a}$ and $R^{22b}$ is independently substituted with 0, 1, 2, or 3 independently selected $R^5$ groups and wherein Q is selected from O, S, and $NR^{26}$. A more specific example is set forth below.

SCHEME 21B.

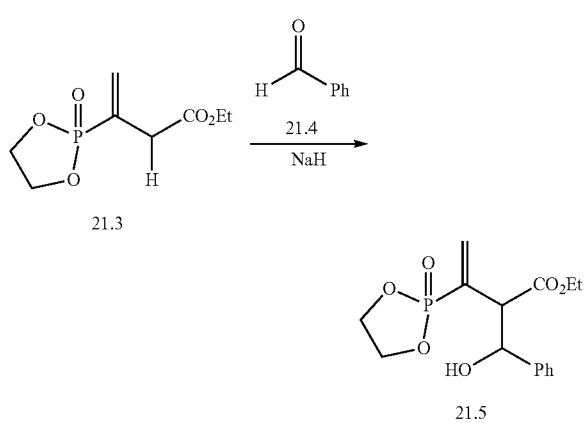

In one aspect, compounds of type 21.5, and similar compounds, can be prepared according to reaction Scheme 21B above. Compounds of type 21.5 can be prepared by an aldol reaction of an appropriate ester, e.g., 21.3 as shown above. The aldol reaction is carried out in the presence of an appropriate base, e.g., n-butyl lithium as shown above, and an appropriate aldehyde, e.g., 21.4 as shown above. As can be appreciated by one skilled in the art, the above reaction provides an example of a generalized approach wherein compounds similar in structure to the specific reactants above (compounds similar to compounds of type 11.1, 20.1, and 20.2), can be substituted in the reaction to provide substituted vinylphosphonate analogs similar to Formula 20.3.

20. Route XX

In one aspect, substituted vinylphosphonate analogs can be prepared as shown below.

SCHEME 22A.

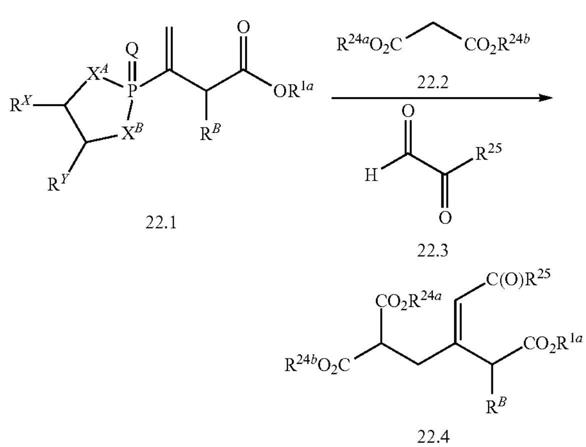

Compounds are represented in generic form, with substituents as noted in compound descriptions elsewhere herein, wherein each of $R^{24a}$ and $R^{24b}$ is independently selected from C1-C4 alkyl, and wherein $R^{25}$ is selected from C1-C4 alkyl and C1-C4 alkoxy and wherein Q is selected from O, S, and $NR^{26}$. A more specific example is set forth below.

SCHEME 22B.

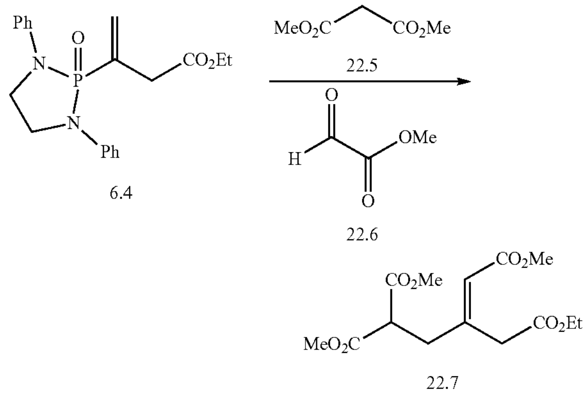

In one aspect, compounds of type 22.7, and similar compounds, can be prepared according to reaction Scheme 22B above. Compounds of type 22.7 can be prepared by a nucleophilic reaction of an appropriate vinylphosphonate, e.g., 6.4 as shown above, in the presence of an appropriate dialkyl malonate, e.g., 22.5 as shown above, and an appropriate 3,4-dione, e.g., 22.6 as shown above. As can be appreciated by one skilled in the art, the above reaction provides an example of a generalized approach wherein compounds similar in structure to the specific reactants above (compounds similar to compounds of type 22.1, 22.2, and 22.3), can be substituted in the reaction to provide substituted vinylphosphonate analogs similar to Formula 20.4.

21. Route XXI

In one aspect, vinylphosphonate analogs can be prepared as shown below.

SCHEME 23A.

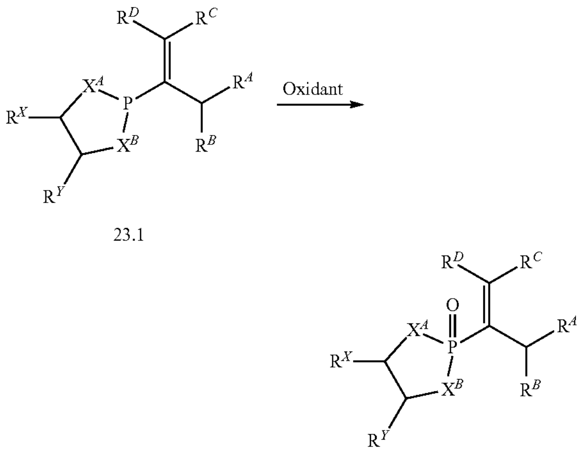

23.1

5.1

Compounds are represented in generic form, with substituents as noted in compound descriptions elsewhere herein. A more specific example is set forth below.

SCHEME 23B.

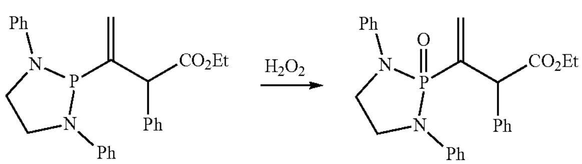

23.2

5.3

In one aspect, the synthesis of vinylphosphonate analogs can begin with a phosphonate. Phosphonates are commercially available or readily prepared by one skilled in the art. Thus, compounds of type 5.3, and similar compounds, can be prepared according to reaction Scheme 23B above. Compounds of type 5.3 can be prepared by oxidation of an appropriate N-heterocyclic phosphine, e.g., 23.2 as shown above. The oxidation is carried out in the presence of an appropriate oxidizing agent, e.g., hydrogen peroxide as shown above. As can be appreciated by one skilled in the art, the above reaction provides an example of a generalized approach wherein compounds similar in structure to the specific reactants above (compounds similar to compounds of type 23.1), can be substituted in the reaction to provide substituted vinylphosphonate analogs similar to Formula 5.1.

F. Representative Example of the Utility of Vinylphosphonates: Synthesis of Doxapram Using the retrosynthetic analysis shown below, Compound 67 can be envisioned as a starting compound for the synthesis of Doxapram, a known respiratory stimulant.

SCHEME 15A.

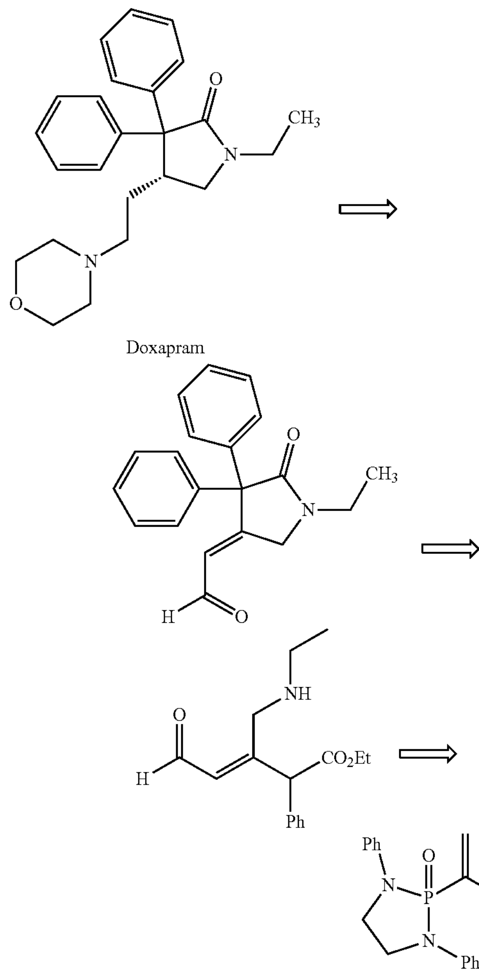

Doxapram

67

Accordingly, the procedure for making vinylphosphonates as described herein could be applied to the synthesis of, for example, Doxapram, using an appropriately substituted NHP-thiourea and ethyl 2-phenylbuta-2,3-dienoate, as shown below.

SCHEME 15B.

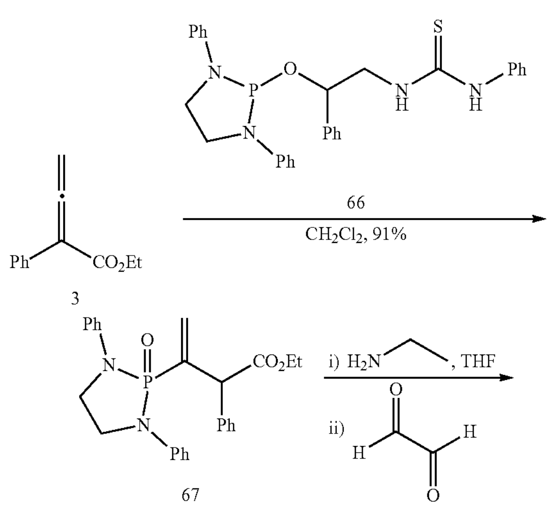

-continued

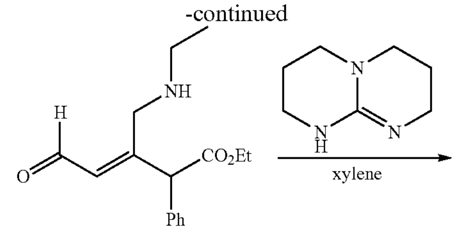

7A

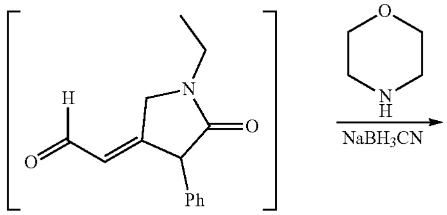

7B

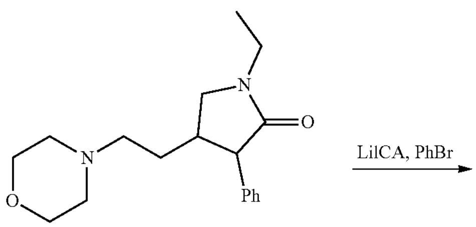

7C

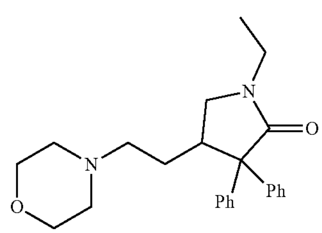

Doxapram

Thus, reacting ethyl 2-phenylbuta-2,3-dienoate (3) with 1-(2-((1,3-diphenyl-1,3,2-diazaphospholidin-2-yl)oxy) ethyl)-3-phenylthiourea (66) in the presence of a solvent component (e.g., dichloromethane) affords vinyldiazaphosphonate 67. Functionalization of the vinyl group and reaction with ethane-1,2-dione affords compound 7A. The amino-ester moieties of 7A could then be cyclized in the presence of 2,3,4,6,7,8-hexahydro-1H-pyrimido[1,2-a]pyrimidine to afford intermediate 7B, which could subsequently be coupled to morpholine via reductive amination in the presence of a reducing agent (e.g., sodium cyanoborohydride) to afford 7C. Finally, aryl coupling of 7C in the presence of a strong base (e.g., lithium N-isopropylcyclohexylamide) would afford Doxapram.

G. Pharmaceutical Compositions and Formulations

When employed as pharmaceuticals, the compounds provided herein can be administered in the form of pharmaceutical compositions, for example, the compounds of Formula (II):

(II)

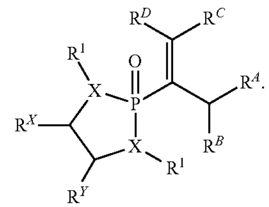

These compositions can be prepared as described herein or elsewhere, and can be administered by a variety of routes, depending upon whether local or systemic treatment is desired and upon the area to be treated. Administration may be topical (including, for example, transdermal, epidermal, ophthalmic and to mucous membranes including, for example, intranasal, vaginal and rectal delivery), pulmonary (e.g., by inhalation or insufflation of powders or aerosols, including by nebulizer; intratracheal or intranasal), oral or parenteral. Parenteral administration includes intravenous, intraarterial, subcutaneous, intraperitoneal intramuscular or injection or infusion; or intracranial (e.g., intrathecal or intraventricular, administration). Parenteral administration can be in the form of a single bolus dose, or may be, for example, by a continuous perfusion pump. Pharmaceutical compositions and formulations for topical administration may include transdermal patches, ointments, lotions, creams, gels, drops, suppositories, sprays, liquids, and powders. Conventional pharmaceutical carriers, aqueous, powder or oily bases, thickeners, and the like may be necessary or desirable.

Also provided are pharmaceutical compositions that contain, as the active ingredient, a compound provided herein (e.g., a compound of Formula (IIa) or Formula (IIb)) or a pharmaceutically acceptable salt thereof, in combination with one or more pharmaceutically acceptable carriers (excipients). In making the compositions provided herein, the active ingredient is typically mixed with an excipient, diluted by an excipient or enclosed within such a carrier in the form of, for example, a capsule, sachet, paper, or other container. When the excipient serves as a diluent, it can be a solid, semi-solid, or liquid material, which acts as a vehicle, carrier or medium for the active ingredient. Thus, the compositions can be in the form of tablets, pills, powders, lozenges, sachets, cachets, elixirs, suspensions, emulsions, solutions, syrups, aerosols (as a solid or in a liquid medium), ointments, soft and hard gelatin capsules, suppositories, sterile injectable solutions, and sterile packaged powders.

Some examples of suitable excipients include, without limitation, lactose, dextrose, sucrose, sorbitol, mannitol, starches, gum acacia, calcium phosphate, alginates, tragacanth, gelatin, calcium silicate, microcrystalline cellulose, polyvinylpyrrolidone, cellulose, water, syrup, and methyl cellulose. The formulations can additionally include, without limitation, lubricating agents such as talc, magnesium stearate, and mineral oil; wetting agents; emulsifying and suspending agents; preserving agents such as methyl- and propylhydroxy-benzoates; sweetening agents; flavoring agents, or combinations thereof.

The active compound can be effective over a wide dosage range and is generally administered in a pharmaceutically effective amount. It will be understood, however, that the amount of the compound actually administered will usually be determined by a physician, according to the relevant circumstances, including the condition to be treated, the chosen route of administration, the actual compound administered, the age, weight, and response of the individual patient, the severity of the patient's symptoms, and the like.

H. Examples

The following examples are put forth so as to provide those of ordinary skill in the art with a complete disclosure and description of how the compounds, and/or methods disclosed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

The Examples are provided herein to illustrate the invention, and should not be construed as limiting the invention in any way. Examples are provided herein to illustrate the invention and should not be construed as limiting the invention in any way.

1. General Experimental Methods

All reactions were carried out under an argon atmosphere in oven-dried glassware with magnetic stirring bar. Dry and degassed solvents were obtained by solvent purification system under argon. All commercially obtained reagents were used as received. Purification of reaction products was carried out by flash column chromatography using silica gel 60 (230-400 mash). Analytical thin layer chromatography was performed on 0.25 mm aluminum-backed silica gel 60-F plates. Visualization was accompanied with UV light and $KMnO_4$ solution. Concentration in vacuo refers to the removal of volatile solvent using a rotary evaporator attached to a dry diaphragm pump (10-15 mm Hg) followed by pumping to a constant weight with an oil pump (<300 mTorr). $^1H$ NMR spectra are recorded at 400 MHz and are recorded relative to $CDCl_3$ (δ 7.26) or TMS (δ 0.00). $^1H$ NMR coupling constants (J) are reported in Hertz (Hz) and multiplicities are indicated as follows: s (singlet), bs (broad singlet), d (doublet), t (triplet), m (multiplet), dd (doublet of doublet), dt (doublet of triplet). Proton-decoupled $^{13}C$ NMR spectra are recorded at 100 MHz and are reported relative to $CDCl_3$ (δ 77.16). $^{31}P$ NMR spectra are recorded at 162 MHz and $^{31}P$ chemical shifts are reported relative to 85% $H_3PO_4$ as an external standard.

A. Preparation of N-Heterocyclic Phosphine Chloride (NHP—Cl)

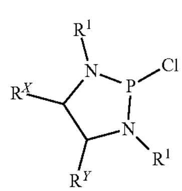

The appropriate ethylene diamine (14.1 mmol, 1.0 equiv) was dissolved in dichloromethane (31 mL). The solution was cooled to 0° C. or −78° C. and $PCl_3$ (14.1 mmol, 1.0 equiv) slowly added followed by triethylamine (28.2 mmol, 2.0 equiv) at same temperature. The mixture was stirred for 30 min at 0° C. or −78° C. and an additional 90 min at room temperature. On completion of the reaction (monitored by TLC analysis), the volatiles were removed in vacuo, and the residue was extracted in THF, filtered through a pad of diatomaceous earth and the filtrates were concentrated under vacuum to obtain pure product as off-white solid.

b. General Synthesis of N-Heterocyclicphosphine Thiourea (NHP-Thiourea) Catalysts To a solution of the appropriate NHP—Cl (3.61 mmol, 1.0 equiv) in DCM or toluene (25 mL) was added a hydroxythiourea compound (3.61 mmol, 1.0 equiv) and triethylamine (4.33 mmol, 1.2 equiv) at 0° C. After 2 h stirring at room temperature, the reaction mixture was diluted in DCM, washed with aq. sat. $NaHCO_3$ solution, dried over $Na_2SO_4$, and concentrated in vacuo. The resulting crude product was purified by chromatography over silica gel (eluting with 15-20% EtOAc/hexanes) to give the corresponding NHP-thiourea as colorless solid.

The following NHP-thiourea catalysts were preparing according the procedure described above using the appropriate NHP—Cl and hydroxythiourea compounds.

i. 4-((1,3-diphenyl-1,3,2-diazaphospholidin-2-yl)oxy)-N-phenylbutanethioamide (compound 3/1a)

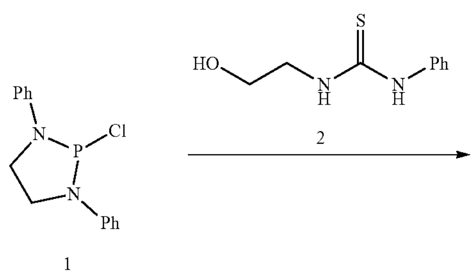

3

2-Chloro-1,3-diphenyl-1,3,2-diazaphospholidine (Robbie et al. (2011) *Polyhedron* 30: 1849) (1.00 g, 3.62 mmol), 1-(2-hydroxyethyl)-3-phenylthiourea (Bemacki et al. (2010) *Org. Lett.* 12: 5526) (0.711 g, 3.62 mmol), and triethylamine (0.438 g, 4.34 mmol) in dry DCM (25 mL) were subjected to the reaction conditions described above. Colorless crystalline solid 1a (1.13 g, 2.58 mmol, 71%). mp: 112-113° C. IR (KBr, $cm^{-1}$): 3394, 3182, 3020, 2866, 1597, 1496, 1276, 1030; $^1H$ NMR (400 MHz, $CDCl_3$): δ 7.73 (bs, 1H), 7.37 (app t, J=7.2, Hz, 2H), 7.30-7.23 (m, 5H), 7.10-7.07 (m, 4H), 7.04 (d, J=7.5 Hz, 2H), 6.91 (app t, J=7.3, Hz, 2H), 6.26 (bs, 1H), 3.88-3.84 (m, 2H), 3.82-3.75 (m, 2H), 3.73-3.71 (m, 2H), 3.68-3.65 (m, 2H); $^{13}$C NMR (100 MHz, $CDCl_3$): δ 180.4, 144.7 (d, J=17.9 Hz), 136.0, 130.0, 129.4, 127.0, 124.9, 120.3, 115.3 (d, J=14.2 Hz), 61.8, 47.4 (d, J=9.7 Hz), 45.9; $^{31}$P NMR (162 MHz, $CDCl_3$): δ 104.30 ppm; HRMS (APCI) calcd for $C_{23}H_{25}N_4OPS$ [M+Cl]−: 471.1181; found: 471.1187 ii. 1-(3,5-bis(trifluoromethyl)phenyl)-3-(2-((1,3-diphenyl-1,3,2-diazaphospholidin-2-yl)oxy)ethyl) thiourea (Compound 4/1g)

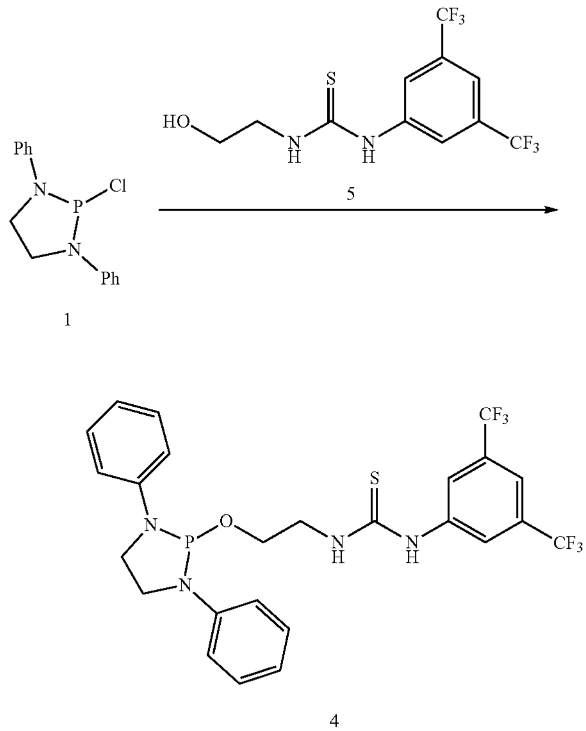

2-Chloro-1,3-diphenyl-1,3,2-diazaphospholidine (Robbie et al. (2011) *Polyhedron* 30: 1849) (0.506 g, 1.80 mmol), 1-(3,5-bis(trifluoromethyl)phenyl)-3-(2-hydroxyethyl)thiourea (Boverie et al. (1999) WO 1999007672 A1) (0.661 g, 1.80 mmol), and triethylamine (0.219 g, 2.19 mmol) in dry DCM (15 mL) were subjected to the reaction conditions described in GP-2. Colorless crystalline solid Ig (0.346 g, 0.604 mmol, 34%). mp: 118-121° C. IR (KBr, cm$^{-1}$): 3340, 3217, 3041, 2805, 1597, 1469, 1276, 1026; $^1$H NMR (400 MHz, $CDCl_3$): δ 7.73 (bs, 2H), 7.63 (s, 1H), 7.30 (t, J=8.5 Hz, 4H), 7.16 (d, J=7.2 Hz, 4H), 6.93 (app t, J=7.3 Hz, 2H), 6.72 (bs, 1H), 6.08 (bs, 1H), 3.95-3.92 (m, 2H), 3.84-3.78 (m, 4H), 3.66 (bs, 2H); $^{13}$C NMR (100 MHz, $CDCl_3$): δ 180.9, 144.6 (d, J=17.9 Hz), 139.5, 132.3 (q, J=34.4 Hz), 129.7, 124.3, 123.5, 120.5, 118.6, 116.2 (d, J=14.2 Hz), 62.2, 47.3 (d, J=9.7 Hz), 45.8; $^{31}$P NMR (162 MHz, $CDCl_3$): δ 104.86 ppm; HRMS (APCI): found [$M^+$] values corresponding to one particular part of the compound; calcd for $C_{11}H_9F_6N_2S$ [$M^+$] (1-(3,5-bis(trifluoromethyl)phenyl)-3-ethylthiourea): 315.0391; found 315.0376.

iii. 1-(2-((1,3-bis(4-methoxyphenyl)-1,3,2-diazaphospholidin-2-yl)oxy)ethyl)-3-phenylthiourea (Compound 7/1b)

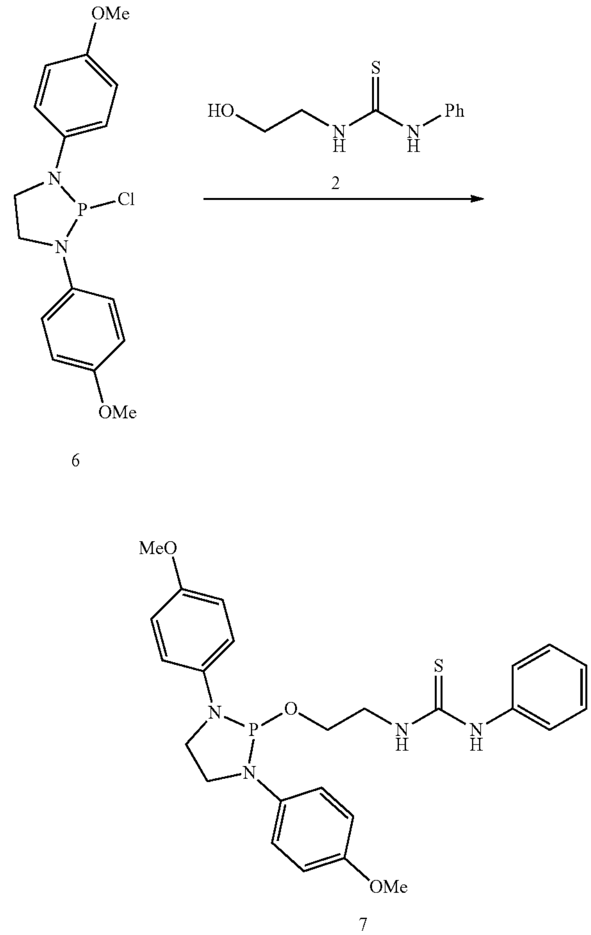

2-Chloro-1,3-bis(4-methoxyphenyl)-1,3,2-diazaphospholidine (Caputo et al. (2008) *Dalton Trans.* 3461) (0.502 g, 1.48 mmol), 1-(2-hydroxyethyl)-3-phenylthiourea (0.291 g, 1.48 mmol), and triethylamine (0.165 g, 1.77 mmol) in dry DCM (15 mL) were subjected to the reaction conditions described above. Colorless solid 1b (0.124 g, 0.249 mmol, 17%). mp: 126-128° C. IR (KBr, cm$^{-1}$): 3317, 2924, 2866, 1604, 1508, 1276, 1026; $^1$H NMR (400 MHz, $CDCl_3$): δ 7.70 (bs, 1H), 7.40-7.26 (m, 3H), 7.06-6.99 (m, 6H), 6.81 (d, J=8.8 Hz, 2H), 6.29 (bs, 1H), 3.85-3.66 (m, 14H); $^{13}$C NMR (100 MHz, $CDCl_3$): δ 180.4, 153.8 (d, J=1.5 Hz), 138.4, 138.3, 130.0, 126.9, 124.7, 116.6 (d, J=12.7 Hz), 114.8, 61.5, 55.6 (d, J=2.2 Hz), 48.1 (d, J=9.7 Hz), 46.1; $^{31}$P NMR (162 MHz, $CDCl_3$): δ 105.11 ppm; HRMS (APCI): found [$M^+$] values corresponding to one particular part of the compound; calcd for $C_9H_{11}N_2S$ [$M^+$] (1-ethyl-3-phenylthiourea): 179.0643; found 179.0638.

iv. 1-(2-((1,3-diphenyl-1,3,2-diazaphospholidin-2-yl) oxy)ethyl)-3-(4-methoxyphenyl)thiourea (Compound 9/1e)

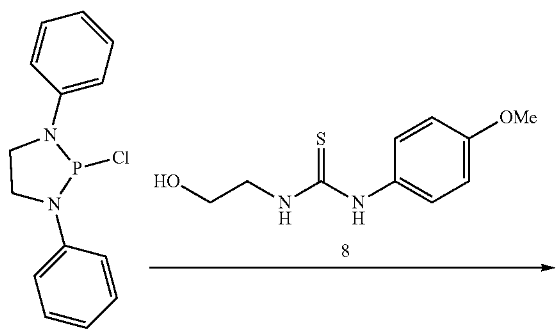

1

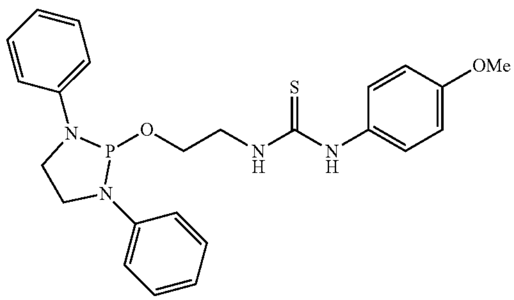

9

2-Chloro-1,3-diphenyl-1,3,2-diazaphospholidine (Robbie et al. (2011) *Polyhedron* 30: 1849) (0.305 g, 1.08 mmol), 1-(2-hydroxyethyl)-3-(4-methoxyphenyl)thiourea[4] (0.245 g, 1.08 mmol), and triethylamine (0.131 g, 1.29 mmol) in dry DCM (10 mL) were subjected to the reaction conditions described above. Colorless solid 1e (0.201 g, 0.431 mmol, 40%). mp: 81-83° C. IR (KBr, $cm^{-1}$): 3379, 3194, 3036, 2866, 1597, 1508, 1276, 1030; 1H NMR (400 MHz, $CDCl_3$): δ 7.30-7.26 (m, 4H), 7.11-7.08 (m, 4H), 6.96-6.87 (m, 6H), 6.03 (bs, 1H), 3.90-3.86 (m, 2H), 3.84 (s, 3H), 3.81-3.76 (m, 2H), 3.74-3.64 (m, 4H); $^{13}$C NMR (100 MHz, $CDCl_3$): δ 180.9, 158.8, 144.7 (d, J=17.9 Hz), 129.4, 129.0, 127.4, 120.3, 115.4, 115.2 (d, J=9.7 Hz), 61.9, 55.5, 47.5 (d, J=9.7 Hz), 45.9; $^{31}$P NMR (162 MHz, $CDCl_3$): δ 104.07 ppm; HRMS (MALDI) for $C_{24}H_{27}N_4O_2PS$ $[M+H]^+$: 467.1671; found: 467.1677.

v. n-(2-((1,3-diphenyl-1,3,2-diazaphospholidin-2-yl) oxy)ethyl)-4-methylbenzenesulfonamide (Compound 11/1i)

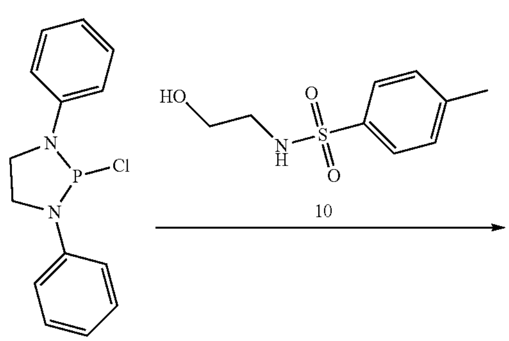

1

-continued

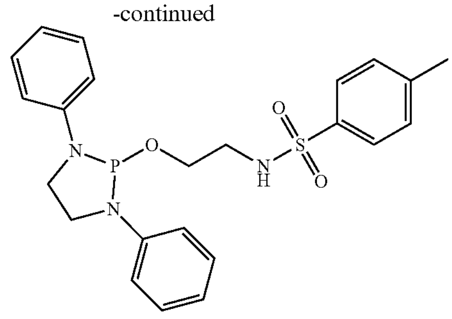

11

2-Chloro-1,3-diphenyl-1,3,2-diazaphospholidine (Robbie et al. (2011) *Polyhedron* 30: 1849) (0.501 g, 1.80 mmol), N-(2-hydroxyethyl)-4-methylbenzenesulfonamide (Law and McErlean (2013) *Chem. Eur. J.* 19: 15852) (0.388 g, 1.80 mmol), and triethylamine (0.219 g, 2.19 mmol) in dry DCM (15 mL) were subjected to the reaction conditions described above. Colorless crystalline solid 1i (0.278 g, 0.610 mmol, 34%). mp: 125-127° C. IR (KBr, $cm^{-1}$): 3286, 3047, 2866, 1597, 1489, 1276, 1030; $^{1}$H NMR (400 MHz, $CDCl_3$): δ 7.51 (dt, J=8.3, 1.9 Hz, 2H), 7.32-7.27 (m, 4H), 7.17 (dd, J=7.9, 0.6 Hz, 2H), 7.11-7.08 (m, 4H), 6.95 (app t, J=7.3, Hz, 2H), 4.53 (t, J=6.1 Hz, 1H), 3.86-3.81 (m, 2H), 3.80-3.75 (m, 2H), 3.56 (q, J=5.2 Hz, 2H), 2.94 (q, J=5.5 Hz, 2H), 2.39 (s, 3H); $^{13}$C NMR (100 MHz, $CDCl_3$): δ 144.5 (d, J=17.9 Hz), 143.2, 136.7, 129.6, 129.4, 126.9, 120.4, 115.3 (d, J=14.2 Hz), 61.9, 47.3 (d, J=9.7 Hz), 43.7 (d, J=2.9 Hz), 21.5; $^{31}$P NMR (162 MHz, $CDCl_3$): δ 104.95 ppm; HRMS (ESI) calcd for $C_{23}H_{26}N_3O_3PS$ $[M^+]$: 455.1432; found: 455.1428.

vi. n-(2-((1,3-diphenyl-1,3,2-diazaphospholidin-2-yl)oxy)ethyl)benzamide (Compound 13/1j)

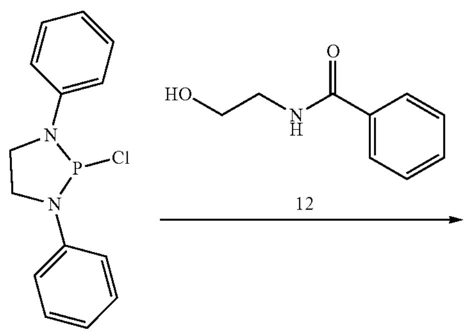

1

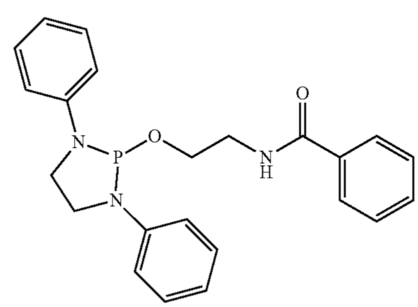

13

2-Chloro-1,3-diphenyl-1,3,2-diazaphospholidine (Robbie et al. (2011) *Polyhedron* 30: 1849) (0.308 g, 1.11 mmol), N-(2-hydroxyethyl)benzamide (Denton et al. (2011) *J. Org. Chem.* 76: 6749) (0.166 g, 1.11 mmol), and triethylamine (0.135 g, 1.33 mmol) in dry DCM (10 mL) were subjected to the reaction conditions described above. Colorless solid 1j (0.165 g, 0.406 mmol, 37%). mp: 124-126° C. IR (KBr, $cm^{-1}$): 3360, 3059, 2870, 1643, 1597, 1496, 1276, 1033; $^{1}H$ NMR (400 MHz, $CDCl_3$): δ 7.47-7.43 (m, 3H), 7.34 (app t, J=7.6 Hz, 2H), 7.27-7.23 (m, 4H), 7.16-7.13 (m, 4H), 6.90 (app t, J=7.3 Hz, 2H), 6.21 (s, 1H), 3.94-3.90 (m, 2H), 3.87-3.79 (m, 2H), 3.76-3.72 (m, 2H), 3.51 (q, J=5.0 Hz, 2H); $^{13}C$ NMR (100 MHz, $CDCl_3$): δ 167.4, 144.7 (d, J=17.2 Hz), 134.2, 131.2, 129.4, 128.4, 126.8, 120.3, 115.1 (d, J=13.5 Hz), 62.4, 47.4 (d, J=10.5 Hz), 40.5 (d, J=3.0 Hz); $^{31}P$ NMR (162 MHz, $CDCl_3$): δ 104.10 ppm; HRMS (APCI): found [$M^+$] values corresponding to one particular part of the compound; calcd for $C_9H_{10}NO$ [$M^+$] (N-ethylbenzamide): 148.0762; found 148.0761.

vii. 1-benzyl-3-(2-((1,3-diphenyl-1,3,2-diazaphospholidin-2-yl)oxy)ethyl)thiourea (Compound 15/1f)

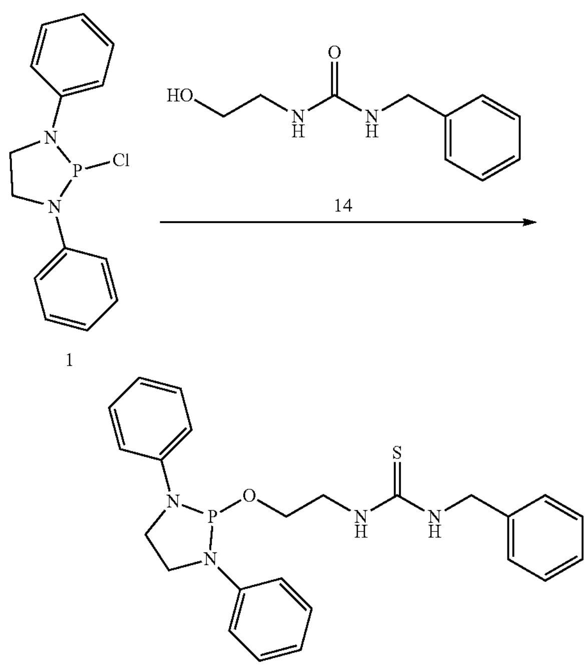

15

2-Chloro-1,3-diphenyl-1,3,2-diazaphospholidine (Robbie et al. (2011) *Polyhedron* 30: 1849) (0.500 g, 1.80 mmol), 1-benzyl-3-(2-hydroxyethyl)urea (Reiter and Schafer (1980) *Eur. J. Med. Chem.* 15: 41) (0.387 g, 1.80 mmol), and triethylamine (0.224 g, 2.21 mmol) in dry DCM (15 mL) were subjected to the reaction conditions described above. Colorless solid 1f (0.220 g, 0.489 mmol, 27%). mp: 108-111° C. IR (KBr, $cm^{-1}$): %). 3325, 3051, 2935, 1651, 1600, 1261, 1072; $^{1}H$ NMR (400 MHz, $CDCl_3$): δ 7.35-7.19 (m, 9H), 7.10 (d, J=8.6 Hz, 4H), 6.84 (t, J=8.6 Hz, 2H), 5.61 (bs, 1H), 4.35 (bs, 2H), 3.86-3.67 (m, 6H), 3.55 (bs, 2H); $^{13}C$ NMR (100 MHz, $CDCl_3$): δ 182.2, 144.7 (d, J=17.2 Hz), 137.1, 129.5, 128.7, 127.9, 127.8, 120.3, 115.3 (d, J=14.2 Hz), 62.8, 48.3, 47.3 (d, J=9.7 Hz), 45.6; $^{31}P$ NMR (162 MHz, $CDCl_3$): δ 105.14 ppm; HRMS (APCI): found [$M^+$] values corresponding to one particular part of the compound; calcd for $C_{10}H_{13}N_2S$ [$M^+$] (1-benzyl-3-ethylthiourea fragment): 193.0799; found 193.0792.

VIII. Compound 17: Colorless Solid. Yield: 83%

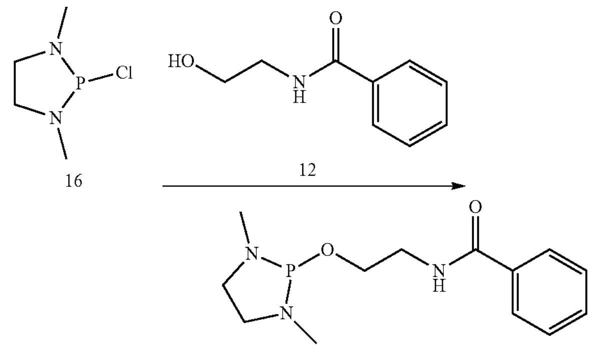

17 ix. Compound 19: Colorless Solid. Yield: Crude

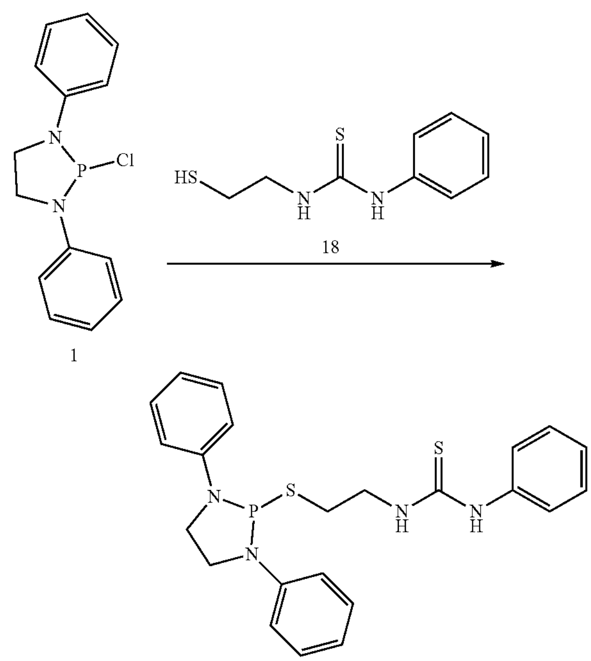

19 x. 1-(2-((1,3-bis(2,6-diisopropylphenyl)-1,3,2-diazaphospholidin-2-yl)oxy)ethyl)-3-phenylthiourea (Compound 21/1c)

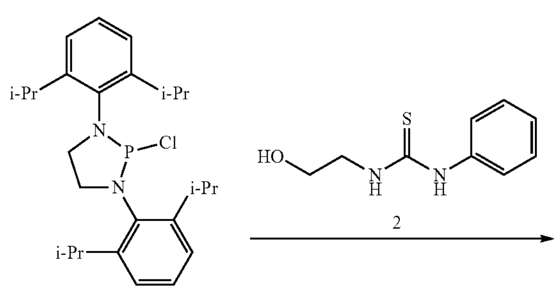

20

-continued

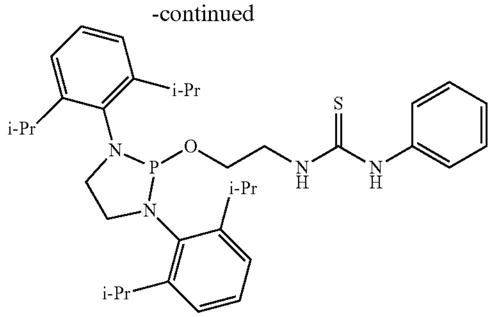

21

2-Chloro-1,3-bis(2,6-diisopropylphenyl)-1,3,2-diazaphospholidine (Caputo et al. (2008) *Dalton Trans*. 3461) (3.04 g, 6.86 mmol), 1-(2-hydroxyethyl)-3-phenylthiourea (1.64 g, 8.92 mmol), and triethylamine (0.900 g, 8.92 mmol) in dry toluene (36 mL) were subjected to the reaction conditions described in GP-2. Off-white solid Ic (2.64 g, 4.35 mmol, 63%). mp: 82-85° C. IR (KBr, $cm^{-1}$): 3329, 2962, 2866, 1535, 1446, 1257, 1041; $^{1}H$ NMR (400 MHz, $CDCl_3$): δ 7.62 (bs, 1H), 7.41 (t, J=7.8 Hz, 2H), 7.29-7.13 (m, 9H), 6.44 (bs, 1H), 3.88-3.80 (m, 2H), 3.69-3.66 (m, 4H), 3.61-3.48 (m, 4H), 3.46 (quint, J=4.5 Hz, 2H), 1.30-1.12 (m, 24H); $^{13}C$ NMR (100 MHz, $CDCl_3$): δ 180.2, 149.4 (d, J=2.9 Hz), 148.4 (d, J=1.5 Hz), 137.7 (d, J=14.2 Hz), 129.9, 127.3, 126.7, 124.3, 124.1, 54.3 (d, J=6.7 Hz), 46.8 (d, J=8.2 Hz), 28.3 (d, J=74.0 Hz), 25.5 (d, J=56.1 Hz), 24.2 9 d, J=18.7 Hz); $^{31}P$ NMR (162 MHz, $CDCl_3$): δ 128.05 ppm; HRMS (APCI) calcd for $C_{35}H_{49}N_4OPS$ [M+Cl]−: 639.3059; found: 639.3045.

xi. 1-(2-((1,3-di-p-tolyl-1,3,2-diazaphospholidin-2-yl)oxy)ethyl)-3-phenylthiourea (Compound 23/1d)

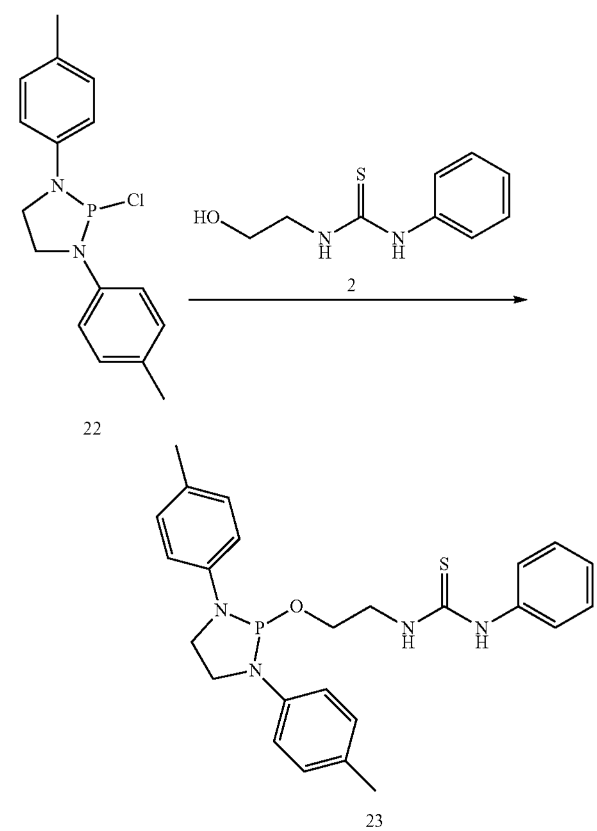

2-Chloro-1,3-di-p-tolyl-1,3,2-diazaphospholidine (Robbie et al. (2011) *Polyhedron* 30: 1849) (0.250 g, 0.912 mmol), 1-(2-hydroxyethyl)-3-phenylthiourea (0.213 g, 1.09 mmol), and triethylamine (0.110 g, 1.09 mmol) in dry toluene (4.5 mL) were subjected to the reaction conditions described above. Colorless solid Id (0.163 g, 0.352 mmol, 39%). mp: 136-139° C. IR (KBr, $cm^{-1}$): 3367, 3190, 2866, 1616, 1512, 1269, 1026; $^{1}H$ NMR (400 MHz, $CDCl_3$): δ 7.58 (bs, 1H), 7.40-7.27 (m, 3H), 7.06-6.97 (m, 10H), 6.26 (bs, 1H), 3.86-3.66 (m, 8H), 2.27 (s, 6H); $^{13}C$ NMR (100 MHz, $CDCl_3$): δ 180.4, 142.2 (d, J=17.9 Hz), 136.1, 129.9, 129.8, 129.5, 127.0, 124.8, 115.3 (d, J=13.4 Hz), 61.7, 47.6 (d, J=10.5 Hz), 46.0 (d, J=2.9 Hz), 20.4 (d, J=1.5 Hz); $^{31}P$ NMR (162 MHz, $CDCl_3$): δ 104.31 ppm; HRMS (ESI) calcd for $C_{25}H_{29}N_4OPS$ [$M^+$] 464.1800; found: 464.1777.

xii. 1-(3-((1,3-diphenyl-1,3,2-diazaphospholidin-2-yl)oxy)propyl)-3-phenylthiourea (Compound 25/11)

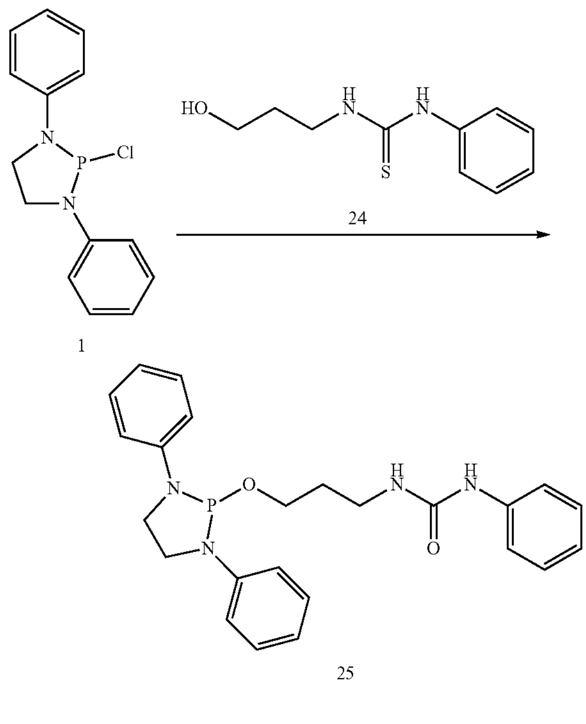

2-Chloro-1,3-diphenyl-1,3,2-diazaphospholidine (Robbie et al. (2011) *Polyhedron* 30: 1849) (0.400 g, 1.45 mmol), 1-(3-hydroxypropyl)-3-phenylthiourea (Heinelt et al. (2004) *Tetrahedron* 60: 9883) (0.304 g, 1.45 mmol), and triethylamine (0.175 g, 1.74 mmol) in dry DCM (10 mL) were subjected to the reaction conditions described above. Colorless solid 11 (0.219 g, 0.488 mmol, 34%). mp: 132-135° C. IR (KBr, $cm^{-1}$): 3275, 3059, 2870, 1597, 1496, 1280, 1018; $^{1}H$ NMR (400 MHz, $CDCl_3$): δ 7.91 (s, 1H), 7.43 (t, J=7.7 Hz, 2H), 7.31-7.18 (m, 8H), 7.02-6.99 (m, 4H), 6.90 (t, J=7.3 Hz, 2H), 6.47 (s, 1H), 3.82-3.71 (m, 4H), 3.60-3.51 (m, 4H), 1.69-1.63 (m, 2H); $^{13}C$ NMR (100 MHz, $CDCl_3$): δ 180.3, 144.7 (d, J=17.2 Hz), 136.2, 130.2, 129.4, 127.1, 125.1, 120.2 (d, J=1.5 Hz), 115.1 (d, J=13.5 Hz), 62.1, 47.4 (d, J=9.7 Hz), 43.8, 29.4 (d, J=2.2 Hz); $^{31}P$ NMR (162 MHz, $CDCl_3$): δ 103.18 ppm; HRMS (APCI) calcd for $C_{24}H_{27}N_4OPS$ [M+Cl]−: 485.1337; found: 485.1328.

xiii. (R)-1-(2-((1,3-diphenyl-1,3,2-diazaphospholidin-2-yl)oxy)propyl)-3-phenylthiourea (Compound 27/1n)

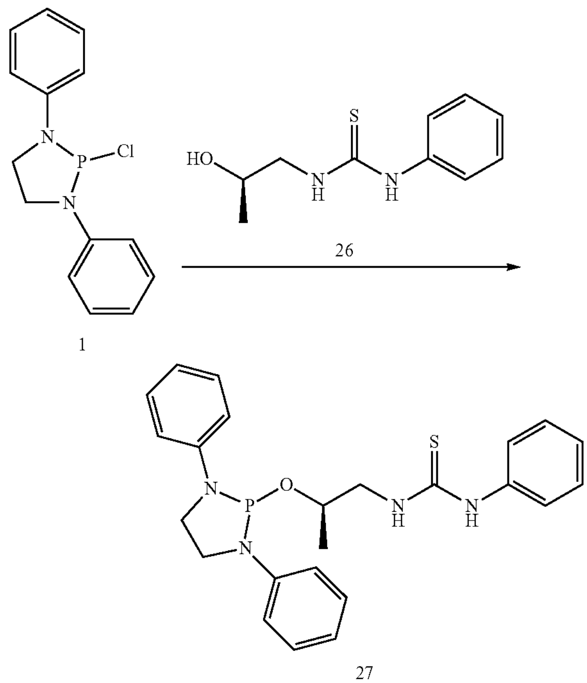

2-Chloro-1,3-diphenyl-1,3,2-diazaphospholidine (Robbie et al. (2011) *Polyhedron* 30: 1849) (0.368 g, 1.32 mmol), (R)-1-(2-hydroxypropyl)-3-phenylurea (Heinelt et al. (2004) *Tetrahedron* 60: 9883) (0.280 g, 1.32 mmol), and triethylamine (0.159 g, 1.59 mmol) in dry DCM (15 mL) were subjected to the reaction conditions described above. Colorless crystalline solid in (0.185 g, 0.408 mmol, 30%). mp: 139-141° C. IR (KBr, $cm^{-1}$): 3344, 3055, 3020, 2874, 1597, 1496, 1276, 1041; $^{1}H$ NMR (400 MHz, $CDCl_3$): δ 7.36-7.21 (m, 8H), 7.11-7.01 (m, 6H), 6.94-6.87 (m, 2H), 6.01 (bs, 1H), 4.35-4.29 (m, 1H), 3.92-3.68 (m, 4H), 3.52 (t, J=4.9, Hz, 2H), 1.01 (d, t, J=6.5 Hz, 3H); $^{13}C$ NMR (100 MHz, $CDCl_3$): δ 180.9, 144.8 (dd, J=17.9, 3.7 Hz), 136.5, 129.7, 129.4 (d, J=9.7 Hz), 126.7, 124.7, 120.1, 115.42 (dd, J=14.2, 11.2 Hz), 69.3, 51.2, 47.1 (d, J=9.7 Hz), 19.9; $^{31}P$ NMR (162 MHz, $CDCl_3$): δ 106.33 ppm; HRMS (ESI) calcd for $C_{24}H_{27}N_4OPS$ [$M^+$]: 450.1696; found: 450.1643.

xiv. Compound 29: Colorless Solid. Yield: 29%

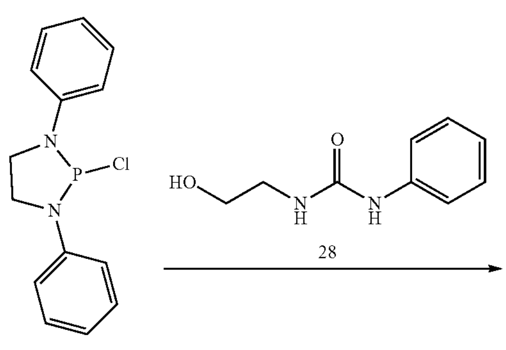

-continued

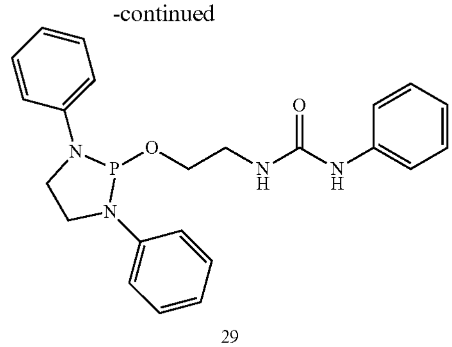

xv. 1-(2-((1,3-diphenyl-1,3,2-diazaphospholidin-2-yl)oxy)ethyl)-1-methyl-3-phenylthiourea (Compound 31/1o)

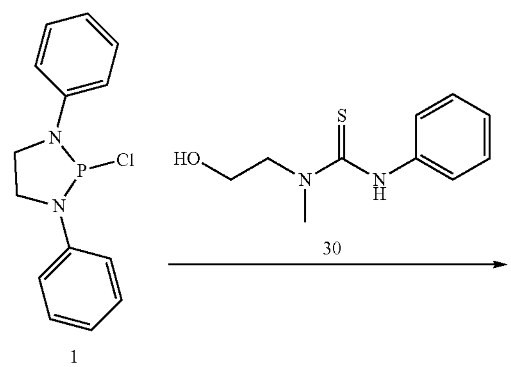

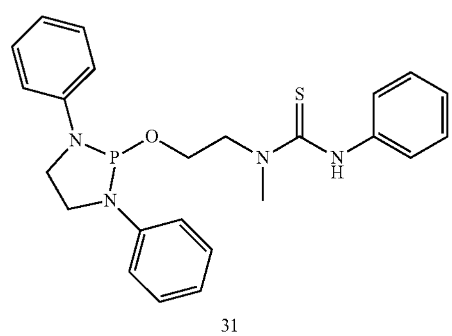

2-Chloro-1,3-diphenyl-1,3,2-diazaphospholidine (Robbie et al. (2011) *Polyhedron* 30: 1849) (1.00 g, 3.62 mmol), 1-(2-hydroxyethyl)-1-methyl-3-phenylthiourea (Kim et al. (1999) *Tetrahedron Lett.* 40: 8201) (0.758 g, 3.62 mmol), and triethylamine (0.438 g, 4.34 mmol) in dry DCM (25 mL) were subjected to the reaction conditions described above. Colorless solid 1o (0.460 g, 1.02 mmol, 29%). mp: 119-121° C. IR (KBr, $cm^{-1}$): 3302, 3032, 2870, 1597, 1492, 1273, 1026; $^{1}H$ NMR (400 MHz, $CDCl_3$): δ 7.93 (bs, 1H), 7.32-7.25 (m, 8H), 7.13 (d, J=7.8 Hz, 2H), 6.93 (app t, J=7.3 Hz, 2H), 3.92-3.82 (m, 4H), 3.78 (quint, J=3.7 Hz, 2H), 3.73 (bs, 2H), 3.04 (s, 3H); $^{13}C$ NMR (100 MHz, $CDCl_3$): δ 182.9, 144.5 (d, J=17.2 Hz), 139.9, 129.5, 128.6, 125.0, 124.5, 120.6, 115.4 (d, J=14.2 Hz), 61.9, 54.4, 47.5 (d, J=9.7 Hz), 39.9; $^{31}P$ NMR (162 MHz, $CDCl_3$): δ 105.70 ppm; HRMS (MALDI) for $C_{24}H_{27}N_4OPS$ [M+H]$^+$: 451.1721; found: 451.1727.

xvi. Compound A
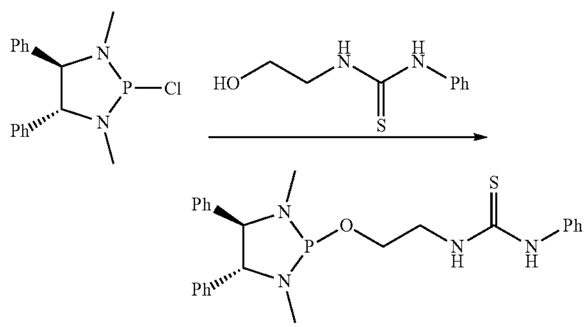
xvii. Compound B
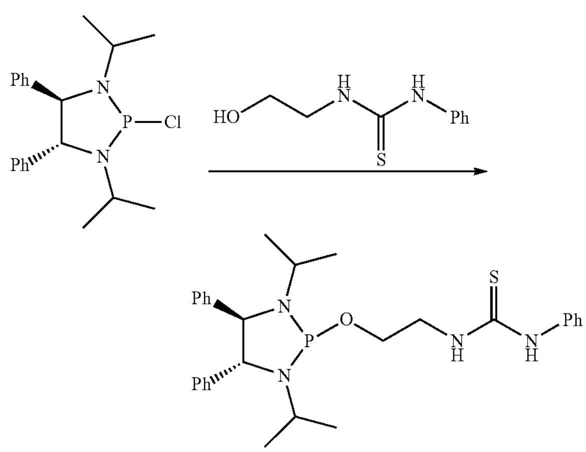
xviii. Compound C
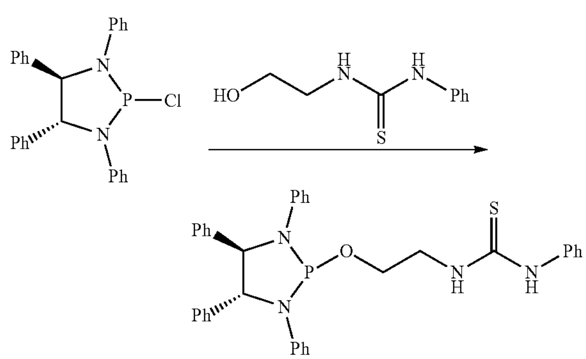
xix. Compound D
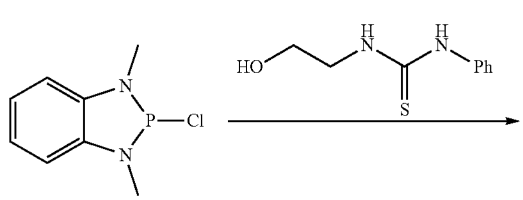
-continued
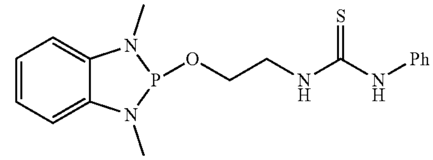
xx. Compound E
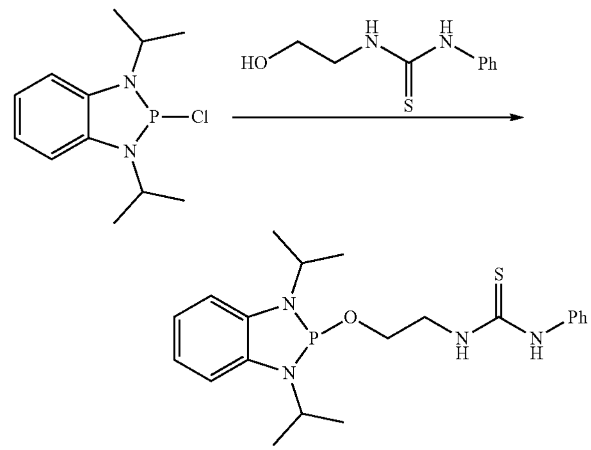
xxi. Compound F
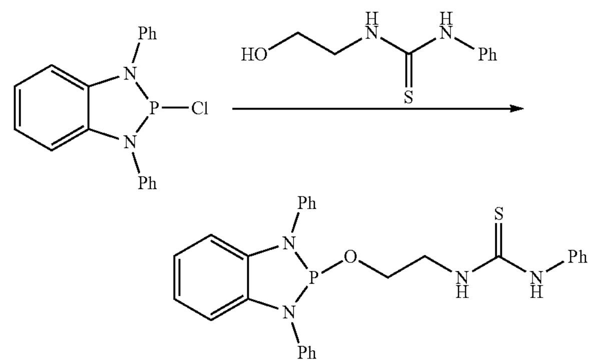
xxii. Compound G
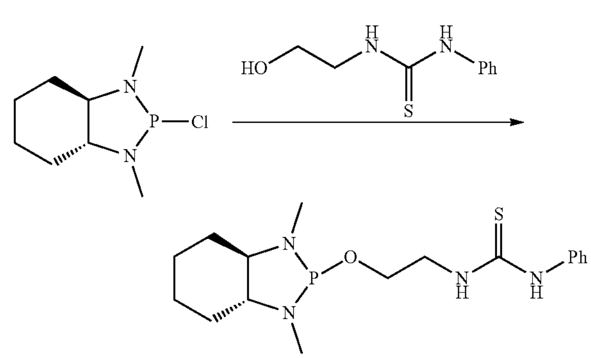

xxiii. Compound H

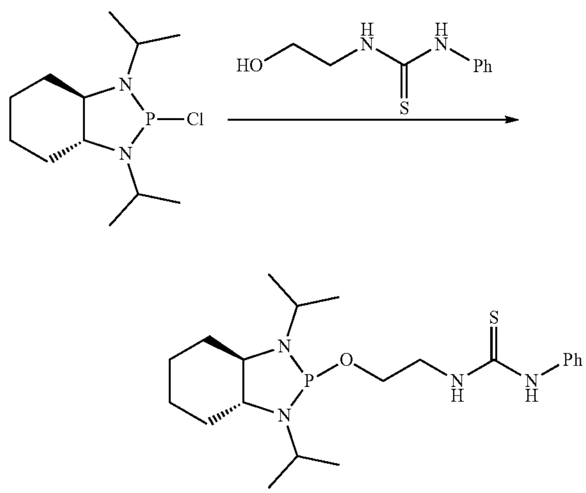

xxiv. Compound I

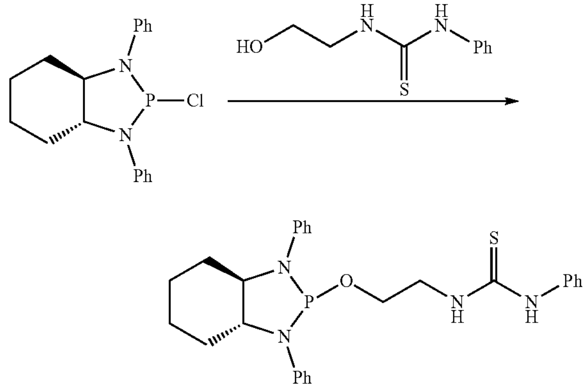

xxv. 1-cyclohexyl-3-(2-((1,3-diphenyl-1,3,2-diazaphospholidin-2-yl)oxy)ethyl)thiourea (1h)

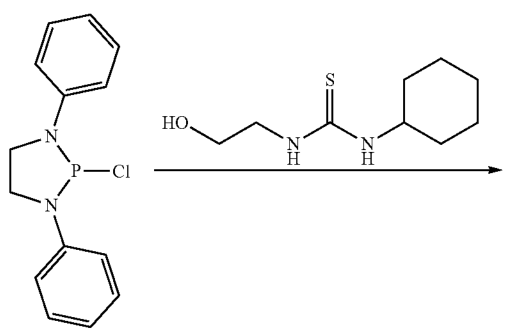

1

-continued

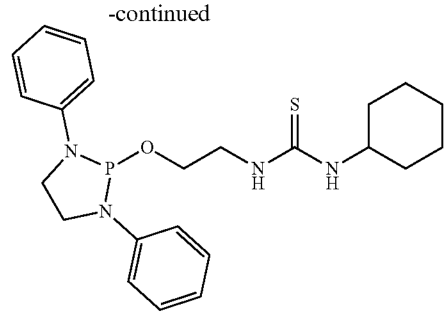

1h

2-Chloro-1,3-diphenyl-1,3,2-diazaphospholidine (Robbie et al. (2011) *Polyhedron* 30: 1849) (0.420 g, 1.51 mmol), 1-cyclohexyl-3-(2-hydroxyethyl)urea (Lown and Chauhan (1983) *J. Org. Chem.* 48, 507) (0.308 g, 1.51 mmol), and triethylamine (0.181 g, 1.81 mmol) in dry DCM (18 mL) were subjected to the reaction conditions described in GP-2. Colorless solid 1h (0.208 g, 0.470 mmol, 31%). mp: 137-139° C. IR (Neat, $cm^{-1}$): 3256, 3061, 2930, 2854, 1595, 1543, 1276, 1026; $^{1}$H NMR (400 MHz, $CDCl_3$): δ 7.31 (app t, J=8.6 Hz, 4H), 7.17-7.14 (m, 4H), 6.95 (t, J=7.2 Hz, 2H), 5.56 (bs, 2H), 3.93-3.86 (m, 2H), 3.84-3.78 (m, 2H), 3.72-3.68 (m, 2H), 3.57 (bs, 2H), 1.88 (d, J=7.2 Hz, 2H), 1.71-1.58 (m, 4H), 1.37-1.26 (m, 2H), 1.19-0.99 (m, 3H); $^{13}$C NMR (100 MHz, $CDCl_3$): δ 180.8, 144.7 (d, J=17.9 Hz), 129.5, 120.4 (d, J=1.5 Hz), 115.3 (d, J=14.2 Hz), 62.8, 52.7, 47.4 (d, J=10.5 Hz), 45.5, 32.7, 25.4, 24.7; $^{31}$P NMR (162 MHz, $CDCl_3$): δ 104.73 ppm; HRMS (ESI) calcd for $C_{23}H_{31}N_4OPS$ $[M+H]^+$: 442.1956; found: 442.1926.

xxvi. n-(2-((1,3-diphenyl-1,3,2-diazaphospholidin-2-yl)oxy)ethyl)-N-methylbenzamide (1k)

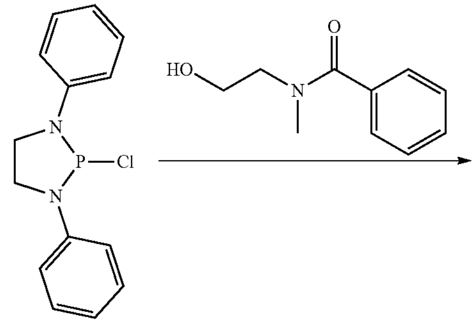

1

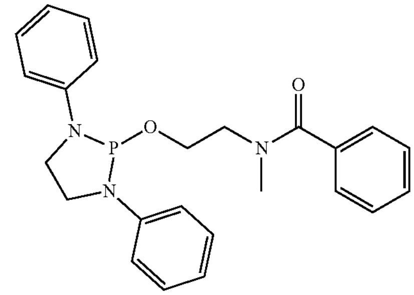

1k

2-Chloro-1,3-diphenyl-1,3,2-diazaphospholidine (Robbie et al. (2011) *Polyhedron* 30: 1849) (0.500 g, 1.80 mmol), 1-(2-hydroxyethyl)-1-methyl-3-phenylthiourea (Guzaev and Manoharan (2001) *J. Am. Chem. Soc.* 123: 783) (0.320 g, 1.80 mmol), and triethylamine (0.219 g, 2.19 mmol) in dry DCM (15 mL) were subjected to the reaction conditions described above. Colorless solid 1k (0.280 g, 0.668 mmol, 37%). mp: 133-136° C. IR (KBr, $cm^{-1}$): 3406, 3051, 2854, 1712, 1600, 1504, 1257, 1026; $^{1}H$ NMR (400 MHz, $CDCl_3$): δ 7.35-7.27 (m, 8H), 7.19-7.02 (m, 5H), 6.93 (tt, J=7.4, 0.9 Hz, 2H), 3.94-3.77 (m, 6H), 3.54 (bs, 2H), 2.87-2.85 (m, 3H); $^{13}C$ NMR (100 MHz, $CDCl_3$): δ 171.4, 145.2 (d, J=17.2 Hz), 136.3, 129.4, 129.2, 128.2, 126.7, 120.6, 115.2 (d, J=14.2 Hz), 62.3, 48.8, 47.5 (d, J=9.7 Hz), 39.6; $^{31}P$ NMR (162 MHz, $CDCl_3$): δ 102.60 ppm; HRMS (ESI): found [$M^+$] values corresponding to one particular part of the compound; calcd for $C_{10}H_{12}NO$ [$M^+$] (N-ethyl-N-methyl benzamide fragment): 162.0919; found 162.0923.

xxvii. 1-(4-((1,3-diphenyl-1,3,2-diazaphospholidin-2-yl)oxy)butyl)-3-phenylthiourea (1m)

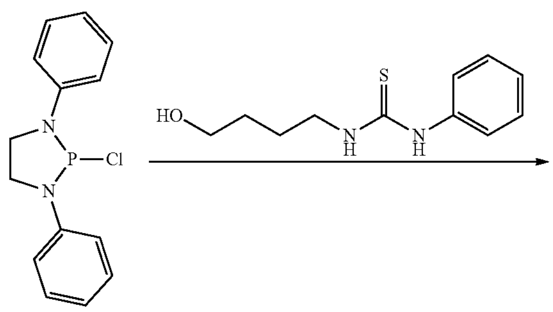

1

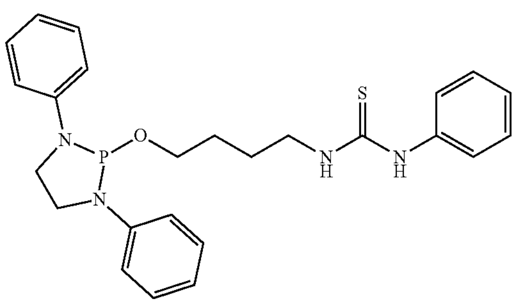

1m

2-Chloro-1,3-diphenyl-1,3,2-diazaphospholidine (Robbie et al. (2011) *Polyhedron* 30: 1849) (1.70 g, 6.17 mmol), 1-(4-hydroxybutyl)-3-phenylthiourea (Ambartsumova et al. (1997) *Chem. Heterocycl. Compd.* 33: 112) (2.00 g, 6.17 mmol), and triethylamine (0.747 g, 7.41 mmol) in dry DCM (18 mL) were subjected to the reaction conditions described above. Colorless solid 1m (0.775 g, 1.67 mmol, 27%). mp: 134-136° C. IR (KBr, $cm^{-1}$): 3263, 3093, 2870, 1593, 1496, 1280, 1010; $^{1}H$ NMR (400 MHz, $CDCl_3$): δ 7.84 (bs, 1H), 7.42 (t, J=7.4 Hz, 2H), 7.32-7.21 (m, 7H), 7.15-7.09 (m, 4H), 6.85 (t, J=7.2 Hz, 2H), 5.87 (bs, 1H), 3.88-3.81 (m, 2H), 3.78-3.73 (m, 2H), 3.58-3.53 (m, 2H), 3.39-3.37 (m, 2H), 1.42-1.39 (m, 4H); $^{13}C$ NMR (100 MHz, $CDCl_3$): δ 180.1, 145.1 (d, J=17.2 Hz), 136.1, 130.2, 129.3, 127.2, 125.1, 119.9, 115.3 (d, J=14.2 Hz), 62.7, 47.4 (d, J=10.5 Hz), 44.7, 27.7, 25.4; $^{31}P$ NMR (162 MHz, $CDCl_3$): δ 102.06 ppm; HRMS (ESI) calcd for $C_{25}H_{29}N_4OPS$ [$M^+$]: 464.1800; found: 464.1886.

xxviii. 2-ethoxy-1,3-diphenyl-1,3,2-diazaphospholidine (S1)

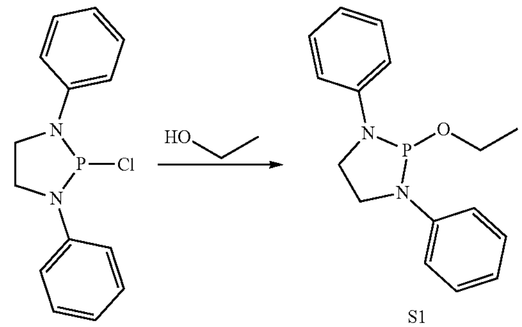

1 S1

2-Chloro-1,3-diphenyl-1,3,2-diazaphospholidine (Robbie et al. (2011) *Polyhedron* 30: 1849) (0.600 g, 2.16 mmol), ethanol (0.110 g, 2.39 mmol), and triethylamine (0.261 g, 0.258 mmol) in dry DCM (10 mL) were subjected to the reaction conditions described above. White solid S1 (0.208 g, 0.727 mmol, 34%). mp: 88-89° C. IR (KBr, $cm^{-1}$): 3434 (br), 3031, 2907, 1750; $^{1}H$ NMR (400 MHz, $CDCl_3$): δ 7.30 (t, J=8.4 Hz, 4H), 7.17-7.15 (m, 4H), 6.92 (t, J=7.3 Hz, 2H), 3.89-3.77 (m, 4H), 3.64 (quint, J=7.0 Hz, 2H), 1.05 (t, J=6.9 Hz, 3H); $^{13}C$ NMR (100 MHz, $CDCl_3$): δ 145.2 (d, J=17.2 Hz), 129.3, 119.9 (d, J=1.5 Hz), 115.3 (d, J=14.2 Hz), 59.2, 47.3 (d, J=9.7 Hz), 16.6 (d, J=2.9 Hz); $^{31}P$ NMR (162 MHz, $CDCl_3$): δ 103.26 ppm; HRMS (APCI) calcd for $C_{16}H_9N_2OP$ $[M+H]^+$: 287.1308; found: 287.1301 c. Solvent Screening

The solvents screened and the results are illustrated below.

TABLE 1

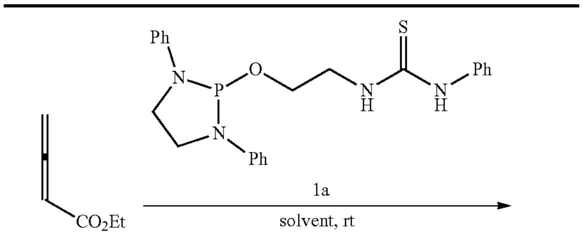

2a

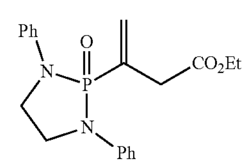

3a

| Entry | Solvent | Time (h) | Yield (%)[a,b] |
|---|---|---|---|
| 1 | THF | 5 | 59 |
| 2 | Toluene | 5 | 48 |
| 3 | $CHCl_3$ | 5 | 80 |
| 4 | MeCN | 5 | 56 |

TABLE 1-continued
| | | | |
|---|---|---|---|
| 5 | $Et_2O$ | 5 | 65 |
| 6 | 1,2-DCE | 5 | 50 |
[a]Reactions were performed using 2a (0.30 mmol) and NHP 1a (0.10 mmol) in 0.15 mL solvent at rt for 5 h.
[b]Isolated yield.
d. Control Experiment
The conditions for the control experiments and the corresponding results are illustrated below.
SCHEME 16.
Control Experiments for Vinylphosphonate Synthesis
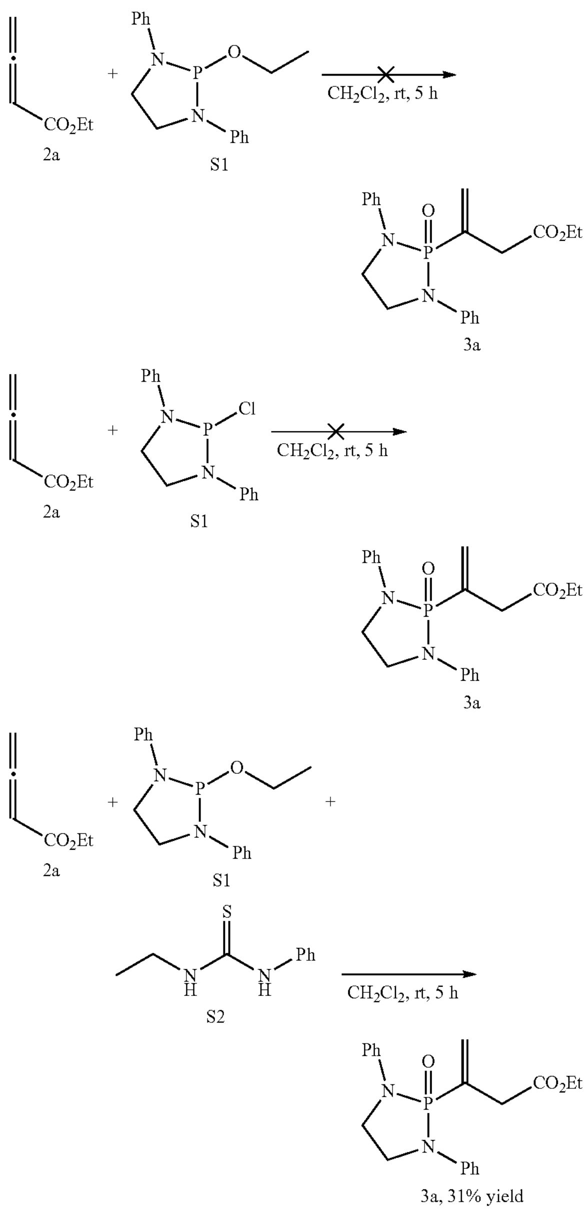
-continued
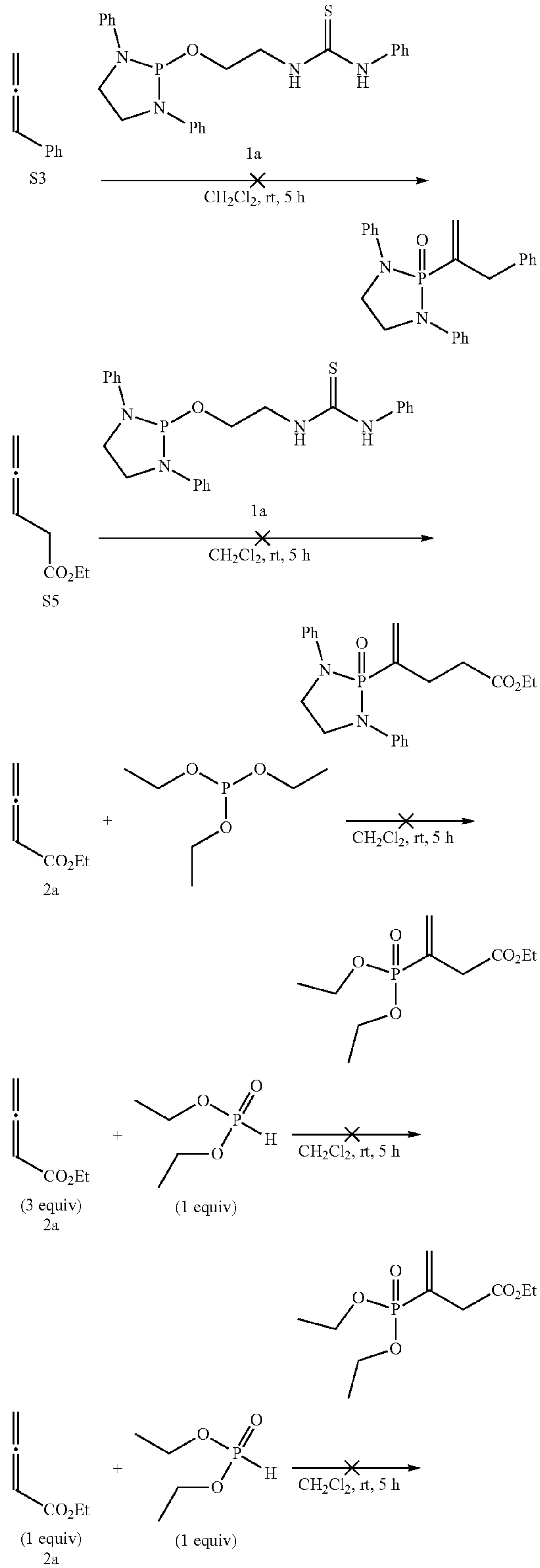

-continued

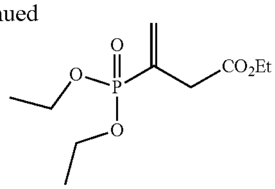

These control experiments with blue color showed that our NHP-thiourea is a unique reagent for the synthesis of vinyldiazaphosphonates under mild reaction conditions.

e. General Synthesis of Allenes

The mixture of alkyl bromide (1.2 equiv) and (carbethoxymethylene)triphenylphosphorane (1 equiv) in DCM was refluxed for overnight. The reaction mixture was cooled to 0° C., and added triethylamine (2.0 equiv). After being stirred for 1 hour at rt, to the mixture was added acetyl chloride (1.0 equiv), and the reaction mixture stirred at rt for 15 h. The resulting orange suspension was filtered through silica gel pad, and concentrated under reduced pressure to obtain crude product which was purified by flash column chromatography (10-15% Ether/Hexane) to yield pure product as colorless/yellow color liquid.

i. Ethyl 2-vinylideneoctanoate (2m)

2m

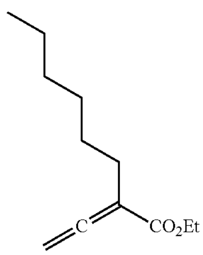

Ethyl 2-vinylideneoctanoate was prepared as described above. $^{1}H$ NMR (400 MHz, $CDCl_3$): δ 5.11 (t, J=3.1 Hz, 2H), 4.20 (q, J=7.0 Hz, 2H), 2.24-2.19 (m, 2H), 1.48-1.41 (m, 2H), 1.35-1.26 (m, 9H), 0.88 (t, J=6.6 Hz, 3H); $^{13}C$ NMR (100 MHz, $CDCl_3$): δ 213.7, 167.3, 100.5, 78.7 (d, J=3.7 Hz), 60.9, 31.6, 29.7, 28.7, 27.9 (d, J=9.7 Hz), 22.6 (d, J=5.2 Hz), 14.2, 14.0.

ii. Ethyl 2-([1,1'-biphenyl]-2-ylmethyl)buta-2,3-dienoate (2v)

2v

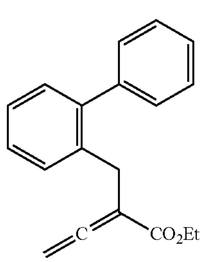

Ethyl 2-([1,1'-biphenyl]-2-ylmethyl)buta-2,3-dienoate was prepared as described above. $^{1}H$ NMR (400 MHz, $CDCl_3$): δ 7.40-7.19 (m, 9H), 4.91-4.90 (m, 2H), 4.16-4.10 (m, 2H), 3.55 (t, J=3.1 Hz, 2H) 1.22 (t, J=7.0 Hz, 3H); $^{13}C$ NMR (100 MHz, $CDCl_3$): δ 214.4, 166.7, 142.2, 141.5, 135.9, 130.0, 129.9, 129.1, 128.0, 127.2, 126.9, 126.3, 100.7, 79.3, 61.1, 32.2, 14.2.

f. Synthesis of N-Methoxy-N-Methylbuta-2,3-Dienamide (2i)

2i

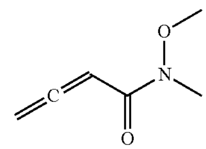

To a solution of (carbethoxymethylene)triphenylphosphorane (1 equiv) in DCM/Hexane (2:1) at 0° C. was slowly added triethylamine (1.1 equiv), and stirred at the same temperature for 2h. To the mixture was added triethylamine (1.1 equiv) followed by an appropriate acid chloride (1.1 equiv), and the reaction mixture stirred at rt for overnight. The resulting orange suspension was filtered through silica gel pad, and concentrated under reduced pressure to obtain crude product which was purified by flash column chromatography (10% Ether/Hexane) to yield pure product as colorless liquid. $^{1}H$ NMR (400 MHz, $CDCl_3$): δ 6.22 (t, J=6.6 Hz, 1H), 5.24 (d, J=6.6 Hz, 2H), 3.71 (s, 3H), 3.25 (s, 3H); $^{13}C$ NMR (100 MHz, $CDCl_3$): δ 215.5, 165.4, 86.0, 79.2, 61.7, 32.6.

g. General Synthesis of Vinyldiazaphosphonates

A solution of an appropriate NHP-thiourea (0.103 mmol, 1.0 equiv) and the corresponding allenoate (0.309 mmol, 3.0 equiv) in DCM (0.15 mL) was stirred at room temperature for 5-48 h. The solvent was removed in vacuo to obtain crude product which was purified by column chromatography over silica gel (eluting with 20-30% EtOAc/hexanes) to yield the corresponding vinyldiazaphosphonates as off-white solids.

The following vinyldiazaphosphonates were preparing according the procedure described above using the appropriate allene and NHP-thiourea catalyst.

i. Ethyl-3-(2-oxido-1,3-diphenyl-1,3,2-diazaphospholidin-2-yl)but-3-enoate (Compound 33/3a)

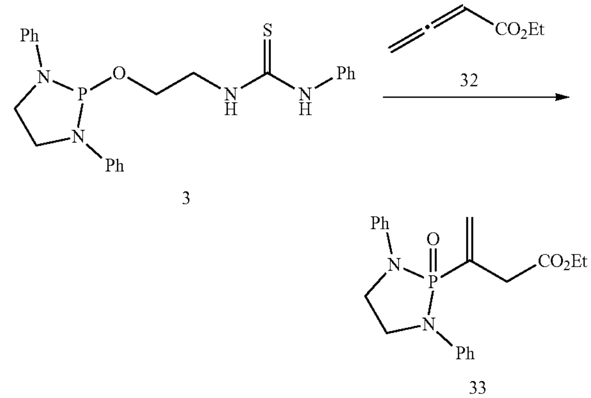

NHP-thiourea 1a (45.0 mg, 0.103 mmol), allene (Rout and Harned (2009) *Chem. Eur. J.* 15: 12926) 2a (34.6 mg, 0.309 mmol), and dry DCM (0.15 mL) were subjected to the reaction conditions described above. Off-white solid 3a (37.9, 0.102 mmol, >99%). mp: 107-109° C. IR (Neat, $cm^{-1}$): 3059, 2982, 2901, 1732, 1601, 1504, 1269, 1126, 1037; $^1$H NMR (400 MHz, $CDCl_3$): δ 7.31-7.27 (m, 4H), 7.21-7.19 (m, 4H), 7.00 (app t, J=7.3 Hz, 2H), 6.74 (dd, J=21.0, 1.5 Hz, 1H), 6.25 (dq, J=44.2, 1.4 Hz, 1H), 3.92-3.86 (m, 4H), 3.52 (q, J=7.1 Hz, 2H), 2.91 (dd, J=16.0, 1.0 Hz, 2H), 0.88 (t, J=7.1 Hz, 3H); $^{13}$C NMR (100 MHz, $CDCl_3$): δ 169.2 (d, J=4.5 Hz), 141.1 (d, J=7.5 Hz), 138.9 (d, J=8.9 Hz), 134.5 (d, J=148.1 Hz), 129.2, 121.8, 116.3 (d, J=5.2 Hz), 60.9, 43.3 (d, J=8.9 Hz), 38.5 (d, J=14.2 Hz), 13.6; $^{31}$P NMR (162 MHz, $CDCl_3$): δ 17.01 ppm; HRMS (APCI) calcd for $C_{20}H_{23}N_2O_3P$ $[M+H]^+$: 371.1519; found: 371.1508.

ii. Benzyl 3-(2-oxido-1,3-diphenyl-1,3,2-diazaphospholidin-2-yl)but-3-enoate (Compound 35/3e)

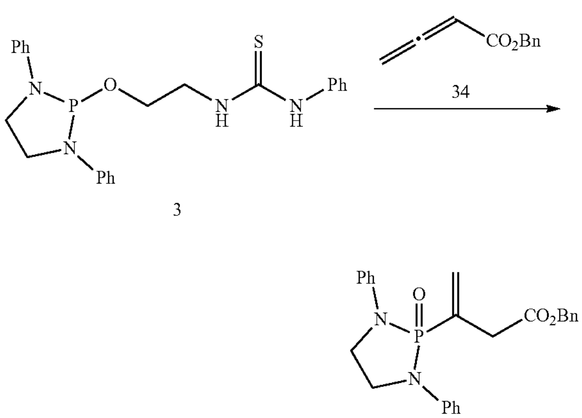

3

35

NHP-thiourea 1a (45.0 mg, 0.103 mmol), allene (Rout and Harned (2009) *Chem. Eur. J.* 15: 12926) 2e (53.8 mg, 0.309 mmol), and dry DCM (0.15 mL) were subjected to the reaction conditions described above. Off-white solid 3e (42.3 mg, 0.0978 mmol, 95%). mp: 155-157° C. IR (Neat, $cm^{-1}$): 3063, 2947, 2885, 1732, 1597, 1501, 1273, 1130, 1033; $^1$H NMR (400 MHz, $CDCl_3$): δ 7.30-7.19 (m, 11H), 7.08-7.05 (m, 2H), 6.99 (app t, J=7.3 Hz, 2H), 6.74 (dd, J=20.9, 1.5 Hz, 1H), 6.23 (dd, J=44.1, 1.4 Hz, 1H), 4.48 (s, 2H), 3.86 (d, J=6.9 Hz, 4H), 2.96 (d, J=15.8 Hz, 2H); $^{13}$C NMR (100 MHz, $CDCl_3$): δ 168.9 (d, J=4.5 Hz), 141.0 (d, J=7.5 Hz), 139.1 (d, J=8.9 Hz), 135.3, 134.3 (d, J=148.1 Hz), 129.2, 128.4, 128.2, 128.1, 121.9, 116.4 (d, J=5.2 Hz), 66.4, 43.3 (d, J=8.2 Hz), 38.4 (d, J=14.2 Hz); $^{31}$P NMR (162 MHz, $CDCl_3$): δ 16.90 ppm; HRMS (ESI) calcd for $C_{25}H_{25}N_2O_3P$ $[M+Na]^+$: 455.1495; found: 455.1489.

iii. ethyl (e)-3-(2-oxido-1,3-diphenyl-1,3,2-diazaphospholidin-2-yl)pent-3-enoate (Compound 37/3xa) and ethyl (Z)-3-(2-oxido-1,3-diphenyl-1,3,2-diazaphospholidin-2-yl)pent-3-enoate (3xb)

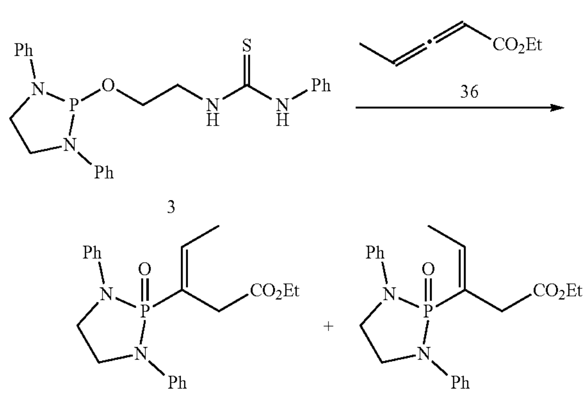

3

37 (3xa)

37b (3xb)

HP-thiourea 1a (45.0 mg, 0.103 mmol), allene (Rout and Hamed (2009) *Chem. Eur. J.* 15: 12926) 2x (33.6 mg, 0.309 mmol), and dry DCM (0.15 mL) were subjected to the reaction conditions described above. Off-white solid 3xa (23.3 mg, 0.0606 mmol, 59%) and 3xb (4.40 mg, 0.0114 mmol, 11%).

3xa: Off-white solid (23.3 mg, 0.0606 mmol, 59%). mp: 147-149° C. IR (Neat, $cm^{-1}$'): 3059, 2978, 2897, 1728, 1597, 1501, 1280, 1130, 1041; $^1$H NMR (400 MHz, $CDCl_3$): δ 7.39 (dq, J=22.1, 7.0 Hz, 1H), 7.29-7.25 (m, 4H), 7.18-7.16 (m, 4H), 6.97 (app t, J=7.3 Hz, 2H), 3.95-3.83 (m, 4H), 3.41 (q, J=7.1 Hz, 2H), 2.94 (d, J=18.6 Hz, 2H), 1.92 (dd, J 7.0, 3.3 Hz, 3H), 0.83 (t, J=7.2 Hz, 3H); $^{13}$C NMR (100 MHz, $CDCl_3$): δ 169.3 (d, J=2.2 Hz), 150.4 (d, J=10.4 Hz), 141.3 (d, J=8.2 Hz), 129.1, 125.5 (d, J=154.8 Hz), 121.5, 116.2 (d, J=5.2 Hz), 60.7, 43.2 (d, J=8.2 Hz), 32.8 (d, J=14.1 Hz), 15.7 (d, J=17.9 Hz), 13.6; $^{31}$P NMR (162 MHz, $CDCl_3$): δ 19.22 ppm; HRMS (ESI) calcd for $C_{21}H_{25}N_2O_3P$ $[M+H]^+$: 407.1495; found: 407.1497.

3xb: Off-white solid (4.40 mg, 0.0114 mmol, 11%). mp: 141-143° C. IR (Neat, $cm^{-1}$): 3065, 2984, 2889, 1724, 1599, 1498, 1271, 1128, 1035; $^1$H NMR (400 MHz, $CDCl_3$): δ 7.32-7.27 (m, 4H), 7.17-7.14 (m, 4H), 6.98 (app t, J=7.2 Hz, 2H), 7.39 (dq, J=47.7, 7.2 Hz, 1H), 3.91-3.87 (m, 4H), 3.45 (q, J=7.0 Hz, 2H), 2.79 (d, J=15.8 Hz, 2H), 2.46 (dd, J=7.4, 3.5 Hz, 3H), 0.86 (t, J=7.0 Hz, 3H); $^{13}$C NMR (100 MHz, $CDCl_3$): δ 170.2 (d, J=2.9 Hz), 153.3 (d, J=11.9 Hz), 141.3 (d, J=8.2 Hz), 129.1, 124.1 (d, J=148.8 Hz), 121.6, 116.0 (d, J=5.2 Hz), 60.6, 43.4 (d, J=8.2 Hz), 40.9 (d, J=15.7 Hz), 16.5 (d, J=5.2 Hz), 13.6; $^{31}$P NMR (162 MHz, $CDCl_3$): δ 18.87 ppm; HRMS (ESI) calcd for $C_{21}H_{25}N_2O_3P$ $[M+H]^+$: 407.1495; found: 407.1497.

iv. ethyl (E)-3-(2-oxido-1,3-diphenyl-1,3,2-diazaphospholidin-2-yl)hex-3-enoate (Compound 39/3ya) and ethyl (Z)-3-(2-oxido-1,3-diphenyl-1,3,2-diazaphospholidin-2-yl)hex-3-enoate (3yb)

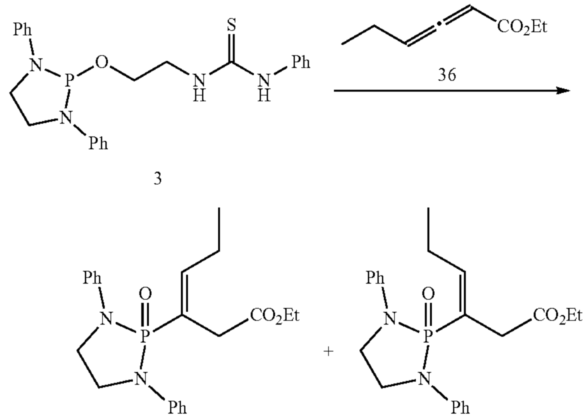

37 (3ya)

37b (3yb)

NHP-thiourea 1a (45.0 mg, 0.103 mmol), allene (Na et al. (2011) *J. Am. Chem. Soc.* 133: 13337) 2y (43.3 mg, 0.309 mmol), and dry DCM (0.15 mL) were subjected to the reaction conditions described above. Off-white solid 3ya (31.2 mg, 0.0783 mmol, 76%) and 3yb (5.10 mg, 0.0128 mmol, 12%).

3ya: Off-white solid (31.2 mg, 0.0783 mmol, 76%). mp: 139-140° C. IR (Neat, $cm^{-1}$): 3059, 2970, 2877, 1739, 1601, 1504, 1273, 1130, 1033; $^{1}H$ NMR (400 MHz, $CDCl_3$): δ 7.33-7.24 (m, 5H), 7.19-7.17 (m, 4H), 6.97 (app t, J=7.3 Hz, 2H), 3.94-3.83 (m, 4H), 3.38 (q, J=7.1 Hz, 2H), 2.91 (d, J=18.8 Hz, 2H), 2.33-2.25 (m, 2H), 1.09 (t, J=7.5 Hz, 3H), 0.82 (t, J=7.1 Hz, 3H); $^{13}C$ NMR (100 MHz, $CDCl_3$): δ 169.3 (d, J=2.2 Hz), 157.2, 141.3 (d, J=8.2 Hz), 129.1, 123.4 (d, J=153.3 Hz), 121.5, 116.1 (d, J=4.5 Hz), 60.7, 43.2 (d, J=7.5 Hz), 33.0 (d, J=3.9 Hz), 23.4 (d, J=17.2 Hz), 13.5, 12.8; $^{31}P$ NMR (162 MHz, $CDCl_3$): δ 19.45 ppm; HRMS (ESI) calcd for $C_{22}H_{27}N_2O_3P$: 421.1652; found: 421.1647.

3yb: Off-white solid (5.10 mg, 0.0128 mmol, 12%). mp: 111-113° C. IR (Neat, $cm^{-1}$): 3061, 2962, 2874, 1728, 1599, 1500, 1271, 1128, 1035; $^{1}H$ NMR (400 MHz, $CDCl_3$): δ 7.31-7.26 (m, 4H), 7.18-7.16 (m, 4H), 6.99 (td, J=7.2, 0.8 Hz, 2H), 6.57 (dt, J=47.7, 7.8 Hz, 1H) 3.94-3.84 (m, 4H), 3.45 (q, J=6.5 Hz, 2H), 3.08-2.98 (m, 2H), 2.79 (d, J=15.8 Hz, 2H), 1.14 (t, J=7.6 Hz, 3H), 0.86 (t, J=7.0 Hz, 3H); $^{13}C$ NMR (100 MHz, $CDCl_3$): δ 170.2, 160.3 (d, J=12.7 Hz), 141.3 (d, J=7.5 Hz), 129.1, 122.4 (d, J=149.6 Hz), 121.6, 116.1 (d, J=5.2 Hz), 60.6, 43.4 (d, J=8.2 Hz), 40.9 (d, J=15.7 Hz), 23.2 (d, J=4.5 Hz), 13.6, 13.4; $^{31}P$ NMR (162 MHz, $CDCl_3$): δ 18.74 ppm; HRMS (ESI) calcd for $C_{22}H_{27}N_2O_3P$: 421.1652; found: 421.1647.

v. Ethyl (E)-5-methyl-3-(2-oxido-1,3-diphenyl-1,3,2-diazaphospholidin-2-yl)hex-3-enoate (Compound 41/3z)

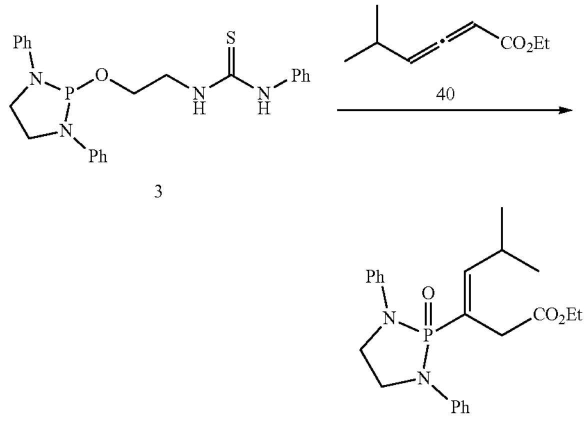

41

NHP-thiourea 1a (45.0 mg, 0.103 mmol), allene (Na et al. (2011) *J. Am. Chem. Soc.* 133: 13337) 2z (47.6 mg, 0.309 mmol), and dry DCM (0.15 mL) were subjected to the reaction conditions described above. Off-white solid 3z (32.5 mg, 0.0789 mmol, 76%). mp: 126-129° C. IR (Neat, $cm^{-1}$): 3063, 2962, 2870, 1724, 1597, 1504, 1276, 1126, 1033; $^{1}H$ NMR (400 MHz, $CDCl_3$): δ 7.30-7.23 (m, 4H), 7.18-7.16 (m, 4H), 7.13-7.07 (m, 1H), 6.97 (app t, J=7.3 Hz, 2H), 3.92-3.82 (m, 4H), 3.36 (q, J=6.6 Hz, 2H), 3.08 (d, J=16.0 Hz, 2H), 1.20 (s, 9H), 0.82 (t, J=7.1 Hz, 3H); $^{13}C$ NMR (100 MHz, $CDCl_3$): δ 169.2 (d, J=2.2 Hz), 162.1 (d, J=8.2 Hz), 141.2 (d, J=8.2 Hz), 129.0, 121.4, 120.5, 116.1 (d, J=4.5 Hz), 60.7, 43.2 (d, J=8.2 Hz), 33.2 (d, J=14.2 Hz), 29.4 (d, J=16.5 Hz), 21.5, 13.5; $^{31}P$ NMR (162 MHz, $CDCl_3$): δ 19.80 ppm; HRMS (ESI) calcd for $C_{23}H_{29}N_2O_3P$ $[M+H]^+$: 435.1808; found: 435.1801.

vi. Ethyl (E)-5,5-dimethyl-3-(2-oxido-1,3-diphenyl-1,3,2-diazaphospholidin-2-yl)hex-3-enoate (Compound 43/3aa)

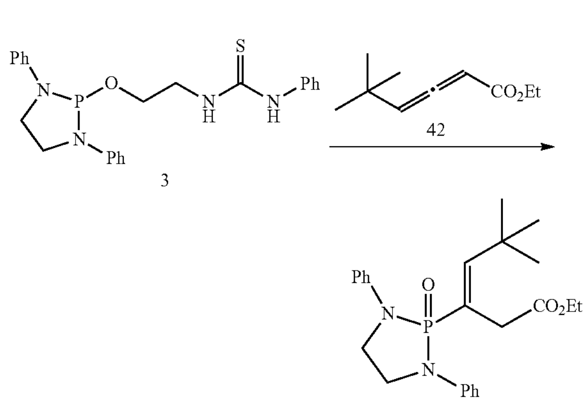

43

NHP-thiourea 1a (45.0 mg, 0.103 mmol), allene (Na et al. (2011) *J. Am. Chem. Soc.* 133: 13337) 2aa (52.0 mg, 0.309 mmol), and dry DCM (0.15 mL) were subjected to the reaction conditions described above. Off-white solid 3aa (38.2 mg, 0.0895 mmol, 86%). mp: 115-117° C. IR (Neat, $cm^{-1}$): 3063, 2958, 2870, 1728, 1601, 1501, 1280, 1126, 1033; $^1$H NMR (400 MHz, $CDCl_3$): δ 7.30-7.23 (m, 4H), 7.18-7.16 (m, 4H), 6.97 (app t, J=7.3 Hz, 2H), 3.92-3.82 (m, 4H), 3.36 (q, J=6.6 Hz, 2H), 3.08 (d, J=16.0 Hz, 2H), 1.20 (s, 9H), 0.82 (t, J=7.1 Hz, 3H); $^{13}$C NMR (100 MHz, $CDCl_3$): δ 169.4, 163.2 (d, J=8.2 Hz), 141.2 (d, J 7.5 Hz), 128.9, 121.4, 121.2 (d, J=148.8 Hz), 116.0 (d, J=5.2 Hz), 60.7, 43.2 (d, J=8.2 Hz), 36.1 (d, J=18.7 Hz), 32.9 (d, J=13.5 Hz), 29.8 (d, J=2.2 Hz), 13.5; $^{31}$P NMR (162 MHz, $CDCl_3$): δ 21.56 ppm; HRMS (ESI) calcd for $C_{24}H_{31}N_2O_3P$ $[M+Na]^+$: 449.1965; found: 449.1960.

vii. Ethyl (E)-3-(2-oxido-1,3-diphenyl-1,3,2-diazaphospholidin-2-yl)-4-phenylbut-3-enoate (Compound 45/3ab)

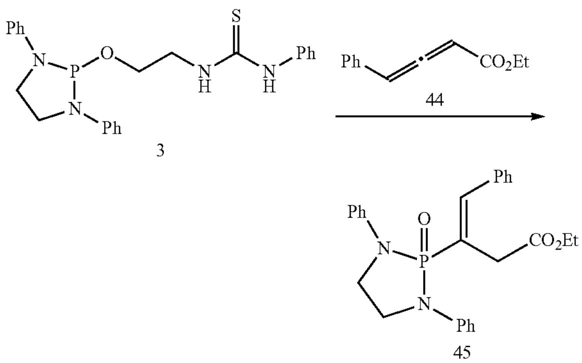

NHP-thiourea 1a (45.0 mg, 0.103 mmol), allene (Tsuboi et al. (1993) *J. Org. Chem.* 58: 5952) 2ab (43.3 mg, 0.309 mmol), and dry DCM (0.15 mL) were subjected to the reaction conditions described above. Off-white solid 3ab (14.1 mg, 0.0315 mmol, 31%). mp: 155-158° C.; IR (Neat, $cm^{-1}$): 3059, 2924, 2854, 1736, 1601, 1501, 1130, 1269, 1033; $^1$H NMR (400 MHz, $CDCl_3$): δ 8.25 (d, J=23.3 Hz, 1H), 7.52 (app d, J=8.2 Hz, 2H), 7.39-7.34 (m, 3H), 7.29-7.24 (m, 8H), 6.98 (app t, J=6.9 Hz, 2H), 3.98-3.88 (m, 4H), 3.46 (q, J=7.1 Hz, 2H), 3.11 (d, J=19.9 Hz, 2H), 0.85 (t, J=7.1 Hz, 3H); $^{13}$C NMR (100 MHz, $CDCl_3$): δ 169.6, 151.0 (d, J=11.2 Hz), 142.8, 141.1 (d, J=8.2 Hz), 135.3 (d, J=20.9 Hz), 129.2, 128.8, 128.5, 125.7 (d, J=151.1 Hz), 121.7, 116.2 (d, J=5.9 Hz), 61.1, 43.3 (d, J=8.2 Hz), 34.3 (d, J=12.7 Hz), 13.6; $^{31}$P NMR (162 MHz, $CDCl_3$): δ 19.81 ppm; HRMS (ESI) calcd for $C_{26}H_{27}N_2O_3P$ $[M+Na]^+$: 469.1652; found: 469.1660.

viii. Ethyl 2-methyl-3-(2-oxido-1,3-diphenyl-1,3,2-diazaphospholidin-2-yl)but-3-enoate (Compound 47/3k)

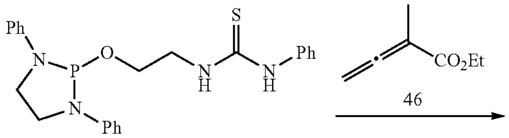

3

-continued

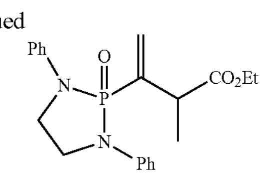

47

NHP-thiourea 1a (45.0 mg, 0.103 mmol), allene (Clavier et al. (2011) *Org. Lett.* 13: 308) 2k (39.0 mg, 0.309 mmol), and dry DCM (0.15 mL) were subjected to the reaction conditions described above. Off-white solid 3k (23.8 mg, 0.0619 mmol, 61%). mp: 142-145° C. IR (Neat, $cm^{-1}$): 3063, 2982, 2874, 1732, 1597, 1501, 1273, 1126, 1033; $^1$H NMR (400 MHz, $CDCl_3$): δ 7.32-7.16 (m, 4H), 7.22-7.16 (m, 4H), 7.02-6.95 (m, 2H), 6.81 (d, J=22.2 Hz, 1H), 6.32 (d, J=45.6 Hz, 1H), 3.96-3.86 (m, 4H), 3.62-3.53 (m, 1H), 3.48-3.40 (m, 1H), 3.06-2.97 (m, 1H), 1.06 (d, J=7.0 Hz, 3H), 0.82 (t, J=7.1 Hz, 3H); $^{13}$C NMR (100 MHz, $CDCl_3$): δ 172.7 (d, J=5.2 Hz), 141.2 (dd, J=8.2, 1.5 Hz), 140.5 (d, J=128.6 Hz), 136.2, 129.1 (d, J=26.9 Hz), 121.7 (d, J=30.7 Hz), 116.3 (d, J=5.2 Hz), 60.7, 43.4 (dd, J=41.1, 7.5 Hz), 40.7 (d, J=4.5 Hz), 17.4 (d, J=5.9 Hz), 13.5; $^{31}$P NMR (162 MHz, $CDCl_3$): δ 17.73 ppm; HRMS (ESI) calcd for $C_{21}H_{25}N_2O_3P$ $[M+Na]^+$: 407.1495; found: 407.1490.

ix. Ethyl 2-benzyl-3-(2-oxido-1,3-diphenyl-1,3,2-diazaphospholidin-2-yl)but-3-enoate (compound 49/3o)

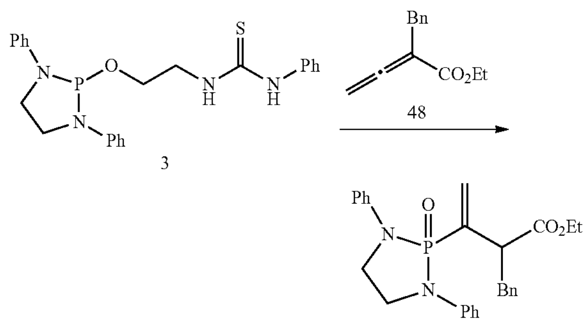

49

NHP-thiourea 1a (45.0 mg, 0.103 mmol), allene (Na et al. (2011) *J. Am. Chem. Soc.* 133: 13337) 2o (62.5 mg, 0.309 mmol), and dry DCM (0.15 mL) were subjected to the reaction conditions described above. Pale yellow solid 3o (25.2 mg, 0.0547 mmol, 53%). mp: 153-155° C. IR (Neat, $cm^{-1}$): 3063, 2978, 2870, 1732, 1597, 1501, 1276, 1153, 1037; $^1$H NMR (400 MHz, $CDCl_3$): δ 7.34-7.23 (m, 6H), 7.16-7.09 (m, 5H), 7.03 (app t, J=7.3 Hz, 1H), 6.96 (app t, J=7.3 Hz, 1H), 6.87 (dd, J=22.3, 0.8 Hz, 1H), 6.81-6.79 (m, 2H), 6.46 (d, J=45.5 Hz, 1H), 3.99-3.87 (m, 4H), 3.49-3.43 (m, 2H), 3.16-3.08 (m, 1H), 3.01-2.95 (m, 1H), 2.42 (dd, J=13.2, 4.3 Hz, 1H), 0.72 (t, J=7.1 Hz, 3H); $^{13}$C NMR (100 MHz, $CDCl_3$): δ 171.4 (d, J=5.2 Hz), 141.1 (d, J=7.5 Hz), 139.0 (d, J=145.8 Hz), 138.4, 137.2 (d, J=8.9 Hz), 129.2 (d, J=36.6 Hz), 128.5 (d, J=20.9 Hz), 126.5, 121.9 (d, J=35.1 Hz), 116.3 (d, J=5.2 Hz), 116.2 (d, J=5.2 Hz), 60.8, 48.4 (d, J=12.7 Hz), 43.5 (dd, J=47.1, 8.2 Hz), 38.5 (d, J=5.2 Hz), 13.5; $^{31}$P NMR (162 MHz, $CDCl_3$): δ 17.63 ppm; HRMS (ESI) calcd for $C_{27}H_{29}N_2O_3P$ $[M+Na]^+$: 483.1808; found: 483.1806.

x. Ethyl 2-(1-(2-oxido-1,3-diphenyl-1,3,2-diazaphospholidin-2-yl)vinyl)pent-4-enoate (compound 51/31)

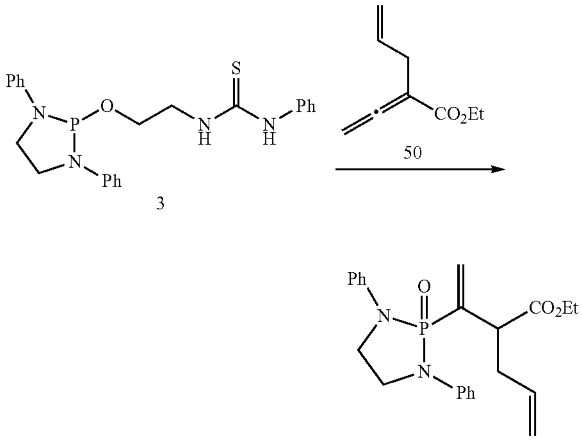

51

NHP-thiourea 1a (45.0 mg, 0.103 mmol), allene (Na et al. (2011) *J. Am. Chem. Soc.* 133: 13337) 21 (47.1 mg, 0.309 mmol), and dry DCM (0.15 mL) were subjected to the reaction conditions described above. Off-white solid 31 (13.9 mg, 0.0338 mmol, 33%). mp: 151-153° C.; IR (Neat, $cm^{-1}$): 3059, 2982, 2854, 1732, 1601, 1504, 1284, 1126, 1037; $^{1}H$ NMR (400 MHz, $CDCl_3$): δ 7.32-7.15 (m, 8H), 7.03-7.94 (m, 2H), 6.85 (dd, J=22.3, 0.8 Hz, 1H), 6.35 (d, J=45.6 Hz, 1H), 5.39-5.28 (m, 1H), 4.81-4.75 (m, 2H), 3.97-3.89 (m, 4H), 3.58-3.44 (m, 2H), 2.95-2.88 (m, 1H), 2.42-2.34 (m, 1H), 2.00-1.94 (m, 1H), 0.83 (t, J=7.1 Hz, 3H); $^{13}C$ NMR (100 MHz, $CDCl_3$): δ 171.3 (d, J=5.2 Hz), 141.1 (d, J=8.2 Hz), 138.4 (d, J=145.8 Hz), 137.0, 134.4, 129.2 (d, J=26.2 Hz), 121.8 (d, J=37.4 Hz), 117.2, 116.3 (dd, J=8.2, 5.2 Hz), 60.7, 46.3 (d, J=4.5 Hz), 43.4 (dd, J=12.7, 8.2 Hz), 36.3 (d, J=5.9 Hz), 13.6; $^{31}P$ NMR (162 MHz, $CDCl_3$): δ 17.59 ppm; HRMS (ESI) calcd for $C_{23}H_{27}N_2O_3P$ $[M+H]^+$: 433.1652; found: 433.1644.

xi. Ethyl 2-(1-(2-oxido-1,3-diphenyl-1,3,2-diazaphospholidin-2-yl)vinyl)octanoate (compound 53/3m)

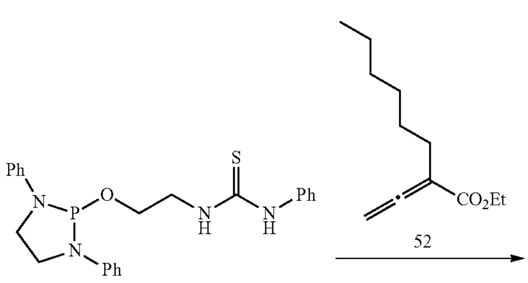

-continued

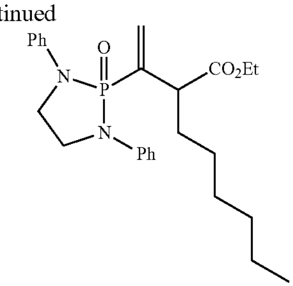

53

NHP-thiourea 1a (18.0 mg, 0.0412 mmol), allene (prepared by GP-1-II) 2m (24.2 mg, 0.123 mmol), and dry DCM (0.15 mL) were subjected to the reaction conditions described above. Off-white solid 3m (8.10 mg, 0.0178 mmol, 43%). mp: 123-126° C. IR (Neat, $cm^{-1}$): 3059, 2928, 2854, 1732, 1601, 1504, 1280, 1126, 1033; $^{1}H$ NMR (400 MHz, $CDCl_3$): δ 7.31-7.26 (m, 4H), 7.24-7.14 (m, 4H), 7.02-6.94 (m, 2H), 6.85 (dd, J=22.4, 1.0 Hz, 1H), 6.35 (d, J=45.9 Hz, 1H), 3.99-3.88 (m, 4H), 3.55-3.40 (m, 2H), 2.86-2.79 (m, 1H), 1.68-1.59 (m, 1H), 1.31-1.27 (m, 2H), 1.16-1.09 (m, 2H), 1.01-0.96 (m, 4H), 0.89-0.77 (m, 7H); $^{13}C$ NMR (100 MHz, $CDCl_3$): δ 172.1 (d, J=4.5 Hz), 141.1 (dd, J=8.2, 5.8 Hz), 138.9 (d, J=145.8 Hz), 136.8, 129.1 (d, J=23.1 Hz), 121.7 (d, J=33.6 Hz), 116.2 (d, J=5.2 Hz), 60.6, 46.5 (d, J=11.9 Hz), 43.4 (app d, J=71.8 Hz), 32.2 (d, J=5.9 Hz), 29.6, 28.6, 27.2, 22.4, 13.9, 13.6; $^{31}P$ NMR (162 MHz, $CDCl_3$): δ 17.97 ppm; HRMS (ESI) calcd for $C_{26}H_{35}N_2O_3P$ $[M+Na]^+$: 477.2278; found: 477.2280.

xii. Ethyl 2-([1,1'-biphenyl]-2-ylmethyl)-3-(2-oxido-1,3-diphenyl-1,3,2-diazaphospholidin-2-yl)but-3-enoate (Compound 55/3v)

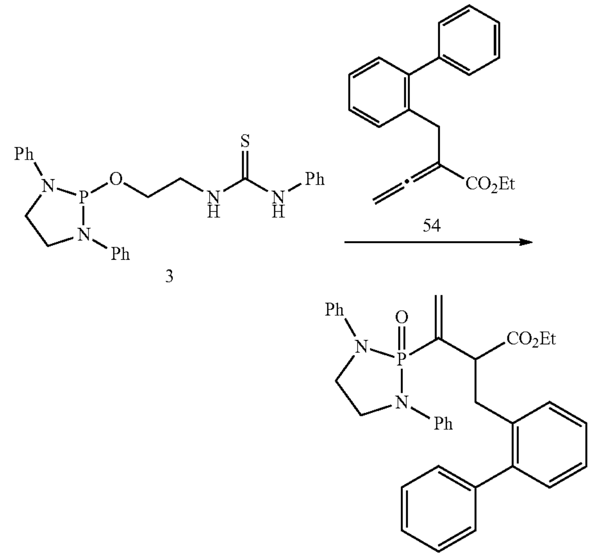

55

NHP-thiourea 1a (45.0 mg, 0.103 mmol), allene (prepared by GP-1-II) 2v (86.0 mg, 0.309 mmol), and dry DCM (0.15 mL) were subjected to the reaction conditions described above. Off-white solid 3v (23.1 mg, 0.0430 mmol, 42%). mp: 175-176° C. IR (Neat, $cm^{-1}$): 3059, 2978, 2870, 1732, 1597, 1504, 1276, 1149, 1037; $^1H$ NMR (400 MHz, $CDCl_3$): δ 7.28-7.19 (m, 7H), 7.16-7.09 (m, 3H), 7.07-6.98 (m, 7H), 6.93-6.89 (m, 2H), 6.81 (dd, J=22.3, 0.9 Hz, 1H), 6.29 (d, J=45.5 Hz, 1H), 3.85-3.72 (m, 2H), 3.70-3.57 (m, 2H), 3.20 (q, J=7.0 Hz, 2H), 3.11-3.04 (m, 1H), 3.00-2.94 (m, 1H), 2.87-2.82 (m, 1H), 0.65 (t, J=7.1 Hz, 3H); $^{13}C$ NMR (100 MHz, $CDCl_3$): δ 170.8 (d, J=4.5 Hz), 141.9, 141.3, 141.1 (dd, J=11.9, 8.2 Hz), 138.5 (d, J=145.8 Hz), 137.7 (d, J=8.9 Hz), 134.9, 130.3, 129.6, 129.2, 128.9 (d, J=4.5 Hz), 128.1, 127.2, 126.9, 126.6, 121.6 (d, J=30.7 Hz), 116.2 (dd, J=36.6, 4.5 Hz), 60.5, 46.7 (d, J=12.7 Hz), 43.1 (d, J=8.2 Hz), 35.8 (d, J=5.9 Hz), 13.4; $^{31}P$ NMR (162 MHz, $CDCl_3$): δ 17.27 ppm; HRMS (APCI) calcd for $C_{33}H_{33}N_2O_3P$ $[M+H]^+$: 537.2302; found: 537.2302.

xiii. Ethyl 2-(4-bromobenzyl)-3-(2-oxido-1,3-diphenyl-1,3,2-diazaphospholidin-2-yl)but-3-enoate (compound 57/3s)

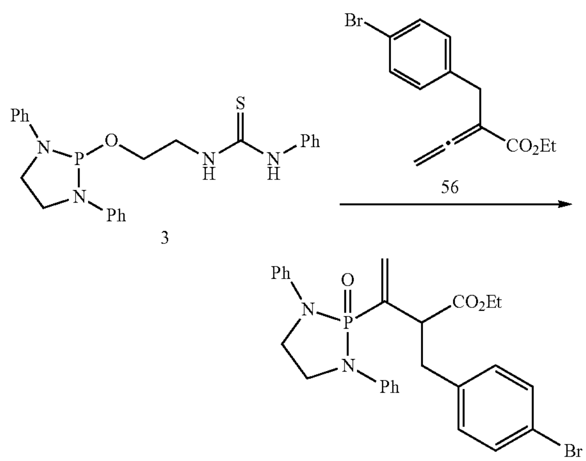

57

NHP-thiourea 1a (45.0 mg, 0.103 mmol), allene (Na et al. (2011) *J. Am. Chem. Soc.* 133: 13337) 2s (86.0 mg, 0.309 mmol), and dry DCM (0.15 mL) were subjected to the reaction conditions described above. Off-white solid 3s (34.1 mg, 0.0632 mmol, 62%). mp: 152-155° C.; IR (Neat, $cm^{-1}$): 3063, 2978, 2870, 1732, 1597, 1504, 1265, 1153, 1037; $^1H$ NMR (400 MHz, $CDCl_3$): δ 7.32-7.14 (m, 10H), 7.03 (app t, J=7.3 Hz, 1H), 6.96 (app t, J=7.3 Hz, 1H), 6.86 (d, J=22.2 Hz, 1H), 6.65 (d, J=8.4 Hz, 2H), 6.42 (d, J=45.6 Hz, 1H), 3.96-3.86 (m, 4H), 3.55-3.42 (m, 2H), 3.11-3.04 (m, 1H), 2.96-2.89 (m, 1H), 2.39 (dd, J=13.6, 4.8 Hz, 1H), 0.75 (t, J=7.1 Hz, 3H); $^{13}C$ NMR (100 MHz, $CDCl_3$): δ 171.2 (d, J=5.2 Hz, 2H), 141.0 (dd, J=8.2, 2.9 Hz), 138.7 (d, J=146.6 Hz), 137.3, 131.4, 130.3, 129.2 (d, J=34.4 Hz), 121.9 (d, J=29.9 Hz), 120.4, 116.3 (d, J=5.2 Hz), 116.0 (d, J=5.2 Hz), 60.9, 48.2 (d, J=12.7 Hz), 43.4 (dd, J=43.4, 8.2 Hz), 37.8 (d, J=5.9 Hz), 13.5; $^{31}P$ NMR (162 MHz, $CDCl_3$): δ 17.39 ppm; HRMS (APCI) calcd for $C_{27}H_{28}BrN_2O_3P$ $[M+H]^+$: 539.1099; found: 539.1171.

xiv. Ethyl 3-(2-oxido-1,3-diphenyl-1,3,2-diazaphospholidin-2-yl)-4,4-diphenylbut-3-enoate (Compound 59/3ac)

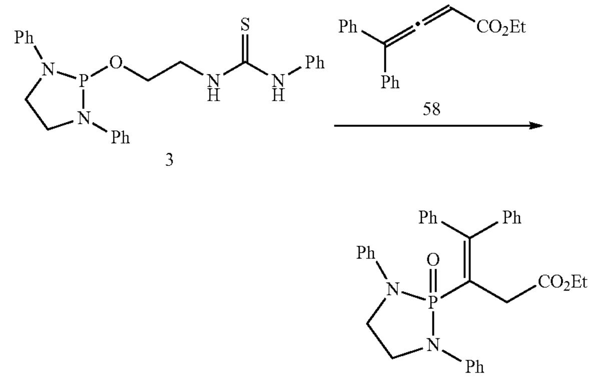

59

NHP-thiourea 1a (202 mg, 0.463 mmol), allene (Chen et al. (2008) *J. Org. Chem.* 73: 9486) 2ac (363 mg, 1.38 mmol), and dry DCM (1.00 mL) were subjected to the reaction conditions described above. Off-white solid 3ac (0.221 g, 0.423 mmol, 91%). mp: 159-161° C.; IR (Neat, $cm^{-1}$): 3059, 2982, 2870, 1732, 1593, 1504, 1276, 1126, 1033; $^1H$ NMR (400 MHz, $CDCl_3$): δ 7.36 (t, J=7.8 Hz, 4H), 7.25-7.12 (m, 10H), 7.05 (t, J=7.2 Hz, 2H), 6.93-6.91 (m, 2H), 6.77-6.75 (m, 2H), 3.92 (q, J=7.0 Hz, 2H), 3.79 (d, J=14.8 Hz, 2H), 3.46-3.41 (m, 2H), 2.61-2.56 (m, 2H), 1.10 (t, J=7.2 Hz, 3H); $^{13}C$ NMR (100 MHz, $CDCl_3$): δ 170.9 (d, J=4.5 Hz), 160.8 (d, J=9.7 Hz), 142.1 (d, J=18.7 Hz), 141.3 (t, J=7.5 Hz), 129.1, 128.3, 127.7 (t, J=3.7 Hz), 127.2, 124.5 (d, J=151.1 Hz), 121.7, 116.9 (d, J=4.5 Hz), 60.6, 42.7 (d, J=9.7 Hz), 39.1 (d, J=12.7 Hz), 14.0; $^{31}P$ NMR (162 MHz, $CDCl_3$): δ 18.30 ppm; HRMS (APCI) calcd for $C_{32}H_{31}N_2O_3P$ $[M+H]^+$: 523.2145; found: 523.2156.

xv. Compound 61: Off-White Solid. Yield: 82%

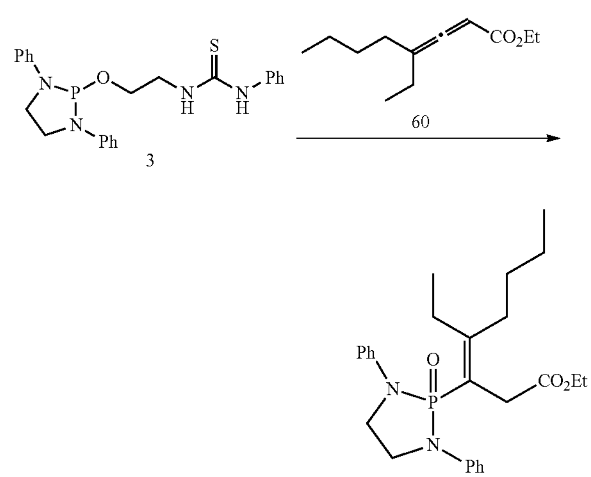

61 xvi. Ethyl 2-(3,5-dimethoxybenzyl)-3-(2-oxido-1,3-diphenyl-1,3,2-diazaphospholidin-2-yl)but-3-enoate (Compound 63/3w)

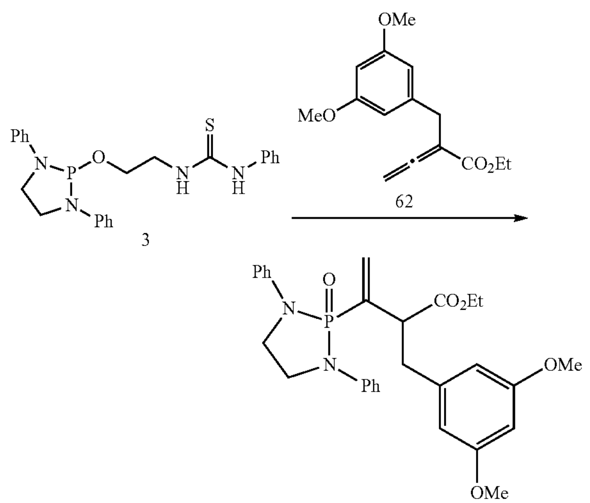

63

NHP-thiourea 1a (45.0 mg, 0.103 mmol), allene (Liao et al. (2015) *J. Am. Chem. Soc.* 137: 628) 2w (73.0 mg, 0.309 mmol), and dry DCM (0.15 mL) were subjected to the reaction conditions described above. Pale yellow solid 3w (30.4 mg, 0.0578 mmol, 56%). mp: 137-139° C.; IR (Neat, $cm^{-1}$): 3063, 2935, 2839, 1732, 1597, 1504, 1273, 1153, 1033; $^{1}H$ NMR (400 MHz, $CDCl_3$): δ 7.32-7.14 (m, 8H), 7.01 (app t, J=7.3 Hz, 1H), 6.96 (app t, J=7.3 Hz, 1H), 6.87 (d, J=22.2 Hz, 1H), 6.48 (d, J=45.5 Hz, 1H), 6.21 (t, J=2.3 Hz, 1H), 5.99 (d, J=2.3 Hz, 2H), 3.97-3.87 (m, 4H), 3.67 (s, 6H), 3.56-3.44 (m, 2H), 3.12-3.04 (m, 1H), 2.97-2.91 (m, 1H), 2.30 (dd, J=13.2, 3.8 Hz, 1H), 0.75 (t, J=7.1 Hz, 3H); $^{13}C$ NMR (100 MHz, $CDCl_3$): δ 171.4 (d, J=5.9 Hz), 160.6, 141.1 (dd, J=8.2, 2.2 Hz), 140.8, 139.1 (d, J=145.8 Hz), 137.1 (d, J=8.2 Hz), 129.2 (d, J=32.9 Hz), 121.8 (d, J=12.7 Hz), 116.2 (dd, J=27.6, 5.2 Hz), 106.6, 98.5, 60.8, 55.1 (d, J=2.2 Hz), 48.3 (d, J=13.5 Hz), 43.5 (d, J=37.4, 8.2 Hz), 38.9 (d, J=5.2 Hz), 13.5; $^{31}P$ NMR (162 MHz, $CDCl_3$): δ 17.48 ppm; HRMS (APCI) calcd for $C_{29}H_{33}N_2O_5P$ $[M+H]^+$: 521.2200; found: 521.2202.

xvii. Diethyl 2-(1-(2-oxido-1,3-diphenyl-1,3,2-diazaphospholidin-2-yl)vinyl)succinate (compound 65/3n)

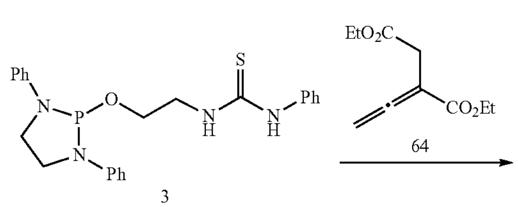

-continued

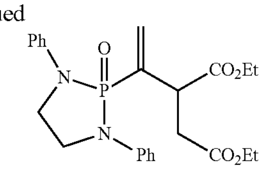

65

NHP-thiourea 1a (45.0 mg, 0.103 mmol), allene (Na et al. (2011) *J. Am. Chem. Soc.* 133: 13337) 2n (52.3 mg, 0.309 mmol), and dry DCM (0.15 mL) were subjected to the reaction conditions described above. Off-white solid 3n (37.1 mg, 0.0812 mmol, 79%). mp: 103-105° C.; IR (Neat, $cm^{-1}$): 3063, 2982, 2874, 1732, 1597, 1504, 1288, 1157, 1033; $^{1}H$ NMR (400 MHz, $CDCl_3$): δ 7.31-7.26 (m, 4H), 7.21-7.18 (m, 4H), 7.03-6.96 (m, 2H), 6.79 (d, J=21.6 Hz, 1H), 6.26 (d, J=44.8 Hz, 1H), 4.02-3.88 (m, 6H), 3.73-3.65 (m, 1H), 3.59-3.51 (m, 1H), 3.47-3.39 (m, 1H), 2.69 (dd, J=16.8, 10.9 Hz, 1H), 1.87 (dd, J=16.9, 3.7 Hz, 1H), 1.13 (t, J=7.1 Hz, 3H), 0.78 (t, J=7.1 Hz, 3H); $^{13}C$ NMR (100 MHz, $CDCl_3$): δ 171.5 (d, J=8.2 Hz), 171.1, 141.1 (dd, J=14.9, 7.5 Hz), 138.8 (d, J=148.1 Hz), 137.1 (d, J=8.9 Hz), 129.2 (d, J=28.4 Hz), 121.9 (d, J=31.4 Hz), 116.4 (dd, J=17.2, 5.2 Hz), 61.1, 60.7, 43.5 (dd, J=19.4, 8.2 Hz), 41.8 (d, J=13.4 Hz), 36.5 (d, J=4.5 Hz), 13.9, 13.4; $^{31}P$ NMR (162 MHz, $CDCl_3$): δ 17.01 ppm; HRMS (APCI) calcd for $C_{24}H_{29}N_2O_5P$ $[M+H]^+$: 457.1887; found: 457.1890.

xviii. Ethyl 3-(2-oxido-1,3-diphenyl-1,3,2-diazaphospholidin-2-yl)-2-phenylbut-3-enoate (Compound 67/3u)

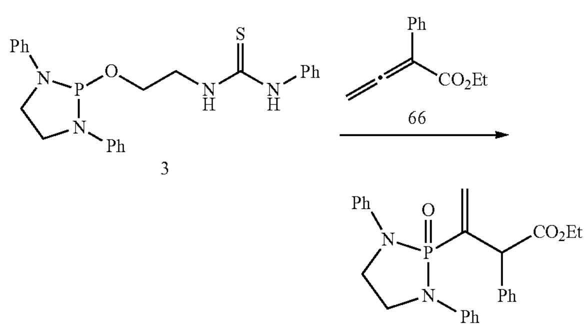

67

NHP-thiourea 1a (34.4 mg, 0.0788 mmol), allene (Lee et al. (2011) *J. Org. Chem.* 76: 312) 2u (45.0 mg, 0.236 mmol), and dry DCM (0.15 mL) were subjected to the reaction conditions described above. Off-white solid 3u (31.6 mg, 0.0707 mmol, 90%). mp: 162-165° C.; IR (Neat, $cm^{-1}$): 3057, 2985, 2904, 1732, 1601, 1504, 1272, 1127, 1037; $^{1}H$ NMR (400 MHz, $CDCl_3$): δ 7.33-7.20 (m, 6H), 7.14-7.07 (m, 5H), 7.01 (q, J=7.5 Hz, 2H), 6.87 (dd, J=21.9, 0.8 Hz, 1H), 6.77 (app d, J=6.9 Hz, 2H), 6.10 (d, J=45.0 Hz, 1H), 4.24 (d, J=11.3 Hz, 1H), 3.94-3.75 (m, 4H), 3.71-3.63 (m, 1H), 3.60-3.52 (m, 1H), 0.98 (t, J=7.1 Hz, 3H); $^{13}C$ NMR (100 MHz, $CDCl_3$): δ 170.0 (d, J=6.7 Hz), 141.2 (d, J=7.5 Hz), 140.8 (d, J=8.2 Hz), 139.1 (d, J=145.8 Hz), 135.3 (d, J=6.7 Hz), 129.1, 128.5, 128.3, 127.4, 121.9 (d, J=7.5 Hz), 116.3 (d, J=4.5 Hz), 61.3, 53.0 (d, J=16.5 Hz), 43.3 (d, J=5.7 Hz), 13.8; $^{31}P$ NMR (162 MHz, $CDCl_3$): δ 17.03 ppm; HRMS (APCI) calcd for $C_{26}H_{27}N_2O_3P$ $[M+H]^+$: 447.1832; found: 447.1833.

xix. Compound 69: Pale Green Syrup. Yield: 47%

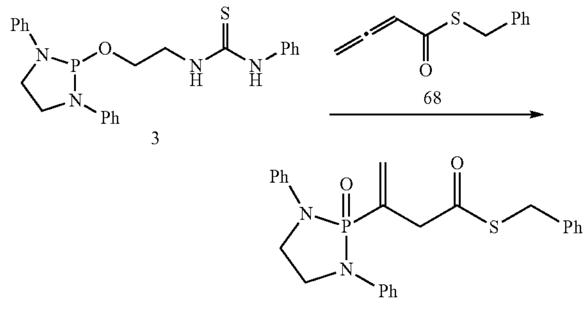

xx. Ethyl 3-(1,3-bis(4-methoxyphenyl)-2-oxido-1,3,2-diazaphospholidin-2-yl)but-3-enoate (Compound 70/3b)

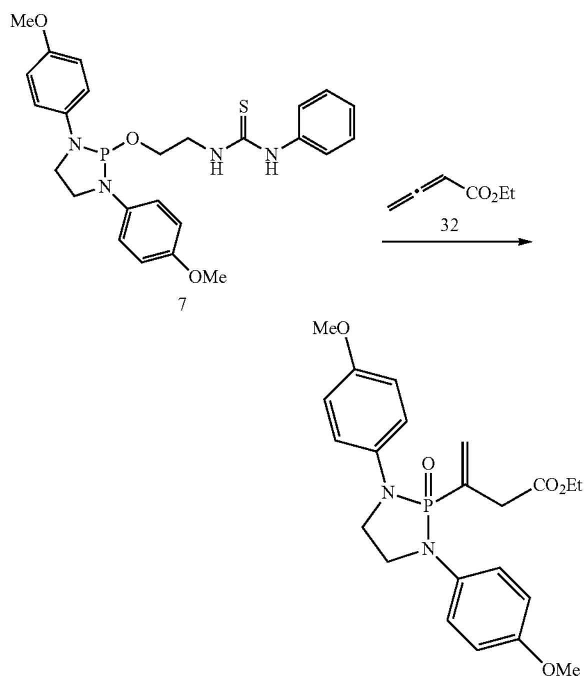

NHP-thiourea 1b (49.6 mg, 0.100 mmol), allene 2a (33.6 mg, 0.300 mmol), and dry DCM (0.30 mL) were subjected to the reaction conditions described above. Off-white solid 3b (41.7 mg, 0.097 mmol, 97%). mp: 116-118° C. IR (Neat, $cm^{-1}$): 3063, 2951, 2833, 1732, 1674, 1504, 1279, 1136, 1035; $^{1}H$ NMR (400 MHz, $CDCl_3$): δ 7.15 (d, J=9.0 Hz, 4H), 6.85 (d, J=9.0 Hz, 4H), 6.62 (dd, J=20.9, 1.6 Hz, 1H), 6.17 (dd, J=43.8, 1.2 Hz, 1H), 3.84-3.80 (m, 4H), 3.76 (s, 6H), 3.64 (q, J=7.0 Hz, 2H), 2.92 (d, J=15.4 Hz, 2H), 0.95 (t, J=7.2 Hz, 3H); $^{13}C$ NMR (100 MHz, $CDCl_3$): δ 169.3 (d, J=5.2 Hz), 154.9, 138.2 (d, J=8.9 Hz), 134.6 (d, J=148.8 Hz), 134.5 (d, J=7.5 Hz), 118.1 (d, J=4.5 Hz), 114.5, 60.8, 55.5, 44.1 (d, J=8.2 Hz), 38.4 (d, J=14.2 Hz), 13.7; $^{31}P$ NMR (162 MHz, $CDCl_3$): δ 17.11 ppm; HRMS (ESI) calcd for $C_{22}H_{27}N_2O_5P$ [$M^+$]: 430.1658; found: 430.1679.

xxi. Ethyl 3-(2-oxido-1,3-di-p-tolyl-1,3,2-diazaphospholidin-2-yl)but-3-enoate (Compound 71/3d)

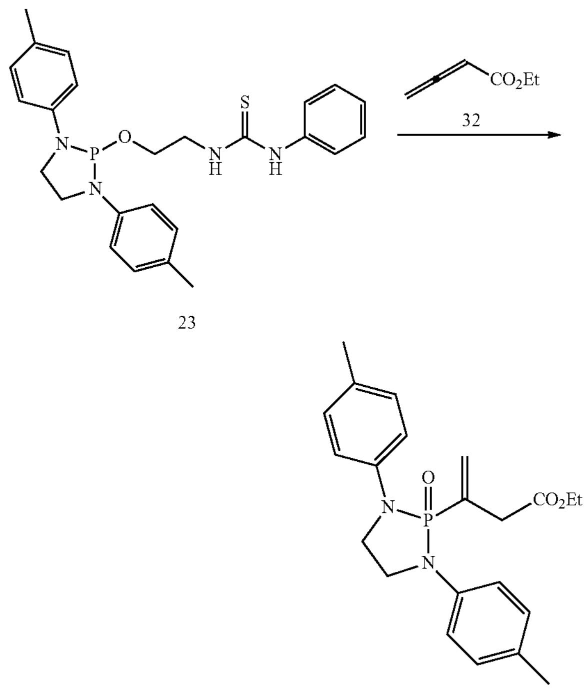

NHP-thiourea 1d (46.4 mg, 0.100 mmol), allene 2a (33.6 mg, 0.300 mmol), and dry DCM (0.30 mL) were subjected to the reaction conditions described above. Off-white solid 3d (39.2 mg, 0.0984 mmol, 98%). mp: 137-139° C. IR (Neat, $cm^{-1}$): 3061, 2957, 2862, 1732, 1614, 15145, 1269, 1136, 1037; $^{1}H$ NMR (400 MHz, $CDCl_3$): δ 7.09 (s, 8H), 6.68 (dd, J=20.9, 1.5 Hz, 1H), 6.20 (dd, J=43.9, 1.4 Hz, 1H), 3.86-3.70 (m, 4H), 3.57 (q, J=7.3 Hz, 2H), 2.89 (dd, J=15.7, 0.97 Hz, 2H), 2.27 (s, 6H), 0.90 (t, J=7.1 Hz, 3H); $^{13}C$ NMR (100 MHz, $CDCl_3$): δ 169.3 (d, J=5.2 Hz), 138.6 (d, J=8.2 Hz), 138.4 (d, J=8.9 Hz), 134.6 (d, J=148.1 Hz), 131.2, 129.7, 116.4 (d, J=4.5 Hz), 60.8, 43.5 (d, J=8.9 Hz), 38.5 (d, J=13.5 Hz), 20.5, 13.6; $^{31}P$ NMR (162 MHz, $CDCl_3$): δ 16.95 ppm; HRMS (APCI) calcd for $C_{22}H_{27}N_2O_3P$ $[M+H]^+$: 399.1832; found: 399.1824.

xxii. Compound 72: Off-White Solid. Yield: Trace Amounts

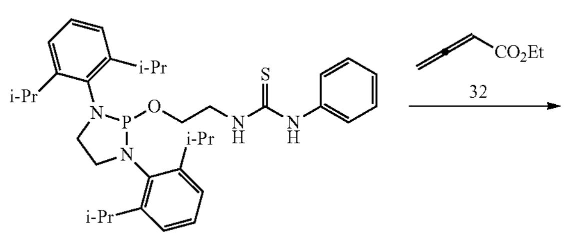

-continued
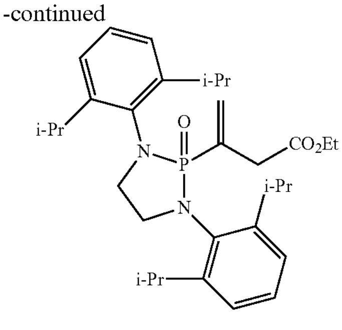
72
xxiii. Compound 33: Off-White Solid. Yield: 92%
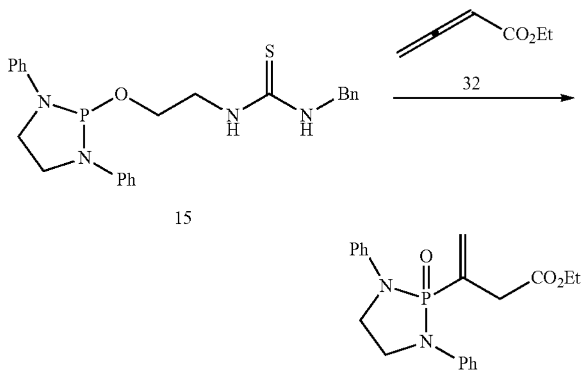
15
33
xxiv. Compound 33: Off-White Solid. Yield: 94%
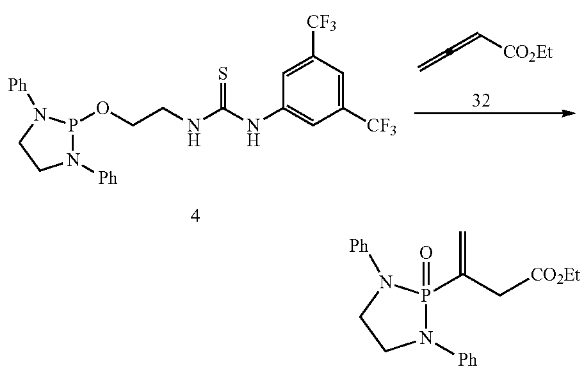
4
33
xxv. Compound 33: Off-White Solid. Yield: 82%
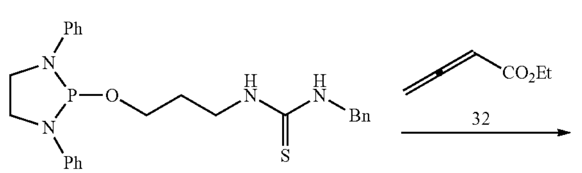
25
-continued
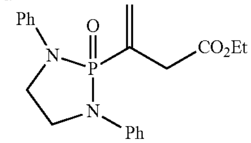
33
xxvi. Compound 33: Off-White Solid. Yield: 87%
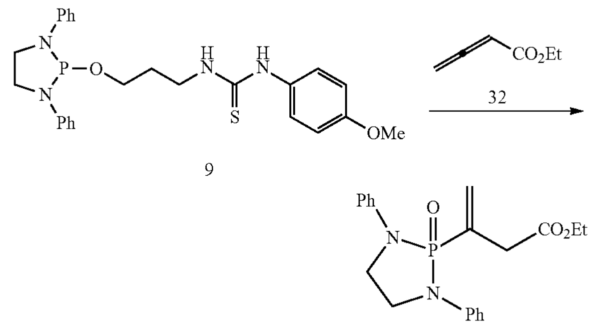
9
33
xxvii. Compound 33: Off-White Solid. Yield: 86%
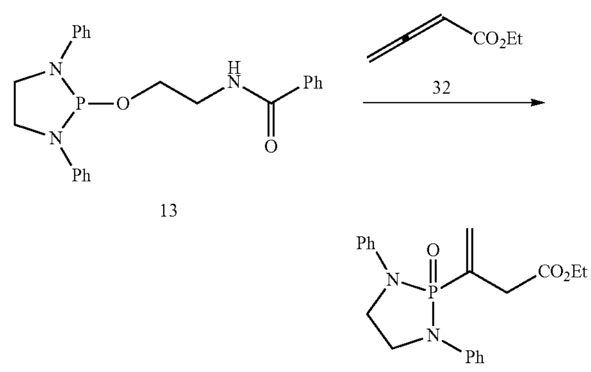
13
33
xxviii. Compound 33: Off-White Solid. Yield: 62%
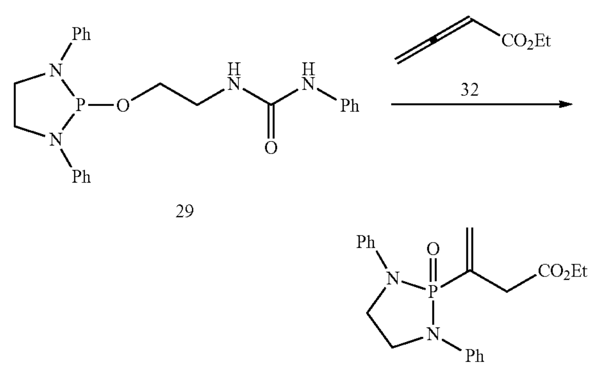
29
33 xxix. Compound 33: Off-White Solid. Yield: 88%

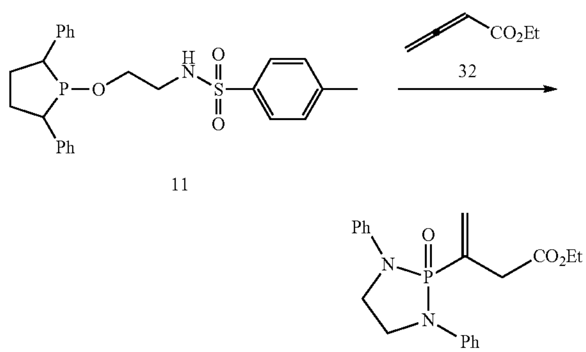

11

33 xxx. Compound 73: No Product

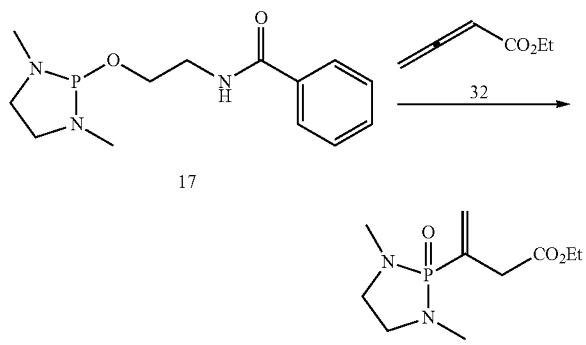

17

73 xxxi. Compound 33: Off-White Solid. Yield: >90%

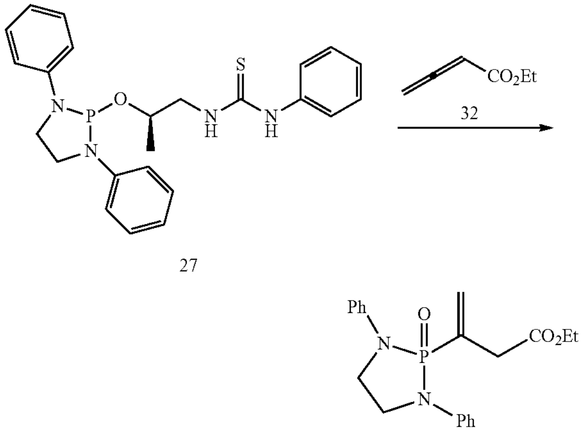

27

33 xxxii. Ethyl 3-cyclohexylidene-3-(2-oxido-1,3-diphenyl-1,3,2-diazaphospholidin-2-yl)propanoate (compound J/3ad)

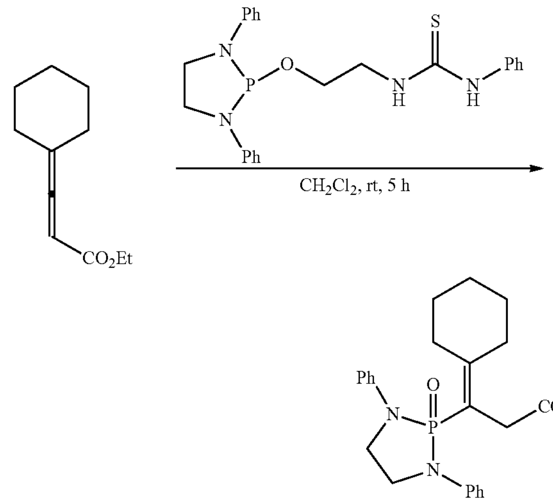

NHP-thiourea 1a (45.0 mg, 0.103 mmol), allene (Trost et al. (2001) *J. Am. Chem. Soc.* 123: 12466) 2ad (56.1 mg, 0.309 mmol), and dry DCM (0.15 mL) were subjected to the reaction conditions described above. Off-white solid 3ad (42.7 mg, 0.0973 mmol, 94%). mp: 124-126° C.; IR (Neat, $cm^{-1}$): 3063, 2931, 2854, 1732, 1597, 1504, 1280, 1126, 1033; $^{1}H$ NMR (400 MHz, $CDCl_3$): δ 7.29-7.25 (m, 4H), 7.17-7.15 (m, 4H), 6.96 (app t, J=7.3 Hz, 2H), 3.91-3.85 (m, 4H), 3.43 (q, J=7.1 Hz, 2H), 3.15-3.31 (m, 2H), 2.98 (d, J=17.5 Hz, 2H), 2.29 (bs, 2H), 1.78 (bs, 2H), 1.63 (bs, 4H), 0.87 (t, J=7.1 Hz, 3H); $^{13}C$ NMR (100 MHz, $CDCl_3$): δ 170.0 (d, J=2.9 Hz), 167.9 (d, J=11.9 Hz), 141.5 (d, J=8.2 Hz), 128.9, 121.3, 116.1 (d, J=5.2 Hz), 114.3 (d, J=154.1 Hz), 60.5, 43.4 (d, J=7.5 Hz), 34.7 (dd, J=16.4, 12.7 Hz), 31.7 (d, J=5.2 Hz), 28.2 (d, J=3.0 Hz), 26.4, 13.7; $^{31}P$ NMR (162 MHz, $CDCl_3$): δ 22.18 ppm; HRMS (APCI) calcd for $C_{25}H_{31}N_2O_3P$ $[M+H]^+$: 439.2145; found: 439.2159.

xxxiii. 4-(2-oxido-1,3-diphenyl-1,3,2-diazaphospholidin-2-yl)pent-4-en-2-one (3f)

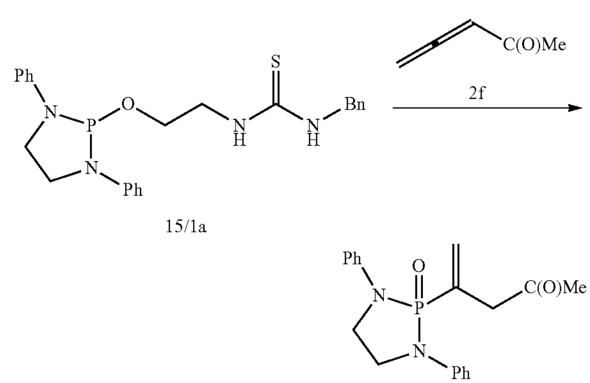

15/1a

3f

NHP-thiourea 1a (30.0 mg, 0.0688 mmol), allene (Constantieux and Buono, In *Organic Syntheses*; John Wiley &

Sons, Inc.: 2002; Vol. 78, p 135) 2f (16.9 mg, 0.206 mmol), and dry DCM (0.18 mL) were subjected to the reaction conditions described above. Yellow solid 3f (13.6 mg, 0.0399 mmol, 58%). mp: 112-115° C.; IR (Neat, $cm^{-1}$): 3063, 2947, 2877, 1709, 1597, 1501, 1269, 1122, 1033; $^{1}H$ NMR (400 MHz, $CDCl_3$): δ 7.33-7.27 (m, 4H), 7.23-7.20 (m, 4H), 7.00 (app t, J=7.3 Hz, 2H), 6.74 (dd, J=21.0, 1.5 Hz, 1H), 6.19 (dd, J=44.4, 1.3 Hz, 1H), 3.90-3.80 (m, 4H), 2.98 (d, J=16.1 Hz, 2H), 1.58 (s, 3H); $^{13}C$ NMR (100 MHz, $CDCl_3$): δ 204.6 (d, J=3.7 Hz), 141.0 (d, J=8.2 Hz), 138.6, 135.4 (d, J=145.8 Hz), 129.3, 122.0, 116.4 (d, J=5.2 Hz), 48.3 (d, J=13.5 Hz), 43.1 (d, J=8.9 Hz), 27.6; $^{31}P$ NMR (162 MHz, $CDCl_3$): δ 17.41 ppm; HRMS (ESI) calcd for $C_{19}H_{21}N_2O_2P$ [$M^+$]: 340.1341; found: 340.1324.

xxxiv. tert-Butyl 3-(2-oxido-1,3-diphenyl-1,3,2-diazaphospholidin-2-yl)but-3-enoate (3g)

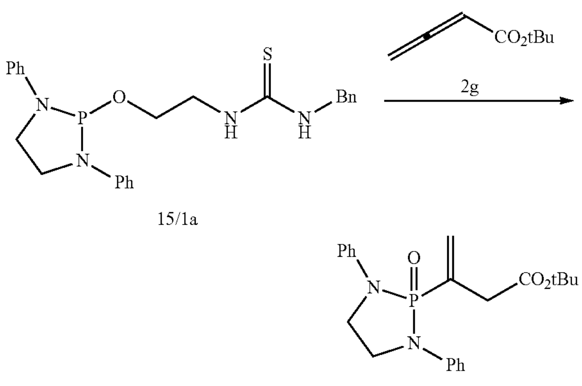

3g

NHP-thiourea 1a (20.0 mg, 0.0458 mmol), allene (Bang et al. (2015) *Org. Lett.* 17: 1573) 2g (18.1 mg, 0.128 mmol), and dry DCM (0.20 mL) were subjected to the reaction conditions described GP-3. Colorless solid 3g (8.80 mg, 0.0220 mmol, 48%). mp: 167-169° C.; IR (KBr, $cm^{-1}$): 2978, 1732, 1600, 1504, 1276, 1128, 1033; $^{1}H$ NMR (400 MHz, $CDCl_3$): δ 7.32-7.27 (m, 4H), 7.22-7.19 (m, 4H), 7.00 (app t, J=7.3 Hz, 2H), 6.74 (d, J=21.5 Hz, 1H), 6.25 (dd, J=44.9, 1.4 Hz, 1H), 3.95-3.84 (m, 4H), 2.81 (d, J=14.8 Hz, 2H), 1.14 (s, 9H); $^{13}C$ NMR (100 MHz, $CDCl_3$): δ 168.6 (d, J=6.7 Hz), 141.2 (d, J=7.5 Hz), 137.9 (d, J=8.9 Hz), 134.9 (d, J=148.1 Hz), 129.2, 121.8, 116.4 (d, J=5.2 Hz), 81.1, 43.5 (d, J=8.2 Hz), 38.9 (d, J=13.5 Hz), 27.5; $^{31}P$ NMR (162 MHz, $CDCl_3$): δ 17.82 ppm; HRMS (ESI) calcd for $C_{22}H_{27}N_2O_3P$ [$M^+$]: 398.1759; found: 398.1767.

xxxv. S-benzyl 3-(2-oxido-1,3-diphenyl-1,3,2-diazaphospholidin-2-yl)but-3-enethioate (3h)

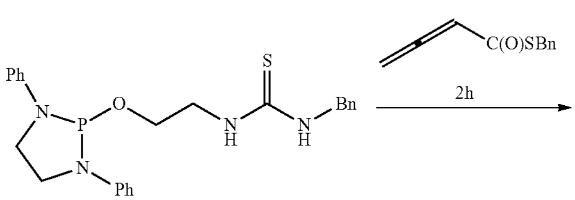

15/1a

-continued

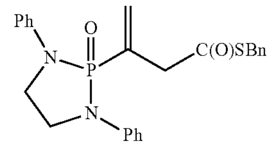

3h

NHP-thiourea 1a (45.0 mg, 0.103 mmol), allene (Cowen et al. (2009) *J. Am. Chem. Soc.* 131: 6105) 2h (59.8 mg, 0.309 mmol), and dry DCM (0.15 mL) were subjected to the reaction conditions described above. Brown syrup 3h (22.0 mg, 0.0490 mmol, 49%). IR (Neat, $cm^{-1}$): 3063, 2924, 2874, 1685, 1597, 1501, 1269, 1122, 1033; $^{1}H$ NMR (400 MHz, $CDCl_3$): δ 7.32-7.18 (m, 11H), 7.06-6.99 (m, 4H), 6.75 (dd, J=20.9, 13.2 Hz, 1H), 6.23 (dd, J=44.1, 1.3 Hz, 1H), 3.86 (d, J=7.0 Hz, 4H), 3.71 (s, 2H), 3.16 (dd, J=15.6, 1.1 Hz, 2H); $^{13}C$ NMR (100 MHz, $CDCl_3$): δ 193.8 (d, J=4.5 Hz), 141.1, 141.0, 136.5, 134.3 (d, J=148.1 Hz), 129.2, 128.8, 128.5, 127.3, 122.0, 116.5, 46.6 (d, J=13.5 Hz), 43.4 (d, J=8.2 Hz), 33.6; $^{31}P$ NMR (162 MHz, $CDCl_3$): δ 16.74 ppm; HRMS (APCI) calcd for $C_{25}H_{25}N_2O_2PS$ [M+H]$^+$: 449.1453; found: 449.1490.

xxxvi. N-methoxy-n-methyl-3-(2-oxido-1,3-diphenyl-1,3,2-diazaphospholidin-2-yl)but-3-enamide (3i)

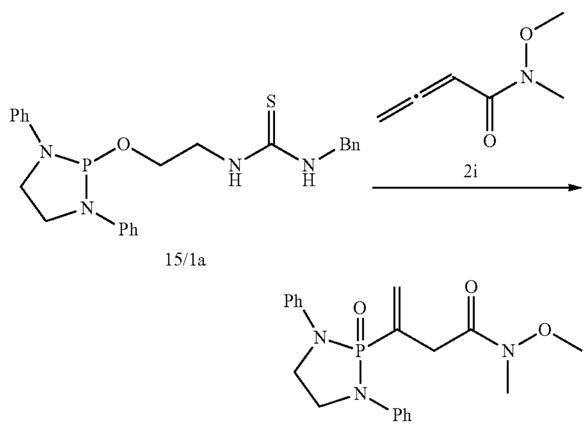

3i

NHP-thiourea 1a (40.0 mg, 0.0917 mmol), allene (prepared by GP-1-I) 2i (34.9 mg, 0.275 mmol), and dry DCM (0.15 mL) were subjected to the reaction conditions described above. Off-white solid 3i (31.4 mg, 0.0815 mmol, 89%). mp 123-124° C.; IR (Neat, $cm^{-1}$): 3063, 2935, 1662, 1601, 1597, 1504, 1276, 1122, 1033; $^{1}H$ NMR (400 MHz, $CDCl_3$): δ 7.31-7.22 (m, 8H), 6.99 (app t, J=7.2 Hz, 2H), 6.68 (dd, J=21.3, 1.2 Hz, 1H), 6.12 (dq, J=44.8, 1.6 Hz, 1H), 3.98-3.92 (m, 2H), 3.90-3.84 (m, 2H), 3.20 (s, 3H), 3.05 (d, J=13.3 Hz, 2H), 2.81 (s, 3H); $^{13}C$ NMR (100 MHz, $CDCl_3$): δ 169.5, 141.3 (d, J=8.2 Hz), 137.3 (d, J=8.9 Hz), 135.1 (d, J=146.6 Hz), 129.2, 121.8, 116.5 (d, J=5.2 Hz), 60.7, 43.5 (d, J=8.9 Hz), 36.7 (d, J=13.5 Hz), 31.8; $^{31}P$ NMR (162 MHz, $CDCl_3$): δ 17.50 ppm; HRMS (ESI) calcd for $C_{20}H_{24}N_3O_3P$ [$M^+$]: 385.1555; found: 385.1568.

xxxvii. 2-(3-(diphenylphosphoryl)prop-1-en-2-yl)-1,3-diphenyl-1,3,2-diazaphospholidine 2-oxide (3j)

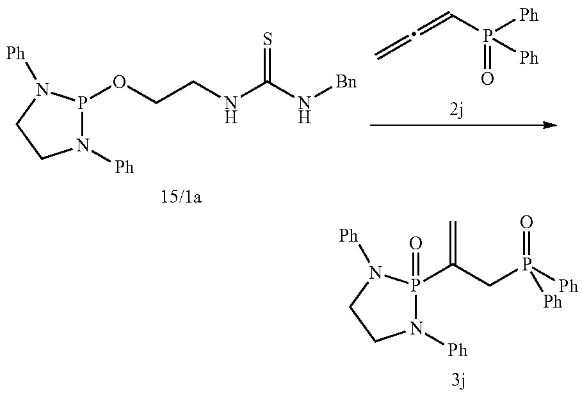

NHP-thiourea 1a (208 mg, 0.477 mmol), allene (Clavier et al. (2011) *Org. Lett.* 13: 308) 2j (106 mg, 0.441 mmol), and dry DCM (0.80 mL) were subjected to the reaction conditions described above. Colorless solid 3j (0.102 g, 0.204 mmol, 43%). mp: 80-81° C.; IR (Neat, $cm^{-1}$): 3055, 2939, 2875, 1599, 1504, 1267, 1120, 1035; $^{1}H$ NMR (400 MHz, $CDCl_3$): δ 7.46-7.40 (m, 6H), 7.31-7.25 (m, 8H), 7.16-7.14 (m, 4H), 7.02 (app t, J=7.4 Hz, 2H), 6.49 (dq, J=10.4, 1.6 Hz, 1H), 6.41 (dq, J=34.0, 1.7 Hz, 1H), 3.91-3.85 (m, 4H), 2.98-2.92 (m, 2H); $^{13}C$ NMR (100 MHz, $CDCl_3$): δ 141.2 (d, J=7.5 Hz), 137.9 (t, J=8.2 Hz), 133.0 (d, J=72.5 Hz), 131.9 (d, J=6.7 Hz), 131.7 (d, J=3.0 Hz), 130.7 (d, J=8.9 Hz), 129.4, 128.6 (d, J=11.9 Hz), 122.1, 116.6 (d, J=4.5 Hz), 43.6 (d, J=8.2 Hz), 31.7 (dd, J=67.3, 11.2 Hz); $^{31}P$ NMR (162 MHz, $CDCl_3$): δ 30.33 ppm (d, J=30.07 Hz), 19.1 ppm (d, J=29.74 Hz); HRMS (ESI) calcd for $C_{29}H_{28}N_2O_2P_2$ [$M^+$]: 498.1626; found: 498.1646.

xxxviii. Ethyl 2-(4-chlorobenzyl)-3-(2-oxido-1,3-diphenyl-1,3,2-diazaphospholidin-2-yl)but-3-enoate (3p)

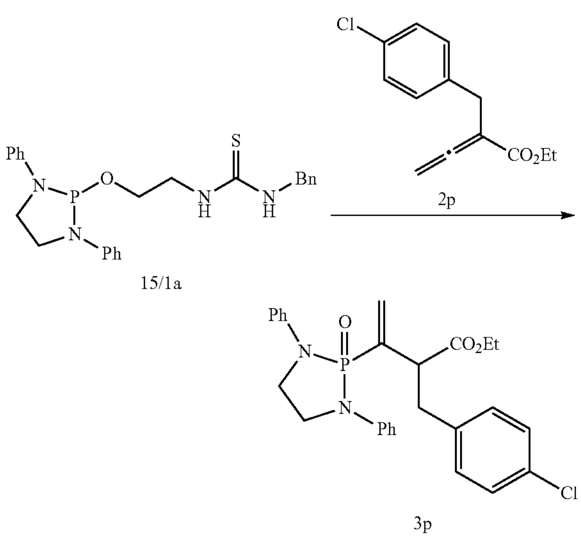

NHP-thiourea 1a (43.0 mg, 0.0986 mmol), allene (Na et al. (2011) *J. Am. Chem. Soc.* 133: 13337) 2p (70.2 mg, 0.295 mmol), and dry DCM (0.3 mL) were subjected to the reaction conditions described above. Off-white solid 3p (38.1 mg, 0.0771 mmol, 78%). mp: 152-153° C.; IR (Neat, $cm^{-1}$): 3061, 2980, 2875, 1732, 1599, 1494, 1271, 1153, 1035, 754; $^{1}H$ NMR (400 MHz, $CDCl_3$): δ 7.33-7.14 (m, 8H), 7.07-7.02 (m, 3H), 6.97 (app t, J=7.2 Hz, 1H), 6.87 (d, J=22.3 Hz, 1H), 6.71 (d, J=8.4 Hz, 2H), 6.43 (d, J=45.4 Hz, 1H), 3.96-3.86 (m, 4H), 3.55-3.43 (m, 2H), 3.11-3.04 (m, 1H), 2.97-2.91 (m, 1H), 2.41 (dd, J=13.5, 4.7 Hz, 1H), 0.75 (t, J=7.0 Hz, 3H); $^{13}C$ NMR (100 MHz, $CDCl_3$): δ 171.3 (d, J=5.9 Hz), 141.1 (dd, J=8.2, 2.2 Hz), 138.8 (d, J=145.8 Hz), 137.2 (d, J=8.2 Hz), 136.8, 132.3, 129.9, 129.2 (d, J=34.4 Hz), 128.5, 121.9 (d, J=29.2 Hz), 116.2 (dd, J=27.6, 5.2 Hz), 60.9, 48.3 (d, J=12.7 Hz), 43.5 (dd, J=44.1, 8.2 Hz), 37.7 (d, J=5.9 Hz), 13.5; $^{31}P$ NMR (162 MHz, $CDCl_3$): δ 17.38 ppm; HRMS (ESI) calcd for $C_{27}H_{28}N_2O_3PCl$ [$M^+$]: 494.1562; found: 494.1538.

xxxix. Ethyl 2-(4-nitrobenzyl)-3-(2-oxido-1,3-diphenyl-1,3,2-diazaphospholidin-2-yl)but-3-enoate (3q)

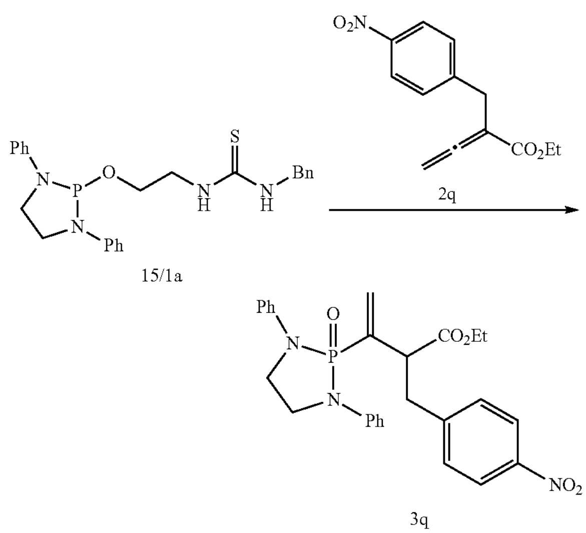

NHP-thiourea 1a (20.0 mg, 0.0458 mmol), allene (Zhu et al. (2003) *J. Am. Chem. Soc.* 125: 4716) 2q (34.1 mg, 0.137 mmol), and dry DCM (0.20 mL) were subjected to the reaction conditions described above. Off-white solid 3q (16.1 mg, 0.0318 mmol, 69%). mp: 175-178° C.; IR (Neat, $cm^{-1}$): 3061, 2980, 2875, 1732, 1599, 1519, 1504, 1346, 1267, 1151, 1035; $^{1}H$ NMR (400 MHz, $CDCl_3$): δ 7.93 (d, J=8.6 Hz, 2H), 7.30-7.25 (m, 4H), 7.18-7.15 (m, 4H), 7.02-6.96 (m, 2H), 6.95-6.92 (m, 2H), 6.88 (d, J=22.1 Hz, 1H), 6.48 (d, J=45.2 Hz, 1H), 3.93-3.90 (m, 4H), 3.49 (q, J=7.2 Hz, 2H), 3.18-3.05 (m, 2H), 2.58 (dd, J=13.1, 4.9 Hz, 1H), 0.78 (t, J=7.0 Hz, 3H); $^{13}C$ NMR (100 MHz, $CDCl_3$): δ 170.9 (d, J=5.2 Hz), 146.6, 145.8, 140.9 (d, J=8.2 Hz), 138.4 (d, J=146.6 Hz), 137.3 (d, J=8.2 Hz), 129.3 (d, J=29.9 Hz), 123.5, 121.9 (d, J=17.2 Hz), 116.3 (d, J=4.5 Hz), 115.6 (d, J=5.2 Hz), 61.2, 47.9 (d, J=13.5 Hz), 43.4 (dd, J=36.6, 8.2 Hz), 38.0 (d, J=5.9 Hz), 13.5; $^{31}P$ NMR (162 MHz, $CDCl_3$): δ 17.10 ppm; HRMS (ESI) calcd for $C_{27}H_{28}N_3O_5P$ [$M^+$]: 505.1767; found: 505.1792.

xl. Ethyl 2-(4-fluorobenzyl)-3-(2-oxido-1,3-diphenyl-1,3,2-diazaphospholidin-2-yl)but-3-enoate (3r)

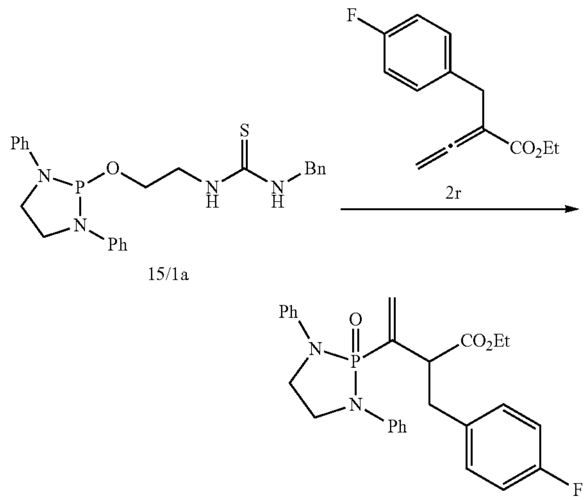

3r

NHP-thiourea 1a (20.0 mg, 0.0458 mmol), allene (Na et al. (2011) *J. Am. Chem. Soc.* 133: 13337) 2r (30.3 mg, 0.137 mmol), and dry DCM (0.15 mL) were subjected to the reaction conditions described above. Colorless solid 3r (18.1 mg, 0.0378 mmol, 82%). mp: 164-166° C. IR (Neat, $cm^{-1}$): 3066, 2985, 2877, 1732, 1601, 1504, 1346, 1280, 1157, 1037; $^{1}H$ NMR (400 MHz, $CDCl_3$): δ 7.33-7.14 (m, 8H), 7.03 (app t, J=7.3 Hz, 1H), 6.96 (app t, J=7.3 Hz, 1H), 6.87 (d, J=22.3 Hz, 1H), 6.81-6.72 (m, 4H), 6.44 (d, J=45.5 Hz, 1H), 3.97-3.87 (m, 4H), 3.47 (q, J=7.2 Hz, 2H), 3.11-3.04 (m, 1H), 2.98-2.92 (m, 1H), 2.41 (dd, J=13.6, 4.6 Hz, 1H), 0.75 (t, J=7.1 Hz, 3H); $^{13}C$ NMR (100 MHz, $CDCl_3$): δ 171.3 (d, J=5.2 Hz), 161.5 (d, J=244.5 Hz), 141.1 (d, J=8.2 Hz), 138.8 (d, J=145.8 Hz), 137.2 (app t, J=4.5 Hz), 134.0 (d, J=3.7 Hz), 130.0 (d, J=8.2 Hz), 129.2 (d, J=34.4 Hz), 121.9 (d, J=29.2 Hz), 116.2 (dd, J=23.9, 4.5 Hz), 115.1 (d, J=20.9 Hz), 60.9, 48.5 (d, J=12.7 Hz), 43.5 (dd, J=45.6, 8.3 Hz), 37.6 (d, J=5.2 Hz), 13.5; $^{31}P$ NMR (162 MHz, $CDCl_3$): δ 17.46 ppm; HRMS (ESI) calcd for $C_{27}H_{28}N_2O_3FP$ $[M^+]$: 478.1822; found: 478.1844.

xli. Ethyl 3-(2-oxido-1,3-diphenyl-1,3,2-diazaphospholidin-2-yl)-2-(4-(trifluoromethyl)benzyl)but-3-enoate (3t)

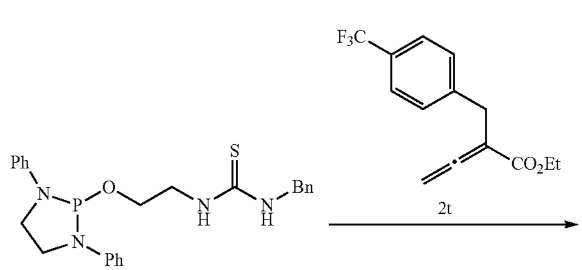

15/1a

-continued

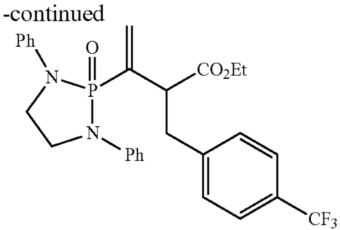

3t

NHP-thiourea 1a (20.0 mg, 0.0458 mmol), allene (Wurz and Fu (2005) *J. Am. Chem. Soc.* 127: 12234) 2t (37.2 mg, 0.137 mmol), and dry DCM (0.15 mL) were subjected to the reaction conditions described above. Colorless solid 3t (22.1 mg, 0.0418 mmol, 91%). mp: 133-135° C.; IR (Neat, $cm^{-1}$): 3063, 2982, 2874, 1732, 1601, 1504, 1327, 1276, 1165, 1037; $^{1}H$ NMR (400 MHz, $CDCl_3$): δ 7.35-7.15 (m, 10H), 7.03 (app t, J=7.3 Hz, 1H), 6.97 (app t, J=7.3 Hz, 1H), 6.95 (m, 2H), 6.90 (s, 2H), 6.87 (d, J=13.7 Hz, 1H), 6.43 (d, J=45.3 Hz, 1H), 3.97-3.87 (m, 4H), 3.54-3.43 (m, 2H), 3.16-3.01 (m, 2H), 2.49 (dd, J=13.3, 4.5 Hz, 1H), 0.75 (t, J=7.1 Hz, 3H); $^{13}C$ NMR (100 MHz, $CDCl_3$): δ 171.1 (d, J=5.2 Hz), 142.4 (d, J=1.5 Hz), 141.1 (d, J=8.2 Hz), 138.7 (d, J=146.6 Hz), 137.2 (t, J=6.7 Hz), 129.2 (d, J=35.5 Hz), 128.9, 125.3 (d, J=3.7 Hz), 122.1, 121.8, 116.3 (d, J=5.2 Hz), 116.0 (d, J=5.2 Hz), 61.1, 48.1 (d, J=12.7 Hz), 43.4 (dd, J=42.6, 8.2 Hz), 38.1 (d, J=5.9 Hz), 13.5; $^{31}P$ NMR (162 MHz, $CDCl_3$): δ 17.26 ppm; HRMS (ESI) calcd for $C_{28}H_{28}N_2O_3F_3P$ $[M^+]$: 529.1863; found: 529.1888.

h. Synthesis of 2-(4-Hydroxybut-1-en-2-yl)-1,3-diphenyl-1,3,2-diazaphospholidine 2-oxide (4a)

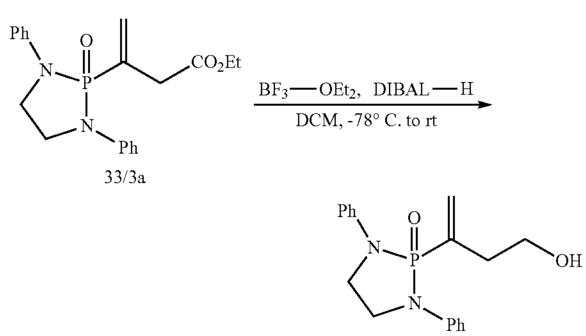

4a

To a solution of 3a (0.170 g, 0.458 mmol) in dry DCM (1.5 mL) was slowly added $BF_3$—$OEt_2$ (0.075 mL, 0.597 mmol) at −78° C. under argon, and stirred for 30 min at same temperature. The reaction mixture was added 1M solution of DIBAL-H in hexanes (1.30 mL, 1.37 mmol), and stirred for 2 h at −78° C., and an additional 1 h at rt. On completion the reaction mixture was slowly quenched with methanol at −78° C. The solvents were removed under reduced pressure and the residue was dissolved in DCM, sequentially washed with water and brine. The organic layer was separated, dried over $Na_2SO_4$ and, concentrated under vacuo to give crude product which was purified by silica flash column chromatography (EtOAc/Hexanes, 8:2) to yield pure product as white solid 4a (91.5 mg, 0.278 mmol, 61%). mp: 186-188° C.; IR (KBr, $cm^{-1}$): 3321 (br), 2945, 2860, 1599, 1494, 1269, 1122, 1051; $^1H$ NMR (400 MHz, $CDCl_3$): δ 7.29 (t, J=8.5 Hz, 4H), 7.18 (d, J=7.8 Hz, 4H), 7.00 (t, J=7.3 Hz, 2H), 6.45 (d, J=22.7 Hz, 1H), 5.99 (dd, J=47.2, 1.4 Hz, 1H), 3.89-3.77 (m, 4H), 3.50 (t, J=6.5 Hz, 2H), 2.23-2.17 (m, 2H); $^{13}C$ NMR (100 MHz, $CDCl_3$): δ 141.2 (d, J=8.2 Hz), 138.5 (d, J=142.1 Hz), 134.9, 129.3, 122.0, 116.5 (d, J=4.5 Hz), 60.8 (d, J=5.2 Hz), 43.6 (d, J=8.2 Hz), 34.9 (d, J=11.9 Hz), $^{31}P$ NMR (162 MHz, $CDCl_3$): δ 19.94 ppm; HRMS (APCI) calcd for $C_{21}H_{25}N_2O_3P$ $[M+H]^+$: 385.1676; found: 385.1688.

i. Synthesis of Ethyl 3-(1,3-bis(4-bromophenyl)-2-oxido-1,3,2-diazaphospholidin-2-yl)but-3-enoate (4b)

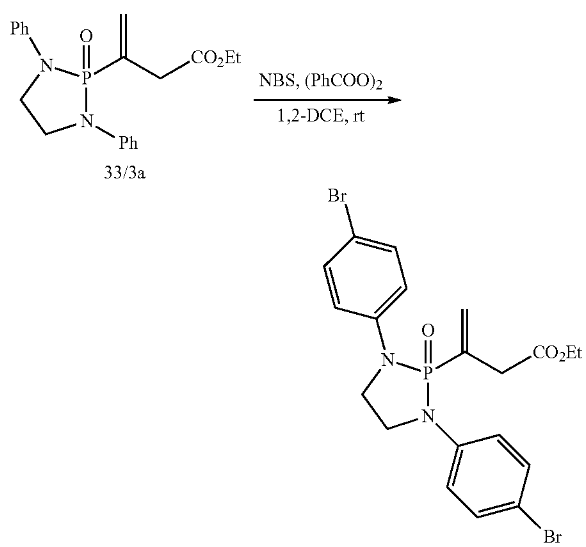

4b

To a solution of 3a (50.0 mg, 0.134 mmol) in 1,2-dichloroethane (1.5 mL) was added catalytic amount of benzoyl peroxide (4 mg) and N-bromosuccinimide (60.8 mg, 0.341 mmol) at rt. The reaction mixture was stirred rt for 4 h. The solvent was removed under vacuum and crude mixture was purified by silica flash column chromatography (EtOAc/Hexanes, 3:7) to yield pure product as off-white solid 4b (54.0 mg, 0.102 mmol, 76%). mp: 163-165° C.; IR (Neat, $cm^{-1}$): 3041, 2985, 2891, 1732, 1589, 1494, 1280, 1132, 1033, 619; $^1H$ NMR (400 MHz, $CDCl_3$): δ 7.40 (d, J=8.6 Hz, 4H), 7.07 (d, J=9.1 Hz, 4H), 6.72 (dd, J=21.1, 1.3 Hz, 1H), 6.27 (dd, J=44.6, 1.3 Hz, 1H), 3.87-3.81 (m, 4H), 3.58 (q, J=7.1 Hz, 2H), 2.89 (dd, J=16.4, 0.9 Hz, 2H), 0.93 (t, J=7.1 Hz, 3H); $^{13}C$ NMR (100 MHz, $CDCl_3$): δ 168.9 (d, J=3.7 Hz), 139.9 (d, J=8.2 Hz), 139.7, 133.8 (d, J=147.3 Hz), 132.1, 117.9 (d, J=5.2 Hz), 114.8, 61.1, 43.3 (d, J=8.2 Hz), 38.5 (d, J=14.2 Hz), 13.6; $^{31}P$ NMR (162 MHz, $CDCl_3$): δ 17.07 ppm; HRMS (APCI) calcd for $C_{20}H_{21}Br_2N_2O_3P$ $[M+H]^+$: 528.9714; found: 528.9703.

j. Synthesis of Ethyl 3-(diethoxyphosphoryl)but-3-enoate (4c)

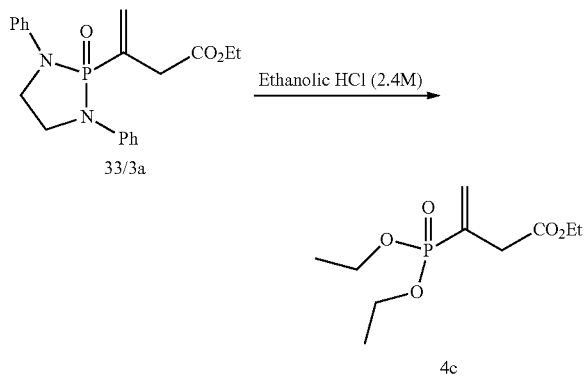

4c

A solution of 3a (40.0 mg, 0.107 mmol) in 2.4M ethanolic HCl (1 mL) was stirred and heated at rt for overnight. On completion, ethanol was removed under reduced pressure, and the resulted crude was dissolved in ethyl acetate, filtered the salts, dried over $Na_2SO_4$, and concentrated to give pure product as brown color liquid 4c (24.6 mg, 0.0983 mmol, 92%). IR (Neat, $cm^{-1}$): 2984, 1737, 1257, 1157, 1026; $^1H$ NMR (400 MHz, $CD_3OD$): δ 6.16 (d, J=22.1 Hz, 1H), 6.04 (dd, J=47.3, 1.2 Hz, 1H), 4.13 (q, J=7.0 Hz, 2H), 4.09-4.01 (m, 4H), 3.25 (d, J=14.9 Hz, 2H), 1.31-1.22 (m, 9H); $^{13}C$ NMR (100 MHz, $CD_3OD$): δ 171.7 (d, J=5.2 Hz), 135.2 (d, J=8.9 Hz), 133.6 (d, J=181.0 Hz), 63.9 (d, J=5.9 Hz), 62.3, 38.7 (d, J=11.9 Hz), 16.7 (d, J=6.7 Hz), 14.6; $^{31}P$ NMR (162 MHz, $CD_3OD$): δ 18.17 ppm; HRMS (ESI) calcd for $C_{10}H_{19}O_5P$ $[M^+]$: 250.0970; found: 250.0956.

k. Synthesis of Ethyl (e)-3-(2-oxido-1,3-diphenyl-1,3,2-diazaphospholidin-2-yl)but-2-enoate (4d)

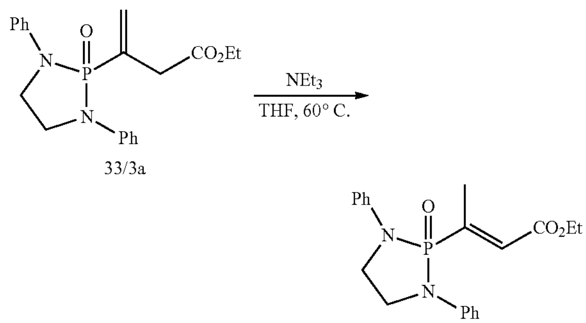

4d

A mixture of 3a (10.0 mg, 0.026 mmol) and triethylamine in THF was stirred and heated to 60° C. for overnight. On completion as checked by TLC analysis, the solvent was removed under reduced pressure to give pure product as off-white solid 4d (9.9 mg, 0.026 mmol, >99%). mp: 208-210° C. IR (Neat, $cm^{-1}$): 2976, 2926, 1718, 1599, 1504, 1334, 1275, 1120, 1039; $^1H$ NMR (400 MHz, $CDCl_3$): δ 7.31 (t, J=8.6 Hz, 4H), 7.19 (d, J=8.6 Hz, 4H), 7.11-7.01 (m, 3H), 4.17 (q, J=7.1 Hz, 2H), 3.98-3.85 (m, 4H), 2.00 (dd, J=16.8, 1.7 Hz, 3H), 1.28 (t, J=7.1 Hz, 3H); $^{13}C$ NMR (100

MHz, $CDCl_3$): δ 164.9 (d, J=29.2 Hz), 146.8 (d, J=138.4 Hz), 140.9 (d, J=7.5 Hz), 134.3 (d, J=11.9 Hz), 129.4, 122.3, 116.5 (d, J=4.5 Hz), 60.6, 44.1 (d, J=8.2 Hz), 29.6, 14.1 (t, J=5.2 Hz); $^{31}P$ NMR (162 MHz, $CDCl_3$): δ 19.22 ppm; HRMS (ESI) calcd for $C_{20}H_{23}N_2O_3P$ $[M+Na]^+$: 393.1339; found: 393.1331.

l. Synthesis of 4-Hydroxy-4-(2-oxido-1,3-diphenyl-1,3,2-diazaphospholidin-2-yl)dihydrofuran-2(3H)-one (4e)

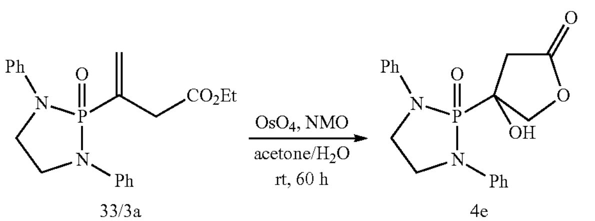

To a solution of 3a (100 mg, 0.271 mmol) in acetone (3 mL) and water (0.3 mL) was added 2.5% wt of $OsO_4$ in t-BuOH solution (0.28 mL, 0.0271 mmol) followed by N-methylmorpholine N-oxide (34.1 mg, 0.292 mmol), and stirred at room temperature for 60 h. On completion as analyzed by TLC, the dark solution was removed under reduced pressure to give crude product, which was purified by silica flash column chromatography (EtOAc:Hexanes, 1:1) to yield pure product as white solid 4e (44.2 mg, 0.123 mmol, 45%). Mp 207-209° C.; IR (KBr, $cm^{-1}$): 3394 (bs), 2850, 1768, 1597, 1490, 1265, 1124, 1033; $^1H$ NMR (400 MHz, DMSO-$d_6$): δ 7.40-7.33 (m, 8H), 7.05 (bs, 2H), 6.33 (bs, 1H), 4.46 (d, J=9.6 Hz, 1H), 3.95 (bs, 2H), 3.72 (d, J=9.4 Hz, 3H), 3.03 (dd, J=16.8, 6.8 Hz, 1H), 1.98 (d, J=16.8 Hz, 1H); $^{13}C$ NMR (100 MHz, DMSO-$d_6$): δ 174.0 (d, J=19.4 Hz), 141.7 (dd, J=9.7, 8.3 Hz), 129.2 (d, J=7.5 Hz), 122.2 (d, J=2.9 Hz), 117.7 (d, J=24.6, 3.7 Hz), 78.3, 76.9, 75.2 (d, J=16.4 Hz), 43.4 (dd, J=11.9, 7.5 Hz); $^{31}P$ NMR (162 MHz, DMSO-$d_6$): δ 21.45 ppm; HRMS (ESI) calcd for $C_{18}H_{19}N_2O_4P$ $[M^+]$: 358.1082; found: 358.1065.

m. Synthesis of Ethyl 2-methyl-3-(2-oxido-1,3-diphenyl-1,3,2-diazaphospholidin-2-yl)but-3-enoate (3k)

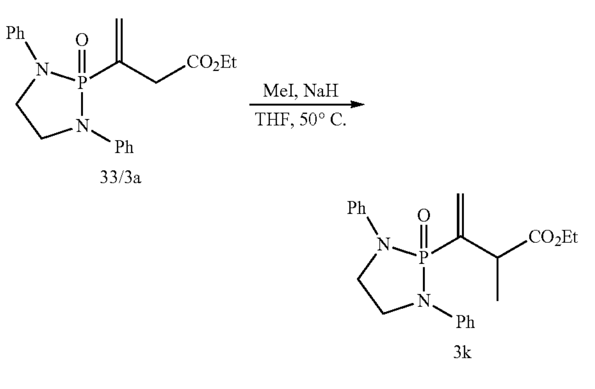

To a solution of 3a (14 mg, 0.037 mmol) in dry THF (0.5 mL) was added 60% NaH (1.6 mg, 0.041 mmol) portion wise at 0° C., and stirred at rt for 30 min. The reaction was cooled to 0° C. and added methyl iodide (0.013 mL, 0.19 mmol) and stirred at rt for 15 h. On completion, the reaction was slowly quenched by ice water at 0° C., and the solvent was removed under vacuo. The residue was dissolved in DCM, washed with water and brine. The organic layer was separated dried over $Na_2SO_4$, and concentrated under vacuo to give crude mixture which was further purified by silica flash column chromatography (EtOAc/Hexanes, 2:8) to give pure product as off-white solid 3k (10 mg, 0.026 mmol, 70%).

n. X-Ray Crystal Structure Analysis of NHP-Thiourea (1a)

Figure 2:
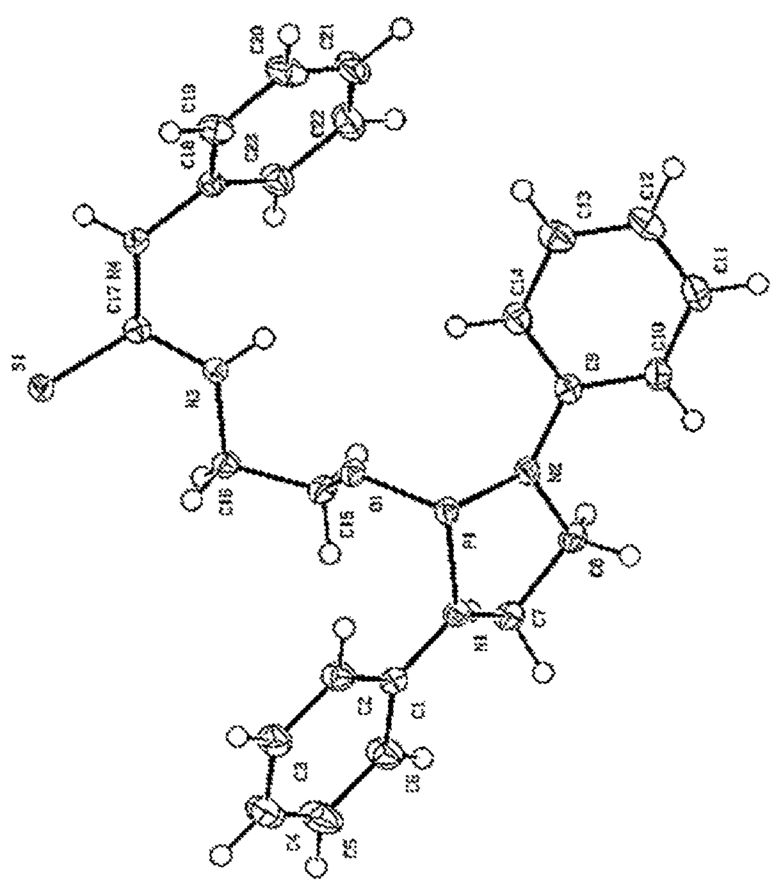

Single crystals of $C_{23}H_{25}N_4OPS$ (Compound 1a) are shown in FIG. 2. A suitable crystal was selected and on a diffractometer. The crystal was kept at 100.03 K during data collection. Using Olex2 (Dolomanov et al. (2009)*J. Appl. Cryst.* 42: 339-341), the structure was solved with the ShelXT structure solution program using Direct Methods and refined with the XL refinement package using CGLS minimization.

Crystal data and structure refinement for compound 1a are illustrated in Table 2 below.

TABLE 2

| | |
|---|---|
| Identification code | 1a |
| Empirical formula | $C_{23}H_{25}N_{40}PS$ |
| Formula weight | 436.50 |
| Temperature/K | 100.03 |
| Crystal system | triclinic |
| Space group | P-1 |
| a/Å | 6.3703(9) |
| b/Å | 12.1555(18) |
| c/Å | 15.503(2) |
| α/° | 108.683(2) |
| β/° | 98.291(2) |
| γ/° | 100.081(2) |
| Volume/Å$^3$ | 1093.6(3) |
| Z | 2 |
| $\rho_{calc}$g/cm$^3$ | 1.326 |
| μ/mm$^{-1}$ | 0.244 |
| F(000) | 460.0 |
| Crystal size/mm$^3$ | 0.3 × 0.1 × 0.05 |
| Radiation | MoKα (λ = 0.71073) |
| 2Θ range for data collection/° | 2.84 to 56.562 |
| Index ranges | −8 ≤ h ≤ 8, −16 ≤ k ≤ 16, −20 ≤ l ≤ 20 |
| Reflections collected | 15051 |
| Independent reflections | 5410 [$R_{int}$ = 0.0236, $R_{sigma}$ = 0.0267] |
| Data/restraints/parameters | 5410/0/271 |
| Goodness-of-fit on F$^2$ | 1.037 |
| Final R indexes [I >= 2σ (I)] | $R_1$ = 0.0316, $wR_2$ = 0.0775 |
| Final R indexes [all data] | $R_1$ = 0.0385, $wR_2$ = 0.0807 |
| Largest diff. peak/hole/ e Å$^{-3}$ | 0.34/−0.28 |

Fractional Atomic Coordinates (×10$^4$) and Equivalent Isotropic Displacement Parameters (Å$^2$×10$^3$) of compound 1a are illustrated in Table 3 below. $U_{eq}$ is defined as ⅓ of the trace of the orthogonalised $U_{IJ}$ tensor.

TABLE 3

| Atom | x | y | z | U(eq) |
|---|---|---|---|---|
| $S_1$ | 12456.1(5) | 8697.7(3) | 10136.8(2) | 19.92(8) |
| $P_1$ | 4104.8(5) | 5520.1(3) | 6648.7(2) | 14.72(8) |
| $O_1$ | 6037.9(13) | 6479.7(7) | 7513.8(6) | 15.90(17) |
| $N_1$ | 2191.2(16) | 5012.8(9) | 7190.9(7) | 16.9(2) |
| $N_2$ | 2446.1(16) | 6349.9(9) | 6324.7(7) | 17.4(2) |
| $N_3$ | 9303.7(16) | 8462.2(9) | 8728.7(7) | 18.0(2) |
| $N_4$ | 12639.8(16) | 9648.2(9) | 8820.5(7) | 17.9(2) |
| $C_1$ | 2690.7(19) | 4398.1(10) | 7797.2(8) | 17.9(2) |
| $C_2$ | 4482(2) | 3869.2(11) | 7760.0(9) | 22.2(3) |
| $C_3$ | 5013(2) | 3292.1(12) | 8370.2(10) | 27.0(3) |
| $C_4$ | 3782(2) | 3215.7(14) | 9027.0(11) | 32.9(3) |
| $C_5$ | 1979(3) | 3714.4(15) | 9054.2(12) | 36.8(4) |
| $C_6$ | 1432(2) | 4303.5(13) | 8449.9(10) | 28.6(3) |
| $C_7$ | 407.4(19) | 5635.0(11) | 7290.1(9) | 19.5(2) |
| $C_8$ | 240.2(19) | 6142.4(11) | 6510.5(9) | 19.5(2) |
| $C_9$ | 2857(2) | 6841.4(10) | 5638.8(8) | 17.4(2) |
| $C_{10}$ | 1163(2) | 6917.1(11) | 4993.9(9) | 21.3(3) |
| $C_{11}$ | 1627(2) | 7395.2(12) | 4319.8(9) | 25.4(3) |
| $C_{12}$ | 3769(2) | 7815.8(12) | 4279.9(9) | 25.8(3) |
| $C_{13}$ | 5465(2) | 7758.6(12) | 4925.7(9) | 25.4(3) |
| $C_{14}$ | 5022(2) | 7281.2(11) | 5602.9(9) | 21.1(2) |
| $C_{15}$ | 5603.0(19) | 7246.7(11) | 8360.7(8) | 17.3(2) |
| $C_{16}$ | 7742(2) | 7760.7(11) | 9066.9(8) | 19.2(2) |
| $C_{17}$ | 11384.3(19) | 8959.5(10) | 9174.5(8) | 15.7(2) |
| $C_{18}$ | 12015.0(19) | 9885.3(10) | 7988.9(8) | 17.2(2) |
| $C_{19}$ | 13291(2) | 9662.7(11) | 7322.2(9) | 23.4(3) |
| $C_{20}$ | 12769(3) | 9915.6(12) | 6516.7(9) | 28.6(3) |
| $C_{21}$ | 10973(3) | 10387.3(13) | 6374.3(9) | 30.1(3) |
| $C_{22}$ | 9706(2) | 10613.6(14) | 7038.5(11) | 32.5(3) |
| $C_{23}$ | 10230(2) | 10374.0(13) | 7853.1(9) | 25.6(3) |

Anisotropic Displacement Parameters ($Å^2 \times 10^3$) for compound 1a are illustrated in Table 4 below. The Anisotropic displacement factor exponent takes the form:—$2\pi^2 [h^2a^{*2}U_{11}+2hka^*b^*U_{12}+ \ldots ]$.

TABLE 4

| Atom | $U_{11}$ | $U_{22}$ | $U_{33}$ | $U_{23}$ | $U_{13}$ | $U_{12}$ |
|---|---|---|---|---|---|---|
| $S_1$ | 16.06(15) | 27.95(16) | 17.30(15) | 12.17(12) | 2.46(11) | 2.15(12) |
| $P_1$ | 12.55(14) | 18.03(15) | 14.04(14) | 5.40(11) | 3.87(10) | 4.49(11) |
| $O_1$ | 12.0(4) | 20.8(4) | 14.3(4) | 5.0(3) | 4.0(3) | 3.8(3) |
| $N_1$ | 12.5(5) | 19.8(5) | 20.1(5) | 8.4(4) | 5.0(4) | 4.3(4) |
| $N_2$ | 12.8(5) | 23.7(5) | 18.3(5) | 9.8(4) | 4.3(4) | 5.6(4) |
| $N_3$ | 16.5(5) | 22.0(5) | 14.9(5) | 8.7(4) | 1.8(4) | −0.1(4) |
| $N_4$ | 14.9(5) | 22.4(5) | 15.7(5) | 8.3(4) | 2.3(4) | 0.5(4) |
| $C_1$ | 16.2(6) | 17.5(5) | 19.1(6) | 7.1(5) | 3.0(4) | 1.1(4) |
| $C_2$ | 21.3(6) | 23.8(6) | 25.4(6) | 11.0(5) | 9.3(5) | 7.0(5) |
| $C_3$ | 24.1(7) | 29.3(7) | 34.5(7) | 17.7(6) | 8.1(6) | 10.1(5) |
| $C_4$ | 34.3(8) | 39.0(8) | 37.3(8) | 26.7(7) | 11.1(6) | 11.3(6) |
| $C_5$ | 36.1(8) | 50.7(10) | 42.1(9) | 32.5(8) | 21.0(7) | 16.3(7) |
| $C_6$ | 24.5(7) | 37.9(8) | 34.9(8) | 21.7(6) | 15.2(6) | 12.6(6) |
| $C_7$ | 13.0(5) | 24.0(6) | 24.5(6) | 10.6(5) | 6.7(4) | 6.2(5) |
| $C_8$ | 12.1(5) | 23.4(6) | 24.4(6) | 9.7(5) | 4.1(4) | 5.3(4) |
| $C_9$ | 20.1(6) | 16.7(5) | 14.7(5) | 3.8(4) | 4.0(4) | 5.9(4) |
| $C_{10}$ | 21.3(6) | 20.5(6) | 19.7(6) | 6.4(5) | −0.6(5) | 4.1(5) |
| $C_{11}$ | 32.7(7) | 23.2(6) | 18.6(6) | 7.2(5) | −1.3(5) | 7.9(5) |
| $C_{12}$ | 38.9(8) | 25.6(7) | 19.3(6) | 11.1(5) | 11.1(5) | 13.4(6) |
| $C_{13}$ | 26.9(7) | 29.7(7) | 27.4(7) | 14.0(6) | 14.0(5) | 12.3(5) |
| $C_{14}$ | 20.3(6) | 25.3(6) | 20.9(6) | 10.0(5) | 6.2(5) | 8.6(5) |
| $C_{15}$ | 15.0(5) | 19.7(6) | 16.5(5) | 4.5(4) | 5.8(4) | 4.2(4) |
| $C_{16}$ | 17.8(6) | 23.3(6) | 14.9(5) | 6.9(5) | 4.3(4) | −0.4(5) |
| $C_{17}$ | 17.2(5) | 15.9(5) | 13.8(5) | 3.7(4) | 5.5(4) | 4.7(4) |
| $C_{18}$ | 19.0(6) | 17.2(5) | 13.3(5) | 5.2(4) | 2.9(4) | 0.1(4) |
| $C_{19}$ | 29.1(7) | 21.7(6) | 23.5(6) | 9.2(5) | 12.5(5) | 8.2(5) |
| $C_{20}$ | 45.4(8) | 22.8(6) | 20.6(6) | 8.0(5) | 16.4(6) | 7.3(6) |
| $C_{21}$ | 41.3(8) | 31.0(7) | 17.6(6) | 12.6(5) | 2.8(6) | 2.5(6) |
| $C_{22}$ | 27.8(7) | 46.1(9) | 32.9(8) | 25.2(7) | 5.3(6) | 11.8(6) |
| $C_{23}$ | 24.6(7) | 35.2(7) | 24.1(6) | 16.2(6) | 10.3(5) | 10.1(6) |

Bond Lengths for compound 1a are illustrated in Table 5 below.

TABLE 5

| Atom | Atom | Length/Å |
|---|---|---|
| $S_1$ | $C_{17}$ | 1.6969(12) |
| $P_1$ | $O_1$ | 1.6414(9) |
| $P_1$ | $N_1$ | 1.7138(10) |
| $P_1$ | $N_2$ | 1.7119(10) |
| $O_1$ | $C_{15}$ | 1.4427(14) |
| $N_1$ | $C_1$ | 1.4107(15) |
| $N_1$ | $C_7$ | 1.4710(15) |
| $N_2$ | $C_8$ | 1.4699(15) |
| $N_2$ | $C_9$ | 1.4102(15) |
| $N_3$ | $C_{16}$ | 1.4601(15) |
| $N_3$ | $C_{17}$ | 1.3370(15) |
| $N_4$ | $C_{17}$ | 1.3520(15) |
| $N_4$ | $C_{18}$ | 1.4262(15) |
| $C_1$ | $C_2$ | 1.4040(17) |
| $C_1$ | $C_6$ | 1.3985(18) |
| $C_2$ | $C_3$ | 1.3847(18) |
| $C_3$ | $C_4$ | 1.388(2) |
| $C_4$ | $C_5$ | 1.389(2) |
| $C_5$ | $C_6$ | 1.391(2) |
| $C_7$ | $C_8$ | 1.5219(17) |
| $C_9$ | $C_{10}$ | 1.3983(17) |
| $C_9$ | $C_{14}$ | 1.4052(18) |
| $C_{10}$ | $C_{11}$ | 1.3914(18) |
| $C_{11}$ | $C_{12}$ | 1.388(2) |
| $C_{12}$ | $C_{13}$ | 1.3902(19) |
| $C_{13}$ | $C_{14}$ | 1.3918(18) |
| $C_{15}$ | $C_{16}$ | 1.5095(16) |
| $C_{18}$ | $C_{19}$ | 1.3934(17) |
| $C_{18}$ | $C_{23}$ | 1.3921(18) |
| $C_{19}$ | $C_{20}$ | 1.3881(18) |
| $C_{20}$ | $C_{21}$ | 1.387(2) |
| $C_{21}$ | $C_{22}$ | 1.387(2) |
| $C_{22}$ | $C_{23}$ | 1.3926(18) |

Bond Angles for compound 1a are illustrated in Table 6 below.

TABLE 6

| Atom | Atom | Atom | Angle/° |
|---|---|---|---|
| $O_1$ | $P_1$ | $N_1$ | 103.87(5) |
| $O_1$ | $P_1$ | $N_2$ | 105.53(5) |
| $N_2$ | $P_1$ | $N_1$ | 89.73(5) |
| $C_{15}$ | $O_1$ | $P_1$ | 123.07(7) |
| $C_1$ | $N_1$ | $P_1$ | 121.17(8) |
| $C_1$ | $N_1$ | $C_7$ | 119.34(10) |
| $C_7$ | $N_1$ | $P_1$ | 115.32(8) |
| $C_8$ | $N_2$ | $P_1$ | 115.81(8) |
| $C_9$ | $N_2$ | $P_1$ | 120.39(8) |
| $C_9$ | $N_2$ | $C_8$ | 119.90(10) |
| $C_{17}$ | $N_3$ | $C_{16}$ | 123.69(10) |
| $C_{17}$ | $N_4$ | $C_{18}$ | 127.06(10) |
| $C_2$ | $C_1$ | $N_1$ | 120.39(11) |
| $C_6$ | $C_1$ | $N_1$ | 121.22(11) |
| $C_6$ | $C_1$ | $C_2$ | 118.38(11) |
| $C_3$ | $C_2$ | $C_1$ | 120.59(12) |
| $C_2$ | $C_3$ | $C_4$ | 120.90(13) |
| $C_3$ | $C_4$ | $C_5$ | 118.80(13) |
| $C_4$ | $C_5$ | $C_6$ | 120.98(14) |
| $C_5$ | $C_6$ | $C_1$ | 120.32(13) |
| $N_1$ | $C_7$ | $C_8$ | 105.69(10) |
| $N_2$ | $C_8$ | $C_7$ | 105.61(9) |
| $C_{10}$ | $C_9$ | $N_2$ | 121.81(11) |
| $C_{10}$ | $C_9$ | $C_{14}$ | 118.65(11) |
| $C_{14}$ | $C_9$ | $N_2$ | 119.54(11) |
| $C_{11}$ | $C_{10}$ | $C_9$ | 120.28(12) |
| $C_{12}$ | $C_{11}$ | $C_{10}$ | 120.87(12) |
| $C_{11}$ | $C_{12}$ | $C_{13}$ | 119.27(12) |
| $C_{12}$ | $C_{13}$ | $C_{14}$ | 120.43(13) |
| $C_{13}$ | $C_{14}$ | $C_9$ | 120.49(12) |
| $O_1$ | $C_{15}$ | $C_{16}$ | 107.27(9) |
| $N_3$ | $C_{16}$ | $C_{15}$ | 110.01(10) |
| $N_3$ | $C_{17}$ | $S_1$ | 121.14(9) |
| $N_3$ | $C_{17}$ | $N_4$ | 118.20(10) |
| $N_4$ | $C_{17}$ | $S_1$ | 120.62(9) |
| $C_{19}$ | $C_{18}$ | $N_4$ | 118.45(11) |
| $C_{23}$ | $C_{18}$ | $N_4$ | 121.43(11) |
| $C_{23}$ | $C_{18}$ | $C_{19}$ | 120.07(11) |
| $C_{20}$ | $C_{19}$ | $C_{18}$ | 120.04(13) |
| $C_{21}$ | $C_{20}$ | $C_{19}$ | 119.98(13) |
| $C_{20}$ | $C_{21}$ | $C_{22}$ | 120.09(12) |
| $C_{21}$ | $C_{22}$ | $C_{23}$ | 120.33(13) |
| $C_{18}$ | $C_{23}$ | $C_{22}$ | 119.49(12) |

Hydrogen Atom Coordinates (Å×$10^4$) and Isotropic Displacement Parameters (Å$^2$×$10^3$) for compound 1a are illustrated in Table 7 below.

TABLE 7

| Atom | x | y | z | U(eq) |
|---|---|---|---|---|
| $H_3$ | 8850 | 8563 | 8202 | 22 |
| $H_4$ | 13989 | 9987 | 9138 | 22 |
| $H_2$ | 5338 | 3908 | 7312 | 27 |
| $H_{3A}$ | 6237 | 2944 | 8339 | 32 |
| $H_{4A}$ | 4165 | 2829 | 9450 | 39 |
| $H_5$ | 1107 | 3652 | 9492 | 44 |
| $H_6$ | 199 | 4643 | 8481 | 34 |
| $H_{7A}$ | 741 | 6284 | 7906 | 23 |
| $H_{7B}$ | −979 | 5071 | 7228 | 23 |
| $H_{8A}$ | −816 | 5568 | 5946 | 23 |
| $H_{8B}$ | −240 | 6900 | 6707 | 23 |
| $H_{10}$ | −312 | 6641 | 5016 | 26 |
| $H_{11}$ | 463 | 7434 | 3881 | 31 |
| $H_{12}$ | 4073 | 8139 | 3816 | 31 |
| $H_{13}$ | 6935 | 8047 | 4905 | 30 |
| $H_{14}$ | 6193 | 7252 | 6044 | 25 |
| $H_{15A}$ | 4530 | 6784 | 8593 | 21 |
| $H_{15B}$ | 5001 | 7896 | 8245 | 21 |
| $H_{16A}$ | 7501 | 8275 | 9666 | 23 |
| $H_{16B}$ | 8334 | 7105 | 9176 | 23 |

TABLE 7-continued

| Atom | x | y | z | U(eq) |
|---|---|---|---|---|
| $H_{19}$ | 14518 | 9338 | 7419 | 28 |
| $H_{20}$ | 13641 | 9766 | 6063 | 34 |
| $H_{21}$ | 10611 | 10556 | 5821 | 36 |
| $H_{22}$ | 8473 | 10933 | 6937 | 39 |
| $H_{23}$ | 9376 | 10543 | 8313 | 31 |

o. X-Ray Crystal Structure Analysis of Vinyldiazaphosphonate (3a)

Single crystals of $C_{20}H_{23}N_2O_3P$ (Compound 3a) are shown in FIG. 3. A suitable crystal was selected and on a diffractometer. The crystal was kept at 99.91 K during data collection. Using Olex2 (Dolomanov et al. (2009) *J. Appl. Cryst.* 42: 339-341), the structure was solved with the ShelXT structure solution program using Direct Methods and refined with the XL refinement package using Least Squares minimization.

Crystal data and structure refinement for compound 3a are illustrated in Table 8 below.

TABLE 8

| | |
|---|---|
| Identification code | 3a |
| Empirical formula | $C_{20}H_{23}N_2O_3P$ |
| Formula weight | 370.37 |
| Temperature/K | 99.91 |
| Crystal system | orthorhombic |
| Space group | Pbca |
| a/Å | 18.5763(9) |
| b/Å | 9.7340(5) |
| c/Å | 19884(10) |
| α/° | 90 |
| β/° | 90 |
| γ/° | 90 |
| Volume/Å$^3$ | 3585.4(4) |
| Z | 8 |
| $\rho_{calc}$g/cm$^3$ | 1.372 |
| μ/mm$^{-1}$ | 0.177 |
| F(000) | 1568.0 |
| Crystal size/mm$^3$ | 0.2 × 0.15 × 0.08 |
| Radiation | MoKα (λ = 0.71073) |
| 2Θ range for data collection/° | 4.108 to 52.736 |
| Index ranges | −23 ≤ h ≤ 23, −12 ≤ k ≤ 12, −24 ≤ 1 ≤ 24 |
| Reflections collected | 41586 |
| Independent reflections | 3628 [$R_{int}$ = 0.0483, $R_{sigma}$ = 0.0290] |
| Data/restraints/parameters | 3628/6/244 |
| Goodness-of-fit on F$^2$ | 0.999 |
| Final R indexes [I >= 2σ (I)] | $R_1$ = 0.0298, $wR_2$ = 0.0768 |
| Final R indexes [all data] | $R_1$ = 0.0388, $wR_2$ = 0.0807 |
| Largest diff. peak/hole/ e Å$^{-3}$ | 0.32/−0.39 |

Fractional Atomic Coordinates (×$10^4$) and Equivalent Isotropic Displacement Parameters (Å$^2$×$10^3$) of compound 3a are illustrated in Table 9 below. $U_{eq}$ is defined as ⅓ of the trace of the orthogonalised $U_{IJ}$ tensor.

TABLE 9

| Atom | x | y | z | U(eq) |
|---|---|---|---|---|
| $P_1$ | 6232.7(2) | 6582.4(3) | 2541.8(2) | 13.25(10) |
| $O_1$ | 5945.4(5) | 7524.0(9) | 2026.4(4) | 18.1(2) |
| $O_3$ | 5641.1(5) | 5650.0(9) | 4336.5(4) | 18.1(2) |
| $O_2$ | 6474.5(5) | 3986.6(10) | 4270.6(5) | 24.7(2) |

TABLE 9-continued

| Atom | x | y | z | U(eq) |
|---|---|---|---|---|
| $N_2$ | 6889.6(6) | 5485.7(10) | 2335.2(5) | 15.5(2) |
| $N_1$ | 6714.1(5) | 7287.1(11) | 3164.3(5) | 15.2(2) |
| $C_1$ | 6860.9(7) | 4492.6(13) | 1815.0(6) | 15.6(3) |
| $C_2$ | 6198.3(7) | 4022.2(14) | 1570.9(7) | 19.1(3) |
| $C_3$ | 6173.4(7) | 2988.4(15) | 1089.1(7) | 20.8(3) |
| $C_4$ | 6801.1(7) | 2405.8(14) | 839.2(7) | 21.0(3) |
| $C_5$ | 7457.1(7) | 2882.0(14) | 1075.9(7) | 20.0(3) |
| $C_6$ | 7494.0(7) | 3917.9(13) | 1555.8(7) | 17.4(3) |
| $C_7$ | 7590.5(7) | 5860.8(13) | 2631.5(7) | 16.6(3) |
| $C_8$ | 7416.3(7) | 6623.0(14) | 3278.8(7) | 17.3(3) |
| $C_9$ | 6470.2(7) | 8311.1(13) | 3615.4(6) | 14.9(3) |
| $C_{10}$ | 6857.7(7) | 8594.1(13) | 4204.7(7) | 17.1(3) |
| $C_{11}$ | 6646.3(7) | 9670.5(14) | 4620.5(7) | 20.0(3) |
| $C_{12}$ | 6051.8(8) | 10456.4(14) | 4465.8(7) | 21.8(3) |
| $C_{13}$ | 5656.0(8) | 10156.4(14) | 3892.6(7) | 22.2(3) |
| $C_{14}$ | 5858.5(7) | 9091.1(13) | 3467.4(7) | 18.7(3) |
| $C_{15}$ | 5508.2(7) | 5602.0(13) | 2911.7(6) | 14.9(3) |
| $C_{16}$ | 4834.7(8) | 6010.1(15) | 2815.6(7) | 21.0(3) |
| $C_{17}$ | 5687.1(7) | 4344.5(13) | 3327.3(7) | 17.9(3) |
| $C_{18}$ | 5988.7(7) | 4632.8(13) | 4020.5(7) | 16.3(3) |
| $C_{19}$ | 5883.9(7) | 5935.1(14) | 5022.8(6) | 19.5(3) |
| $C_{20}$ | 5459.3(7) | 7140.9(14) | 5275.0(7) | 21.1(3) |

Anisotropic Displacement Parameters ($Å^2 \times 10^3$) for compound 3a are illustrated in Table 10 below. The Anisotropic displacement factor exponent takes the form:—$2\pi^2[h^2a^{*2}U_{11}+2hka^*b^*U_{12}+ \ldots ]$.

TABLE 10

| Atom | $U_{11}$ | $U_{22}$ | $U_{33}$ | $U_{23}$ | $U_{13}$ | $U_{12}$ |
|---|---|---|---|---|---|---|
| $P_1$ | 12.57(18) | 14.30(19) | 12.89(18) | 0.70(13) | −0.97(12) | 0.27(13) |
| $O_1$ | 18.2(5) | 20.2(5) | 16.0(5) | 2.5(4) | −0.8(4) | 1.0(4) |
| $O_3$ | 21.0(5) | 18.8(5) | 14.5(5) | −1.3(4) | −2.2(4) | 1.1(4) |
| $O_2$ | 21.8(5) | 29.8(6) | 22.6(5) | 1.7(4) | −0.5(4) | 7.6(4) |
| $N_2$ | 13.3(6) | 17.1(6) | 16.1(6) | −2.0(5) | −2.2(4) | 0.5(4) |
| $N_1$ | 13.4(5) | 15.5(6) | 16.6(6) | −1.3(4) | −2.4(4) | 0.7(4) |
| $C_1$ | 20.1(7) | 14.8(6) | 12.1(6) | 2.7(5) | −0.5(5) | 0.4(5) |
| $C_2$ | 17.3(7) | 24.4(8) | 15.5(7) | −0.8(6) | 0.6(5) | 1.4(6) |
| $C_3$ | 22.8(7) | 24.5(7) | 15.2(7) | −0.2(6) | −2.5(6) | −3.9(6) |
| $C_4$ | 30.4(8) | 18.8(7) | 13.7(7) | −0.2(5) | 1.0(6) | −0.4(6) |
| $C_5$ | 22.9(7) | 19.5(7) | 17.7(7) | 1.9(6) | 4.3(6) | 4.1(6) |
| $C_6$ | 17.0(7) | 17.5(7) | 17.7(7) | 2.5(5) | 0.7(5) | −0.7(6) |
| $C_7$ | 13.0(7) | 17.0(7) | 19.7(7) | 1.0(5) | −3.2(5) | 0.1(5) |
| $C_8$ | 14.3(7) | 18.3(7) | 19.4(7) | −0.1(5) | −3.9(5) | 1.3(5) |
| $C_9$ | 16.4(6) | 13.2(6) | 15.2(6) | 1.5(5) | 1.5(5) | −3.4(5) |
| $C_{10}$ | 16.6(7) | 16.1(7) | 18.6(7) | 2.0(5) | −1.1(5) | −2.2(5) |
| $C_{11}$ | 22.9(7) | 21.2(7) | 15.8(7) | −1.5(6) | −1.6(6) | −6.6(6) |
| $C_{12}$ | 26.4(8) | 16.6(7) | 22.5(8) | −3.6(6) | 2.4(6) | −0.8(6) |
| $C_{13}$ | 23.0(8) | 19.2(7) | 24.3(8) | −1.2(6) | −0.7(6) | 2.8(6) |
| $C_{14}$ | 19.5(7) | 18.7(7) | 17.9(7) | −0.4(5) | −2.7(6) | 0.0(6) |
| $C_{15}$ | 17.0(7) | 16.3(6) | 11.3(6) | −3.6(5) | −0.2(5) | −2.1(5) |
| $C_{16}$ | 19.5(7) | 24.4(8) | 19.3(8) | −2.4(6) | 0.1(6) | −1.2(6) |
| $C_{17}$ | 19.4(7) | 16.4(7) | 17.8(7) | −1.2(5) | 1.9(5) | −2.3(5) |
| $C_{18}$ | 14.9(6) | 16.1(7) | 17.8(7) | 2.6(5) | 2.7(5) | −2.9(5) |
| $C_{19}$ | 22.0(7) | 23.1(7) | 13.3(7) | 0.5(5) | −2.9(5) | −2.3(6) |
| $C_{20}$ | 23.5(7) | 21.8(7) | 18.2(7) | −0.4(6) | 2.1(6) | −3.6(6) |

Bond Lengths for compound 3a are illustrated in Table 11 below.

TABLE 11

| Atom | Atom | Length/Å |
|---|---|---|
| $P_1$ | $O_1$ | 1.4728(9) |
| $P_1$ | $N_2$ | 1.6724(11) |
| $P_1$ | $N_1$ | 1.6716(11) |
| $P_1$ | $C_{15}$ | 1.8055(13) |

TABLE 11-continued

| Atom | Atom | Length/Å |
|---|---|---|
| $O_3$ | $C_{18}$ | 1.3378(15) |
| $O_3$ | $C_{19}$ | 1.4604(15) |
| $O_2$ | $C_{18}$ | 1.2065(16) |
| $N_2$ | $C_1$ | 1.4147(16) |
| $N_2$ | $C_7$ | 1.4744(16) |
| $N_1$ | $C_8$ | 1.4734(16) |
| $N_1$ | $C_9$ | 1.4139(16) |
| $C_1$ | $C_2$ | 1.3997(18) |
| $C_1$ | $C_6$ | 1.4000(18) |
| $C_2$ | $C_3$ | 1.388(2) |
| $C_3$ | $C_4$ | 1.3881(19) |
| $C_4$ | $C_5$ | 1.3858(19) |
| $C_5$ | $C_6$ | 1.3881(19) |
| $C_7$ | $C_8$ | 1.5174(18) |
| $C_9$ | $C_{10}$ | 1.3998(18) |
| $C_9$ | $C_{14}$ | 1.3979(18) |
| $C_{10}$ | $C_{11}$ | 1.3899(19) |
| $C_{11}$ | $C_{12}$ | 1.378(2) |
| $C_{12}$ | $C_{13}$ | 1.385(2) |
| $C_{13}$ | $C_{14}$ | 1.3884(19) |
| $C_{15}$ | $C_{16}$ | 1.3265(19) |
| $C_{15}$ | $C_{17}$ | 1.5127(18) |
| $C_{17}$ | $C_{18}$ | 1.5105(19) |
| $C_{19}$ | $C_{20}$ | 1.5000(18) |

Bond Angles for compound 3a are illustrated in Table 12 below.

TABLE 12

| Atom | Atom | Atom | Angle/° |
|---|---|---|---|
| $O_1$ | $P_1$ | $N_2$ | 119.45(5) |
| $O_1$ | $P_1$ | $N_1$ | 116.80(5) |
| $O_1$ | $P_1$ | $C_{15}$ | 109.92(6) |
| $N_2$ | $P_1$ | $C_{15}$ | 107.82(6) |
| $N_1$ | $P_1$ | $N_2$ | 93.00(5) |
| $N_1$ | $P_1$ | $C_{15}$ | 108.41(6) |
| $C_{18}$ | $O_3$ | $C_{19}$ | 115.34(10) |

TABLE 12-continued

| Atom | Atom | Atom | Angle/° |
|---|---|---|---|
| $C_1$ | $N_2$ | $P_1$ | 125.97(9) |
| $C_1$ | $N_2$ | $C_7$ | 119.54(10) |
| $C_7$ | $N_2$ | $P_1$ | 112.88(8) |
| $C_8$ | $N_1$ | $P_1$ | 114.05(8) |
| $C_9$ | $N_1$ | $P_1$ | 125.80(9) |
| $C_9$ | $N_1$ | $C_8$ | 119.71(10) |
| $C_2$ | $C_1$ | $N_2$ | 120.58(11) |
| $C_2$ | $C_1$ | $C_6$ | 118.75(12) |
| $C_6$ | $C_1$ | $N_2$ | 120.60(11) |
| $C_3$ | $C_2$ | $C_1$ | 120.29(12) |
| $C_4$ | $C_3$ | $C_2$ | 120.92(13) |
| $C_5$ | $C_4$ | $C_3$ | 118.76(13) |
| $C_4$ | $C_5$ | $C_6$ | 121.23(12) |
| $C_5$ | $C_6$ | $C_1$ | 120.04(12) |
| $N_2$ | $C_7$ | $C_8$ | 105.65(10) |
| $N_1$ | $C_8$ | $C_7$ | 105.84(10) |
| $C_{10}$ | $C_9$ | $N_1$ | 120.13(12) |
| $C_{14}$ | $C_9$ | $N_1$ | 120.71(11) |
| $C_{14}$ | $C_9$ | $C_{10}$ | 119.11(12) |
| $C_{11}$ | $C_{10}$ | $C_9$ | 119.87(12) |
| $C_{12}$ | $C_{11}$ | $C_{10}$ | 120.86(13) |
| $C_{11}$ | $C_{12}$ | $C_{13}$ | 119.42(13) |
| $C_{12}$ | $C_{13}$ | $C_{14}$ | 120.80(13) |
| $C_{13}$ | $C_{14}$ | $C_9$ | 119.89(12) |
| $C_{16}$ | $C_{15}$ | $P_1$ | 119.11(11) |
| $C_{16}$ | $C_{15}$ | $C_{17}$ | 121.86(12) |
| $C_{17}$ | $C_{15}$ | $P_1$ | 119.03(9) |
| $C_{18}$ | $C_{17}$ | $C_{15}$ | 115.27(11) |
| $O_3$ | $C_{18}$ | $C_{17}$ | 112.62(11) |
| $O_2$ | $C_{18}$ | $O_3$ | 123.66(12) |
| $O_2$ | $C_{18}$ | $C_{17}$ | 123.68(12) |
| $O_3$ | $C_{19}$ | $C_{20}$ | 107.27(11) |

Hydrogen Atom Coordinates (Å×$10^4$) and Isotropic Displacement Parameters (Å$^2$×$10^3$) for compound 3a are illustrated in Table 13 below.

TABLE 13

| Atom | x | y | z | U(eq) |
|---|---|---|---|---|
| $H_2$ | 5764 | 4412 | 1736 | 23 |
| $H_3$ | 5720 | 2675 | 928 | 25 |
| $H_4$ | 6781 | 1694 | 512 | 25 |
| $H_5$ | 7890 | 2492 | 907 | 24 |
| $H_6$ | 7949 | 4237 | 1708 | 21 |
| $H_{7A}$ | 7866 | 6457 | 2320 | 20 |
| $H_{7B}$ | 7879 | 5028 | 2728 | 20 |
| $H_{8A}$ | 7388 | 5976 | 3663 | 21 |
| $H_{8B}$ | 7790 | 7319 | 3377 | 21 |
| $H_{10}$ | 7265 | 8051 | 4320 | 21 |
| $H_{11}$ | 6915 | 9867 | 5016 | 24 |
| $H_{12}$ | 5915 | 11197 | 4750 | 26 |
| $H_{13}$ | 5241 | 10686 | 3789 | 27 |
| $H_{14}$ | 5582 | 8893 | 3076 | 22 |
| $H_{17A}$ | 5245 | 3787 | 3378 | 21 |
| $H_{17B}$ | 6041 | 3784 | 3075 | 21 |
| $H_{19A}$ | 6405 | 6151 | 5025 | 23 |
| $H_{19B}$ | 5801 | 5126 | 5315 | 23 |
| $H_{20A}$ | 5543 | 7933 | 4980 | 32 |
| $H_{20B}$ | 5612 | 7367 | 5735 | 32 |
| $H_{20C}$ | 4946 | 6911 | 5275 | 32 |
| $H_{16A}$ | 4728(9) | 6822(16) | 2551(8) | 31(4) |
| $H_{16B}$ | 4424(9) | 5516(16) | 3022(8) | 32(4) |

2. Conceptual Design of N-Heterocyclic Phosphine-Promoted Michael/Intramolecular Arbuzov Cascade Reaction (NPMAC)

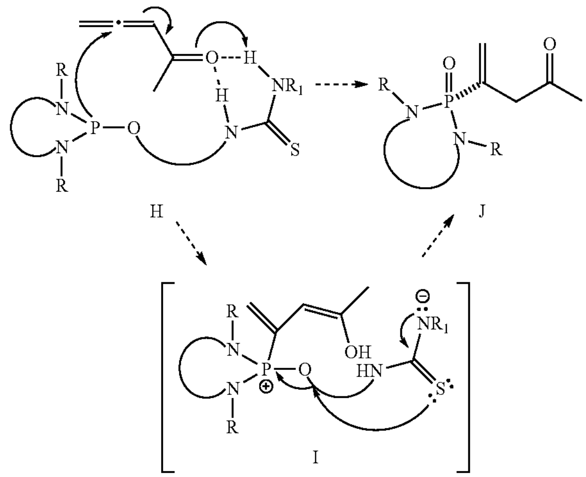

Without wishing to be bound by theory, a conceptual description of this bi-functional NHP-promoted C—P bond forming reaction with allene is presented above. The NHP with enhanced nucleophilicity by the lone pairs and substituents on nitrogen may initiate the addition of phosphorus nucleophile to the sp carbon of allene. This phospha-Michael addition (Enders et al. (2006) *Eur. J. Org. Chem.* 2006: 29; Keglevich et al. (2008) *Heteroat. Chem.* 19: 288) to allene could be accelerated by the activated allenoates through H-bonding (Hoashi et al. (2005) *Angew. Chem. Int. Ed.* 44: 4032; Okino et al. (2005) *J. Am. Chem. Soc.* 127: 119; Hoashi et al. (2004) *Tetrahedron Lett.* 45: 9185; Xiao et al. (2014) *Beilstein J. Org. Chem.* 10: 2089; Guang and Zhao (2013) *Tetrahedron let.* 54: 5703) H. The concept of bi-functional NHP in merging NHP with Brønsted acid can be demonstrated by the dual role in H-bonding activation of the allene and a proton donor to the enolate intermediate. The anionic thiourea and polar P—O bond (Gudat (2010) In *Phosphorus Heterocycles II*; Bansal, R. K., Ed.; Springer Berlin Heidelberg: 2010; Vol. 21, p 63) would then induce the C—O bond cleavage via an intramolecular Arbuzov-type reaction (Breen et al. (2009) *Org. Biomol. Chem.* 7: 178; Catan et al. (2011) *Eur. J. Org. Chem.* 2011: 6857; Bernacki et al. (2010) *Org. Lett.* 12: 5526; Guzaev and Manoharan (2001) *J. Am. Chem. Soc.* 123: 783) corresponding to the formation of P═O bond of vinyldiazaphosphonate I. Without wishing to be bound by theory, this reaction strategy may avoid high reaction temperature conditions and metal reagents to achieve the synthesis of vinylphosphonates J.

3. Optimization of NPMAC Reaction

The envisioned concept of a bi-functional NHP began by investigating the synthesis in which NHP—Cl was treated with 1-(2-hydroxyethyl)-3-phenylthiourea. With the bi-functional NHP in hand, the reactivity with electrophile 2a was explored (Table 1). A screening study of solvents (see Solvent Screening below) quickly identified DCM as the desired solvent for this transformation (entry 2, >99%). An initial reaction between bi-functional NHP 1a and ethylallenoate 2a was carried out to find an optimal amount of the electrophile with a slight excess (entry 2). Afterwards, the optimization studies of the bi-functional NHP were performed with 3 equiv of electrophile in DCM. A study of electronic and steric effects of the NHP with different substituents revealed that a bulky substituent on NHP significantly reduces the efficiency of the reaction (entry 4), whereas the electronic nature has a negligible effect on product yields (entry 3, 5).

TABLE 14

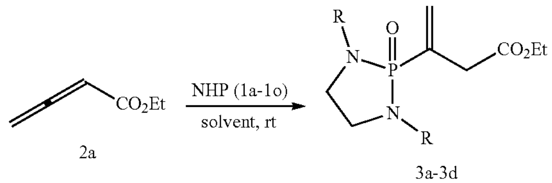

3a: R = Ph
3b: R = 4-OMe—$C_6H_6$
3c: R = 2,6-iPr—$C_6H_6$
3d: R = 4-Me—$C_6H_4$

| Entry | NHP | Solvent | Time (h) | Product/Yield (%)[b] |
|---|---|---|---|---|
| 1[c] | 1a | $CH_2Cl_2$ | 24 | 3a/50 |
| 2 | 1a | $CH_2Cl_2$ | 5 | 3a/>99 |
| 3 | 1b | $CH_2Cl_2$ | 5 | 3b/97 |
| 4 | 1c | $CH_2Cl_2$ | 5 | 3c/trace |
| 5 | 1d | $CH_2Cl_2$ | 5 | 3d/98 |
| 6 | 1e | $CH_2Cl_2$ | 5 | 3a/87 |
| 7 | 1f | $CH_2Cl_2$ | 5 | 3a/92 |
| 8 | 1g | $CH_2Cl_2$ | 5 | 3a/94 |
| 9 | 1h | $CH_2Cl_2$ | 5 | 3a/61 |
| 10 | 1i | $CH_2Cl_2$ | 5 | 3a/88 |
| 11 | 1j | $CH_2Cl_2$ | 5 | 3a/86 |
| 12 | 1k | $CH_2Cl_2$ | 5 | 3a/0 |
| 13 | 1l | $CH_2Cl_2$ | 5 | 3a/82 |
| 14 | 1m | $CH_2Cl_2$ | 5 | 3a/78 |
| 15 | 1n | $CH_2Cl_2$ | 5 | 3a/95 |
| 16 | 1o | $CH_2Cl_2$ | 5 | 3a/66 |

Reactions were performed using 2a (0.30 mmol) and NHP (1a-1n) (0.10 mmol) in $CH_2Cl_2$ (0.15 mL) at rt for 5 hrs.
[b]Isolated Yield.
[c]Reaction using 2a (0.20 mmol).

4. Exploration of Reaction Scope

With the optimized reaction conditions established, the scope of the reaction was explored using various electrophiles and the NHP-thiourea 1a (Table 2). α- or γ-Substituted allenes with a wide range of electron-withdrawing substituents underwent clean reactions to afford desired products in moderate to excellent yields (31-99% yields). Moderately electron-withdrawing substituents on allenes (2a, 2e) were necessary to achieve high yields (3a—99%, 3e—95%); however, stronger electron-withdrawing groups (2f, 2h-j) than the ester group or a bulky ester group on the allene (2g) diminished the product yields (3f-j). The vinyl-diazaphosphonate structure 3a was unambiguously determined by single crystal X-ray analysis providing s-cis conformation (see FIG. 3). In general, the use of allenoates with substituents gave low product yields, presumably due to steric encumbrance in addition to the β-carbon. Nonetheless, strong electron-withdrawing groups on α-substituents (2t, 2u) overcome this steric issue (3t—91%, 3u—90%). Without wishing to be bound by theory, this different reactivity may be attributed to more reactive allenes, which are activated by strong electron-withdrawing substituents. An excellent E/Z stereoselectivity was observed from allenes with γ-aryl or -branched substituents providing only E-olefin products (3z, 3aa, 3ab). Moreover, the tetra-substituted alkenes, otherwise challenging to synthesize, were obtained with moderate to excellent yields (3ac—91%, 3ad—94%). Indeed, all allene electrophiles proceed with complete regioselectivity to provide only the β-addition products.

TABLE 15

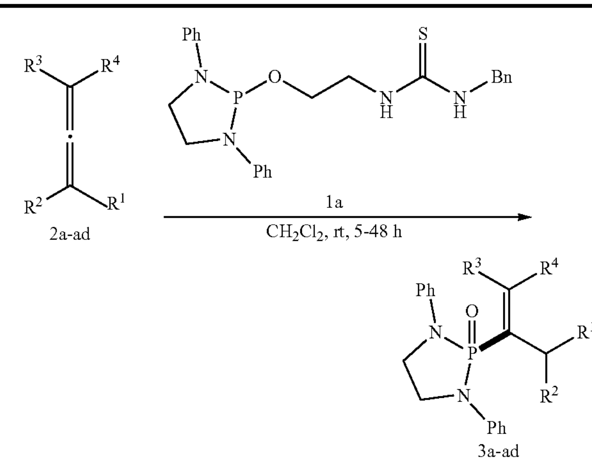

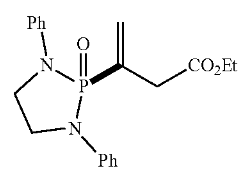

3a >99%[b]

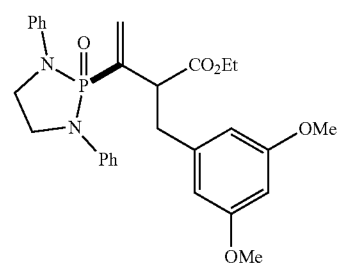

3w, 56%[d]

TABLE 15-continued
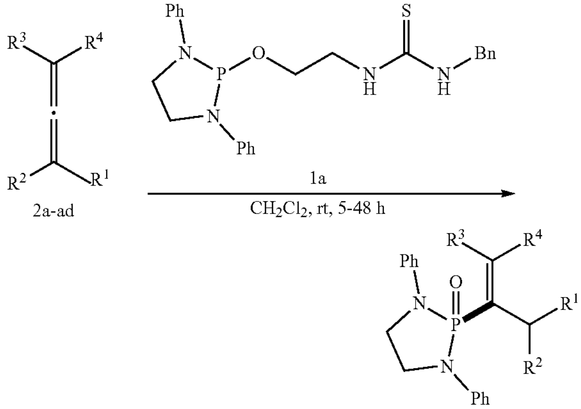
2a-ad
3a-ad
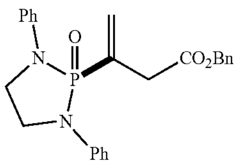
3e, 95%
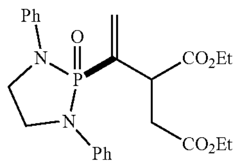
3n, 79%[c]
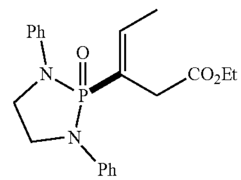
3x, 70%, E/Z = 6:1[f]
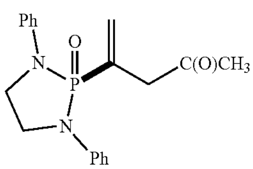
3f, 58%
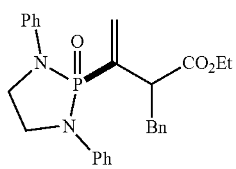
3o, 53%[c]
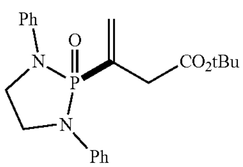
3g, 48%[c]
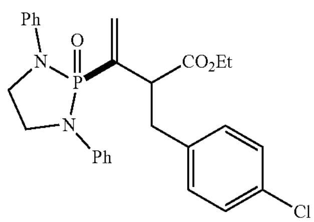
3p, 78%[d]
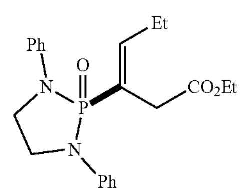
3y, 88%[c], E/Z = 7:1[f]
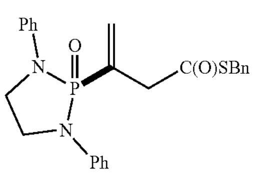
3h, 49%
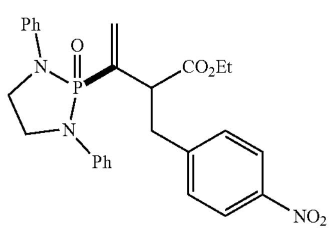
3q, 69%[d]
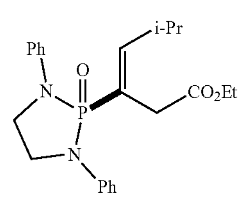
3z, 76%, only E[f]

TABLE 15-continued
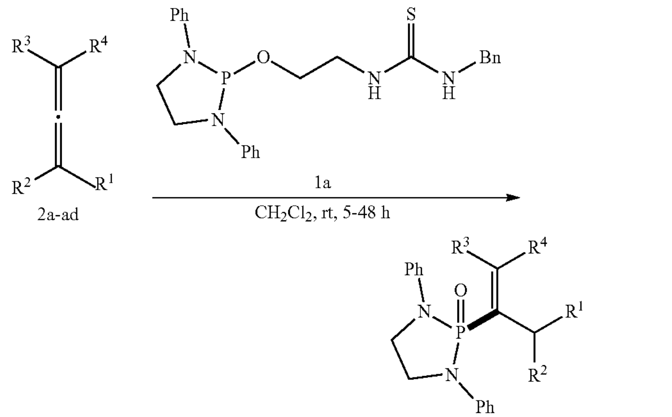
3a-ad
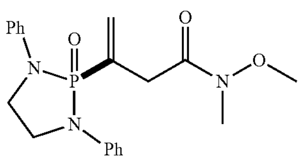
3i, 89%[d]
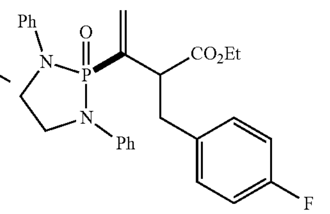
3r, 82%[d]
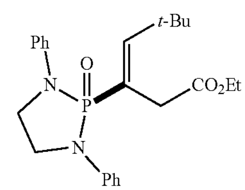
3aa, 86%[c], only E[f]
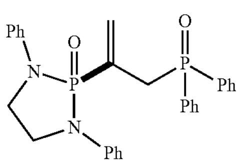
3j, 43%[d,e]
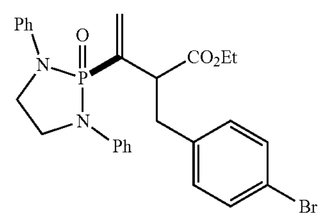
3s, 62%[c]
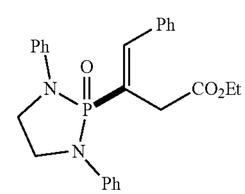
3ab, 31%[d], only E[f]
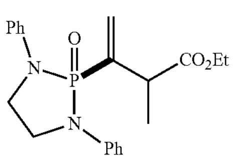
3k, 61%[d]
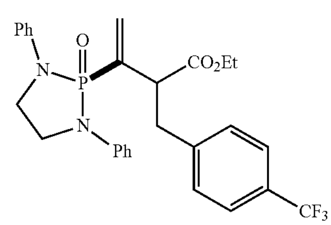
3t, 91%[d]
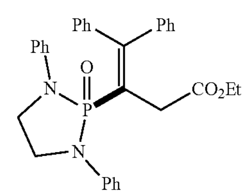
3ac, 91%[d]
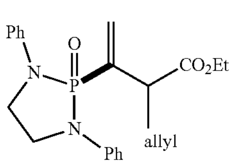
3l, 33%[c]
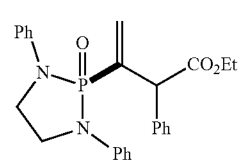
3u, 90%
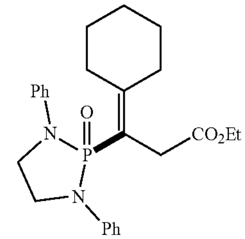
3ad, 94%[d]

TABLE 15-continued
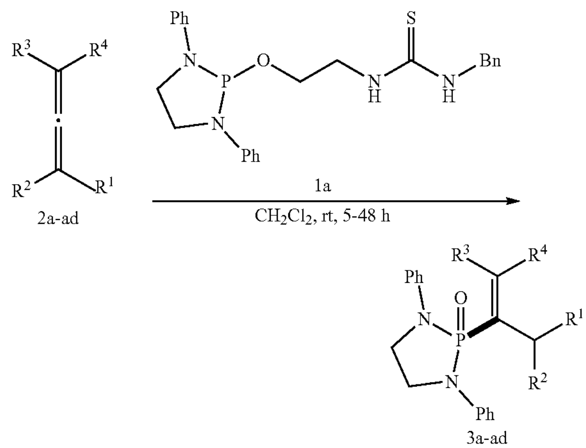
2a-ad
3a-ad
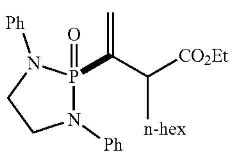
3m, 43%[d]
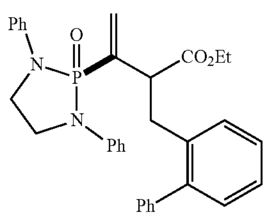
3v, 42%[c]
[a]Reactions were performed using 2 (0.30 mmol) and NHP 1a (0.10 mmol) in $CH_2Cl_2$ (0.15 mL) at rt for 5-48 h.
[b]Isolated yield.
[c]Reaction run for 24 h.
[d]Reaction run for 48 h.
[e]Reaction was conducted with 2j (0.92 equiv).
[f]E/Z ratio was determined by crude NMR spectrum.
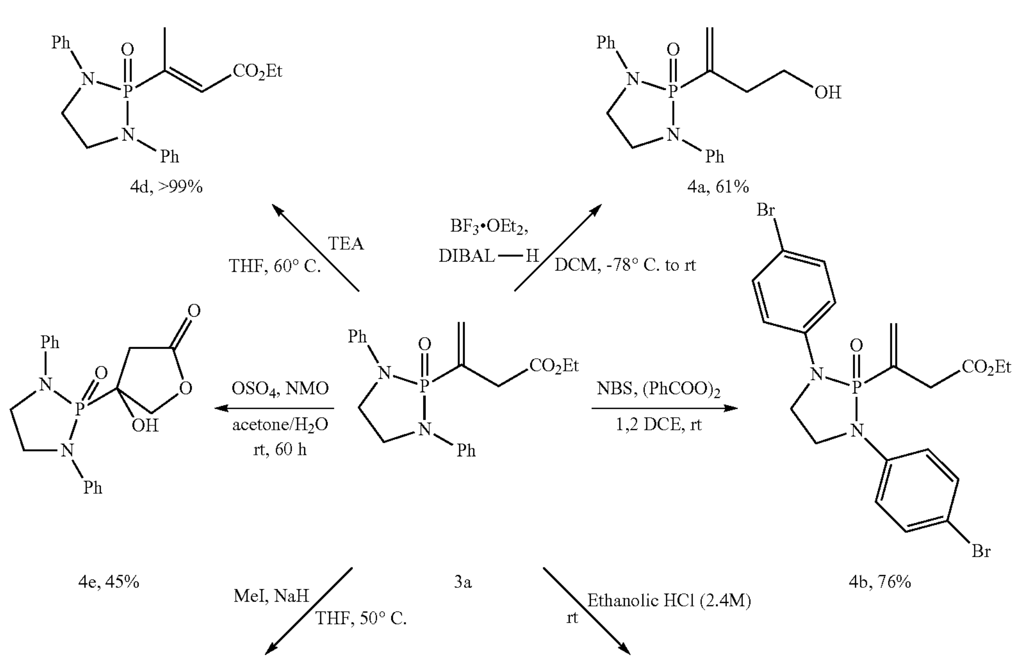

-continued

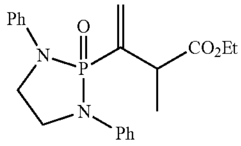

3k, 70%

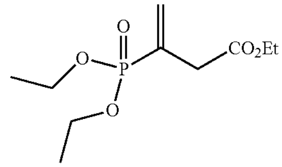

4c, 92%

The vinyldiazaphosphonate is a versatile compound, which was subjected to further synthetic manipulations (see above). A selective reduction of phosphonate ester to alcohol 4a was achieved with DIBAL-H (Moriwake et al. (1986) *Chem. Lett.* 15: 815). With potential application of halogenated vinlyphosphonates as flame retardants (Nametz (1967) *Ind. Eng. Chem.* 59: 99), bromination of 3a was performed to demonstrate a selective aryl halogenation to generate 4b. Additionally, conversion of the parent vinlydiazaphosphonate 3a to vinylphosphonate 4c proceeded smoothly in presence of ethonolic HCl with excellent yield (92%). Moreover, the presence of acidic α-proton on vinyldiazaphosphonate leads to alkylation 3k (70%) and isomerization 4d (>99%). Finally, with an attempt to functionalize the vinyl group of 3a to a diol, the feasibility of tandem dihydroxylation/lactonization of 3a was demonstrated to provide a phosphono lactone 4e (Dupau et al. (2002) *Adv. Synth. Catal.* 344: 421; Jackson et al. (1989) *J. Org. Chem.* 54: 4750).

6. Preliminary Proposed Reaction Pathway provide vinyldiazaphosphonate 3a. This reaction protocol has demonstrated a bi-functional role of NHP in N-heterocyclic Phosphine-promoted Michael/intramolecuar Arbuzov Cascade reaction (NPMAC).

I. References

Robbie, A. J.; Cowley, A. R.; Jones, M. W.; Dilworth, J. R. *Polyhedron* 2011, 30, 1849.

Bemacki, A. L.; Zhu, L.; Hennings, D. D. *Org. Lett.* 2010, 12, 5526.

Caputo, C. A.; Price, J. T.; Jennings, M. C.; McDonald, R.; Jones, N. D. *Dalton Trans.* 2008, 3461.

Goodyer, C. L. M.; Chinje, E. C.; Jaffar, M.; Stratford, I. J.; Threadgill, M. D. *Bioorg. Med. Chem.* 2003, 11, 4189.

Reiter, J. T., L.; Schafer, I *Eur. J. Med. Chem.* 1980, 15, 41.

Boverie, S.; De, T. P.; Delarge, J.; Dorwald, F. Z.; Hansen, J. B.; Lebrun, P.; Mogensen, J. P.; Pirotte, B.; Tagmose, T. M.; Google Patents: 1999.

Lown, J. W.; Chauhan, S. M. S. *J. Org. Chem.* 1983, 48, 507.

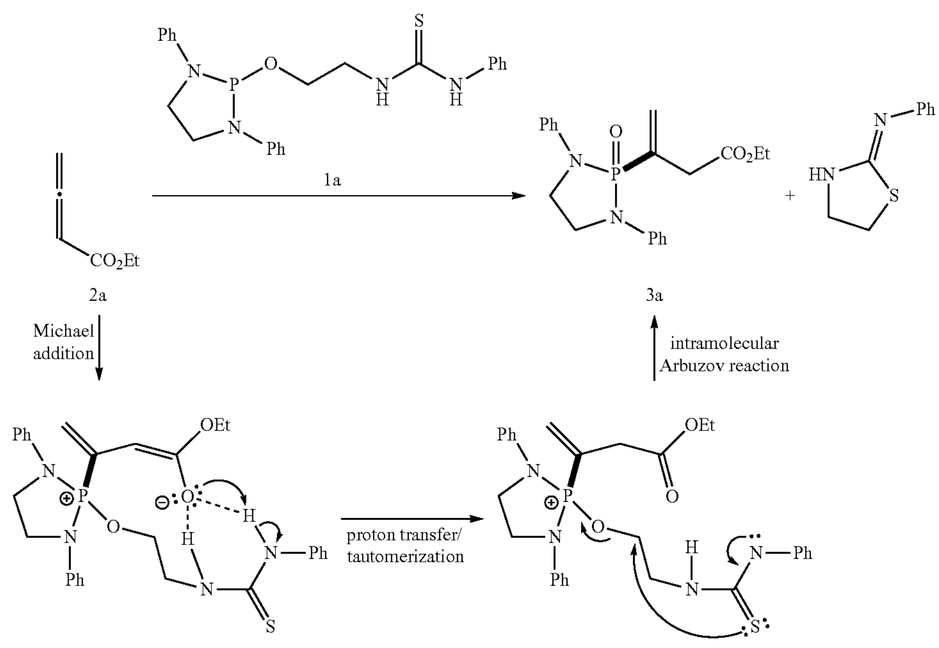

Based on these results, a preliminary reaction pathway was proposed (see above). Without wishing to be bound by theory, Michael addition of the bi-functional NHP 1a to an allenoate 2a, which could be activated by combination of both nucleophilic NHP and H-bonding activation with Brønsted acids, may account for the construction of C—P bond. The following proton transfer/tautomerization may leverage the cascade process of intramolecular Arbuzov reaction to Law, K. R.; McErlean, C. S. P. *Chem. Eur. J.* 2013, 19, 15852.

Denton, R. M.; An, J.; Adeniran, B.; Blake, A. J.; Lewis, W.; Poulton, A. M. *J. Org. Chem.* 2011, 76, 6749.

Guzaev, A. P.; Manoharan, M. *J. Am. Chem. Soc.* 2001, 123, 783.

Heinelt, U.; Schultheis, D.; Jiger, S.; Lindenmaier, M.; Pollex, A.; Beckmann, H. S. g. *Tetrahedron* 2004, 60, 9883.

Ambartsumova, R. F.; Levkovich, M. G.; Mil'grom, E. G.; Abdullaev, N. D. *Chem Heterocycl Compd* 1997, 33, 112.
Kim, T. H.; Min, J. K.; Lee, G.-J. *Tetrahedron Lett.* 1999, 40, 8201.
Rout, L.; Harned, A. M. *Chem. Eur. J.* 2009, 15, 12926.
Constantieux, T.; Buono, G. In *Organic Syntheses*; John Wiley & Sons, Inc.: 2002; Vol. 78, p 135.
Bang, J.; Kim, H.; Kim, J.; Yu, C.-M. *Org. Lett.* 2015, 17, 1573.
Cowen, B. J.; Saunders, L. B.; Miller, S. J. *J. Am. Chem. Soc.* 2009, 131, 6105.
GP-1-I, *The allene was prepared by the GP-1-I.*
Clavier, H.; Jeune, K. L.; Riggi, I. d.; Tenaglia, A.; Buono, G. *Org. Lett.* 2011, 13, 308.
Na, R.; Jing, C.; Xu, Q.; Jiang, H.; Wu, X.; Shi, J.; Zhong, J.; Wang, M.; Benitez, D.; Tkatchouk, E.; Goddard, W. A.; Guo, H.; Kwon, O. *J. Am. Chem. Soc.* 2011, 133, 13337.
GP-1-II, *The allene was prepared by GP-1-II.*
Zhu, X.-F.; Lan, J.; Kwon, O. *J. Am. Chem. Soc.* 2003, 125, 4716.
Wurz, R. P.; Fu, G. C. *J. Am. Chem. Soc.* 2005, 127, 12234.
Lee, P. H.; Mo, J.; Kang, D.; Eom, D.; Park, C.; Lee, C.-H.; Jung, Y. M.; Hwang, H. *J. Org. Chem.* 2011, 76, 312.
Liao, J.-Y.; Shao, P.-L.; Zhao, Y. *J. Am. Chem. Soc.* 2015, 137, 628.
Tsuboi, S.; Kuroda, H.; Takatsuka, S.; Fukawa, T.; Sakai, T.; Utaka, M. *J. Org. Chem.* 1993, 58, 5952.
Chen, B.; Lu, Z.; Chai, G.; Fu, C.; Ma, S. *J. Org. Chem.* 2008, 73, 9486.
Trost, B. M.; Pinkerton, A. B.; Seidel, M. *J. Am. Chem. Soc.* 2001, 123, 12466.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A compound having a structure represented by a formula:

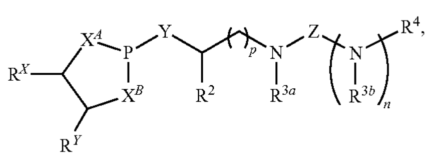

wherein n is selected from 0 and 1;
wherein p is selected from 0, 1, 2, 3, 4, and 5;
wherein each of $X^A$ and $X^B$ is $NR^1$;
wherein each occurrence of $R^1$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each occurrence of $R^1$, when present, is independently substituted with 0, 1, 2, 3, or 4 independently selected $R^5$ groups;
wherein Y is selected from O, S, and $NR^{26}$;
wherein $R^{26}$, when present, is selected from hydrogen and C1-C8 alkyl;
wherein Z is selected from C═S, S═O, and $SO_2$;
wherein each of $R^X$ and $R^Y$ is independently selected from hydrogen, C1-C8 alkyl, C6-C10 aryl, and 4-10 membered heteroaryl, or wherein each of $R^X$ and $R^Y$ are optionally covalently bonded together and, together with the intermediate carbon atoms, comprise a 5- to 7-membered cycloalkyl or 5- to 6-membered aryl;
wherein $R^2$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein $R^2$ is substituted with 0, 1, 2, 3, or 4 independently selected $R^5$ groups;
wherein each of $R^{3a}$ and $R^{3b}$, when present, is independently selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, —(C1-C3 alkyl)(C6-C10 aryl), and 4-10 membered heteroaryl, and wherein each of $R^{3a}$ and $R^{3b}$ is independently substituted with 0, 1, 2, 3, or 4 independently selected $R^5$ groups;
wherein $R^4$ is selected from hydrogen, C1-C6 alkyl, C1-C6 haloalkyl, C2-C6 alkenyl, C2-C6 alkynyl, C3-C10 cycloalkyl, 4-10 membered heterocycloalkyl, C6-C10 aryl, and 4-10 membered heteroaryl, and —(C1-C3 alkyl)(C6-C10 aryl), and wherein $R^4$ is substituted with 0, 1, 2, 3, or 4 independently selected $R^5$ groups;
wherein each occurrence of $R^5$, when present, is independently selected from halogen, —$NO_2$, —CN, —OH, —SH, —$NH_2$, C1-C3 alkyl, C2-C4 alkenyl, C2-C4 alkynyl, C1-C3 haloalkyl, C1-C3 cyanoalkyl, C1-C3 hydroxyalkyl, C1-C3 haloalkoxy, C1-C3 alkoxy, C1-C3 thioalkyl, C1-C3 alkyl(C1-C3 alkoxy), C1-C3 alkylamino, (C1-C3)(C1-C3) dialkylamino, C3-C7 cycloalkyl, C6-C10 aryl, —(C═O)(C1-C3 alkyl), —(S═O)(C1-C3 alkyl), —$SO_2$(C1-C3 alkyl), —$CO_2R^{11}$, —(C═O)$NR^{12a}R^{12b}$, —$SO_2NR^{12a}R^{12b}$, —O(C═O)$NR^{12a}R^{12b}$, —$NHSO_2NR^{12a}R^{12b}$, and —NH(C═O)$NR^{12a}R^{12b}$;
wherein each occurrence of $R^{11}$, when present, is independently selected from hydrogen and C1-C4 alkyl; and
wherein each occurrence of $R^{12a}$ and $R^{12b}$, when present, is independently selected from hydrogen and C1-C3 alkyl.

2. The compound of claim 1, wherein each occurrence of $R^1$, when present, is independently selected from C1-C6 alkyl.

3. The compound of claim 1, wherein each of $R^X$ and $R^Y$ is independently selected from hydrogen and C6-C10 aryl.

4. The compound of claim 1, wherein each of $R^X$ and $R^Y$ are optionally covalently bonded together and, together with the intermediate carbon atoms, comprise a 5- to 7-membered cycloalkyl or 5- to 6-membered aryl.

5. The compound of claim 1, wherein $R^2$ is selected from hydrogen and C1-C6 alkyl.

6. The compound of claim 1, wherein each of $R^{3a}$ and $R^{3b}$, when present, is independently selected from hydrogen and C1-C6 alkyl.

7. The compound of claim 1, wherein $R^4$ is selected from C3-C10 cycloalkyl, C6-C10 aryl, and —(C1-C3 alkyl)(C6-C10 aryl).

8. The compound of claim 1, wherein each occurrence of $R^5$, when present, is independently selected from halogen, —$NO_2$, —CN, —OH, —SH, —$NH_2$, C1-C3 alkyl, C1-C3 haloalkyl, C1-C3 hydroxyalkyl, C1-C3 alkoxy, C1-C3 thioalkyl, C1-C3 alkylamino, and (C1-C3)(C1-C3) dialkylamino.

9. The compound of claim 1, wherein the compound has a structure represented by a formula:

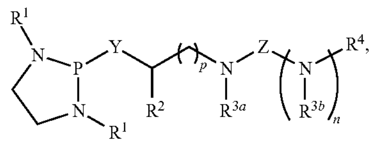

wherein n is selected from 0 and 1;

wherein p is selected from 0, 1, 2, 3, 4, and 5;

wherein each occurrence of $R^1$, when present, is independently selected from hydrogen, C1-C6 alkyl, and C6-C10 aryl, and wherein each occurrence of $R^1$, when present, is independently substituted with 0, 1, 2, 3, or 4 independently selected $R^5$ groups;

wherein Y is selected from O and S;

wherein Z is selected from C═S, S═O, and $SO_2$;

wherein $R^2$ is selected from hydrogen and C1-C6 alkyl substituted with 0, 1, 2, 3, or 4 independently selected $R^5$ groups;

wherein each of $R^{3a}$ and $R^{3b}$, when present, is independently selected from hydrogen and C1-C6 alkyl substituted with 0, 1, 2, 3, or 4 independently selected $R^5$ groups;

wherein $R^4$ is selected from C3-C10 cycloalkyl, C6-C10 aryl, and —(C1-C3 alkyl)(C6-C10 aryl), and wherein $R^4$ is substituted with 0, 1, 2, 3, or 4 independently selected $R^5$ groups;

wherein each occurrence of $R^5$, when present, is independently selected from halogen, —$NO_2$, —CN, —OH, —SH, —$NH_2$, C1-C3 alkyl, C1-C3 haloalkyl, C1-C3 hydroxyalkyl, C1-C3 alkoxy, C1-C3 thioalkyl, C1-C3 alkylamino, and (C1-C3)(C1-C3) dialkylamino.

10. The compound of claim 1, wherein the compound has a structure represented by a formula:

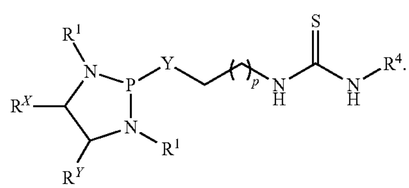

11. The compound of claim 1, wherein n is 1.

12. The compound of claim 1, wherein p is 1.

13. The compound of claim 1, wherein each occurrence of $R^1$, when present, is independently C6-C10 aryl and wherein each occurrence of $R^1$, when present, is independently substituted with 0, 1, 2, 3, or 4 independently selected $R^5$ groups.

14. The compound of claim 1, wherein each $R^1$ is phenyl, optionally substituted by 1 or 2 independently selected $R^5$ groups; and wherein $R^5$ is selected from the group consisting of $NO_2$, bromo, methyl, isopropyl, and methoxy.

15. The compound of claim 1, wherein Y is O.

16. The compound of claim 1, wherein Z is C═S.

17. The compound of claim 1, wherein the compound has a structure represented by a formula:

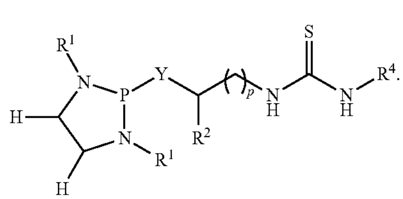

18. The compound of claim 1, wherein the compound has a structure represented by a formula:

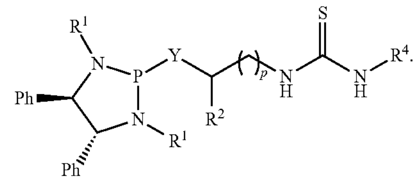

19. The compound of claim 1, wherein the compound has a structure represented by a formula:

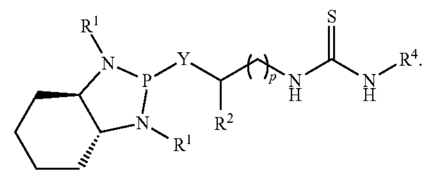

20. The compound of claim 1, wherein the compound is selected from:

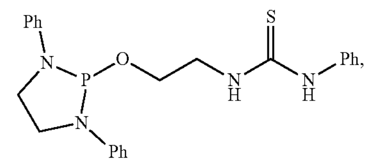

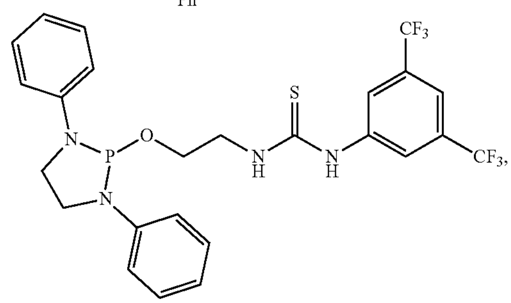

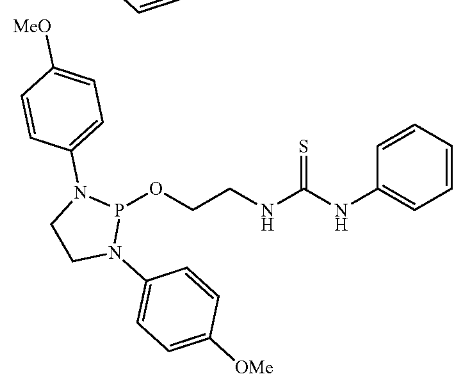

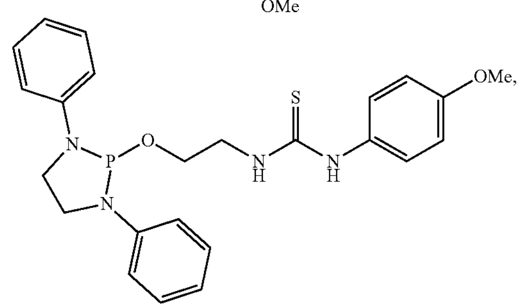

-continued
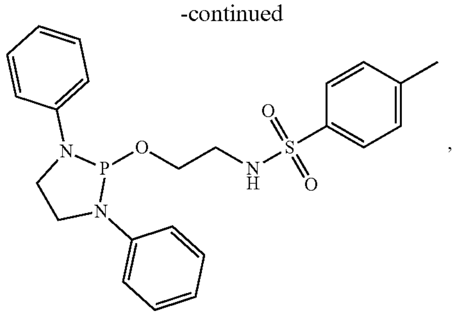
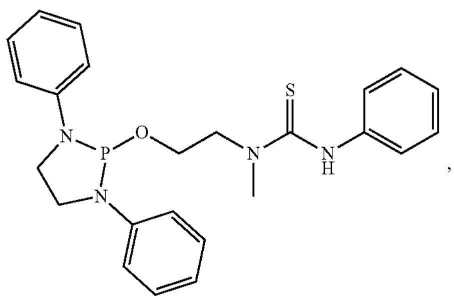
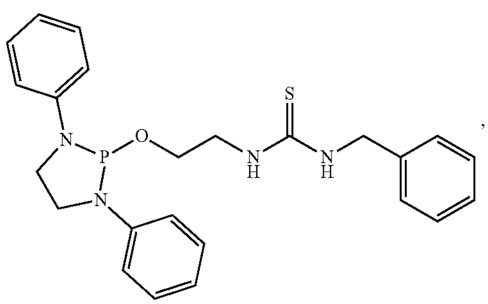
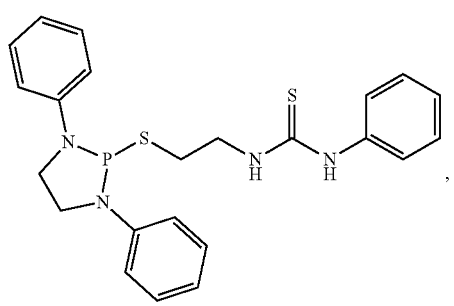
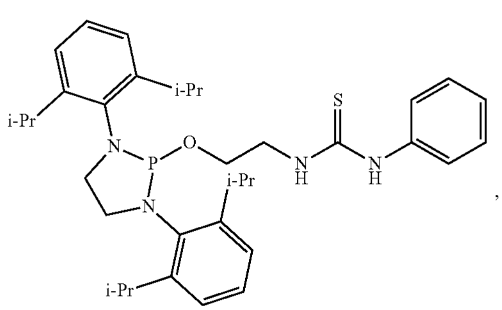
-continued
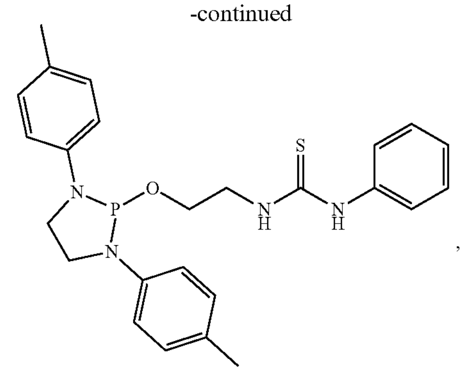
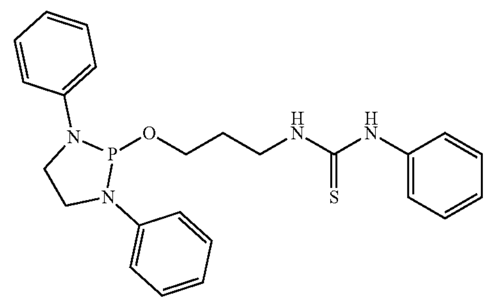
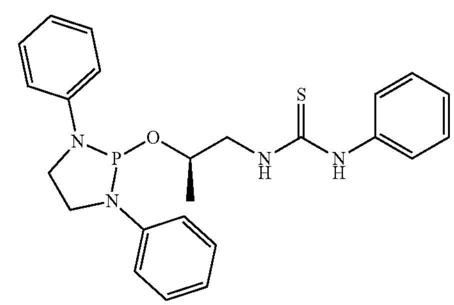
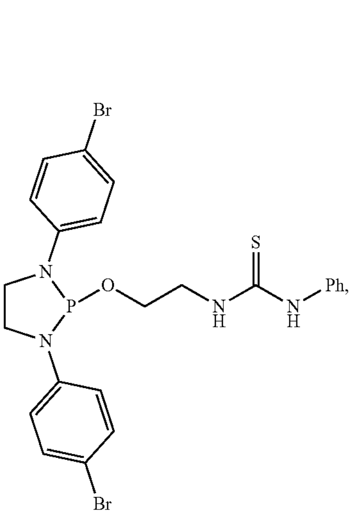

-continued
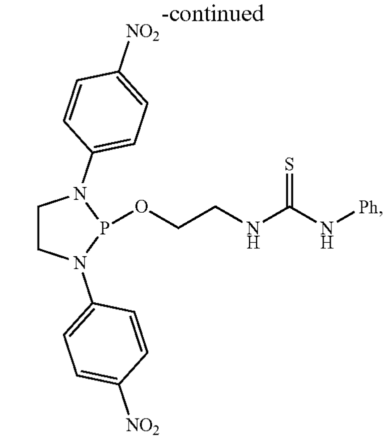
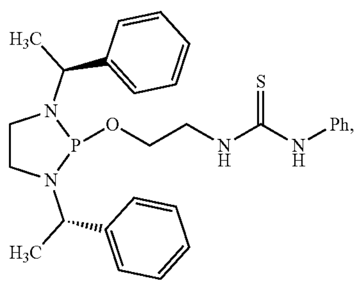
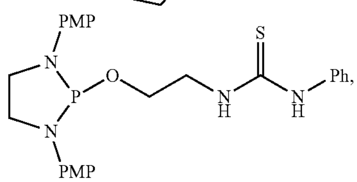
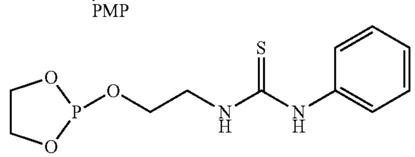
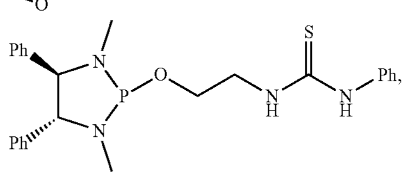
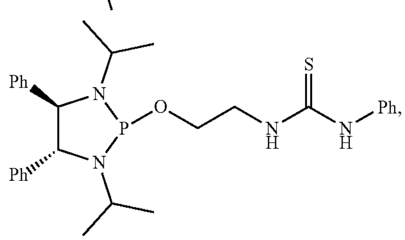
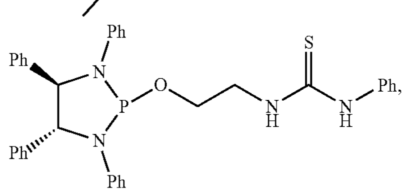
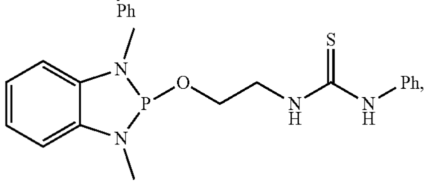
-continued
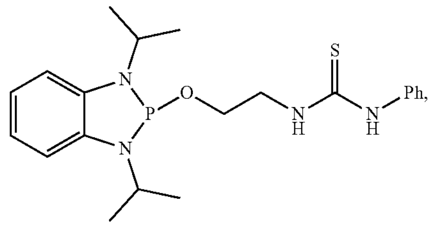
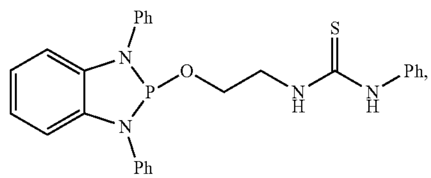
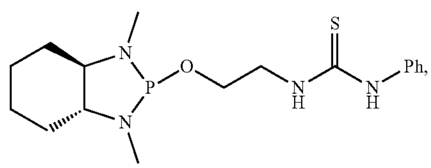
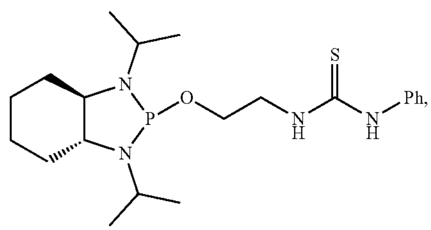
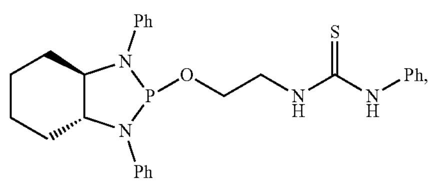
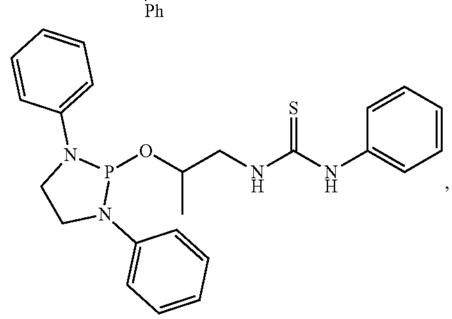
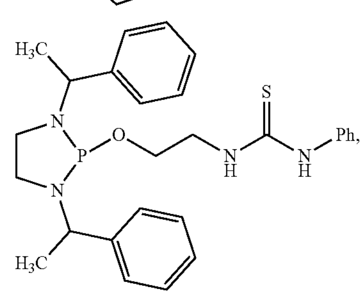
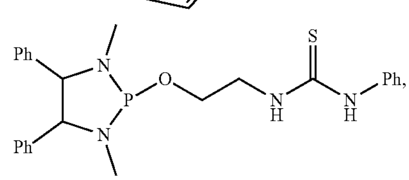

-continued
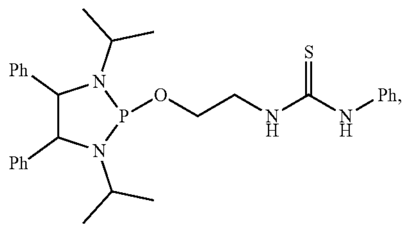
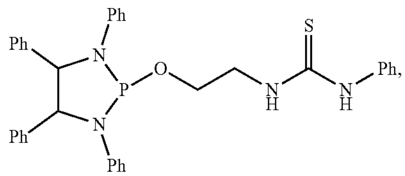
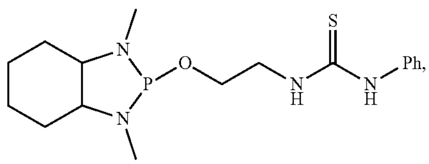
-continued
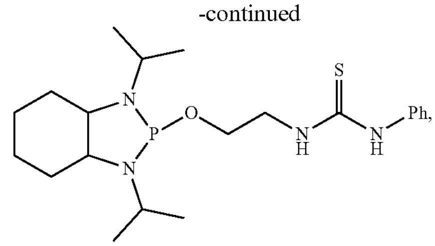
and
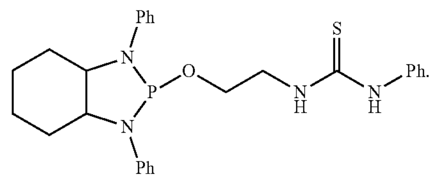
* * * * *